US011481769B2

(12) United States Patent
Van Os et al.

(10) Patent No.: US 11,481,769 B2
(45) Date of Patent: Oct. 25, 2022

(54) USER INTERFACE FOR TRANSACTIONS

(71) Applicant: Apple Inc., Cupertino, CA (US)

(72) Inventors: Marcel Van Os, San Francisco, CA (US); Peter D. Anton, San Francisco, CA (US); Donald W. Pitschel, San Francisco, CA (US); Simon Tickner, Whitstable (GB)

(73) Assignee: Apple Inc., Cupertino, CA (US)

( * ) Notice: Subject to any disclaimer, the term of this patent is extended or adjusted under 35 U.S.C. 154(b) by 21 days.

(21) Appl. No.: 16/789,132

(22) Filed: Feb. 12, 2020

(65) Prior Publication Data

US 2020/0184472 A1 Jun. 11, 2020

Related U.S. Application Data

(63) Continuation of application No. 15/351,230, filed on Nov. 14, 2016, now Pat. No. 10,621,581.

(60) Provisional application No. 62/348,893, filed on Jun. 11, 2016.

(51) Int. Cl.
*G06Q 20/40* (2012.01)
*G06Q 20/22* (2012.01)
*G06Q 20/32* (2012.01)
*G06Q 20/38* (2012.01)
(Continued)

(52) U.S. Cl.
CPC ....... *G06Q 20/386* (2020.05); *G06Q 20/2295* (2020.05); *G06Q 20/29* (2013.01); *G06Q 20/3223* (2013.01); *G06Q 20/36* (2013.01); *G06Q 20/401* (2013.01); *G06Q 30/06* (2013.01); *G06Q 30/0641* (2013.01)

(58) Field of Classification Search
CPC .. G06Q 30/0641; G06Q 20/401; G06Q 20/20; G06Q 30/06; G06Q 20/29; G06Q 20/36; G06Q 20/386; G06Q 20/3223; G06Q 20/2295; G07F 9/001; G07G 1/0009
USPC ..................................................... 705/35–45
See application file for complete search history.

(56) References Cited

U.S. PATENT DOCUMENTS

| 3,586,261 A | 6/1971 | Paine et al. |
| 4,516,207 A | 5/1985 | Moriyama et al. |
| 4,803,487 A | 2/1989 | Willard et al. |

(Continued)

FOREIGN PATENT DOCUMENTS

| AU | 2005256796 A1 | 1/2006 |
| AU | 2015100708 A4 | 7/2015 |

(Continued)

OTHER PUBLICATIONS

Google Scholar NPL (non-patent literature) Search, dated Feb. 22, 2022. (Year: 2022).*

(Continued)

*Primary Examiner* — Hai Tran
(74) *Attorney, Agent, or Firm* — Dentons US LLP

(57) ABSTRACT

The present disclosure generally relates to techniques for managing contextual transactions. In some examples, at a sender electronic device, a first user provides authorization to purchase an item for a second user. In some examples, at a recipient device, the second user selects one or more attributes for the item and requests to claim the item. In some examples, an electronic device displays a representation of an item and a purchase affordance for purchasing the item using a payment system that is available on the electronic device.

48 Claims, 75 Drawing Sheets

(51) Int. Cl.
  *G06Q 30/06* (2012.01)
  *G06Q 20/36* (2012.01)

(56) References Cited

U.S. PATENT DOCUMENTS

| | | |
|---|---|---|
| 5,237,159 A | 8/1993 | Stephens et al. |
| 5,265,007 A | 11/1993 | Barnhard et al. |
| 5,484,988 A | 1/1996 | Hills et al. |
| 5,691,524 A | 11/1997 | Josephson |
| 5,717,868 A | 2/1998 | James |
| 5,783,808 A | 7/1998 | Josephson |
| 5,802,208 A | 9/1998 | Podilchuk et al. |
| 5,815,657 A | 9/1998 | Williams et al. |
| 5,910,989 A | 6/1999 | Naccache |
| 5,917,913 A | 6/1999 | Wang |
| 5,983,197 A | 11/1999 | Enta |
| 6,016,484 A | 1/2000 | Williams et al. |
| 6,076,928 A | 6/2000 | Fateh et al. |
| 6,164,528 A | 12/2000 | Hills et al. |
| 6,189,785 B1 | 2/2001 | Lowery |
| 6,193,152 B1 | 2/2001 | Fernando et al. |
| 6,212,548 B1 | 4/2001 | DeSimone et al. |
| 6,230,148 B1 | 5/2001 | Pare et al. |
| 6,256,129 B1 | 7/2001 | Kim et al. |
| 6,260,027 B1 | 7/2001 | Takahashi et al. |
| 6,282,656 B1 | 8/2001 | Wang |
| 6,323,846 B1 | 11/2001 | Westerman et al. |
| 6,328,207 B1 | 12/2001 | Gregoire et al. |
| 6,398,646 B1 | 6/2002 | Wei et al. |
| 6,408,087 B1 | 6/2002 | Kramer |
| 6,570,557 B1 | 5/2003 | Westerman et al. |
| 6,581,042 B2 | 6/2003 | Pare et al. |
| 6,644,546 B2 | 11/2003 | George et al. |
| 6,662,166 B2 | 12/2003 | Pare et al. |
| 6,677,932 B1 | 1/2004 | Westerman |
| 6,822,769 B1 | 11/2004 | Drinkwater et al. |
| 6,889,138 B1 | 5/2005 | Krull et al. |
| 6,950,810 B2 | 9/2005 | Lapsley et al. |
| 6,957,339 B2 | 10/2005 | Shinzaki et al. |
| 6,970,855 B2 | 11/2005 | Das et al. |
| 6,993,489 B1 | 1/2006 | Miglautsch |
| 7,079,652 B1 | 7/2006 | Harris |
| 7,081,905 B1 | 7/2006 | Raghunath |
| 7,099,845 B2 | 8/2006 | Higgins et al. |
| 7,099,850 B1 | 8/2006 | Mann et al. |
| 7,130,664 B1 | 10/2006 | Williams |
| 7,155,411 B1 | 12/2006 | Blinn et al. |
| 7,305,350 B1 | 12/2007 | Bruecken |
| 7,347,361 B2 | 3/2008 | Lovett |
| 7,356,516 B2 | 4/2008 | Richey et al. |
| 7,359,880 B2 | 4/2008 | Abel et al. |
| 7,370,244 B2 | 5/2008 | Breitling et al. |
| 7,415,720 B2 | 8/2008 | Jung |
| 7,430,537 B2 | 9/2008 | Templeton et al. |
| 7,454,192 B1 | 11/2008 | Zhu |
| 7,496,527 B2 | 2/2009 | Silverstein et al. |
| 7,529,563 B1 | 5/2009 | Pitroda |
| 7,535,344 B2 | 5/2009 | Obradovich |
| 7,546,470 B2 | 6/2009 | Schultz |
| 7,614,008 B2 | 11/2009 | Ording |
| 7,630,937 B1 | 12/2009 | Mo et al. |
| 7,633,076 B2 | 12/2009 | Huppi et al. |
| 7,644,019 B2 | 1/2010 | Woda et al. |
| 7,653,883 B2 | 1/2010 | Hotelling et al. |
| 7,657,441 B2 | 2/2010 | Richey et al. |
| 7,657,849 B2 | 2/2010 | Chaudhri et al. |
| 7,663,607 B2 | 2/2010 | Hotelling et al. |
| 7,664,638 B2 | 2/2010 | Cooper et al. |
| 7,689,508 B2 | 3/2010 | Davis et al. |
| 7,783,564 B2 | 8/2010 | Mullen et al. |
| 7,784,684 B2 | 8/2010 | Labrou et al. |
| 7,810,720 B2 | 10/2010 | Lovett |
| 7,818,399 B1 | 10/2010 | Ross, Jr. et al. |
| 7,844,914 B2 | 11/2010 | Andre et al. |
| 7,860,936 B1 | 12/2010 | Newstadt et al. |
| 7,890,422 B1 | 2/2011 | Hirka et al. |
| 7,957,762 B2 | 6/2011 | Herz et al. |
| RE42,574 E | 7/2011 | Cockayne |
| 8,006,002 B2 | 8/2011 | Kalayjian et al. |
| 8,042,157 B2 | 10/2011 | Bennett et al. |
| 8,050,997 B1 | 11/2011 | Nosek et al. |
| 8,060,571 B2 | 11/2011 | Rao |
| 8,112,787 B2 | 2/2012 | Buer |
| 8,121,945 B2 | 2/2012 | Rackle et al. |
| 8,126,806 B1 | 2/2012 | DiMartino et al. |
| 8,157,164 B1 | 4/2012 | Billman |
| 8,180,705 B2 | 5/2012 | Kowalchyk et al. |
| 8,195,507 B2 | 6/2012 | Postrel |
| 8,195,576 B1 | 6/2012 | Grigg et al. |
| 8,239,784 B2 | 8/2012 | Hotelling et al. |
| 8,254,647 B1 | 8/2012 | Nechyba et al. |
| 8,279,180 B2 | 10/2012 | Hotelling et al. |
| 8,381,135 B2 | 2/2013 | Hotelling et al. |
| 8,392,259 B2 | 3/2013 | MacGillivray et al. |
| 8,396,265 B1 | 3/2013 | Ross et al. |
| 8,452,654 B1 | 5/2013 | Wooters et al. |
| 8,452,978 B2 | 5/2013 | Alward et al. |
| 8,453,940 B2 | 6/2013 | Diamond |
| 8,467,766 B2 | 6/2013 | Rackley et al. |
| 8,479,122 B2 | 7/2013 | Hotelling et al. |
| 8,554,694 B1 | 10/2013 | Ward et al. |
| 8,560,004 B1 | 10/2013 | Tsvetkov et al. |
| 8,571,937 B2 | 10/2013 | Rose et al. |
| 8,583,549 B1 | 11/2013 | Mohsenzadeh |
| 8,606,512 B1 | 12/2013 | Bogovich et al. |
| 8,606,640 B2 | 12/2013 | Brody et al. |
| 8,706,628 B2 | 4/2014 | Phillips |
| 8,762,272 B1 | 6/2014 | Cozens et al. |
| 8,763,896 B2 | 7/2014 | Kushevsky et al. |
| 8,769,624 B2 | 7/2014 | Cotterill |
| 8,827,153 B1 | 9/2014 | Rhoades et al. |
| 8,831,677 B2 | 9/2014 | Villa-Real |
| 8,880,055 B1 | 11/2014 | Clement et al. |
| 8,892,474 B1 | 11/2014 | Inskeep et al. |
| 8,924,259 B2 | 12/2014 | Neighman et al. |
| 8,924,292 B1 | 12/2014 | Ellis et al. |
| 8,931,703 B1 | 1/2015 | Mullen et al. |
| 8,942,420 B2 | 1/2015 | Kim et al. |
| 8,949,902 B1 | 2/2015 | Fabian-Isaacs et al. |
| 8,959,360 B1 | 2/2015 | Barra |
| 8,963,806 B1 | 2/2015 | Starner et al. |
| 9,002,322 B2 | 4/2015 | Cotterill |
| 9,053,293 B2 | 6/2015 | Latzina |
| 9,117,242 B1 | 8/2015 | Ellis et al. |
| 9,123,272 B1 | 9/2015 | Baldwin et al. |
| 9,177,130 B2 | 11/2015 | Nechyba et al. |
| 9,189,778 B1 | 11/2015 | Sh. Al-Rashidi |
| 9,253,375 B2 | 2/2016 | Milanfar et al. |
| 9,269,083 B1 | 2/2016 | Jarajapu et al. |
| 9,294,476 B1 | 3/2016 | Lurey et al. |
| 9,305,310 B2 | 4/2016 | Radhakrishnan et al. |
| 9,324,067 B2 | 4/2016 | Van Os et al. |
| 9,349,035 B1 | 5/2016 | Gerber et al. |
| 9,355,393 B2 | 5/2016 | Purves et al. |
| 9,411,460 B2 | 8/2016 | Dumont et al. |
| 9,477,872 B2 | 10/2016 | Sarve et al. |
| 9,483,763 B2 | 11/2016 | Van Os et al. |
| 9,509,686 B2 | 11/2016 | Anantha et al. |
| 9,519,901 B1 | 12/2016 | Dorogusker |
| 9,526,127 B1 | 12/2016 | Taubman et al. |
| 9,547,419 B2 | 1/2017 | Yang et al. |
| 9,558,636 B1 | 1/2017 | Burdick |
| 9,569,605 B1 | 2/2017 | Schneider et al. |
| 9,574,896 B2 | 2/2017 | McGavran et al. |
| 9,584,463 B2 | 2/2017 | Ji et al. |
| 9,716,825 B1 | 7/2017 | Manzari et al. |
| 9,767,329 B2 | 9/2017 | Forster |
| 9,779,585 B2 | 10/2017 | Dupuis et al. |
| 9,817,549 B2 | 11/2017 | Chandrasekaran |
| 9,842,330 B1 | 12/2017 | Van et al. |
| 9,847,999 B2 | 12/2017 | Van Os et al. |
| 9,851,214 B1 | 12/2017 | Chintakindi |
| 9,880,717 B1 | 1/2018 | Persson et al. |
| 9,881,198 B2 | 1/2018 | Lee et al. |

(56) References Cited

U.S. PATENT DOCUMENTS

| | | |
|---|---|---|
| 9,922,327 B2 | 3/2018 | Johnson et al. |
| 9,940,637 B2 | 4/2018 | Van Os et al. |
| 9,953,149 B2 | 4/2018 | Tussy |
| 9,965,808 B1 | 5/2018 | Kunz et al. |
| 10,003,738 B2 | 6/2018 | Lautenbach et al. |
| 10,019,904 B1 | 7/2018 | Chan et al. |
| 10,032,100 B2 | 7/2018 | Mullen et al. |
| 10,073,541 B1 | 9/2018 | Baldwin |
| 10,089,607 B2 | 10/2018 | Ziat et al. |
| 10,095,276 B2 | 10/2018 | Faith et al. |
| 10,223,631 B2 | 3/2019 | Mullen et al. |
| 10,223,743 B2 | 3/2019 | Walker et al. |
| 10,248,779 B2 | 4/2019 | Song et al. |
| 10,255,545 B2 | 4/2019 | Mullen et al. |
| 10,296,889 B2 | 5/2019 | Lin et al. |
| 10,319,203 B1 | 6/2019 | Testanero et al. |
| 10,334,054 B2 | 6/2019 | Van Os et al. |
| 10,482,461 B2 | 11/2019 | Van Os et al. |
| 10,580,059 B2 | 3/2020 | Nair et al. |
| 10,749,967 B2 | 8/2020 | Van Os et al. |
| 10,783,576 B1 | 9/2020 | Van Os et al. |
| 2001/0039497 A1 | 11/2001 | Hubbard |
| 2001/0049627 A1 | 12/2001 | Simpson |
| 2002/0004760 A1 | 1/2002 | Yoshida et al. |
| 2002/0015024 A1 | 2/2002 | Westerman et al. |
| 2002/0023215 A1 | 2/2002 | Wang et al. |
| 2002/0029169 A1 | 3/2002 | Oki et al. |
| 2002/0046064 A1 | 4/2002 | Maury et al. |
| 2002/0059295 A1 | 5/2002 | Ludtke et al. |
| 2002/0065774 A1 | 5/2002 | Young et al. |
| 2002/0087262 A1 | 7/2002 | Bullock et al. |
| 2002/0116276 A1 | 8/2002 | Ottley |
| 2003/0006280 A1 | 1/2003 | Seita et al. |
| 2003/0028639 A1 | 2/2003 | Yamamoto et al. |
| 2003/0061157 A1 | 3/2003 | Hirka et al. |
| 2003/0097413 A1 | 5/2003 | Vishik et al. |
| 2003/0110097 A1 | 6/2003 | Lei et al. |
| 2003/0142227 A1 | 7/2003 | Van Zee |
| 2003/0169881 A1 | 9/2003 | Niedermeyer |
| 2003/0181201 A1 | 9/2003 | Bomze et al. |
| 2003/0188183 A1 | 10/2003 | Lee et al. |
| 2003/0200184 A1 | 10/2003 | Dominguez et al. |
| 2003/0236746 A1 | 12/2003 | Turner et al. |
| 2004/0006479 A1 | 1/2004 | Tanaka |
| 2004/0061913 A1 | 4/2004 | Takiguchi et al. |
| 2004/0073432 A1 | 4/2004 | Stone |
| 2004/0122685 A1 | 6/2004 | Bunce |
| 2004/0143547 A1 | 7/2004 | Mersky et al. |
| 2004/0143553 A1 | 7/2004 | Torget et al. |
| 2004/0169722 A1 | 9/2004 | Pena |
| 2004/0181695 A1 | 9/2004 | Walker et al. |
| 2004/0215572 A1 | 10/2004 | Uehara et al. |
| 2004/0225609 A1 | 11/2004 | Greene |
| 2004/0242200 A1 | 12/2004 | Maeoka et al. |
| 2004/0254891 A1 | 12/2004 | Blinn et al. |
| 2005/0043996 A1 | 2/2005 | Silver et al. |
| 2005/0071188 A1 | 3/2005 | Thuerk |
| 2005/0093868 A1 | 5/2005 | Hinckley |
| 2005/0096009 A1 | 5/2005 | Ackley |
| 2005/0131816 A1 | 6/2005 | Britto et al. |
| 2005/0144452 A1 | 6/2005 | Lynch et al. |
| 2005/0187873 A1 | 8/2005 | Labrou et al. |
| 2005/0191159 A1 | 9/2005 | Benko |
| 2005/0193054 A1 | 9/2005 | Wilson et al. |
| 2005/0210394 A1 | 9/2005 | Crandall et al. |
| 2005/0219223 A1 | 10/2005 | Kotzin et al. |
| 2005/0244059 A1 | 11/2005 | Turski |
| 2005/0250538 A1 | 11/2005 | Narasimhan et al. |
| 2005/0253814 A1 | 11/2005 | Ghassabian |
| 2005/0261968 A1 | 11/2005 | Randall et al. |
| 2005/0278587 A1 | 12/2005 | Breitling et al. |
| 2006/0000900 A1 | 1/2006 | Fernandes et al. |
| 2006/0017692 A1 | 1/2006 | Wehrenberg et al. |
| 2006/0021003 A1 | 1/2006 | Fisher et al. |
| 2006/0025923 A1 | 2/2006 | Dotan et al. |
| 2006/0026536 A1 | 2/2006 | Hotelling et al. |
| 2006/0033724 A1 | 2/2006 | Chaudhri et al. |
| 2006/0053079 A1 | 3/2006 | Edmonson et al. |
| 2006/0056664 A1 | 3/2006 | Iwasaki |
| 2006/0064313 A1 | 3/2006 | Steinbarth et al. |
| 2006/0064372 A1 | 3/2006 | Gupta |
| 2006/0120707 A1 | 6/2006 | Kusakari et al. |
| 2006/0149546 A1 | 7/2006 | Runge et al. |
| 2006/0165060 A1 | 7/2006 | Dua |
| 2006/0173749 A1 | 8/2006 | Ward et al. |
| 2006/0179404 A1 | 8/2006 | Yolleck et al. |
| 2006/0192868 A1 | 8/2006 | Wakamori |
| 2006/0197753 A1 | 9/2006 | Hotelling |
| 2006/0206709 A1 | 9/2006 | Labrou et al. |
| 2006/0208065 A1 | 9/2006 | Mendelevich et al. |
| 2006/0229984 A1 | 10/2006 | Miyuki et al. |
| 2006/0234764 A1 | 10/2006 | Gamo et al. |
| 2006/0235795 A1 | 10/2006 | Johnson et al. |
| 2006/0235796 A1 | 10/2006 | Johnson et al. |
| 2006/0288226 A1 | 12/2006 | Kowal |
| 2006/0294007 A1 | 12/2006 | Barthelemy |
| 2006/0294025 A1 | 12/2006 | Mengerink |
| 2007/0013662 A1 | 1/2007 | Fauth |
| 2007/0073649 A1 | 3/2007 | Kikkoji et al. |
| 2007/0096765 A1 | 5/2007 | Kagan |
| 2007/0125838 A1 | 6/2007 | Law et al. |
| 2007/0131759 A1 | 6/2007 | Cox et al. |
| 2007/0150842 A1 | 6/2007 | Chaudhri et al. |
| 2007/0157089 A1 | 7/2007 | Van Os et al. |
| 2007/0180492 A1 | 8/2007 | Hassan et al. |
| 2007/0186106 A1 | 8/2007 | Ting et al. |
| 2007/0188409 A1 | 8/2007 | Repetto et al. |
| 2007/0192168 A1 | 8/2007 | Van |
| 2007/0194110 A1 | 8/2007 | Esplin et al. |
| 2007/0194113 A1 | 8/2007 | Esplin et al. |
| 2007/0203836 A1 | 8/2007 | Dodin |
| 2007/0219901 A1 | 9/2007 | Garbow et al. |
| 2007/0245148 A1 | 10/2007 | Buer |
| 2007/0254712 A1 | 11/2007 | Chitti |
| 2007/0255564 A1 | 11/2007 | Yee et al. |
| 2007/0255662 A1 | 11/2007 | Tumminaro |
| 2007/0260547 A1 | 11/2007 | Little |
| 2007/0260558 A1 | 11/2007 | Look |
| 2007/0294182 A1 | 12/2007 | Hammad |
| 2008/0004964 A1 | 1/2008 | Messa et al. |
| 2008/0010215 A1 | 1/2008 | Rackley, III et al. |
| 2008/0011825 A1 | 1/2008 | Giordano et al. |
| 2008/0016443 A1 | 1/2008 | Hiroshima et al. |
| 2008/0040265 A1 | 2/2008 | Rackley, III et al. |
| 2008/0041936 A1 | 2/2008 | Vawter |
| 2008/0042866 A1 | 2/2008 | Morse et al. |
| 2008/0052091 A1 | 2/2008 | Vawter et al. |
| 2008/0052181 A1 | 2/2008 | Devitt-carolan et al. |
| 2008/0054081 A1 | 3/2008 | Mullen |
| 2008/0059323 A1 | 3/2008 | Chang et al. |
| 2008/0059351 A1 | 3/2008 | Richey et al. |
| 2008/0078831 A1 | 4/2008 | Johnson et al. |
| 2008/0114678 A1 | 5/2008 | Bennett et al. |
| 2008/0114980 A1 | 5/2008 | Sridhar |
| 2008/0120029 A1 | 5/2008 | Zelek et al. |
| 2008/0120707 A1 | 5/2008 | Ramia |
| 2008/0147561 A1 | 6/2008 | Euchner et al. |
| 2008/0167988 A1 | 7/2008 | Sun et al. |
| 2008/0208681 A1 | 8/2008 | Hammad et al. |
| 2008/0208742 A1 | 8/2008 | Arthur et al. |
| 2008/0208743 A1 | 8/2008 | Arthur et al. |
| 2008/0208762 A1 | 8/2008 | Arthur et al. |
| 2008/0221903 A1 | 9/2008 | Kanevsky et al. |
| 2008/0229409 A1 | 9/2008 | Miller et al. |
| 2008/0231429 A1 | 9/2008 | Leonard et al. |
| 2008/0247519 A1 | 10/2008 | Abella et al. |
| 2008/0275779 A1 | 11/2008 | Lakshminarayanan |
| 2008/0319875 A1 | 12/2008 | Levchin et al. |
| 2008/0320391 A1 | 12/2008 | Lemay et al. |
| 2009/0005011 A1 | 1/2009 | Christie et al. |
| 2009/0006217 A1 | 1/2009 | Smith |
| 2009/0030793 A1 | 1/2009 | Fordyce, III |
| 2009/0031375 A1 | 1/2009 | Sullivan et al. |
| 2009/0036165 A1 | 2/2009 | Brede |

(56) References Cited

U.S. PATENT DOCUMENTS

| | | |
|---|---|---|
| 2009/0037286 A1 | 2/2009 | Foster et al. |
| 2009/0037326 A1 | 2/2009 | Chitti et al. |
| 2009/0048959 A1 | 2/2009 | Omura et al. |
| 2009/0050687 A1 | 2/2009 | Kon et al. |
| 2009/0054044 A1 | 2/2009 | Ikemori et al. |
| 2009/0057396 A1 | 3/2009 | Barbour et al. |
| 2009/0063851 A1 | 3/2009 | Nijdam |
| 2009/0067689 A1 | 3/2009 | Porter et al. |
| 2009/0083850 A1 | 3/2009 | Fadell et al. |
| 2009/0089193 A1 | 4/2009 | Paintin et al. |
| 2009/0094134 A1 | 4/2009 | Toomer et al. |
| 2009/0094681 A1 | 4/2009 | Sadler et al. |
| 2009/0099961 A1 | 4/2009 | Ogilvy et al. |
| 2009/0106160 A1 | 4/2009 | Skowronek |
| 2009/0119678 A1 | 5/2009 | Shih et al. |
| 2009/0119754 A1 | 5/2009 | Schubert |
| 2009/0122149 A1 | 5/2009 | Ishii |
| 2009/0135678 A1 | 5/2009 | Godat |
| 2009/0158390 A1 | 6/2009 | Guan |
| 2009/0159696 A1 | 6/2009 | Mullen |
| 2009/0160609 A1 | 6/2009 | Lin et al. |
| 2009/0165107 A1 | 6/2009 | Tojo et al. |
| 2009/0173784 A1 | 7/2009 | Yang |
| 2009/0182634 A1 | 7/2009 | Park et al. |
| 2009/0182674 A1 | 7/2009 | Patel et al. |
| 2009/0187423 A1 | 7/2009 | Kim |
| 2009/0192911 A1 | 7/2009 | Graf |
| 2009/0192937 A1 | 7/2009 | Griffin et al. |
| 2009/0193514 A1 | 7/2009 | Adams et al. |
| 2009/0195469 A1 | 8/2009 | Lim et al. |
| 2009/0199130 A1 | 8/2009 | Tsern et al. |
| 2009/0199188 A1 | 8/2009 | Fujimaki |
| 2009/0210308 A1 | 8/2009 | Toomer et al. |
| 2009/0222842 A1 | 9/2009 | Narayanan et al. |
| 2009/0227296 A1 | 9/2009 | Kim |
| 2009/0228938 A1 | 9/2009 | White et al. |
| 2009/0234876 A1 | 9/2009 | Schigel et al. |
| 2009/0241169 A1 | 9/2009 | Dhand et al. |
| 2009/0307139 A1 | 12/2009 | Mardikar et al. |
| 2010/0001980 A1 | 1/2010 | Kim et al. |
| 2010/0008535 A1 | 1/2010 | Abulafia et al. |
| 2010/0023449 A1 | 1/2010 | Skowronek et al. |
| 2010/0026453 A1 | 2/2010 | Yamamoto et al. |
| 2010/0027854 A1 | 2/2010 | Chatterjee et al. |
| 2010/0042517 A1 | 2/2010 | Paintin et al. |
| 2010/0042835 A1 | 2/2010 | Lee et al. |
| 2010/0049619 A1 | 2/2010 | Beck |
| 2010/0051689 A1 | 3/2010 | Diamond et al. |
| 2010/0057624 A1 | 3/2010 | Hurt et al. |
| 2010/0058333 A1 | 3/2010 | Peterson |
| 2010/0064259 A1 | 3/2010 | Alexanderovitc et al. |
| 2010/0078471 A1 | 4/2010 | Lin et al. |
| 2010/0078472 A1 | 4/2010 | Lin et al. |
| 2010/0082445 A1 | 4/2010 | Hodge et al. |
| 2010/0082462 A1 | 4/2010 | Yuan et al. |
| 2010/0082481 A1 | 4/2010 | Lin et al. |
| 2010/0082485 A1 | 4/2010 | Lin et al. |
| 2010/0107229 A1 | 4/2010 | Najafi et al. |
| 2010/0114731 A1 | 5/2010 | Kingston et al. |
| 2010/0125456 A1 | 5/2010 | Weng et al. |
| 2010/0131190 A1 | 5/2010 | Terauchi et al. |
| 2010/0131303 A1 | 5/2010 | Collopy et al. |
| 2010/0153265 A1 | 6/2010 | Hershfield et al. |
| 2010/0161434 A1 | 6/2010 | Herwig et al. |
| 2010/0164864 A1 | 7/2010 | Chou |
| 2010/0174644 A1 | 7/2010 | Rosano et al. |
| 2010/0174647 A1 | 7/2010 | Kowalchyk et al. |
| 2010/0185446 A1 | 7/2010 | Homma et al. |
| 2010/0191570 A1 | 7/2010 | Michaud et al. |
| 2010/0205091 A1 | 8/2010 | Graziano et al. |
| 2010/0216425 A1 | 8/2010 | Smith |
| 2010/0217808 A1 | 8/2010 | Benninger |
| 2010/0223145 A1 | 9/2010 | Dragt |
| 2010/0225607 A1 | 9/2010 | Kim |
| 2010/0243741 A1 | 9/2010 | Eng |
| 2010/0248823 A1 | 9/2010 | Smith |
| 2010/0250376 A1 | 9/2010 | Nandiraju |
| 2010/0251243 A1 | 9/2010 | Gill et al. |
| 2010/0267362 A1 | 10/2010 | Smith et al. |
| 2010/0269156 A1 | 10/2010 | Hohlfeld et al. |
| 2010/0275259 A1 | 10/2010 | Adams et al. |
| 2010/0306107 A1 | 12/2010 | Nahari |
| 2010/0311397 A1 | 12/2010 | Li |
| 2011/0035799 A1 | 2/2011 | Handler |
| 2011/0054268 A1 | 3/2011 | Fidacaro et al. |
| 2011/0055763 A1 | 3/2011 | Utsuki et al. |
| 2011/0078025 A1 | 3/2011 | Shrivastav |
| 2011/0099079 A1 | 4/2011 | White |
| 2011/0106671 A1 | 5/2011 | Minnis et al. |
| 2011/0122294 A1 | 5/2011 | Suh et al. |
| 2011/0138166 A1 | 6/2011 | Peszek et al. |
| 2011/0138450 A1 | 6/2011 | Kesanupalli et al. |
| 2011/0142234 A1 | 6/2011 | Rogers |
| 2011/0145049 A1 | 6/2011 | Hertel et al. |
| 2011/0149874 A1 | 6/2011 | Reif |
| 2011/0159959 A1 | 6/2011 | Mallinson et al. |
| 2011/0161116 A1 | 6/2011 | Peak et al. |
| 2011/0164269 A1 | 7/2011 | Kamishiro |
| 2011/0166992 A1 | 7/2011 | Dessert et al. |
| 2011/0179126 A1 | 7/2011 | Wetherell et al. |
| 2011/0184820 A1 | 7/2011 | Mon et al. |
| 2011/0187497 A1 | 8/2011 | Chin |
| 2011/0201306 A1 | 8/2011 | Ali |
| 2011/0202417 A1 | 8/2011 | Dewakar et al. |
| 2011/0214158 A1 | 9/2011 | Pasquero et al. |
| 2011/0218849 A1 | 9/2011 | Rutigliano et al. |
| 2011/0225057 A1 | 9/2011 | Webb et al. |
| 2011/0230769 A1 | 9/2011 | Yamazaki |
| 2011/0231914 A1 | 9/2011 | Hung |
| 2011/0244796 A1 | 10/2011 | Khan et al. |
| 2011/0251892 A1 | 10/2011 | Laracey |
| 2011/0254683 A1 | 10/2011 | Soldan et al. |
| 2011/0282697 A1 | 11/2011 | Fitzgerald et al. |
| 2012/0022872 A1 | 1/2012 | Gruber et al. |
| 2012/0023185 A1 | 1/2012 | Holden et al. |
| 2012/0024947 A1 | 2/2012 | Naelon et al. |
| 2012/0028609 A1 | 2/2012 | Hruska |
| 2012/0036029 A1 | 2/2012 | Esplin et al. |
| 2012/0036433 A1 | 2/2012 | Zimmer et al. |
| 2012/0066731 A1 | 3/2012 | Vasquez et al. |
| 2012/0078751 A1 | 3/2012 | Macphail et al. |
| 2012/0078788 A1 | 3/2012 | Gandhi |
| 2012/0084210 A1 | 4/2012 | Farahmand |
| 2012/0089300 A1 | 4/2012 | Wolterman |
| 2012/0089507 A1 | 4/2012 | Zhang et al. |
| 2012/0095918 A1 | 4/2012 | Jurss |
| 2012/0101881 A1 | 4/2012 | Taylor et al. |
| 2012/0101887 A1 | 4/2012 | Harvey et al. |
| 2012/0109764 A1 | 5/2012 | Martin et al. |
| 2012/0110456 A1 | 5/2012 | Larco et al. |
| 2012/0116669 A1 | 5/2012 | Lee et al. |
| 2012/0123806 A1 | 5/2012 | Schumann et al. |
| 2012/0123937 A1 | 5/2012 | Spodak |
| 2012/0136780 A1 | 5/2012 | El-awady et al. |
| 2012/0136781 A1 | 5/2012 | Fridman et al. |
| 2012/0150750 A1 | 6/2012 | Law et al. |
| 2012/0185397 A1 | 7/2012 | Levovitz |
| 2012/0191603 A1 | 7/2012 | Nuzzi |
| 2012/0197740 A1 | 8/2012 | Grigg et al. |
| 2012/0197743 A1 | 8/2012 | Grigg et al. |
| 2012/0203605 A1 | 8/2012 | Morgan et al. |
| 2012/0209748 A1 | 8/2012 | Small |
| 2012/0215553 A1 | 8/2012 | Leston |
| 2012/0215647 A1 | 8/2012 | Powell et al. |
| 2012/0221464 A1 | 8/2012 | Pasquero et al. |
| 2012/0232968 A1 | 9/2012 | Calman et al. |
| 2012/0238363 A1 | 9/2012 | Watanabe et al. |
| 2012/0245941 A1 | 9/2012 | Cheyer |
| 2012/0245985 A1 | 9/2012 | Cho et al. |
| 2012/0245986 A1 | 9/2012 | Regan et al. |
| 2012/0267432 A1 | 10/2012 | Kuttuva |
| 2012/0271712 A1 | 10/2012 | Katzin et al. |
| 2012/0280917 A1 | 11/2012 | Toksvig et al. |
| 2012/0284185 A1 | 11/2012 | Mettler et al. |

(56) References Cited

U.S. PATENT DOCUMENTS

| | | |
|---|---|---|
| 2012/0290376 A1 | 11/2012 | Dryer et al. |
| 2012/0290449 A1 | 11/2012 | Mullen et al. |
| 2012/0290472 A1 | 11/2012 | Mullen et al. |
| 2012/0303268 A1 | 11/2012 | Su et al. |
| 2012/0310760 A1 | 12/2012 | Phillips et al. |
| 2012/0316777 A1 | 12/2012 | Kitta |
| 2012/0316933 A1 | 12/2012 | Pentland et al. |
| 2012/0317023 A1 | 12/2012 | Moon et al. |
| 2012/0322370 A1 | 12/2012 | Lee |
| 2012/0322371 A1 | 12/2012 | Lee |
| 2012/0330830 A1 | 12/2012 | Mason et al. |
| 2013/0006637 A1 | 1/2013 | Kanevsky et al. |
| 2013/0006746 A1 | 1/2013 | Moore |
| 2013/0013499 A1 | 1/2013 | Kalgi |
| 2013/0019204 A1 | 1/2013 | Kotler et al. |
| 2013/0024371 A1 | 1/2013 | Hariramani et al. |
| 2013/0030934 A1 | 1/2013 | Bakshi et al. |
| 2013/0031217 A1 | 1/2013 | Rajapakse |
| 2013/0041654 A1 | 2/2013 | Walker et al. |
| 2013/0047034 A1 | 2/2013 | Salomon et al. |
| 2013/0047233 A1 | 2/2013 | Fisk et al. |
| 2013/0047236 A1 | 2/2013 | Singh |
| 2013/0050263 A1 | 2/2013 | Khoe et al. |
| 2013/0054336 A1 | 2/2013 | Graylin |
| 2013/0060678 A1 | 3/2013 | Oskolkov et al. |
| 2013/0073321 A1 | 3/2013 | Hofmann et al. |
| 2013/0074194 A1 | 3/2013 | White et al. |
| 2013/0080162 A1 | 3/2013 | Chang et al. |
| 2013/0080272 A1 | 3/2013 | Ronca et al. |
| 2013/0080275 A1 | 3/2013 | Ronca et al. |
| 2013/0082819 A1 | 4/2013 | Cotterill |
| 2013/0085931 A1 | 4/2013 | Runyan |
| 2013/0085936 A1 | 4/2013 | Law et al. |
| 2013/0086637 A1 | 4/2013 | Cotterill et al. |
| 2013/0091443 A1 | 4/2013 | Park et al. |
| 2013/0103519 A1 | 4/2013 | Kountotsis et al. |
| 2013/0110719 A1 | 5/2013 | Carter et al. |
| 2013/0117022 A1 | 5/2013 | Chen et al. |
| 2013/0122866 A1 | 5/2013 | Huang |
| 2013/0124319 A1 | 5/2013 | Hodge et al. |
| 2013/0124423 A1 | 5/2013 | Fisher |
| 2013/0144706 A1 | 6/2013 | Qawami et al. |
| 2013/0151360 A1 | 6/2013 | Scipioni et al. |
| 2013/0151414 A1 | 6/2013 | Zhu et al. |
| 2013/0151636 A1 | 6/2013 | Majeti et al. |
| 2013/0159178 A1 | 6/2013 | Colon et al. |
| 2013/0166325 A1 | 6/2013 | Ganapathy et al. |
| 2013/0166332 A1 | 6/2013 | Hammad |
| 2013/0166679 A1 | 6/2013 | Kuwahara |
| 2013/0179304 A1 | 7/2013 | Swist |
| 2013/0185059 A1 | 7/2013 | Riccardi |
| 2013/0189953 A1 | 7/2013 | Mathews |
| 2013/0198112 A1 | 8/2013 | Bhat |
| 2013/0200146 A1 | 8/2013 | Moghadam |
| 2013/0212655 A1 | 8/2013 | Hoyos et al. |
| 2013/0216108 A1 | 8/2013 | Hwang et al. |
| 2013/0218721 A1 | 8/2013 | Borhan et al. |
| 2013/0222323 A1 | 8/2013 | Mckenzie |
| 2013/0223696 A1 | 8/2013 | Azar et al. |
| 2013/0226792 A1 | 8/2013 | Kushevsky et al. |
| 2013/0232073 A1 | 9/2013 | Sheets et al. |
| 2013/0238455 A1 | 9/2013 | Laracey |
| 2013/0239202 A1 | 9/2013 | Adams et al. |
| 2013/0243264 A1 | 9/2013 | Aoki |
| 2013/0246202 A1 | 9/2013 | Tobin |
| 2013/0246954 A1 | 9/2013 | Gray et al. |
| 2013/0262857 A1 | 10/2013 | Neuman et al. |
| 2013/0275300 A1 | 10/2013 | Killian et al. |
| 2013/0282533 A1 | 10/2013 | Foran-owens et al. |
| 2013/0282577 A1 | 10/2013 | Milne |
| 2013/0290187 A1 | 10/2013 | Itwaru |
| 2013/0297414 A1 | 11/2013 | Goldfarb et al. |
| 2013/0304514 A1 | 11/2013 | Hyde et al. |
| 2013/0304651 A1 | 11/2013 | Smith |
| 2013/0320080 A1 | 12/2013 | Olson et al. |
| 2013/0322665 A1 | 12/2013 | Bennett et al. |
| 2013/0326563 A1 | 12/2013 | Mulcahy et al. |
| 2013/0332358 A1 | 12/2013 | Zhao |
| 2013/0332364 A1 | 12/2013 | Templeton et al. |
| 2013/0332826 A1 | 12/2013 | Karunamuni et al. |
| 2013/0333006 A1 | 12/2013 | Tapiing et al. |
| 2013/0336527 A1 | 12/2013 | Nechyba et al. |
| 2013/0336545 A1 | 12/2013 | Pritikin et al. |
| 2013/0339436 A1 | 12/2013 | Gray |
| 2013/0345975 A1 | 12/2013 | Vulcano et al. |
| 2013/0346273 A1 | 12/2013 | Stockton et al. |
| 2013/0346302 A1 | 12/2013 | Purves et al. |
| 2014/0003677 A1 | 1/2014 | Han et al. |
| 2014/0006285 A1 | 1/2014 | Chi et al. |
| 2014/0019352 A1 | 1/2014 | Shrivastava |
| 2014/0020068 A1 | 1/2014 | Desai et al. |
| 2014/0025513 A1 | 1/2014 | Cooke et al. |
| 2014/0025520 A1 | 1/2014 | Mardikar et al. |
| 2014/0036099 A1 | 2/2014 | Balassanian |
| 2014/0043547 A1 | 2/2014 | Marhefka |
| 2014/0052553 A1 | 2/2014 | Uzo |
| 2014/0052794 A1 | 2/2014 | Tucker et al. |
| 2014/0058805 A1 | 2/2014 | Paesler et al. |
| 2014/0058860 A1 | 2/2014 | Roh et al. |
| 2014/0058935 A1 | 2/2014 | Mijares |
| 2014/0058939 A1 | 2/2014 | Savla |
| 2014/0058941 A1 | 2/2014 | Moon et al. |
| 2014/0061299 A1 | 3/2014 | Scipioni |
| 2014/0067654 A1 | 3/2014 | Hanson et al. |
| 2014/0068740 A1 | 3/2014 | LeCun et al. |
| 2014/0070957 A1 | 3/2014 | Longinotti-Buitoni et al. |
| 2014/0074407 A1 | 3/2014 | Hernandez-silveira et al. |
| 2014/0074569 A1 | 3/2014 | Francis et al. |
| 2014/0074635 A1 | 3/2014 | Reese et al. |
| 2014/0074716 A1 | 3/2014 | Ni |
| 2014/0074717 A1 | 3/2014 | Evans |
| 2014/0081854 A1 | 3/2014 | Sanchez et al. |
| 2014/0089196 A1 | 3/2014 | Paya et al. |
| 2014/0094124 A1 | 4/2014 | Dave et al. |
| 2014/0094143 A1 | 4/2014 | Ayotte |
| 2014/0095225 A1 | 4/2014 | Williams et al. |
| 2014/0099886 A1 | 4/2014 | Monroe |
| 2014/0101056 A1 | 4/2014 | Wendling |
| 2014/0108263 A1 | 4/2014 | Ortiz et al. |
| 2014/0109018 A1 | 4/2014 | Casey et al. |
| 2014/0118519 A1 | 5/2014 | Sahin |
| 2014/0122331 A1 | 5/2014 | Vaish et al. |
| 2014/0128035 A1 | 5/2014 | Sweeney |
| 2014/0129435 A1 | 5/2014 | Pardo et al. |
| 2014/0129441 A1 | 5/2014 | Blanco et al. |
| 2014/0130035 A1 | 5/2014 | Desai et al. |
| 2014/0134947 A1 | 5/2014 | Stouder-studenmund |
| 2014/0138435 A1 | 5/2014 | Khalid |
| 2014/0140587 A1 | 5/2014 | Ballard et al. |
| 2014/0142851 A1 | 5/2014 | Larmo et al. |
| 2014/0143145 A1 | 5/2014 | Kortina et al. |
| 2014/0149198 A1 | 5/2014 | Kim et al. |
| 2014/0156531 A1 | 6/2014 | Poon et al. |
| 2014/0164082 A1 | 6/2014 | Sun et al. |
| 2014/0164241 A1 | 6/2014 | Neuwirth |
| 2014/0167986 A1 | 6/2014 | Parada et al. |
| 2014/0172533 A1 | 6/2014 | Andrews et al. |
| 2014/0180582 A1 | 6/2014 | Pontarelli et al. |
| 2014/0181747 A1 | 6/2014 | Son |
| 2014/0187163 A1 | 7/2014 | Fujita |
| 2014/0187856 A1 | 7/2014 | Holoien et al. |
| 2014/0188673 A1 | 7/2014 | Graham et al. |
| 2014/0195815 A1 | 7/2014 | Taveau et al. |
| 2014/0197234 A1 | 7/2014 | Hammad |
| 2014/0207659 A1 | 7/2014 | Erez et al. |
| 2014/0207679 A1 | 7/2014 | Cho |
| 2014/0207680 A1 | 7/2014 | Rephlo |
| 2014/0214644 A1 | 7/2014 | Rephlo et al. |
| 2014/0215361 A1 | 7/2014 | Hwang et al. |
| 2014/0222664 A1 | 8/2014 | Milne |
| 2014/0236840 A1 | 8/2014 | Islam |
| 2014/0244365 A1 | 8/2014 | Price et al. |
| 2014/0244493 A1 | 8/2014 | Kenyon et al. |
| 2014/0244495 A1 | 8/2014 | Davis et al. |

(56) References Cited

U.S. PATENT DOCUMENTS

| | | |
|---|---|---|
| 2014/0254891 A1 | 9/2014 | Lee et al. |
| 2014/0257871 A1 | 9/2014 | Christensen et al. |
| 2014/0258292 A1 | 9/2014 | Thramann et al. |
| 2014/0279442 A1 | 9/2014 | Luoma et al. |
| 2014/0279474 A1 | 9/2014 | Evans et al. |
| 2014/0279497 A1 | 9/2014 | Qaim-maqami et al. |
| 2014/0279530 A1 | 9/2014 | Douglas et al. |
| 2014/0279543 A1 | 9/2014 | Ruhrig |
| 2014/0279556 A1 | 9/2014 | Priebatsch et al. |
| 2014/0281561 A1 | 9/2014 | Etchegoyen et al. |
| 2014/0282987 A1 | 9/2014 | Narendra et al. |
| 2014/0292396 A1 | 10/2014 | Bruwer et al. |
| 2014/0293079 A1 | 10/2014 | Milanfar et al. |
| 2014/0297385 A1 | 10/2014 | Ryan |
| 2014/0298432 A1 | 10/2014 | Brown |
| 2014/0298478 A1 | 10/2014 | Kim et al. |
| 2014/0337207 A1 | 11/2014 | Zhang et al. |
| 2014/0337931 A1 | 11/2014 | Cotterill |
| 2014/0343843 A1 | 11/2014 | Yanku |
| 2014/0344082 A1 | 11/2014 | Soundararajan |
| 2014/0344896 A1 | 11/2014 | Pak et al. |
| 2014/0344904 A1 | 11/2014 | Venkataraman et al. |
| 2014/0359140 A1 | 12/2014 | Shankarraman |
| 2014/0359456 A1 | 12/2014 | Thiele et al. |
| 2014/0365113 A1 | 12/2014 | Mcgavran et al. |
| 2014/0372251 A1* | 12/2014 | Rodell ............... G06Q 30/0641 705/26.7 |
| 2014/0372309 A1 | 12/2014 | Bullard et al. |
| 2014/0372920 A1 | 12/2014 | Choi et al. |
| 2014/0375835 A1 | 12/2014 | Bos |
| 2014/0379341 A1 | 12/2014 | Seo et al. |
| 2015/0002696 A1 | 1/2015 | He et al. |
| 2015/0003595 A1 | 1/2015 | Yaghi et al. |
| 2015/0005039 A1 | 1/2015 | Liu et al. |
| 2015/0006207 A1 | 1/2015 | Jarvis et al. |
| 2015/0006376 A1 | 1/2015 | Nuthulapati et al. |
| 2015/0012417 A1 | 1/2015 | Joao et al. |
| 2015/0012425 A1 | 1/2015 | Mathew |
| 2015/0012435 A1 | 1/2015 | Wright et al. |
| 2015/0014141 A1 | 1/2015 | Rao et al. |
| 2015/0019944 A1 | 1/2015 | Kalgi |
| 2015/0039494 A1 | 2/2015 | Sinton et al. |
| 2015/0043790 A1 | 2/2015 | Ono et al. |
| 2015/0044964 A1 | 2/2015 | Khan et al. |
| 2015/0044965 A1 | 2/2015 | Kamon et al. |
| 2015/0046336 A1 | 2/2015 | Cummins |
| 2015/0051846 A1 | 2/2015 | Masuya |
| 2015/0054764 A1 | 2/2015 | Kim et al. |
| 2015/0056957 A1 | 2/2015 | Mardikar et al. |
| 2015/0058146 A1 | 2/2015 | Gaddam et al. |
| 2015/0058191 A1 | 2/2015 | Khan et al. |
| 2015/0066758 A1 | 3/2015 | Denardis et al. |
| 2015/0067496 A1 | 3/2015 | Missig et al. |
| 2015/0067602 A1 | 3/2015 | Bernstein et al. |
| 2015/0073927 A1* | 3/2015 | Reblin ................. G06K 7/1413 705/17 |
| 2015/0074418 A1 | 3/2015 | Lee et al. |
| 2015/0074615 A1 | 3/2015 | Han et al. |
| 2015/0077362 A1 | 3/2015 | Seo |
| 2015/0089636 A1 | 3/2015 | Martynov et al. |
| 2015/0095174 A1 | 4/2015 | Dua |
| 2015/0095175 A1 | 4/2015 | Dua |
| 2015/0098309 A1 | 4/2015 | Adams et al. |
| 2015/0112870 A1* | 4/2015 | Nagasundaram .... G06Q 20/385 705/67 |
| 2015/0115028 A1 | 4/2015 | Montealegre |
| 2015/0120545 A1 | 4/2015 | Fiore et al. |
| 2015/0121405 A1 | 4/2015 | Ekselius et al. |
| 2015/0124053 A1 | 5/2015 | Tamura et al. |
| 2015/0127539 A1 | 5/2015 | Ye et al. |
| 2015/0127550 A1 | 5/2015 | Khan |
| 2015/0135278 A1 | 5/2015 | Corda et al. |
| 2015/0135282 A1 | 5/2015 | Kong et al. |
| 2015/0149899 A1 | 5/2015 | Bernstein et al. |
| 2015/0154589 A1 | 6/2015 | Li |
| 2015/0154676 A1 | 6/2015 | Matousek et al. |
| 2015/0170146 A1 | 6/2015 | Ji et al. |
| 2015/0178878 A1 | 6/2015 | Huang |
| 2015/0186152 A1 | 7/2015 | Jothiswaran et al. |
| 2015/0186636 A1 | 7/2015 | Tharappel et al. |
| 2015/0186871 A1 | 7/2015 | Laracey |
| 2015/0186892 A1 | 7/2015 | Zhang et al. |
| 2015/0187019 A1 | 7/2015 | Fernandes et al. |
| 2015/0195133 A1 | 7/2015 | Sheets et al. |
| 2015/0208244 A1 | 7/2015 | Nakao |
| 2015/0213244 A1 | 7/2015 | Lymberopoulos et al. |
| 2015/0213542 A1 | 7/2015 | Wallaja |
| 2015/0213560 A1 | 7/2015 | Aabye et al. |
| 2015/0215128 A1 | 7/2015 | Pal |
| 2015/0220924 A1 | 8/2015 | Bakker |
| 2015/0227922 A1 | 8/2015 | Filler |
| 2015/0229750 A1 | 8/2015 | Zhou et al. |
| 2015/0230277 A1 | 8/2015 | Omeara et al. |
| 2015/0235018 A1 | 8/2015 | Gupta et al. |
| 2015/0235055 A1 | 8/2015 | An et al. |
| 2015/0242611 A1 | 8/2015 | Cotterill |
| 2015/0242837 A1 | 8/2015 | Yarbrough et al. |
| 2015/0249540 A1 | 9/2015 | Khalil et al. |
| 2015/0254661 A1 | 9/2015 | Lane |
| 2015/0257004 A1 | 9/2015 | Shanmugam et al. |
| 2015/0264111 A1 | 9/2015 | Aleksandrov |
| 2015/0278799 A1 | 10/2015 | Palanisamy |
| 2015/0278814 A1 | 10/2015 | Jaffe |
| 2015/0278900 A1* | 10/2015 | Hosein ............... G06Q 30/0613 705/26.44 |
| 2015/0286694 A1 | 10/2015 | Kaplinger et al. |
| 2015/0295921 A1 | 10/2015 | Cao |
| 2015/0302493 A1 | 10/2015 | Batstone et al. |
| 2015/0302510 A1 | 10/2015 | Godsey et al. |
| 2015/0324113 A1 | 11/2015 | Kapp et al. |
| 2015/0324615 A1 | 11/2015 | Matsumoto et al. |
| 2015/0334567 A1 | 11/2015 | Chen et al. |
| 2015/0339652 A1 | 11/2015 | Park et al. |
| 2015/0340025 A1 | 11/2015 | Shima |
| 2015/0346845 A1 | 12/2015 | Di Censo et al. |
| 2015/0348001 A1 | 12/2015 | Van os et al. |
| 2015/0348002 A1* | 12/2015 | Van Os .................. G06Q 20/10 705/44 |
| 2015/0348009 A1 | 12/2015 | Brown et al. |
| 2015/0348014 A1 | 12/2015 | Van os et al. |
| 2015/0348018 A1 | 12/2015 | Campos et al. |
| 2015/0348029 A1 | 12/2015 | Van os et al. |
| 2015/0349959 A1 | 12/2015 | Marciniak |
| 2015/0363632 A1 | 12/2015 | Ahn et al. |
| 2015/0365400 A1 | 12/2015 | Cox |
| 2016/0005024 A1 | 1/2016 | Harrell |
| 2016/0005028 A1 | 1/2016 | Mayblum et al. |
| 2016/0011768 A1 | 1/2016 | Mm et al. |
| 2016/0012417 A1 | 1/2016 | Mizon |
| 2016/0012465 A1 | 1/2016 | Sharp |
| 2016/0019536 A1 | 1/2016 | Ortiz et al. |
| 2016/0021003 A1 | 1/2016 | Pan |
| 2016/0026779 A1 | 1/2016 | Grigg et al. |
| 2016/0034887 A1 | 2/2016 | Lee |
| 2016/0047666 A1 | 2/2016 | Fuchs |
| 2016/0050199 A1 | 2/2016 | Ganesan |
| 2016/0061613 A1 | 3/2016 | Jung et al. |
| 2016/0061623 A1 | 3/2016 | Pahwa et al. |
| 2016/0062487 A1 | 3/2016 | Foss et al. |
| 2016/0063235 A1 | 3/2016 | Tussy |
| 2016/0063298 A1 | 3/2016 | Tuneld et al. |
| 2016/0078281 A1 | 3/2016 | Gongaware et al. |
| 2016/0078434 A1 | 3/2016 | Huxham et al. |
| 2016/0086166 A1 | 3/2016 | Pomeroy et al. |
| 2016/0086176 A1 | 3/2016 | Henrique et al. |
| 2016/0092665 A1 | 3/2016 | Cowan et al. |
| 2016/0092877 A1 | 3/2016 | Chew |
| 2016/0100156 A1 | 4/2016 | Zhou et al. |
| 2016/0104159 A1 | 4/2016 | Butterfield et al. |
| 2016/0104228 A1 | 4/2016 | Sundaresan |
| 2016/0117670 A1 | 4/2016 | Davis |
| 2016/0127358 A1 | 5/2016 | Engelking |
| 2016/0132864 A1 | 5/2016 | Shah et al. |
| 2016/0134488 A1 | 5/2016 | Straub et al. |

(56) References Cited

U.S. PATENT DOCUMENTS

| | | |
|---|---|---|
| 2016/0147987 A1 | 5/2016 | Jang et al. |
| 2016/0148384 A1 | 5/2016 | Bud et al. |
| 2016/0156574 A1 | 6/2016 | Hum et al. |
| 2016/0165205 A1 | 6/2016 | Liu et al. |
| 2016/0171192 A1 | 6/2016 | Holz et al. |
| 2016/0171481 A1 | 6/2016 | McElmurry et al. |
| 2016/0171482 A1 | 6/2016 | Muncey et al. |
| 2016/0180305 A1 | 6/2016 | Dresser et al. |
| 2016/0180316 A1 | 6/2016 | Wang et al. |
| 2016/0180325 A1 | 6/2016 | Davis et al. |
| 2016/0180578 A1 | 6/2016 | Vegesna |
| 2016/0188860 A1 | 6/2016 | Lee et al. |
| 2016/0189717 A1 | 6/2016 | Kannan et al. |
| 2016/0203483 A1 | 7/2016 | Bridgewater et al. |
| 2016/0210623 A1 | 7/2016 | Voege |
| 2016/0217310 A1 | 7/2016 | Shah et al. |
| 2016/0224966 A1 | 8/2016 | Van os et al. |
| 2016/0224973 A1 | 8/2016 | Van os et al. |
| 2016/0225371 A1 | 8/2016 | Agrawal et al. |
| 2016/0232513 A1 | 8/2016 | Purves et al. |
| 2016/0232516 A1 | 8/2016 | Dayan et al. |
| 2016/0234023 A1 | 8/2016 | Mozer et al. |
| 2016/0238402 A1 | 8/2016 | Mcgavran et al. |
| 2016/0239701 A1 | 8/2016 | Lee et al. |
| 2016/0239886 A1 | 8/2016 | Susilo et al. |
| 2016/0241543 A1 | 8/2016 | Jung et al. |
| 2016/0241555 A1 | 8/2016 | Vo et al. |
| 2016/0253665 A1 | 9/2016 | Van os et al. |
| 2016/0260031 A1 | 9/2016 | Pace et al. |
| 2016/0267447 A1 | 9/2016 | Davis et al. |
| 2016/0267779 A1 | 9/2016 | Kuang |
| 2016/0270144 A1 | 9/2016 | Thanayankizil et al. |
| 2016/0275281 A1 | 9/2016 | Ranjit |
| 2016/0275475 A1 | 9/2016 | Lin et al. |
| 2016/0277342 A1 | 9/2016 | Shi |
| 2016/0277396 A1 | 9/2016 | Gardiner et al. |
| 2016/0292525 A1 | 10/2016 | Aoki |
| 2016/0294557 A1 | 10/2016 | Baldwin et al. |
| 2016/0300100 A1 | 10/2016 | Shen et al. |
| 2016/0308859 A1 | 10/2016 | Barry et al. |
| 2016/0314290 A1 | 10/2016 | Baca et al. |
| 2016/0314451 A1 | 10/2016 | Martin |
| 2016/0335495 A1 | 11/2016 | Kim et al. |
| 2016/0342832 A1 | 11/2016 | Newell et al. |
| 2016/0345172 A1 | 11/2016 | Cotterill |
| 2016/0350522 A1 | 12/2016 | Chi et al. |
| 2016/0352667 A1 | 12/2016 | Pickett et al. |
| 2016/0358133 A1 | 12/2016 | Van os et al. |
| 2016/0358134 A1 | 12/2016 | Van os et al. |
| 2016/0358167 A1 | 12/2016 | Van os et al. |
| 2016/0358168 A1 | 12/2016 | Van os et al. |
| 2016/0358180 A1 | 12/2016 | Van os et al. |
| 2016/0358199 A1 | 12/2016 | Van os et al. |
| 2016/0364561 A1 | 12/2016 | Lee et al. |
| 2016/0364591 A1 | 12/2016 | El-Khoury et al. |
| 2016/0364600 A1 | 12/2016 | Shah et al. |
| 2016/0364715 A1 | 12/2016 | Cho et al. |
| 2016/0378186 A1 | 12/2016 | Kim |
| 2016/0378961 A1 | 12/2016 | Park |
| 2016/0378966 A1 | 12/2016 | Alten |
| 2017/0004484 A1 | 1/2017 | Seol et al. |
| 2017/0004507 A1 | 1/2017 | Henderson et al. |
| 2017/0017834 A1 | 1/2017 | Sabitov et al. |
| 2017/0017958 A1 | 1/2017 | Scott et al. |
| 2017/0032375 A1 | 2/2017 | Van os et al. |
| 2017/0039544 A1 | 2/2017 | Park et al. |
| 2017/0046111 A1 | 2/2017 | Chu et al. |
| 2017/0046508 A1 | 2/2017 | Shin et al. |
| 2017/0046704 A1 | 2/2017 | Buchner et al. |
| 2017/0054731 A1 | 2/2017 | Cotterill |
| 2017/0063851 A1 | 3/2017 | Kim et al. |
| 2017/0063852 A1 | 3/2017 | Azar |
| 2017/0070680 A1 | 3/2017 | Kobayashi |
| 2017/0076132 A1 | 3/2017 | Sezan et al. |
| 2017/0123498 A1 | 5/2017 | Dillon et al. |
| 2017/0147186 A1 | 5/2017 | Veiusamy et al. |
| 2017/0160098 A1 | 6/2017 | Mcgavran et al. |
| 2017/0169202 A1 | 6/2017 | Duggan et al. |
| 2017/0169287 A1 | 6/2017 | Tokunaga et al. |
| 2017/0180637 A1 | 6/2017 | Lautenbach et al. |
| 2017/0180813 A1 | 6/2017 | Kang et al. |
| 2017/0185760 A1 | 6/2017 | Wilder |
| 2017/0193214 A1 | 7/2017 | Shim et al. |
| 2017/0193314 A1 | 7/2017 | Kim et al. |
| 2017/0193501 A1 | 7/2017 | Cole et al. |
| 2017/0228704 A1 | 8/2017 | Zhou et al. |
| 2017/0237692 A1 | 8/2017 | Sheth et al. |
| 2017/0244703 A1 | 8/2017 | Lee et al. |
| 2017/0300897 A1 | 10/2017 | Ferenczi et al. |
| 2017/0329949 A1 | 11/2017 | Civelli |
| 2017/0337542 A1 | 11/2017 | Kim et al. |
| 2017/0339151 A1 | 11/2017 | Van Os et al. |
| 2017/0339347 A1 | 11/2017 | Cho et al. |
| 2017/0344251 A1 | 11/2017 | Hajimusa et al. |
| 2017/0344526 A1 | 11/2017 | Smith et al. |
| 2017/0357443 A1 | 12/2017 | Paek et al. |
| 2017/0357972 A1 | 12/2017 | Van os et al. |
| 2017/0357973 A1 | 12/2017 | Van et al. |
| 2018/0004924 A1 | 1/2018 | Tieu |
| 2018/0021954 A1 | 1/2018 | Fischer et al. |
| 2018/0053157 A1 | 2/2018 | Roffey |
| 2018/0053169 A1 | 2/2018 | James |
| 2018/0068313 A1 | 3/2018 | Van Os et al. |
| 2018/0082282 A1 | 3/2018 | Van Os et al. |
| 2018/0107372 A1 | 4/2018 | Van Damme et al. |
| 2018/0109482 A1 | 4/2018 | Deluca et al. |
| 2018/0109629 A1 | 4/2018 | Van Os et al. |
| 2018/0114010 A1 | 4/2018 | Van Os et al. |
| 2018/0117944 A1 | 5/2018 | Lee |
| 2018/0150627 A1 | 5/2018 | Rodefer |
| 2018/0157395 A1 | 6/2018 | Mhun et al. |
| 2018/0158066 A1 | 6/2018 | Van Os et al. |
| 2018/0181737 A1 | 6/2018 | Tussy |
| 2018/0218359 A1 | 8/2018 | Kim et al. |
| 2018/0240086 A1 | 8/2018 | Sobotka |
| 2018/0276673 A1 | 9/2018 | Van Os et al. |
| 2018/0300101 A1 | 10/2018 | Liu et al. |
| 2018/0302790 A1 | 10/2018 | Cotterill |
| 2018/0335928 A1 | 11/2018 | Van Os et al. |
| 2018/0336543 A1 | 11/2018 | Van Os et al. |
| 2018/0374096 A1 | 12/2018 | Demaret et al. |
| 2019/0018974 A1 | 1/2019 | Chae et al. |
| 2019/0050867 A1 | 2/2019 | Van Os et al. |
| 2019/0080066 A1 | 3/2019 | Van Os et al. |
| 2019/0080070 A1 | 3/2019 | Van Os et al. |
| 2019/0080071 A1 | 3/2019 | Van Os et al. |
| 2019/0080072 A1 | 3/2019 | Van Os et al. |
| 2019/0080189 A1 | 3/2019 | Van Os et al. |
| 2019/0095883 A1 | 3/2019 | Robinson et al. |
| 2019/0124510 A1 | 4/2019 | Cotterill et al. |
| 2019/0141021 A1 | 5/2019 | Isaacson et al. |
| 2019/0156607 A1 | 5/2019 | Tao et al. |
| 2019/0173814 A1 | 6/2019 | McNeill |
| 2019/0266587 A1 | 8/2019 | Lin et al. |
| 2019/0289079 A1 | 9/2019 | Van Os et al. |
| 2019/0347391 A1 | 11/2019 | Kim et al. |
| 2019/0370448 A1 | 12/2019 | Devine et al. |
| 2019/0370583 A1 | 12/2019 | Van Os et al. |
| 2020/0036720 A1* | 1/2020 | Butler ............... H04L 63/102 |
| 2020/0042685 A1 | 2/2020 | Tussy et al. |
| 2020/0065470 A1 | 2/2020 | Van Os et al. |
| 2020/0065821 A1 | 2/2020 | Van Os et al. |
| 2020/0120503 A1 | 4/2020 | Cotterill |
| 2020/0143353 A1 | 5/2020 | Van Os et al. |
| 2020/0211047 A1 | 7/2020 | Van Os et al. |
| 2020/0302517 A1 | 9/2020 | Van Os et al. |
| 2020/0302519 A1 | 9/2020 | Van Os et al. |
| 2020/0311509 A1 | 10/2020 | Benkley et al. |
| 2020/0366742 A1 | 11/2020 | Van Os et al. |
| 2020/0372514 A1 | 11/2020 | Van Os et al. |
| 2021/0004897 A1 | 1/2021 | Van Os et al. |
| 2021/0027269 A1 | 1/2021 | Van Os et al. |
| 2021/0042549 A1 | 2/2021 | Van Os et al. |
| 2021/0073823 A1 | 3/2021 | Van Os |

(56) References Cited

U.S. PATENT DOCUMENTS

| | | |
|---|---|---|
| 2021/0096886 A1 | 4/2021 | Mclachlan et al. |
| 2021/0192530 A1 | 6/2021 | Van Os et al. |
| 2021/0201288 A1 | 7/2021 | Van Os et al. |
| 2021/0224785 A1 | 7/2021 | Van Os et al. |
| 2021/0272092 A1 | 9/2021 | Van Os et al. |
| 2021/0272118 A1 | 9/2021 | Van Os et al. |
| 2021/0397681 A1 | 12/2021 | Boule et al. |

FOREIGN PATENT DOCUMENTS

| | | |
|---|---|---|
| AU | 2015100709 A4 | 7/2015 |
| AU | 2016100796 A4 | 6/2016 |
| AU | 2017100556 A4 | 6/2017 |
| AU | 2017101425 A4 | 11/2017 |
| CN | 1452739 A | 10/2003 |
| CN | 1741104 A | 3/2006 |
| CN | 1846221 A | 10/2006 |
| CN | 1908981 A | 2/2007 |
| CN | 101171604 A | 4/2008 |
| CN | 101268470 A | 9/2008 |
| CN | 101299694 A | 11/2008 |
| CN | 101341718 A | 1/2009 |
| CN | 101341727 A | 1/2009 |
| CN | 101485128 A | 7/2009 |
| CN | 101610155 A | 12/2009 |
| CN | 101730907 A | 6/2010 |
| CN | 101796764 A | 8/2010 |
| CN | 101809581 A | 8/2010 |
| CN | 102004908 A | 4/2011 |
| CN | 102065148 A | 5/2011 |
| CN | 102096546 A | 6/2011 |
| CN | 102164213 A | 8/2011 |
| CN | 102202192 A | 9/2011 |
| CN | 102209321 A | 10/2011 |
| CN | 102282578 A | 12/2011 |
| CN | 102394838 A | 3/2012 |
| CN | 102396205 A | 3/2012 |
| CN | 102541438 A | 7/2012 |
| CN | 102663303 A | 9/2012 |
| CN | 102737313 A | 10/2012 |
| CN | 102982144 A | 3/2013 |
| CN | 103001856 A | 3/2013 |
| CN | 103067248 A | 4/2013 |
| CN | 103188280 A | 7/2013 |
| CN | 103413218 A | 11/2013 |
| CN | 103701605 A | 4/2014 |
| CN | 103778533 A | 5/2014 |
| CN | 103970208 A | 8/2014 |
| CN | 104024987 A | 9/2014 |
| CN | 104038256 A | 9/2014 |
| CN | 104077534 A | 10/2014 |
| CN | 104252675 A | 12/2014 |
| CN | 104361302 A | 2/2015 |
| CN | 104487927 A | 4/2015 |
| CN | 104508618 A | 4/2015 |
| CN | 104539924 A | 4/2015 |
| CN | 104813354 A | 7/2015 |
| CN | 104903835 A | 9/2015 |
| CN | 105320864 A | 2/2016 |
| CN | 105389491 A | 3/2016 |
| CN | 105474224 A | 4/2016 |
| CN | 105787718 A | 7/2016 |
| CN | 105794244 A | 7/2016 |
| CN | 105844468 A | 8/2016 |
| CN | 105868613 A | 8/2016 |
| CN | 105893814 A | 8/2016 |
| CN | 106020436 A | 10/2016 |
| CN | 106095247 A | 11/2016 |
| CN | 106156566 A | 11/2016 |
| CN | 106164934 A | 11/2016 |
| CN | 106355058 A | 1/2017 |
| CN | 106462383 A | 2/2017 |
| CN | 106485123 A | 3/2017 |
| CN | 106503514 A | 3/2017 |
| CN | 106778222 A | 5/2017 |
| CN | 109769397 A | 5/2019 |
| EP | 0836074 A2 | 4/1998 |
| EP | 1614992 A1 | 1/2006 |
| EP | 1950678 A1 | 7/2008 |
| EP | 2096413 A1 | 9/2009 |
| EP | 2309410 A1 | 4/2011 |
| EP | 2341315 A1 | 7/2011 |
| EP | 2466260 A1 | 6/2012 |
| EP | 2568693 A2 | 3/2013 |
| EP | 2654275 A1 | 10/2013 |
| EP | 2672377 A2 | 12/2013 |
| EP | 2674889 A2 | 12/2013 |
| EP | 2701107 A1 | 2/2014 |
| EP | 2713298 A1 | 4/2014 |
| EP | 2725537 A1 | 4/2014 |
| EP | 2980741 A1 | 2/2016 |
| EP | 2993619 A1 | 3/2016 |
| EP | 3057024 A1 | 8/2016 |
| EP | 3062271 A1 | 8/2016 |
| EP | 3076334 A1 | 10/2016 |
| EP | 3096275 A1 | 11/2016 |
| EP | 3047622 B1 | 8/2017 |
| EP | 3349400 A1 | 7/2018 |
| GB | 2466038 A | 6/2010 |
| GB | 2500321 A | 9/2013 |
| GB | 2528948 A | 2/2016 |
| JP | 6284182 A | 10/1994 |
| JP | 11-39385 A | 2/1999 |
| JP | 11-73530 A | 3/1999 |
| JP | 11-183183 A | 7/1999 |
| JP | 2000-259477 A | 9/2000 |
| JP | 2001-331758 A | 11/2001 |
| JP | 2002-99854 A | 4/2002 |
| JP | 2003-16398 A | 1/2003 |
| JP | 2003-67210 A | 3/2003 |
| JP | 2003-141541 A | 5/2003 |
| JP | 2003-178244 A | 6/2003 |
| JP | 2003-346059 A | 12/2003 |
| JP | 2004-37998 A | 2/2004 |
| JP | 2004-252736 A | 9/2004 |
| JP | 2004-258738 A | 9/2004 |
| JP | 2004-287592 A | 10/2004 |
| JP | 2004-356816 A | 12/2004 |
| JP | 2005-521961 A | 7/2005 |
| JP | 2005-523505 A | 8/2005 |
| JP | 2005-317049 A | 11/2005 |
| JP | 2006-31182 A | 2/2006 |
| JP | 2006-93912 A | 4/2006 |
| JP | 2006-114018 A | 4/2006 |
| JP | 2006-163960 A | 6/2006 |
| JP | 2006-197071 A | 7/2006 |
| JP | 2006-221468 A | 8/2006 |
| JP | 2006-277670 A | 10/2006 |
| JP | 2007-34637 A | 2/2007 |
| JP | 2007-507011 A | 3/2007 |
| JP | 2007-226794 A | 9/2007 |
| JP | 2007-334637 A | 12/2007 |
| JP | 2008-70926 A | 3/2008 |
| JP | 2009-9434 A | 1/2009 |
| JP | 2009-49878 A | 3/2009 |
| JP | 2009-99076 A | 5/2009 |
| JP | 2009-134521 A | 6/2009 |
| JP | 2009-258991 A | 11/2009 |
| JP | 2010-102718 A | 5/2010 |
| JP | 2010-517390 A | 5/2010 |
| JP | 2010-152506 A | 7/2010 |
| JP | 2010-524051 A | 7/2010 |
| JP | 2010-211577 A | 9/2010 |
| JP | 2010-211579 A | 9/2010 |
| JP | 2010-271779 A | 12/2010 |
| JP | 2011-503711 A | 1/2011 |
| JP | 2011-97287 A | 5/2011 |
| JP | 2011-519439 A | 7/2011 |
| JP | 2012-8985 A | 1/2012 |
| JP | 2012-504273 A | 2/2012 |
| JP | 2012-73724 A | 4/2012 |
| JP | 2012-508930 A | 4/2012 |
| JP | 2012-99025 A | 5/2012 |
| JP | 2012-114676 A | 6/2012 |

(56) References Cited

FOREIGN PATENT DOCUMENTS

| | | |
|---|---|---|
| JP | 2012-198625 A | 10/2012 |
| JP | 2012-215981 A | 11/2012 |
| JP | 2012-529699 A | 11/2012 |
| JP | 2013-20496 A | 1/2013 |
| JP | 2013-34322 A | 2/2013 |
| JP | 2013-58828 A | 3/2013 |
| JP | 2013-114317 A | 6/2013 |
| JP | 2013-530445 A | 7/2013 |
| JP | 2013-149206 A | 8/2013 |
| JP | 2013-157959 A | 8/2013 |
| JP | 2013-533532 A | 8/2013 |
| JP | 5267966 B2 | 8/2013 |
| JP | 2013-218663 A | 10/2013 |
| JP | 2013-222410 A | 10/2013 |
| JP | 2013-229656 A | 11/2013 |
| JP | 2014-41616 A | 3/2014 |
| JP | 2014-44719 A | 3/2014 |
| JP | 2014-44724 A | 3/2014 |
| JP | 2014-75155 A | 4/2014 |
| JP | 2014-102845 A | 6/2014 |
| JP | 2014-517366 A | 7/2014 |
| JP | 2014-520296 A | 8/2014 |
| JP | 2014-191653 A | 10/2014 |
| JP | 2014-528601 A | 10/2014 |
| JP | 2015-14923 A | 1/2015 |
| JP | 2015-506040 A | 2/2015 |
| JP | 2015-75877 A | 4/2015 |
| JP | 2015-187783 A | 10/2015 |
| JP | 2015-534664 A | 12/2015 |
| JP | 2016-53766 A | 4/2016 |
| JP | 2016-71655 A | 5/2016 |
| JP | 2016-521403 A | 7/2016 |
| JP | 6023162 B2 | 11/2016 |
| JP | 2016-224960 A | 12/2016 |
| JP | 2017-16170 A | 1/2017 |
| JP | 2017-500656 A | 1/2017 |
| JP | 2017-41098 A | 2/2017 |
| JP | 2017-091129 A | 5/2017 |
| JP | 2017-102952 A | 6/2017 |
| JP | 2017-138846 A | 8/2017 |
| JP | 2018-506103 A | 3/2018 |
| JP | 2018-524679 A | 8/2018 |
| KR | 2002-0052156 A | 7/2002 |
| KR | 10-0403196 B1 | 10/2003 |
| KR | 10-2004-0027236 A | 4/2004 |
| KR | 10-2004-0049502 A | 6/2004 |
| KR | 10-475654 B1 | 3/2005 |
| KR | 10-2006-0098024 A | 9/2006 |
| KR | 10-2007-0013048 A | 1/2007 |
| KR | 10-2007-0120125 A | 12/2007 |
| KR | 10-0805341 B1 | 2/2008 |
| KR | 10-2008-0064395 A | 7/2008 |
| KR | 10-2009-0089472 A | 8/2009 |
| KR | 10-2010-0045059 A | 5/2010 |
| KR | 10-2011-0056561 A | 5/2011 |
| KR | 10-2012-0040693 A | 4/2012 |
| KR | 10-1184865 B1 | 9/2012 |
| KR | 10-2013-0027326 A | 3/2013 |
| KR | 10-1253392 B1 | 4/2013 |
| KR | 10-2013-0112339 A | 10/2013 |
| KR | 10-2013-0116905 A | 10/2013 |
| KR | 10-1330962 B1 | 11/2013 |
| KR | 10-2013-0138659 A | 12/2013 |
| KR | 10-1342208 B1 | 12/2013 |
| KR | 10-2014-0001515 A | 1/2014 |
| KR | 10-2014-0018019 A | 2/2014 |
| KR | 10-2014-0026263 A | 3/2014 |
| KR | 10-2014-0027029 A | 3/2014 |
| KR | 10-2014-0055429 A | 5/2014 |
| KR | 10-2014-0105309 A | 9/2014 |
| KR | 10-2014-0121764 A | 10/2014 |
| KR | 10-2014-0131093 A | 11/2014 |
| KR | 10-2014-0137400 A | 12/2014 |
| KR | 10-2014-0139982 A | 12/2014 |
| KR | 10-2015-0013264 A | 2/2015 |
| KR | 10-2016-0012636 A | 2/2016 |
| KR | 10-2016-0026791 A | 3/2016 |
| KR | 10-2016-0045633 A | 4/2016 |
| KR | 10-2016-0048215 A | 5/2016 |
| KR | 10-2016-0054573 A | 5/2016 |
| KR | 10-2016-0076201 A | 6/2016 |
| KR | 10-2016-0099397 A | 8/2016 |
| KR | 10-2016-0099432 A | 8/2016 |
| KR | 10-2016-0105279 A | 9/2016 |
| KR | 10-2016-0105296 A | 9/2016 |
| KR | 10-2017-0011784 A | 2/2017 |
| KR | 10-1820573 B1 | 1/2018 |
| KR | 10-2018-0051556 A | 5/2018 |
| WO | 1999/44114 A1 | 9/1999 |
| WO | 02/01864 A1 | 1/2002 |
| WO | 2003/038698 A1 | 5/2003 |
| WO | 2003/083793 A2 | 10/2003 |
| WO | 2003/093765 A2 | 11/2003 |
| WO | 2007/000012 A1 | 1/2007 |
| WO | 2007/041834 A1 | 4/2007 |
| WO | 2007/073422 A1 | 6/2007 |
| WO | 2007/105937 A1 | 9/2007 |
| WO | 2007/116521 A1 | 10/2007 |
| WO | 2008/147457 A1 | 12/2008 |
| WO | 2009/042392 A2 | 4/2009 |
| WO | 2010/039337 A2 | 4/2010 |
| WO | 2010/056484 A2 | 5/2010 |
| WO | 2010/077960 A2 | 7/2010 |
| WO | 2010/120972 A1 | 10/2010 |
| WO | 2010/128442 A2 | 11/2010 |
| WO | 2011/037134 A1 | 3/2011 |
| WO | 2012/083113 A2 | 6/2012 |
| WO | 2012/129231 A1 | 9/2012 |
| WO | 2012/135796 A1 | 10/2012 |
| WO | 2013/000150 A1 | 1/2013 |
| WO | 2013/023224 A2 | 2/2013 |
| WO | 2013/066659 A1 | 5/2013 |
| WO | 2013/090624 A1 | 6/2013 |
| WO | 2013/103912 A1 | 7/2013 |
| WO | 2013/169877 A2 | 11/2013 |
| WO | 2013/177548 A1 | 11/2013 |
| WO | 2014/033939 A1 | 3/2014 |
| WO | 2014/074407 A1 | 5/2014 |
| WO | 2014/147297 A1 | 9/2014 |
| WO | 2014/171734 A2 | 10/2014 |
| WO | 2014/172757 A1 | 10/2014 |
| WO | 2015/009581 A1 | 1/2015 |
| WO | 2015/009765 A1 | 1/2015 |
| WO | 2015/013522 A1 | 1/2015 |
| WO | 2015/030912 A1 | 3/2015 |
| WO | 2015/051361 A1 | 4/2015 |
| WO | 2015/057320 A1 | 4/2015 |
| WO | 2015/062382 A1 | 5/2015 |
| WO | 2015/062410 A1 | 5/2015 |
| WO | 2015/065561 A1 | 5/2015 |
| WO | 2015/112868 A1 | 7/2015 |
| WO | 2015/120019 A1 | 8/2015 |
| WO | 2015/187608 A1 | 12/2015 |
| WO | 2016/032534 A1 | 3/2016 |
| WO | 2016/111808 A1 | 7/2016 |
| WO | 2016/123309 A1 | 8/2016 |
| WO | 2016/126374 A1 | 8/2016 |
| WO | 2016/126775 A1 | 8/2016 |
| WO | 2016/129938 A1 | 8/2016 |
| WO | 2016/201037 A1 | 12/2016 |
| WO | 2017/030223 A1 | 2/2017 |
| WO | 2017/030642 A1 | 2/2017 |
| WO | 2017/041641 A1 | 3/2017 |
| WO | 2017/072589 A2 | 5/2017 |
| WO | 2017/078792 A1 | 5/2017 |
| WO | 2017/218094 A1 | 12/2017 |
| WO | 2018/226265 A1 | 12/2018 |

OTHER PUBLICATIONS

STIC EIC Search Report, Dec. 1, 2021 (Year: 2021).*
Decision to Grant received for Danish Patent Application No. PA201970127, dated Aug. 20, 2020, 2 pages.

(56) References Cited

OTHER PUBLICATIONS

Office Action received for Chinese Patent Application No. 201711292804.3, dated Aug. 5, 2020, 26 pages (16 pages of English Translation and 10 pages of Official Copy).
Office Action received for Japanese Patent Application No. 2019-572834, dated Jul. 17, 2020, 13 pages (7 pages of English Translation and 6 pages of Official Copy).
Applicant-Initiated Interview Summary received for U.S. Appl. No. 16/125,267, dated Jun. 25, 2021, 5 pages.
Brief Communication Regarding Oral Proceedings received for European Patent Application No. 16201159.7, dated Jun. 29, 2021, 13 pages.
Brief Communication Regarding Oral Proceedings received for European Patent Application No. 18830326.7, dated Jun. 30, 2021, 2 pages.
European Search Report received for European Patent Application No. 21150992.2, dated Jun. 23, 2021, 6 pages.
Non-Final Office Action received for U.S. Appl. No. 16/667,174, dated Jun. 24, 2021, 16 pages.
Notice of Allowance received for U.S. Appl. No. 14/869,831, dated Jul. 2, 2021, 9 pages.
Office Action received for Australian Patent Application No. 2020204256, dated Jun. 21, 2021, 2 pages.
Office Action received for Chinese Patent Application No. 201780069966.2, dated Jun. 1, 2021, 23 pages (12 pages of English Translation and 11 pages of Official Copy).
Office Action received for Chinese Patent Application No. 201810338040.5, dated Jun. 3, 2021, 25 pages (15 pages of English Translation and 10 pages of Official Copy).
Office Action received for Chinese Patent Application No. 201810339290.0, dated Jun. 4, 2021, 20 pages (11 pages of English Translation and 9 pages of Official Copy).
Office Action received for Chinese Patent Application No. 202011206499.3, dated May 21, 2021, 20 pages (10 pages of English Translation and 10 pages of Official Copy).
Office Action received for Japanese Patent Application No. 2019-572834, dated Jun. 7, 2021, 5 pages (2 pages of English Translation and 3 pages of Official Copy).
Office Action received for Japanese Patent Application No. 2020-010992, dated May 24, 2021, 9 pages (4 pages of English Translation and 5 pages of Official Copy).
Office Action received for Korean Patent Application No. 10-2019-7006639, dated Jun. 15, 2021, 8 pages (4 pages of English Translation and 4 pages of Official Copy).
Office Action received for Korean Patent Application No. 10-2020-7010007, dated Jun. 21, 2021, 7 pages (3 pages of English Translation and 4 pages of Official Copy).
Result of Consultation received for European Patent Application No. 18830326.7, mailed on Jun. 21, 2021, 5 pages.
Decision to Grant received for Danish Patent Application No. PA201870855, dated Oct. 20, 2020, 2 pages.
Decision to Refuse received for European Patent Application No. 19171661.2, dated Oct. 22, 2020, 7 pages.
Final Office Action received for U.S. Appl. No. 15/274,910, dated Oct. 16, 2020, 34 pages.
Minutes of the Oral Proceedings received for European Patent Application No. 19171661.2, mailed on Oct. 15, 2020, 5 pages.
Non-Final Office Action received for U.S. Appl. No. 16/786,694, dated Oct. 5, 2020, 23 pages.
Non-Final Office Action received for U.S. Appl. No. 16/990,974, dated Oct. 15, 2020, 6 pages.
Notice of Allowance received for Japanese Patent Application No. 2019-510416, dated Oct. 12, 2020, 4 pages (1 page of English Translation and 3 pages of Official Copy).
Notice of Allowance received for U.S. Appl. No. 15/992,722, dated Oct. 19, 2020, 5 pages.
Office Action received for Australian Patent Application No. 2020239783, dated Oct. 13, 2020, 4 pages.
Office Action received for European Patent Application No. 17799904.2, dated Oct. 21, 2020, 6 pages.
Office Action received for European Patent Application No. 19186538.5, dated Oct. 12, 2020, 7 pages.
Office Action received for European Patent Application No. 19194828.0, dated Oct. 15, 2020, 7 pages.
Non-Final Office Action received for U.S. Appl. No. 17/037,085, dated Jul. 8, 2021, 37 pages.
Non-Final Office Action received for U.S. Appl. No. 16/814,226, dated Jul. 13, 2021, 17 pages.
Notice of Allowance received for Korean Patent Application No. 10-2020-7027862, dated Jun. 29, 2021, 5 pages (1 page of English Translation and 4 pages of Official Copy).
Office Action received for Australian Patent Application No. 2020102130, dated Jun. 7, 2021, 3 pages.
Office Action received for Australian Patent Application No. 2020273355, dated Jul. 6, 2021, 3 pages.
Office Action received for Chinese Patent Application No. 202010174749.3, dated Jun. 2, 2021, 19 pages (10 pages of English Translation and 9 pages of Official Copy).
Office Action received for European Patent Application No. 21150992.2, dated Jul. 6, 2021, 6 pages.
Summons to Attend Oral Proceedings received for European Patent Application No. 17865509.8, mailed on Jul. 14, 2021, 8 pages.
Applicant Initiated Interview Summary received for U.S. Appl. No. 15/884,195, dated Apr. 28, 2020, 5 pages.
Applicant Initiated Interview Summary received for U.S. Appl. No. 15/981,817, dated Apr. 22, 2020, 5 pages.
Corrected Notice of Allowance received for U.S. Appl. No. 16/434,865, dated Apr. 28, 2020, 2 pages.
Decision to Refuse received for the European Patent Application No. 16803996.4, dated Apr. 14, 2020, 28 pages.
Intention to Grant received for Danish Patent Application No. PA201970127, dated Apr. 21, 2020, 2 pages.
Non-Final Office Action received for U.S. Appl. No. 16/736,704, dated May 1, 2020, 41 pages.
Notice of Allowance received for U.S. Appl. No. 16/147,023, dated May 5, 2020, 2 pages.
Office Action received for Australian Patent Application No. 2017324176, dated Apr. 21, 2020, 3 pages.
Office Action received for Australian Patent Application No. 2020200685, dated Apr. 20, 2020, 3 pages.
Office Action received for European Patent Application No. 18830326.7, dated Apr. 30, 2020, 5 pages.
Summons to Attend Oral Proceedings received for European Patent Application No. 19171661.2, mailed on Apr. 16, 2020, 12 pages.
Decision on Appeal received for Korean Patent Application No. 10-2018-7019643, dated Jun. 9, 2020, 27 pages (3 pages of English Translation and 24 pages of Official Copy).
Extended European Search Report received for European Patent Application No. 17835789.3, dated Jun. 23, 2020, 12 pages.
Non-Final Office Action received for U.S. Appl. No. 15/823,269, dated Jun. 23, 2020, 14 pages.
Notice of Allowance received for Japanese Patent Application No. 2018-551159, dated Jun. 15, 2020, 4 pages (1 page of English Translation and 3 pages of Official Copy).
Office Action received for Chinese Patent Application No. 201910498825.3, dated May 21, 2020, 16 pages (9 pages of English Translation and 7 pages of Official Copy).
Office Action received for European Patent Application No. 18730556.0, dated Jun. 23, 2020, 11 pages.
Office Action received for Japanese Patent Application No. 2019-053379, dated May 29, 2020, 11 pages (6 pages of English Translation and 5 pages of Official Copy).
Applicant-Initiated Interview Summary received for U.S. Appl. No. 15/274,910, dated Jul. 9, 2020, 3 pages.
Decision on Appeal received for Korean Patent Application No. 10-2016-0152210, dated Jun. 23, 2020, 20 pages (2 pages of English Translation and 18 pages of Official Copy).
Decision to Refuse received for European Patent Application No. 15727291.5, dated Jun. 30, 2020, 21 pages.
Decision to Refuse received for European Patent Application No. 16201205.8, dated Jun. 30, 2020, 29 pages.
European Search Report received for European Patent Application No. 20180033.1, dated Jul. 6, 2020, 4 pages.

(56) References Cited

OTHER PUBLICATIONS

Minutes of the Oral Proceedings received for European Patent Application No. 15727291.5, mailed on Jun. 29, 2020, 8 pages.
Minutes of the Oral Proceedings received for European Patent Application No. 16201205.8, mailed on Jun. 29, 2020, 6 pages.
Non-Final Office Action received for U.S. Appl. No. 16/125,267, dated Jul. 2, 2020, 20 pages.
Notice of Allowance received for Chinese Patent Application No. 201810338038.8, dated Jun. 30, 2020, 2 pages (1 page of English Translation and 1 page of Official Copy).
Notice of Allowance received for U.S. Appl. No. 16/147,023, dated Jul. 2, 2020, 2 pages.
Office Action received for European Patent Application No. 19150528.8, dated Jul. 1, 2020, 6 pages.
Decision on Appeal received for U.S. Appl. No. 14/869,831, dated Nov. 2, 2020, 8 pages.
Extended European Search Report received for European Patent Application No. 20186286.9, dated Nov. 2, 2020, 9 pages.
Notice of Acceptance received for Australian Patent Application No. 2020200685, dated Oct. 29, 2020, 3 pages.
Notice of Allowance received for Chinese Patent Application No. 201910354714.5, dated Oct. 14, 2020, 2 pages (1 page of English Translation and 1 page of Official Copy).
Office Action received for European Patent Application No. 18713408.5, dated Nov. 4, 2020, 6 pages.
Applicant-Initiated Interview Summary received for U.S. Appl. No. 15/433,320, dated Nov. 25, 2020, 4 pages.
Invitation to Pay Additional Fees received for PCT Patent Application No. PCT/US2020/048799, mailed on Nov. 20, 2020, 13 pages.
Notice of Allowance received for Japanese Patent Application No. 2019-053379, dated Nov. 16, 2020, 4 pages (1 page of English Translation and 3 pages of Official Copy).
Notice of Allowance received for Korean Patent Application No. 10-2020-7017803, dated Nov. 5, 2020, 6 pages (2 pages of English Translation and 4 pages of Official Copy).
Office Action received for Chinese Patent Application No. 201811460172.1, dated Oct. 14, 2020, 7 pages (4 pages of English Translation and 3 pages of Official Copy).
Office Action received for European Patent Application No. 19160348.9, dated Nov. 17, 2020, 6 pages.
Whatsupcoders, "Flutter Tutorial—Upload Images using Firebase Storage", Online available at: https://www.youtube.com/watch?v=7uqmY6le4xk, Apr. 19, 2019, 4 pages.
Applicant-Initiated Interview Summary received for U.S. Appl. No. 16/413,402, dated Mar. 29, 2021, 4 pages.
Applicant-Initiated Interview Summary received for U.S. Appl. No. 16/670,949, dated Apr. 6, 2021, 2 pages.
Non-Final Office Action received for U.S. Appl. No. 16/125,267, dated Mar. 26, 2021, 20 pages.
Notice of Allowance received for Korean Patent Application No. 10-2021-7005691, dated Mar. 29, 2021, 3 pages (1 page of English Translation and 2 pages of Official Copy).
Notice of Allowance received for U.S. Appl. No. 15/433,320, dated Apr. 1, 2021, 19 pages.
Notice of Allowance received for U.S. Appl. No. 15/823,269, dated Mar. 31, 2021, 9 pages.
Notice of Allowance received for U.S. Appl. No. 16/786,694, dated Mar. 26, 2021, 11 pages.
Office Action received for European Patent Application No. 17810682.9, dated Mar. 26, 2021, 8 pages.
Office Action received for European Patent Application No. 19160344.8, dated Mar. 26, 2021, 7 pages.
Office Action received for European Patent Application No. 20204436.8, dated Mar. 22, 2021, 10 pages.
Office Action received for Korean Patent Application No. 10-2020-7010007, dated Mar. 15, 2021, 7 pages (3 pages of English Translation and 4 pages of Official Copy).
Non-Final Office Action received for U.S. Appl. No. 15/433,320, dated Jul. 31, 2020, 13 pages.

Non-Final Office Action received for U.S. Appl. No. 15/992,722, dated Aug. 6, 2020, 7 pages.
Notice of Allowance received for U.S. Appl. No. 16/147,023, dated Aug. 13, 2020, 2 pages.
Office Action received for Chinese Patent Application No. 201910109868.8, dated Jun. 30, 2020, 15 pages (7 pages of English Translation and 8 pages of Official Copy).
Office Action received for European Patent Application No. 17865509.8, dated Jul. 28, 2020, 8 pages.
Bao et al., "Location-based and Preference-Aware Recommendation Using Sparse Geo-Social Networking Data", ACM Sigspatial GIS '12, Redondo Beach, CA, USA, Online available at: https://www.microsoft.com/en-us/research/wp-content/uploads/2016/02/LocationRecommendation.pdf, Nov. 6-9, 2012, 10 pages.
Final Office Action received for U.S. Appl. No. 16/736,704, dated Oct. 13, 2020, 62 pages.
Intention to Grant received for Danish Patent Application No. PA201770502, dated Oct. 6, 2020, 2 pages.
Lu, Haiyun, "Recommendations Based on Purchase Patterns", International Journal of Machine Learning and Computing, vol. 4, No. 6, Online available at: http://www.ijmlc.org/papers/462-C015.pdf, Dec. 2014, pp. 501-504.
Notice of Allowance received for Japanese Patent Application No. 2019-238894, dated Oct. 5, 2020, 4 pages (1 page of English Translation and 3 pages of Official Copy).
Office Action received for Chinese Patent Application No. 201910246439.5, dated Sep. 2, 2020, 15 pages (8 pages of English Translation and 7 pages of Official Copy).
Record of Oral Hearing received for U.S. Appl. No. 14/869,831, mailed on Oct. 6, 2020, 12 pages.
Corrected Notice of Allowance received for U.S. Appl. No. 16/434,865, dated Jun. 4, 2020, 2 pages.
Decision to Refuse received for European Patent Application No. 15728352.4, dated May 28, 2020, 25 pages.
Notice of Allowance received for Japanese Patent Application No. 2019-107235, dated May 15, 2020, 4 pages (1 page of English Translation and 3 pages of Official Copy).
Notice of Allowance received for U.S. Appl. No. 15/981,817, dated May 28, 2020, 16 pages.
Notice of Allowance received for U.S. Appl. No. 16/147,023, dated Jun. 1, 2020, 2 pages.
Office Action received for Chinese Patent Application No. 201910246439.5, dated Apr. 23, 2020, 14 pages (7 pages of English Translation and 7 pages of Official Copy).
Office Action received for Danish Patent Application No. PA201870855, dated May 14, 2020, 4 pages.
Office Action received for European Patent Application No. 18713408.5, dated May 26, 2020, 5 pages.
Teather et al., "Assessing the Effects of Orientation and Device on (Constrained) 3D Movement Techniques", IEEE Symposium on 3D User Interfaces. Reno, Nevada, USA., Mar. 8-9, 2008, 8 pages.
Notice of Allowance received for Chinese Patent Application No. 201610371856.9, dated May 11, 2020, 2 pages (1 page of English Translation and 1 page of Official copy).
Notice of Allowance received for Korean Patent Application No. 10-2019-7038021, dated May 2, 2020, 5 pages (1 page of English Translation and 4 pages of Official Copy).
Notice of Allowance received for Korean Patent Application No. 10-2020-0048600, dated Apr. 30, 2020, 5 pages (2 pages of English Translation and 3 pages of Official Copy).
Notice of Allowance received for U.S. Appl. No. 16/147,023, dated May 20, 2020, 7 pages.
Notice of Allowance received for U.S. Appl. No. 16/542,084, dated May 20, 2020, 7 pages.
Notice of Allowance received for U.S. Appl. No. 16/667,271, dated May 12, 2020, 11 pages.
Office Action received for Chinese Patent Application No. 201510284715.9, dated Apr. 14, 2020, 19 pages (7 pages of English Translation and 12 pages of Official Copy).
Office Action received for Danish Patent Application No. PA201770502, dated May 7, 2020, 5 pages.
Office Action received for European Patent Application No. 19160348.9, dated May 14, 2020, 4 pages.

(56) References Cited

OTHER PUBLICATIONS

Summons to Attend Oral Proceedings received for European Patent Application No. 15728352.4, mailed on May 12, 2020, 25 pages.
Intention to Grant received for Danish Patent Application No. PA201870855, dated Jul. 13, 2020, 2 pages.
Notice of Allowance received for U.S. Appl. No. 16/147,023, dated Jul. 21, 2020, 2 pages.
Office Action received for European Patent Application No. 20180033.1, dated Jul. 17, 2020, 7 pages.
Office Action received for Japanese Patent Application No. 2020-028315, dated Jul. 6, 2020, 18 pages (10 pages of English Translation and 8 pages of Official Copy).
Office Action received for Australian Patent Application No. 2020102130, dated Mar. 29, 2021, 4 pages.
Office Action received for Australian Patent Application No. 2020202953, dated Mar. 29, 2021, 4 pages.
Office Action received for European Patent Application No. 17813737.8, dated Apr. 16, 2021, 7 pages.
Punchkick Interactive, "Punchkick hands-on review: Fitbit Surge", URL: https://www.youtube.com/watch?v=K2G7aebUYcA, Mar. 25, 2015, 3 pages.
Decision to Grant received for Danish Patent Application No. PA201770502, dated Feb. 25, 2021, 2 pages.
European Search Report received for European Patent Application No. 20204436.8, dated Mar. 9, 2021, 5 pages.
Non-Final Office Action received for U.S. Appl. No. 16/549,862, dated Mar. 8, 2021, 23 pages.
Notice of Allowance received for U.S. Appl. No. 15/823,269, dated Mar. 10, 2021, 6 pages.
Office Action received for Australian Patent Application No. 2017324176, dated Feb. 25, 2021, 6 pages.
Summons to Attend Oral Proceedings received for European Patent Application No. 18830326.7, mailed on Feb. 25, 2021, 6 pages.
Applicant-Initiated Interview Summary received for U.S. Appl. No. 16/667,271, dated Apr. 8, 2020, 3 pages.
Decision to Refuse Application received for the European Patent Application No. 16803996.4, dated Apr. 3, 2020, 25 pages.
Non-Final Office Action received for U.S. Appl. No. 15/274,910, dated Apr. 6, 2020, 33 pages.
Notice of Allowance received for Korean Patent Application No. 10-2020-7004737, dated Mar. 31, 2020, 4 pages (1 page of English Translation and 3 pages of Official Copy).
Notice of Allowance received for U.S. Appl. No. 16/147,023, dated Apr. 3, 2020, 2 pages.
Notice of Allowance received for U.S. Appl. No. 16/147,023, dated Mar. 27, 2020, 2 pages.
Notice of Allowance received for U.S. Appl. No. 16/164,561, dated Apr. 8, 2020, 5 pages.
Notice of Allowance received for U.S. Appl. No. 16/434,865, dated Apr. 7, 2020, 5 pages.
Office Action received for Chinese Patent Application No. 201910109868.8, dated Mar. 16, 2020, 19 pages (10 pages of English Translation and 9 pages of Official Copy).
Office Action received for Japanese Patent Application No. 2019-238894, dated Mar. 6, 2020, 7 pages (3 pages of English Translation and 4 pages of Official Copy).
Office Action received for Korean Patent Application No. 10-2020-7002929, dated Mar. 22, 2020, 5 pages (2 pages of English Translation and 3 pages of Official Copy).
Brief Communication Regarding Oral Proceedings received for European Patent Application No. 15727291.5, dated Jun. 9, 2020, 12 pages.
Brief Communication regarding Oral Proceedings received for European Patent Application No. 16201205.8, dated May 29, 2020, 29 pages.
Brief Communication regarding Oral Proceedings received for European Patent Application No. 19171661.2, dated May 28, 2020, 2 pages.
Minutes of the Oral Proceedings received for European Patent Application No. 15728352.4, mailed on May 27, 2020, 3 pages.
Notice of Allowance received for Japanese Patent Application No. 2017-562050, dated Jun. 1, 2020, 4 pages (1 page of English Translation and 3 pages of Official Copy).
Notice of Allowance received for Korean Patent Application No. 10-2019-7033768, dated Jun. 3, 2020, 6 pages (2 pages of English Translation and 4 pages of Official Copy).
Notice of Allowance received for U.S. Appl. No. 16/147,023, dated Jun. 18, 2020, 2 pages.
Office Action received for Japanese Patent Application No. 2019-510416, dated May 15, 2020, 4 pages (2 pages of English Translation and 2 pages of Official Copy).
Summons to Attend Oral Proceedings received for European Patent Application No. 19171661.2, mailed on Jun. 2, 2020, 13 pages.
International Preliminary Report on Patentability received for PCT Patent Application No. PCT/US2018/049289, dated Mar. 19, 2020, 9 pages.
International Preliminary Report on Patentability received for PCT Patent Application No. PCT/US2018/015603, dated Mar. 19, 2020, 8 pages.
Notice of Acceptance received for Australian Patent Application No. 2020201306, dated Mar. 12, 2020, 3 pages.
Notice of Allowance received for Korean Patent Application No. 10-2019-7014494, dated Mar. 19, 2020, 4 pages (1 page of English Translation and 3 pages of Official Copy).
Office Action received for Australian Patent Application No. 2017284013, dated Mar. 19, 2020, 3 pages.
Office Action received for Korean Patent Application No. 10-2019-7033768, dated Mar. 13, 2020, 6 pages (2 pages of English Translation and 4 pages of Official Copy).
Notice of Acceptance received for Australian Patent Application No. 2020200795, dated Feb. 28, 2020, 3 pages.
Notice of Allowance received for Korean Patent Application No. 10-2017-0022582, dated Feb. 27, 2020, 5 pages (2 pages of English Translation and 3 pages of Official Copy).
Office Action received for Chinese Patent Application No. 201910354714.5, dated Feb. 3, 2020, 12 pages (7 pages of English Translation and 5 pages of Official Copy).
Applicant-Initiated Interview Summary received for U.S. Appl. No. 16/125,267, dated Sep. 14, 2020, 5 pages.
Brief Communication Regarding Oral Proceedings received for European Patent Application No. 19171661.2, dated Sep. 3, 2020, 2 pages.
Notice of Acceptance received for Australian Patent Application No. 2017284013, dated Aug. 26, 2020, 3 pages.
Notice of Allowance received for Japanese Patent Application No. 2018-158482, dated Sep. 7, 2020, 4 pages (1 page of English Translation and 3 pages of Official Copy).
Notice of Allowance received for Korean Patent Application No. 10-2020-7011172, dated Aug. 25, 2020, 7 pages (2 pages of English Translation and 5 pages of Official Copy).
Office Action received for Australian Patent Application No. 2017324176, dated Aug. 17, 2020, 5 pages.
Office Action received for Chinese Patent Application No. 201910070375.8, dated Sep. 3, 2020, 8 pages (4 pages of English Translation and 4 pages of Official Copy).
Office Action received for Korean Patent Application No. 10-2020-0097418, dated Aug. 28, 2020, 6 pages (2 pages of English Translation and 4 pages of Official Copy).
Office Action received for Korean Patent Application No. 10-2020-7010007, dated Aug. 26, 2020, 12 pages (5 pages of English Translation and 7 pages of Official Copy).
Advisory Action received for U.S. Appl. No. 14/503,296, dated Oct. 2, 2015, 3 pages.
Advisory Action received for U.S. Appl. No. 14/869,715, dated Feb. 8, 2017, 3 pages.
Advisory Action received for U.S. Appl. No. 14/869,715, dated May 18, 2017, 6 pages.
Advisory Action received for U.S. Appl. No. 14/869,877, dated Jan. 5, 2017, 3 pages.
Advisory Action received for U.S. Appl. No. 14/870,793, dated Apr. 13, 2017, 3 pages.
Advisory Action received for U.S. Appl. No. 15/137,944, dated May 11, 2017, 6 pages.

(56) References Cited

OTHER PUBLICATIONS

Applicant Initiated Interview Summary received for U.S. Appl. No. 15/351,230, dated Nov. 22, 2019, 5 pages.
Cazlar, "[iOS] MapsGPS (formerly PebbGPS) is now available—now with colour turn-by-turn directions!", Online Available at <https://forums.pebble.com/t/ios-mapsgps-formerly-pebbgps-is-now-available-now-with-colour-turn-by-turn-directions/5584>, 2013, 31 pages.
Corrected Notice of Allowance received for U.S. Appl. No. 14/836,754, dated May 23, 2018, 2 pages.
Corrected Notice of Allowance received for U.S. Appl. No. 15/137,944, dated Jan. 11, 2018, 2 pages.
Corrected Notice of Allowance received for U.S. Appl. No. 15/137,944, dated Jan. 19, 2018, 2 pages.
Corrected Notice of Allowance received for U.S. Appl. No. 15/294,439, dated Mar. 13, 2019, 4 pages.
Decision to Grant received for Danish Patent Application No. PA201570665, dated Apr. 26, 2017, 2 pages.
Decision to Grant received for Danish Patent Application No. PA201670042, dated Mar. 19, 2018, 2 pages.
Decision to Refuse received for European Patent Application No. 16201195.1, dated Mar. 4, 2019, 23 pages.
Decision to Refuse received for European Patent Application No. 16703893.4, dated Jul. 24, 2019, 22 pages.
Decision to Refuse received for European Patent Application No. 18154163.2, dated May 17, 2019, 22 pages.
"Does Apple Pay change payment?", Mac Fan, Japan, Mynavi Publishing Corporation, vol. 22, No. 11 common No. 381, Nov. 1, 2014, 11 pages.
EasyVideoGuides, "Mapquest", available on https://www.youtube.com/watch?v=7sDIDNM2bCI, Dec. 26, 2007, 4 pages.
Ehowtech, "How to Get Written Directions on a Garmin : Using a Garmin", available online at: https://www.youtube.com/watch?v=s_EKT6qH4LI, Dec. 2, 2012, 1 page.
European Search Report received for European Patent Application No. 19171661.2, dated Jul. 17, 2019, 6 pages.
Examiner's Answer to Appeal Brief received for U.S. Appl. No. 14/870,793, dated Apr. 16, 2018, 15 pages.
Examiner's Answer to Appeal Brief received for U.S. Appl. No. 14/869,831, dated Aug. 12, 2019, 16 pages.
Extended European Search Report received for European Patent Application No. 16201159.7, dated Mar. 27, 2017, 12 pages.
Extended European Search Report received for European Patent Application No. 16201195.1, dated Feb. 7, 2017, 13 pages.
Extended European Search Report received for European Patent Application No. 16201205.8, dated Jan. 5, 2017, 12 pages.
Extended European Search Report received for European Patent Application No. 16803996.4, dated Feb. 7, 2018, 8 pages.
Extended European Search Report received for European Patent Application No. 16804040.0, dated Feb. 26, 2018, 9 pages.
Extended European Search Report received for European Patent Application No. 17810682.9, dated Mar. 26, 2019, 7 pages.
Extended European Search Report received for European Patent Application No. 18154163.2, dated Mar. 2, 2018, 4 pages.
Final Office Action received for U.S. Appl. No. 14/503,072, dated Mar. 2, 2017, 9 pages.
Final Office Action received for U.S. Appl. No. 14/503,072, dated Sep. 1, 2015, 16 pages.
Final Office Action received for U.S. Appl. No. 14/503,296, dated Apr. 24, 2019, 5 pages.
Final Office Action received for U.S. Appl. No. 14/503,296, dated Jul. 2, 2015, 7 pages.
Final Office Action received for U.S. Appl. No. 14/503,296, dated Jun. 4, 2018, 8 pages.
Final Office Action received for U.S. Appl. No. 14/836,754, dated Jun. 14, 2017, 23 pages.
Final Office Action received for U.S. Appl. No. 14/869,715, dated Jun. 17, 2016, 35 pages.
Final Office Action received for U.S. Appl. No. 14/869,715, dated Mar. 7, 2017, 41 pages.
Final Office Action received for U.S. Appl. No. 14/869,715, dated Oct. 6, 2016, 37 pages.
Final Office Action received for U.S. Appl. No. 14/869,831, dated Aug. 2, 2016, 14 pages.
Final Office Action received for U.S. Appl. No. 14/869,831, dated Jul. 30, 2018, 31 pages.
Final Office Action received for U.S. Appl. No. 14/869,831, dated May 19, 2017, 20 pages.
Final Office Action received for U.S. Appl. No. 14/869,877, dated Apr. 26, 2018, 18 pages.
Final Office Action received for U.S. Appl. No. 14/869,877, dated Aug. 3, 2016, 13 pages.
Final Office Action received for U.S. Appl. No. 14/869,877, dated Jun. 11, 2019, 35 pages.
Final Office Action received for U.S. Appl. No. 14/870,726, dated Apr. 19, 2017, 17 pages.
Final Office Action received for U.S. Appl. No. 14/870,793, dated Jan. 19, 2017, 16 pages.
Final Office Action received for U.S. Appl. No. 14/871,635, dated Jan. 18, 2018, 33 pages.
Final Office Action received for U.S. Appl. No. 14/871,635, dated May 3, 2019, 32 pages.
Final Office Action received for U.S. Appl. No. 14/871,654, dated Nov. 16, 2017, 32 pages.
Final Office Action received for U.S. Appl. No. 15/137,944, dated Feb. 27, 2017, 10 pages.
Final Office Action received for U.S. Appl. No. 15/351,230, dated Nov. 4, 2019, 6 pages.
Final Office Action received for U.S. Appl. No. 14/836,754, dated Mar. 22, 2016, 17 pages.
Final Office Action received for U.S. Appl. No. 14/836,754, dated Mar. 31, 2017, 24 pages.
Final Office Action received for U.S. Appl. No. 14/870,694, dated Apr. 7, 2017, 16 pages.
Haris, "Google Maps Navigation on Android 2.0", Sizzled Core, Online available at <http://www.sizzledcore.com/2009/10/29/google-maps-navigation-on-android-20/>, Oct. 29, 2009, 6 pages.
Intention to Grant received for Danish Patent Application No. PA201570665, dated Feb. 28, 2017, 2 pages.
Intention to Grant received for Danish patent Application No. PA201670042, dated Jan. 29, 2018, 2 pages.
International Preliminary Report on Patentability received for PCT Patent Application No. PCT/US2015/033326, dated Dec. 8, 2016, 11 pages.
International Preliminary Report on Patentability received for PCT Patent Application No. PCT/US2015/033380, dated Dec. 8, 2016, 10 pages.
International Preliminary Report on Patentability received for PCT Patent Application No. PCT/US2015/046892, dated Mar. 16, 2017, 14 pages.
International Preliminary Report on Patentability received for PCT Patent Application No. PCT/US2016/015316, dated Aug. 10, 2017, 10 pages.
International Preliminary Report on Patentability received for PCT Patent Application No. PCT/US2016/016621, dated Aug. 24, 2017, 8 pages.
International Preliminary Report on Patentability received for PCT Patent Application No. PCT/US2016/033751, dated Dec. 14, 2017, 11 pages.
International Preliminary Report on Patentability received for PCT Patent Application No. PCT/US2016/034175, dated Dec. 14, 2017, 14 pages.
International Preliminary Report on Patentability received for PCT Patent Application No. PCT/US2017/031748, dated Dec. 20, 2018, 10 pages.
International Search Report and Written Opinion received for PCT Patent Application No. PCT/US2015/033326, dated Aug. 10, 2015, 13 pages.
International Search Report and Written Opinion received for PCT Patent Application No. PCT/US2015/046892, dated Jan. 27, 2016, 20 pages.

(56) References Cited

OTHER PUBLICATIONS

International Search Report and Written Opinion received for PCT Patent Application No. PCT/US2015/033380, dated Aug. 10, 2015, 13 pages.
International Search Report and Written Opinion received for PCT Patent Application No. PCT/US2016/016621, dated May 9, 2016, 12 pages.
International Search Report and Written Opinion received for PCT Patent Application No. PCT/US2016/033751, dated Oct. 5, 2016, 14 pages.
International Search Report and Written Opinion received for PCT Patent Application No. PCT/US2016/034175, dated Oct. 7, 2016, 17 pages.
International Search Report and Written Opinion received for PCT Patent Application No. PCT/US2017/031748, dated Aug. 29, 2017, 14 pages.
International Search Report and Written Opinion received for PCT Patent Application No. PCT/US2016/015316, dated Mar. 8, 2016, 13 pages.
Invitation to Pay Additional Fees received for PCT Patent Application No. PCT/US2017/031748, mailed on Jun. 21, 2017, 2 pages.
Invitation to Pay Additional Fees received for PCT Patent Application No. PCT/US2015/046892, mailed on Nov. 4, 2015, 5 pages.
Invitation to Pay Additional Fees received for PCT Patent Application No. PCT/US2016/033751, mailed on Jul. 22, 2016, 2 pages.
Invitation to Pay Additional Fees received for PCT Patent Application No. PCT/US2016/034175, mailed on Aug. 11, 2016, 3 pages.
IOS Security, "White Paper", Available online at <https://web.archive.org/web/20150526223200/http://www.apple.com/business/docs/iOS_Security_Guide.pdf>, Apr. 2015, 55 pages.
Kamijo, Noboru, "Next Generation Mobile System—WatchPad1.5", Available at <http://researcher.ibm.com/researcher/view_group_subpage.php?id=5617>, retrieved on Jul. 4, 2015, 2 pages.
Kawai, Yasuhiro, "Resolving anxieties regarding card payment abuse by authentication—overcoming cumbersomeness by cooperation with mobile phones", Nikkei Internet Solutions No. 78, Japan, Nikkei BP, No. 78, Dec. 22, 2003, pp. 28-31.
Minutes of Oral Proceeding received for European Patent Application No. 16703893.4, mailed on Jul. 22, 2019, 9 pages.
Minutes of the Oral Proceedings received for European Patent Application No. 18154163.2, mailed on May 17, 2019, 7 pages.
Naver Blog, "How to Use Smart Wallet and Registered Card", Online Available at <http://feena74.blog.me/140185758401>, Mar. 29, 2013, 20 pages.
Non-Final Office Action received for U.S. Appl. No. 14/836,754, dated Nov. 17, 2015, 15 pages.
Non-Final Office Action received for U. S. U.S. Appl. No. 14/869,715, dated Jan. 29, 2016, 62 pages.
Non-Final Office Action received for U.S. Appl. No. 14/503,072, dated Jan. 26, 2015, 12 pages.
Non-Final Office Action received for U.S. Appl. No. 14/503,296, dated Jan. 30, 2015, 16 pages.
Non-Final Office Action received for U.S. Appl. No. 14/864,011, dated Jan. 21, 2016, 10 pages.
Non-Final Office Action received for U.S. Appl. No. 14/869,877, dated Jan. 29, 2016, 18 pages.
Non-Final Office Action received for U.S. Appl. No. 14/869,877, dated Jun. 16, 2017, 17 pages.
Non-Final Office Action received for U.S. Appl. No. 14/869,877, dated Oct. 5, 2018, 19 pages.
Non-Final Office Action received for U.S. Appl. No. 14/870,793, dated Apr. 19, 2016, 17 pages.
Non-Final Office Action received for U.S. Appl. No. 14/503,364, dated Feb. 3, 2016, 16 pages.
Non-Final Office Action received for U.S. Appl. No. 14/869,831, dated Jan. 29, 2016, 18 pages.
Non-Final Office Action received for U.S. Appl. No. 14/869,831, dated Nov. 22, 2017, 17 pages.
Non-Final Office Action received for U.S. Appl. No. 14/503,072, dated Jun. 17, 2016, 19 pages.
Non-Final Office Action received for U.S. Appl. No. 14/503,296, dated Aug. 28, 2017, 14 pages.
Non-Final Office Action received for U.S. Appl. No. 14/503,296, dated Oct. 5, 2016, 11 pages.
Non-Final Office Action received for U.S. Appl. No. 14/503,296, dated Sep. 18, 2018, 20 pages.
Non-Final Office Action received for U.S. Appl. No. 14/503,381, dated May 13, 2015, 13 pages.
Non-Final Office Action received for U.S. Appl. No. 14/836,754, dated Aug. 16, 2017, 25 pages.
Non-Final Office Action received for U.S. Appl. No. 14/836,754, dated Oct. 21, 2016, 18 pages.
Non-Final Office Action received for U.S. Appl. No. 14/864,011, dated Jun. 10, 2016, 10 pages.
Non-Final Office Action received for U.S. Appl. No. 14/869,715, dated Oct. 11, 2016, 37 pages.
Non-Final Office Action received for U.S. Appl. No. 14/870,726, dated Sep. 16, 2016, 12 pages.
Non-Final Office Action received for U.S. Appl. No. 14/871,635, dated May 5, 2017, 23 pages.
Non-Final Office Action received for U.S. Appl. No. 14/871,635, dated Nov. 16, 2018, 36 pages.
Non-Final Office Action received for U.S. Appl. No. 14/871,654, dated May 4, 2017, 23 pages.
Non-Final Office Action received for U.S. Appl. No. 15/137,944, dated Jul. 27, 2017, 13 pages.
Non-Final Office Action received for U.S. Appl. No. 15/137,944, dated Oct. 18, 2016, 10 pages.
Non-Final Office Action received for U.S. Appl. No. 15/294,439, dated Jan. 26, 2018, 18 pages.
Non-Final Office Action received for U.S. Appl. No. 15/351,230, dated Apr. 18, 2019, 16 pages.
Non-Final Office Action received for U.S. Appl. No. 15/433,238, dated Nov. 3, 2017, 6 pages.
Non-Final Office Action received for U.S. Appl. No. 14/870,694, dated Sep. 23, 2016, 13 pages.
Notice of Acceptance received for Australian Patent Application No. 2018200628, dated Jun. 13, 2019, 3 pages.
Notice of Acceptance received for Australian Patent Application No. 2015266650, dated Jan. 18, 2018, 3 pages.
Notice of Acceptance received for Australian Patent Application No. 2015266693, dated Jan. 19, 2018, 3 pages.
Notice of Acceptance received for Australian Patent Application No. 2016211504, dated Oct. 17, 2017, 3 pages.
Notice of Acceptance received for Australian Patent Application No. 2016218318, dated Jul. 3, 2019, 3 pages.
Notice of Acceptance received for Australian Patent Application No. 2017201064, dated Feb. 20, 2018, 3 pages.
Notice of Allowance received for Chinese Patent Application No. 201520357381.9, dated Jul. 29, 2015, 4 pages.
Notice of Allowance received for Chinese Patent Application No. 201520358683.8, dated Mar. 10, 2016, 5 pages.
Notice of Allowance received for Chinese Patent Application No. 201610069731.0, dated Sep. 6, 2019, 2 pages.
Notice of Allowance received for Chinese Patent Application No. 201610084974.1, dated Aug. 5, 2019, 2 pages.
Notice of Allowance received for Chinese Patent Application No. 201620480708.6, dated Apr. 20, 2017, 3 pages.
Notice of Allowance received for Chinese Patent Application No. 201620480846.4, dated Apr. 20, 2017, 3 pages.
Notice of Allowance received for Chinese Patent Application No. 201710093861.2, dated Sep. 24, 2019, 4 pages.
Notice of Allowance received for Japanese Patent Application No. 2016-224507, dated Mar. 26, 2019, 3 pages.
Notice of Allowance received for Japanese Patent Application No. 2016-224508, dated Jun. 20, 2017, 3 pages.
Notice of Allowance received for Japanese Patent Application No. 2016-558332, dated Jan. 11, 2019, 4 pages.
Notice of Allowance received for Japanese Patent Application No. 2016-569665, dated Feb. 22, 2019, 4 pages.
Notice of Allowance received for Japanese Patent Application No. 2017-540616, dated Apr. 23, 2019, 4 pages.

(56) References Cited

OTHER PUBLICATIONS

Notice of Allowance received for Japanese Patent Application No. 2017-562330, dated Sep. 20, 2019, 4 pages.
Notice of Allowance received for Japanese Patent Application No. 2018-008937, dated Jul. 2, 2018, 4 pages.
Notice of Allowance received for Korean Patent Application No. 10-2017-0022365, dated Mar. 27, 2018, 4 pages.
Notice of Allowance received for Korean Patent Application No. 10-2017-0022546, dated Feb. 27, 2018, 4 pages.
Notice of Allowance received for Korean Patent Application No. 10-2017-7024513, dated Apr. 20, 2018, 5 pages.
Notice of Allowance received for Korean Patent Application No. 10-2017-7034677, dated May 27, 2019, 5 pages.
Notice of Allowance received for Korean Patent Application No. 10-2018-7001854, dated Aug. 21, 2018, 4 pages.
Notice of Allowance received for Taiwanese Patent Application No. 104117508, dated Sep. 18, 2019, 5 pages.
Notice of Allowance received for Taiwanese Patent Application No. 104128689, dated Aug. 28, 2018, 5 pages.
Notice of Allowance received for the U.S. Appl. No. 14/503,381, dated Dec. 16, 2015, 8 pages.
Notice of Allowance received for U.S. Appl. No. 14/503,072, dated Jun. 4, 2018, 6 pages.
Notice of Allowance received for U.S. Appl. No. 14/503,072, dated Mar. 26, 2018, 6 pages.
Notice of Allowance received for U.S. Appl. No. 14/503,296, dated Aug. 28, 2019, 12 pages.
Notice of Allowance received for U.S. Appl. No. 14/503,364, dated Jun. 16, 2016, 11 pages.
Notice of Allowance received for U.S. Appl. No. 14/836,754, dated May 10, 2018, 27 pages.
Notice of Allowance received for U.S. Appl. No. 14/864,011, dated Apr. 28, 2016, 5 pages.
Notice of Allowance received for U.S. Appl. No. 14/864,011, dated Oct. 5, 2016, 5 pages.
Notice of Allowance received for U.S. Appl. No. 14/869,715, dated Dec. 19, 2017, 32 pages.
Notice of Allowance received for U.S. Appl. No. 14/870,694, dated Dec. 11, 2018, 6 pages.
Notice of Allowance received for U.S. Appl. No. 14/870,694, dated Jul. 31, 2018, 7 pages.
Notice of Allowance received for U.S. Appl. No. 14/870,726, dated Sep. 11, 2018, 9 pages.
Notice of Allowance received for U.S. Appl. No. 14/871,654, dated May 22, 2018, 22 pages.
Notice of Allowance received for U.S. Appl. No. 15/137,944, dated Dec. 21, 2017, 8 pages.
Notice of Allowance received for U.S. Appl. No. 15/294,439, dated Jan. 8, 2019, 8 pages.
Notice of Allowance received for U.S. Appl. No. 15/294,439, dated Sep. 10, 2018, 9 pages.
Notice of Allowance received for U.S. Appl. No. 15/351,230, dated Dec. 11, 2019, 11 pages.
Notice of Allowance received for U.S. Appl. No. 15/433,238, dated May 17, 2018, 7 pages.
Npasqua, "Maps: ability to swipe step by step in turn-by-turn mode", 2012, Apple Support Communities, https://discussions.apple.com/thread/4424256?start=0&tstart=0, Oct. 12, 2012, 4 pages.
Oates, Nathan, "PebbGPS", Available online at:-https://pebble.devpost.com/submissions/21694-pebbgps, Mar. 16, 2014, 2 pages.
Office Action received for Australian Patent Application No. 2017100558, dated Feb. 27, 2018, 3 pages.
Office Action received for European Patent Application No. 15728352.4, dated Jan. 25, 2018, 10 pages.
Office Action received for Japanese Patent Application No. 2016-224507, dated Dec. 1, 2017, 14 pages.
Office Action received for Australian Patent Application No. 2015100708, dated Sep. 8, 2015, 4 pages.
Office Action received for Australian Patent Application No. 2015100709, dated Sep. 9, 2015 (Examination Report 1), 4 pages.
Office Action received for Australian Patent Application No. 2015100709, dated Sep. 9, 2015 (Examination Report 2), 4 pages.
Office Action received for Australian Patent Application No. 2015266650, dated Apr. 10, 2017, 4 pages.
Office Action received for Australian Patent Application No. 2015266693, dated Apr. 10, 2017, 4 pages.
Office Action received for Australian Patent Application No. 2016100090, dated Apr. 13, 2016, 7 pages.
Office Action received for Australian Patent Application No. 2016100090, dated Oct. 7, 2016, 3 pages.
Office Action received for Australian Patent Application No. 2016100155, dated May 4, 2016, 7 pages.
Office Action received for Australian Patent Application No. 2016100367, dated May 25, 2016, 3 pages.
Office Action received for Australian Patent Application No. 2016100367, dated Oct. 26, 2016, 3 pages.
Office Action received for Australian Patent Application No. 2016100383, dated Jun. 9, 2016, 2 pages.
Office Action received for Australian Patent Application No. 2016100383, dated Nov. 11, 2016, 3 pages.
Office Action received for Australian Patent Application No. 2016100795, dated Aug. 12, 2016, 6 pages.
Office Action received for Australian Patent Application No. 2016100795, dated Feb. 6, 2017, 3 pages.
Office Action received for Australian Patent Application No. 2016100796, dated Aug. 26, 2016, 6 pages.
Office Action received for Australian Patent Application No. 2016100796, dated Feb. 13, 2017, 4 pages.
Office Action received for Australian Patent Application No. 2016102031, dated Feb. 28, 2017, 4 pages.
Office Action received for Australian Patent Application No. 2016218318, dated Aug. 24, 2018, 5 pages.
Office Action received for Australian Patent Application No. 2016218318, dated Sep. 26, 2018, 3 pages.
Office Action received for Australian Patent Application No. 2016270323, dated May 29, 2019, 4 pages.
Office Action received for Australian Patent Application No. 2016270323, dated Nov. 26, 2018, 4 pages.
Office Action received for Australian Patent Application No. 2016270775, dated May 29, 2019, 3 pages.
Office Action received for Australian Patent Application No. 2016270775, dated Nov. 26, 2018, 5 pages.
Office Action received for Australian Patent Application No. 2017100070, dated Mar. 16, 2017, 6 pages.
Office Action received for Australian Patent Application No. 2017100231, dated Apr. 13, 2017, 3 pages.
Office Action received for Australian Patent Application No. 2017100328, dated May 16, 2017, 3 pages.
Office Action received for Australian Patent Application No. 2017100328, dated Oct. 16, 2017, 6 pages.
Office Action received for Australian Patent Application No. 2017100558, dated Sep. 1, 2017, 5 pages.
Office Action received for Australian Patent Application No. 2017101375, dated Dec. 1, 2017, 3 pages.
Office Action received for Australian Patent Application No. 2017101375, dated Feb. 19, 2018, 4 pages.
Office Action received for Australian Patent Application No. 2017201064, dated Mar. 9, 2017, 2 pages.
Office Action received for Australian Patent Application No. 2017201068, dated Jan. 17, 2018, 5 pages.
Office Action received for Australian Patent Application No. 2017201068, dated Mar. 10, 2017, 2 pages.
Office Action received for Australian Patent Application No. 2018200485, dated Feb. 20, 2019, 6 pages.
Office Action received for Australian Patent Application No. 2018200485, dated Mar. 15, 2018, 3 pages.
Office Action received for Australian Patent Application No. 2018200485, dated Mar. 15, 2019, 4 pages.
Office Action received for Australian Patent Application No. 2018200628, dated Jan. 24, 2019, 3 pages.
Office Action received for Australian Patent Application No. 2018202559, dated Apr. 8, 2019, 4 pages.

(56) References Cited

OTHER PUBLICATIONS

Office Action received for Australian Patent Application No. 2018202559, dated Jan. 16, 2019, 6 pages.
Office Action received for Australian Patent Application No. 2018202559, dated Jul. 19, 2019, 5 pages.
Office Action received for Chinese Patent Application No. 201510284715.9, dated Dec. 21, 2018, 22 pages.
Office Action received for Chinese Patent Application No. 201510284715.9, dated Jun. 19, 2019, 26 pages.
Office Action received for Chinese Patent Application No. 201510284896.5, dated Jun. 28, 2018, 15 pages.
Office Action received for Chinese Patent Application No. 201510284896.5, dated Mar. 6, 2019, 13 pages.
Office Action received for Chinese Patent Application No. 201520358683.8, dated Sep. 2, 2015, 4 pages.
Office Action received for Chinese Patent Application No. 201610069731.0, dated Mar. 5, 2019, 10 pages.
Office Action received for Chinese Patent Application No. 201610084974.1, dated Dec. 5, 2018, 6 pages.
Office Action received for Chinese Patent Application No. 201610084974.1, dated May 3, 2018, 12 pages.
Office Action received for Chinese Patent Application No. 201610371774.4, dated Dec. 19, 2018, 13 pages.
Office Action received for Chinese Patent Application No. 201610371774.4, dated Jul. 8, 2019, 6 pages.
Office Action received for Chinese Patent Application No. 201610371856.9, dated Dec. 19, 2018, 12 pages.
Office Action received for Chinese Patent Application No. 201610371856.9, dated Jul. 10, 2019, 6 pages.
Office Action received for Chinese Patent Application No. 201620101636.X, dated May 25, 2016, 3 pages.
Office Action received for Chinese Patent Application No. 201620101636.X, dated Oct. 13, 2016, 3 pages.
Office Action received for Chinese Patent Application No. 201620119869.2, dated Jun. 3, 2016, 2 pages.
Office Action received for Chinese Patent Application No. 201620119869.2, dated Nov. 22, 2016, 2 pages.
Office Action received for Chinese Patent Application No. 201620480708.6, dated Jan. 9, 2017, 3 pages.
Office Action received for Chinese Patent Application No. 201620480708.6, dated Sep. 14, 2016, 3 pages.
Office Action received for Chinese Patent Application No. 201620480846.4, dated Jan. 9, 2017, 3 pages.
Office Action received for Chinese Patent Application No. 201620480846.4, dated Sep. 14, 2016, 3 pages.
Office Action received for Chinese Patent Application No. 201620509362.8, dated Feb. 10, 2017, 2 pages.
Office Action received for Chinese Patent Application No. 201620509362.8, dated Oct. 21, 2016, 3 pages.
Office Action received for Chinese Patent Application No. 201620509515.9, dated Nov. 9, 2016, 2 pages.
Office Action received for Chinese Patent Application No. 201710093861.2, dated Mar. 5, 2019, 6 pages.
Office Action received for Chinese Patent Application No. 201710093861.2, dated Sep. 14, 2018, 15 pages.
Office Action received for Chinese Patent Application No. 201710094150.7, dated Dec. 19, 2018, 12 pages.
Office Action received for Chinese Patent Application No. 201710094150.7, dated Jul. 31, 2019, 6 pages.
Office Action received for Chinese Patent Application No. 201810094316.X, dated Apr. 28, 2019, 9 pages.
Office Action received for Chinese Patent Application No. 201810094316.X, dated Aug. 5, 2019, 9 pages.
Office Action received for Chinese Patent Application No. 201810094316.X, dated Oct. 29, 2018, 12 pages.
Office Action Received for Danish Patent Application No. PA 201670709, dated Jul. 21, 2017, 4 pages.
Office Action Received for Danish Patent Application No. PA 201670709, dated Nov. 30, 2016, 10 pages.
Office Action received for Danish Patent Application No. PA201570665, dated Mar. 31, 2016, 9 pages.
Office Action received for Danish Patent Application No. PA201570665, dated Sep. 5, 2016, 3 pages.
Office Action received for Danish Patent Application No. PA201670042, dated Feb. 15, 2017, 3 pages.
Office Action received for Danish Patent Application No. PA201670042, dated Jun. 23, 2016, 5 pages.
Office Action received for Danish Patent Application No. PA201670042, dated Mar. 31, 2016, 10 pages.
Office Action received for Danish Patent Application No. PA201670042, dated Sep. 25, 2017, 2 pages.
Office Action received for Danish Patent Application No. PA201670074, dated Apr. 7, 2016, 8 pages.
Office Action received for Danish Patent Application No. PA201670074, dated Jun. 28, 2016, 5 pages.
Office Action received for Danish Patent Application No. PA201670074, dated Mar. 16, 2017, 2 pages.
Office Action received for Danish Patent Application No. PA201670362, dated Jan. 29, 2018, 3 pages.
Office Action received for Danish Patent Application No. PA201670362, dated Jun. 1, 2017, 6 pages.
Office Action received for Danish Patent Application No. PA201670362, dated Nov. 21, 2016, 11 pages.
Office Action received for Danish Patent Application No. PA201670363, dated Feb. 12, 2018, 2 pages.
Office Action received for Danish Patent Application No. PA201670363, dated Jun. 1, 2017, 5 pages.
Office Action received for Danish Patent Application No. PA201670363, dated Nov. 4, 2016, 11 pages.
Office Action received for Danish Patent Application No. PA201670710, dated Dec. 8, 2016, 10 pages.
Office Action received for Danish Patent Application No. PA201670710, dated Sep. 25, 2017, 6 pages.
Office Action received for Danish Patent Application No. PA201670749, dated Jan. 30, 2017, 11 pages.
Office Action received for Danish Patent Application No. PA201670749, dated Oct. 3, 2017, 3 pages.
Office Action received for Danish Patent Application No. PA201670751, dated Jan. 13, 2017, 9 pages.
Office Action received for Danish Patent Application No. PA201670751, dated Nov. 13, 2017, 2 pages.
Office Action received for Danish Patent Application No. PA201770292, dated Apr. 24, 2018, 3 pages.
Office Action received for Danish Patent Application No. PA201770292, dated Jun. 6, 2017, 7 pages.
Office Action received for Danish Patent Application No. PA201770292, dated Nov. 9, 2018, 3 pages.
Office Action received for Danish Patent Application No. PA201770292, dated Sep. 6, 2017, 4 pages.
Office Action received for European Patent Application No. 15727291.5, dated Jan. 15, 2018, 8 pages.
Office Action received for European Patent Application No. 16201159.7, dated Jun. 12, 2019, 10 pages.
Office Action received for European Patent Application No. 16201195.1, dated Feb. 14, 2018, 12 pages.
Office Action received for European Patent Application No. 16201205.8, dated Feb. 16, 2018, 12 pages.
Office Action received for European Patent Application No. 16703893.4, dated Sep. 17, 2018, 7 pages.
Office Action received for European Patent Application No. 16803996.4, dated Nov. 29, 2018, 12 pages.
Office Action received for European Patent Application No. 16804040.0, dated May 13, 2019, 12 pages.
Office Action received for European Patent Application No. 18154163.2, dated Apr. 11, 2018, 6 pages.
Office Action received for European Patent Application No. 19171661.2, dated Aug. 7, 2019, 7 pages.
Office Action received for German Patent Application No. 202015004267.8, dated Nov. 4, 2015, 4 pages.
Office Action received for Japanese Patent Application No. 2016-224506, dated May 14, 2019, 22 pages.

(56) References Cited

OTHER PUBLICATIONS

Office Action received for Japanese Patent Application No. 2016-224507, dated Jun. 16, 2017, 16 pages.
Office Action received for Japanese Patent Application No. 2016-558332, dated Dec. 8, 2017, 12 pages.
Office Action received for Japanese Patent Application No. 2016-558332, dated Jul. 27, 2018, 9 pages.
Office Action received for Japanese Patent Application No. 2016-569665, dated Aug. 20, 2018, 9 pages.
Office Action received for Japanese Patent Application No. 2016-569665, dated Jan. 19, 2018, 10 pages.
Office Action received for Japanese Patent Application No. 2017-540616, dated Jan. 12, 2018, 24 pages.
Office Action received for Japanese Patent Application No. 2017-540616, dated Jul. 27, 2018, 20 pages.
Office Action received for Japanese Patent Application No. 2017-562050, dated Feb. 1, 2019, 15 pages.
Office Action received for Japanese Patent Application No. 2017-562330, dated Jan. 18, 2019, 11 pages.
Office Action received for Korean Patent Application No. 10-2016-0152210, dated Jan. 29, 2019, 7 pages.
Office Action received for Korean Patent Application No. 10-2016-0152210, dated May 14, 2018, 13 pages.
Office Action received for Korean Patent Application No. 10-2016-0152210, dated May 30, 2019, 8 pages.
Office Action received for Korean Patent Application No. 10-2017-0022365, dated Jun. 26, 2017, 10 pages.
Office Action received for Korean Patent Application No. 10-2017-0022546, dated Jun. 21, 2017, 12 pages.
Office Action received for Korean Patent Application No. 10-2017-0022582, dated Jul. 31, 2019, 5 pages.
Office Action received for Korean Patent Application No. 10-2017-0022582, dated Sep. 19, 2018, 6 pages.
Office Action received for Korean Patent Application No. 10-2017-7034558, dated Dec. 15, 2018, 15 pages.
Office Action received for Korean Patent Application No. 10-2017-7034558, dated Jun. 4, 2019, 7 pages.
Office Action received for Korean Patent Application No. 10-2017-7034558, dated Sep. 25, 2019, 9 pages.
Office Action received for Korean Patent Application No. 10-2017-7034677, dated Nov. 1, 2018, 5 pages.
Office Action received for Korean Patent Application No. 10-2018-7001854, dated Apr. 2, 2018, 13 pages.
Office Action received for Korean Patent Application No. 10-2018-7019643, dated Jul. 2, 2019, 12 pages.
Office Action received for Taiwanese Patent Application No. 104117508, dated Jul. 14, 2017, 9 pages.
Office Action received for Taiwanese Patent Application No. 104117508, dated Jul. 20, 2016, 19 pages.
Office Action received for Taiwanese Patent Application No. 104117508, dated Mar. 20, 2017, 22 pages.
Office Action received for Taiwanese Patent Application No. 104117508, dated Jan. 25, 2019, 24 pages.
Office Action received for Taiwanese Patent Application No. 104117508, dated May 22, 2019, 7 pages.
Office Action received for Taiwanese Patent Application No. 104128689, dated Aug. 21, 2017, 8 pages.
Office Action received for Taiwanese Patent Application No. 104128689, dated Nov. 14, 2016, 12 pages.
Pre-Brief Appeal Conference decision received for U.S. Appl. No. 14/869,831, dated Jan. 18, 2019, 3 pages.
Preliminary Opinion before oral proceedings received for European Patent Application No. 18154163.2, dated Apr. 16, 2019, 12 pages.
"Real Solution of two-step-authentication Password Management for Authentication Enhancement", Fukuda Takao, Nikkei PC, JPN, Nikkei Business Publications, Inc., No. 694, Mar. 24, 2014, 11 pages.
Result of Consultation received for European Patent Application No. 16703893.4, dated Jun. 7, 2019, 3 pages.

Summons to Attend Oral Proceedings received for European Patent Application No. 16201195.1, mailed on Sep. 4, 2018, 21 pages.
Summons to Attend Oral Proceedings received for European Patent Application No. 16703893.4, mailed on Mar. 26, 2019, 14 pages.
Summons to Attend Oral Proceedings received for European Patent Application No. 16803996.4, mailed on Oct. 2, 2019, 16 pages.
Summons to Attend Oral Proceedings received for European Patent Application No. 18154163.2, mailed on Nov. 29, 2018, 9 pages.
Supplemental Notice of Allowance received for U.S. Appl. No. 14/870,694, dated Jan. 17, 2019, 3 pages.
Supplemental Notice of Allowance received for U.S. Appl. No. 14/870,726, dated Mar. 6, 2019, 6 pages.
Supplemental Notice of Allowance received for U.S. Appl. No. 15/433,238, dated Jun. 20, 2018, 2 pages.
The Gadget Pill, "Sygic for Android Navigation with HUD", Available online at:-https://www.youtube.com/watch?v=fGqrycRevGU, Mar. 23, 2014, 1 page.
Walker, Alissa, "Apple Watch's Walking Directions Buzz Your Wrist When It's Time to Turn", available online at: http://gizmodo.com/apple-watch-will-give-you-a-buzz-when-its-time-to-turn-1632557384, Sep. 9, 2014, 2 pages.
Applicant-Initiated Interview Summary received for U.S. Appl. No. 16/125,267, dated Feb. 8, 2021, 3 pages.
Non-Final Office Action received for U.S. Appl. No. 16/581,614, dated Feb. 4, 2021, 18 pages.
Notice of Allowance received for Korean Patent Application No. 10-2020-7025711, dated Jan. 19, 2021, 6 pages (2 pages of English Translation and 4 pages of Official Copy).
Office Action received for Australian Patent Application No. 2017324176, dated Jan. 14, 2021, 6 pages.
Summons to Attend Oral Proceedings received for European Patent Application No. 16201159.7, mailed on Feb. 4, 2021, 12 pages.
Use NFC with Screen Off or in Lock Screen on Galaxy Nexus, Available online at https://www.xda-developers.com/use-nfc-with-screen-off-or-in-lock-screen-on-galaxy-nexus/, Jun. 14 2012, 4 pages.
Advisory Action received for U.S. Appl. No. 16/581,614, dated Sep. 11, 2020, 8 pages.
Applicant Initiated Interview Summary received for U.S. Appl. No. 15/823,269, dated Sep. 17, 2020, 3 pages.
Applicant Initiated Interview Summary received for U.S. Appl. No. 16/581,614, dated Apr. 30, 2020, 4 pages.
Applicant Initiated Interview Summary received for U.S. Appl. No. 16/581,614, dated Aug. 26, 2020, 3 pages.
Applicant-Initiated Interview Summary received for U.S. Appl. No. 16/581,569, dated May 1, 2020, 3 pages.
Final Office Action received for U.S. Appl. No. 15/884,195, dated Sep. 29, 2020, 20 pages.
Final Office Action received for U.S. Appl. No. 16/581,614, dated Jul. 10, 2020, 21 pages.
International Search Report and Written Opinion received for PCT Patent Application No. PCT/US2020/020414, dated Jul. 27, 2020, 27 pages.
Invitation to Pay Additional Fees received for PCT Patent Application No. PCT/US2020/020414, mailed on Jun. 4, 2020, 24 pages.
Non-Final Office Action received for U.S. Appl. No. 16/581,569, dated Feb. 13, 2020, 32 pages.
Non-Final Office Action received for U.S. Appl. No. 16/581,614, dated Jan. 29, 2020, 13 pages.
Notice of Allowance received for U.S. Appl. No. 16/581,569, dated May 27, 2020, 43 pages.
Office Action received for Australian Patent Application No. 2019250143, dated Sep. 15, 2020, 5 pages.
Office Action received for Korean Patent Application No. 10-2020-7025711, dated Sep. 11, 2020, 12 pages (5 pages of English Translation and 7 pages of Official Copy).
Final Office Action received for U.S. Appl. No. 15/884,195, dated Feb. 22, 2021, 26 pages.
Notice of Acceptance received for Australian Patent Application No. 2019250143, dated Jan. 29, 2021, 3 pages.
Notice of Allowance received for U.S. Appl. No. 15/823,269, dated Feb. 22, 2021, 7 pages.
Notice of Allowance received for U.S. Appl. No. 16/736,704, dated Feb. 23, 2021, 11 pages.

(56) References Cited

OTHER PUBLICATIONS

Office Action received for Australian Patent Application No. 2019271927, dated Feb. 10, 2021, 5 pages.
Office Action received for Chinese Patent Application No. 201910744886.3, dated Jan. 18, 2021, 7 pages (1 page of English Translation and 6 pages of Official Copy).
Office Action received for Japanese Patent Application No. 2020-126751, dated Jan. 5, 2021, 8 pages (4 pages of English Translation and 4 pages of Official Copy).
Office Action received for Korean Patent Application No. 10-2020-7027862, dated Jan. 29, 2021, 8 pages (3 pages of English Translation and 5 pages of Official Copy).
Hartl et al., "Efficient Verification of Holograms Using Mobile Augmented Reality", IEEE Transactions on Visualization and Computer Graphics, vol. 22, No. 7, Online available at: https://arbook.icg.tugraz.at/schmalstieg/Schmalstieg_302.pdf, 2015, 9 pages.
Wang Na, "Research of Face Detection System Based on Mobile Phone Platform", Video Engineering, vol. 36, No. 11, Nov. 2012, 5 pages (Official Copy Only) (See Communication under Rule 37 CFR § 1.98(a) (3)).
Decision on Request for Rehearing received for U.S. Appl. No. 14/869,831, dated Mar. 8, 2021, 9 pages.
Notice of Acceptance received for Australian Patent Application No. 2020239783, dated Mar. 2, 2021, 3 pages.
Notice of Allowance received for Chinese Patent Application No. 201910498825.3, dated Mar. 8, 2021, 2 pages (1 page of English Translation and 1 page of Official Copy).
Office Action received for Chinese Patent Application No. 201711292804.3, dated Feb. 23, 2021, 17 pages (8 pages of English Translation and 9 pages of Official Copy).
Applicant Initiated interview Summary received for U.S. Appl. No. 16/736,704, dated Aug. 27, 2020, 5 pages.
Office Action received for Australian Patent Application No. 2020200685, dated Aug. 12, 2020, 3 pages.
Office Action received for European Patent Application No. 18830326.7, dated Aug. 13, 2020, 6 pages.
Applicant-Initiated Interview Summary received for U.S. Appl. No. 16/549,862, dated May 21, 2021, 2 pages.
Ex Parte Quayle Action received for U.S. Appl. No. 14/869,831, dated May 28, 2021, 16 pages.
Notice of Allowance received for U.S. Appl. No. 15/823,269, dated Jun. 3, 2021, 6 pages.
Notice of Allowance received for U.S. Appl. No. 16/670,949, dated May 27, 2021, 7 pages.
Advisory Action received for U.S. Appl. No. 12/286,410, dated Jun. 25, 2012, 2 Pages.
Adrianisen, "Samsung Galaxy S8 Face Recognition—Register Your Face Review!", Retrieved from < https://www.youtube.com/watch?v=04KVPaCJq94>, Apr. 27, 2017, 1 page.
Advisory Action received for U.S. Appl. No. 15/274,910, dated Aug. 12, 2019, 3 pages.
Advisory Action received for U.S. Appl. No. 16/164,561, dated Nov. 14, 2019, 2 pages.
Advisory Action received for U.S. Appl. No. 15/250,152, dated Mar. 25, 2019, 5 pages.
Applicant Initiated Interview Summary received for U.S. Appl. No. 15/433,320, dated Feb. 11, 2020, 5 pages.
Applicant Initiated Interview Summary received for U.S. Appl. No. 16/147,023, dated Oct. 29, 2019, 3 pages.
Balaban, Dan, "The Brave New World of Contactless Mobile Credit", Nov. 2005, Iss 11 p. 20, Nov. 2005, 6 pages.
Bernier, Patrick L.., "File: Sony PaSoRi RC-S320.jpeg", Online Available at <http://en.wikipedia.org/wiki/File:Sony_PaSoRi_RCS320.jpeg>, Jan. 1, 2007, 4 pages.
Bernier, Patrick, "FeliCa", Wikipedia, Jan. 1, 2007, 3 pages.
Certificate of Examination received for Australian Patent Application No. 2017101425, dated Jan. 17, 2018, 2 pages.
Certificate of Examination received for Australian Patent Application No. 2018101014, dated Mar. 20, 2019, 2 pages.
Certification of Examination received for Australian Patent Application No. 2017100553, dated Jan. 17, 2018, 2 pages.
Corrected Notice of Allowance received for U.S. Appl. No. 15/269,801, dated Oct. 3, 2017, 4 pages.
Corrected Notice of Allowance received for U.S. Appl. No. 15/845,794, dated Feb. 25, 2019, 2 pages.
Corrected Notice of Allowance received for U.S. Appl. No. 15/866,341, dated Aug. 21, 2019, 3 pages.
Corrected Notice of Allowance received for U.S. Appl. No. 15/866,341, dated Aug. 26, 2019, 3 pages.
CV, Meerkat, "Extracting Face Orientation in Real-time", Available online at: <https://www.youtube.com/watch?v=Ugwfnjx6UYw>, Jul. 22, 2016, 3 pages.
Decision to Grant received for Danish Patent Application No. PA201670628, dated Nov. 20, 2017, 2 pages.
Decision to Grant received for Danish Patent Application No. PA201770503, dated Feb. 14, 2020, 2 pages.
Decision to Grant received for Danish Patent Application No. PA201770715, dated Feb. 15, 2019, 2 pages.
Decision to Grant received for Danish Patent Application No. PA201770782, dated Oct. 25, 2019, 2 pages.
Decision to Grant received for Danish Patent Application No. PA201770804, dated Jun. 28, 2019., 2 pages.
Decision to Grant received for Danish Patent Application No. PA201870370, dated Mar. 29, 2019, 2 pages.
Decision to Grant received for Danish Patent Application No. PA201870371, dated Mar. 29, 2019, 2 pages.
Decision to Grant received for European Patent Application No. 12773460.6, dated Jun. 27, 2019, 2 pages.
Decision to Grant received for Japanese Patent Application No. 2017-075031, dated Jul. 1, 2019, 3 pages (1 page of English Translation and 2 pages of Official Copy).
Decision to Refuse received for European Patent Application No. 12770400.5, dated Nov. 8, 2018, 12 pages.
Drareni, Jamil, "Face Tracking and Head Pose Estimation with Open CV", Available online at: <https://www.youtube.com/watch?v=Etj_aktbnwM>, Jun. 9, 2013, 3 pages.
European Search Report received for European Patent Application No. 17865509.8, dated Oct. 2, 2019, 5 pages.
Extended European Search Report (includes Supplementary European Search Report and Search Opinion) received for European Patent Application No. 09818165.4, dated Jun. 22, 2012, 5 pages.
Extended European Search Report for European Application No. 17813737.8, dated Nov. 22, 2019, 9 pages.
Extended European Search Report received for European Patent Application No. 17799904.2, dated Jul. 30, 2018, 7 pages.
Extended European Search Report received for European Patent Application No. 18208881.5, dated Jan. 8, 2019, 7 pages.
Extended European Search Report received for European Patent Application No. 19150528.8, dated May 15, 2019, 9 pages.
Extended European Search Report received for European Patent Application No. 19160344.8, dated Jun. 14, 2019, 7 pages.
Extended European Search Report received for European Patent Application No. 19160348.9, dated Jul. 19, 2019, 6 pages.
Extended European Search Report received for European Patent Application No. 19186538.5, dated Oct. 9, 2019, 10 pages.
Extended European Search Report received for European Patent Application No. 19194828.0, dated Dec. 19, 2019, 7 pages.
Final Office Action received for U.S. Appl. No. 12/286,410, dated Apr. 9, 2012, 15 pages.
Final Office Action received for U.S. Appl. No. 12/286,410, dated Jun. 12, 2014, 16 pages.
Final Office Action received for U.S. Appl. No. 12/286,488, dated Aug. 23, 2018, 30 Pages.
Final Office Action received for U.S. Appl. No. 12/286,488, dated Jun. 6, 2011, 28 Pages.
Final Office Action received for U.S. Appl. No. 12/286,488, dated Mar. 10, 2015, 16 pages.
Final Office Action received for U.S. Appl. No. 12/286,494, dated Dec. 27, 2013, 21 pages.
Final Office Action received for U.S. Appl. No. 12/286,494, dated Feb. 3, 2016, 19 pages.

(56) References Cited

OTHER PUBLICATIONS

Final Office Action received for U.S. Appl. No. 12/286,494, dated Mar. 9, 2012, 20 pages.
Final Office Action received for U.S. Appl. No. 13/248,882, dated Dec. 4, 2013, 22 pages.
Final Office Action received for U.S. Appl. No. 14/285,378, dated Jul. 23, 2015, 19 pages.
Final Office Action received for U.S. Appl. No. 15/274,910, dated May 31, 2019, 31 pages.
Final Office Action received for U.S. Appl. No. 15/433,320, dated Dec. 31, 2019, 30 pages.
Final Office Action received for U.S. Appl. No. 15/866,341, dated May 14, 2019, 10 pages.
Final Office Action received for U.S. Appl. No. 16/147,023, dated Jul. 23, 2019, 18 pages.
Final Office Action received for U.S. Appl. No. 16/147,115, dated Jun. 19, 2019, 14 pages.
Final Office Action received for U.S. Appl. No. 16/164,561, dated Sep. 5, 2019, 12 pages.
Final Office Action received for U.S. Appl. No. 15/250,152, dated Aug. 23, 2017, 24 pages.
Final Office Action received for U.S. Appl. No. 15/250,152, dated Nov. 16, 2018, 30 pages.
Giving Apple Pay a Try, The Consumer Credit Monthly, Kinzai Institute for Financial Affairs, Inc, vol. 33, No. 1, ISSN: 0288-8122, 2015, 7 pages (Official Copy only) (See Communication under 37 CFR § 1.98(a) (3)).
Handheld, MacMillian Publishers, Online Available at: <http://www.macmillandictionary.com/dictionary/american/handheld>, 1 page.
How to Smartphone, "Samsung Galaxy S7—screen rotation on / off", Available Online at <https://www.youtube.com/watch?v=np54sEEl11E >, see video from 1:10 to 1:30., Dec. 12, 2016, 3 pages.
Intention to Grant received for Danish Patent Application No. PA201670628, dated Aug. 28, 2017, 2 pages.
Intention to Grant received for Danish Patent Application No. PA201770503, dated Nov. 11, 2019, 2 pages.
Intention to Grant received for Danish Patent Application No. PA201770714, dated Feb. 15, 2019, 2 pages.
Intention to Grant received for Danish Patent Application No. PA201770714, dated Nov. 2, 2018, 2 pages.
Intention to Grant received for Danish Patent Application No. PA201770715, dated Nov. 13, 2018, 2 pages.
Intention to Grant received for Danish Patent Application No. PA201770782, dated Aug. 8, 2019, 2 pages.
Intention to Grant received for Danish Patent Application No. PA201770804, dated Apr. 10, 2019, 2 pages.
Intention to Grant received for Danish Patent Application No. PA201870370, dated Jan. 2, 2019, 2 pages.
Intention to Grant received for Danish Patent Application No. PA201870371, dated Jan. 2, 2019, 2 pages.
Intention to Grant received for European Patent Application No. 12773460.6, dated Feb. 4, 2019, 8 pages.
Intention to Grant received for European Patent Application No. 12773460.6, dated Jun. 17, 2019, 4 pages.
International Preliminary Report on Patentability received for PCT Patent Application No. PCT/US2009/053441, dated Apr. 14, 2011, 6 pages.
International Preliminary Report on Patentability received for PCT Patent Application No. PCT/US2012/057319, dated Apr. 10, 2014, 6 pages.
International Preliminary Report on Patentability received for PCT Patent Application No. PCT/US2012/057656, dated Apr. 10, 2014, 6 pages.
International Preliminary Report on Patentability received for PCT Patent Application No. PCT/US2017/031086, dated Dec. 27, 2018, 12 pages.
International Preliminary Report on Patentability received for PCT Patent Application No. PCT/US2017/032240, dated Nov. 29, 2018, 29 pages.
International Preliminary Report on Patentability received for PCT Patent Application No. PCT/US2017/058368, dated Feb. 19, 2019, 5 pages.
International Preliminary Report on Patentability received for PCT Patent Application No. PCT/US2017/49500, dated Mar. 21, 2019, 14 pages.
International Preliminary Report on Patentability received for PCT Patent Application No. PCT/US2018/033054, dated Nov. 28, 2019, 21 pages.
International Search Report and Written Opinion received for PCT Patent Application No. PCT/US17/31086, dated Sep. 8, 2017, 15 pages.
International Search Report and Written Opinion received for PCT Patent Application No. PCT/US2009/053441, dated May 25, 2010, 7 pages.
International Search Report and Written Opinion received for PCT Patent Application No. PCT/US2012/057319, dated Feb. 25, 2013, 7 pages.
International Search Report and Written Opinion received for PCT Patent Application No. PCT/US2012/057656, dated Feb. 25, 2013, 7 pages.
International Search Report and Written Opinion received for PCT Patent Application No. PCT/US2017/032240, dated Sep. 21, 2017, 33 pages.
International Search Report and Written Opinion received for PCT Patent Application No. PCT/US2017/058368, dated Feb. 23, 2018, 12 pages.
International Search Report and Written Opinion received for PCT Patent Application No. PCT/US2017/49500, dated Jan. 18, 2018, 18 pages.
International Search Report and Written Opinion received for PCT Patent Application No. PCT/US2018/015603, dated Jun. 22, 2018, 13 pages.
International Search Report and Written Opinion received for PCT Patent Application No. PCT/US2018/033054, dated Oct. 30, 2018, 32 pages.
International Search Report and Written Opinion received for PCT Patent Application No. PCT/US2018/049289, dated Feb. 19, 2019, 12 pages.
International Search Report and Written Opinion received for PCT Patent Application No. PCT/US2019/035092, dated Jan. 16, 2020, 16 pages.
Invitation to Pay Additional Fee received for PCT Patent Application No. PCT/US17/31086, mailed on Jul. 14, 2017, 2 pages.
Invitation to Pay Additional Fee received for PCT Patent Application No. PCT/US17/32240, mailed on Jul. 12, 2017, 2 pages.
Invitation to Pay Additional Fee received for PCT Patent Application No. PCT/US2017/49500, mailed on Nov. 14, 2017, 3 pages.
Invitation to Pay Additional Fee received for PCT Patent Application No. PCT/US2019/035092, mailed on Nov. 20, 2019, 6 pages.
Invitation to Pay Additional Fee received for PCT Patent Application No. PCT/US2017/058368, mailed on Dec. 14, 2017, 2 pages.
Invitation to Pay Additional Fees received for PCT Patent Application No. PCT/US2018/033054, mailed on Sep. 4, 2018, 25 pages.
Invitation to Pay Search Fees received for European Patent Application No. 18730556.0, mailed on Mar. 2, 2020, 3 pages.
Komachi, Aneem, "Time Attendance—Face Recognition—Biometrics", Available at <https://www.youtube.com/watch?v=asclTiiiSbc>, Feb. 9, 2010, 1 page.
Minutes of the Oral Proceedings received for European Application No. 12770400.5, mailed on Nov. 6, 2018, 7 pages.
Nhdanh—Protocol Corp, "How to Enroll Face Enbioaccess T9 Nitgen Korea—Dăng Ký Khuôn Măt Enbioaccess T9 Nitgen", Available online at <https://www.youtube.com/watch?v=mFn03PD4NIE>, Mar. 30, 2017, 1 page.
Nomad, Studio, "Hajimete-no-smartphone-no-komatta-wo-sakutto-kaiketsu (Easy solution to troubles at your first smartphone)", Kazukuni Saito of Shuwa System Co., Ltd., 1st Ed, Jul. 1, 2016, 20 pages (Official Copy only) (See Communication under 37 CFR § 1.98(a) (3)).
Non-Final Office Action received for U.S. Appl. No. 15/274,910, dated Oct. 18, 2018, 26 pages.

(56) References Cited

OTHER PUBLICATIONS

Non-Final Office Action received for U.S. Appl. No. 12/286,410, dated Dec. 11, 2012, 17 pages.
Non-Final Office Action received for U.S. Appl. No. 12/286,410, dated May 15, 2013, 15 pages.
Non-Final Office Action received for U.S. Appl. No. 12/286,410, dated Oct. 11, 2013, 17 pages.
Non-Final Office Action received for U.S. Appl. No. 12/286,410, dated Oct. 27, 2011, 12 pages.
Non-Final Office Action received for U.S. Appl. No. 12/286,488, dated Apr. 25, 2014, 29 pages.
Non-Final Office Action received for U.S. Appl. No. 12/286,488, dated Feb. 9, 2018, 21 pages.
Non-Final Office Action received for U.S. Appl. No. 12/286,488, dated Jan. 26, 2011, 20 pages.
Non-Final Office Action received for U.S. Appl. No. 12/286,488, dated Nov. 12, 2014, 9 pages.
Non-Final Office Action received for U.S. Appl. No. 12/286,494, dated Aug. 20, 2015, 16 pages.
Non-Final Office Action received for U.S. Appl. No. 12/286,494, dated Jan. 9, 2015, 13 Pages.
Non-Final Office Action received for U.S. Appl. No. 12/286,494, dated Jul. 29, 2013, 21 pages.
Non-Final Office Action received for U.S. Appl. No. 12/286,494, dated Jun. 3, 2014, 13 Pages.
Non-Final Office Action received for U.S. Appl. No. 12/286,494, dated Sep. 13, 2011, 17 pages.
Non-Final Office Action received for U.S. Appl. No. 13/248,872, dated May 19, 2014, 6 pages.
Non-Final Office Action received for U.S. Appl. No. 13/248,882, dated Jul. 10, 2013, 14 pages.
Non-Final Office Action received for U.S. Appl. No. 14/285,378, dated Dec. 21, 2015, 18 pages.
Non-Final Office Action received for U.S. Appl. No. 14/285,378, dated Jan. 21, 2015, 19 pages.
Non-Final Office Action received for U.S. Appl. No. 14/642,366, dated Aug. 24, 2015, 7 pages.
Non-Final Office Action received for U.S. Appl. No. 15/134,638, dated Sep. 20, 2016, 6 pages.
Non-Final Office Action received for U.S. Appl. No. 15/145,633, dated Jun. 14, 2018, 19 pages.
Non-Final Office Action received for U.S. Appl. No. 15/269,801, dated Dec. 30, 2016, 17 pages.
Non-Final Office Action received for U.S. Appl. No. 15/274,086, dated Jan. 11, 2017, 21 pages.
Non-Final Office Action received for U.S. Appl. No. 15/782,068, dated Jun. 3, 2019, 17 Pages.
Non-Final Office Action received for U.S. Appl. No. 15/845,794, dated Oct. 15, 2018, 8 pages.
Non-Final Office Action received for U.S. Appl. No. 15/866,341, dated Nov. 13, 2018, 11 pages.
Non-Final Office Action received for U.S. Appl. No. 15/884,195, dated Feb. 27, 2020, 18 pages.
Non-Final Office Action received for U.S. Appl. No. 15/894,221, dated Jul. 25, 2018, 21 pages.
Non-Final Office Action received for U.S. Appl. No. 15/903,456, dated Sep. 6, 2018, 20 pages.
Non-Final Office Action received for U.S. Appl. No. 15/981,817, dated Jan. 2, 2020, 31 pages.
Non-Final Office Action received for U.S. Appl. No. 16/147,023, dated Dec. 26, 2018, 17 pages.
Non-Final Office Action received for U.S. Appl. No. 16/147,115, dated Dec. 13, 2018, 12 pages.
Non-Final Office Action received for U.S. Appl. No. 16/164,561, dated Jan. 4, 2019, 14 pages.
Non-Final Office Action received for U.S. Appl. No. 16/434,865, dated Jan. 16, 2020, 9 pages.
Non-Final Office Action received for U.S. Appl. No. 16/542,084, dated Jan. 24, 2020, 21 pages.
Non-Final Office Action received for U.S. Appl. No. 16/667,271, dated Dec. 13, 2019, 8 pages.
Non-Final Office Action received for U.S. Appl. No. 15/250,152, dated Apr. 6, 2018, 31 pages.
Non-Final Office Action received for U.S. Appl. No. 15/250,152, dated Mar. 2, 2017, 26 pages.
Non-Final Office Action received for U.S. Appl. No. 15/433,320, dated May 2, 2019, 27 pages.
Non-Final Office Action received for U.S. Appl. No. 15/945,610, dated Sep. 20, 2018, 9 pages.
Notice from the European Patent Office dated Oct. 1, 2007 Concerning Business Methods, Official Journal EPO, available online at <http://archive.epo.org/epo/pubs/oj007/11_07/11_5927.pdf>. Nov. 2007, pp. 592-593.
Notice of Acceptance received for Australian Patent Application No. 2017266867, dated Mar. 6, 2019, 3 pages.
Notice of Acceptance received for Australian Patent Application No. 2017317605, dated Aug. 28, 2019, 3 Pages.
Notice of Acceptance received for Australian Patent Application No. 2018202559, dated Oct. 21, 2019, 3 pages.
Notice of Acceptance received for Australian Patent Application No. 2018269512, dated Jan. 28, 2020, 3 pages.
Notice of Acceptance received for Australian Patent Application No. 2018279788, dated Nov. 6, 2019, 3 pages.
Notice of Acceptance received for Australian Patent Application No. 2018312629, dated Nov. 7, 2019, 4 pages.
Notice of Acceptance received for Australian Patent Application No. 2019200360, dated Mar. 15, 2019, 3 pages.
Notice of Acceptance received for Australian Patent Application No. 2019201101, dated May 6, 2019, 3 pages.
Notice of Acceptance received for Australian Patent Application No. 2019203473, dated Nov. 7, 2019, 3 pages.
Notice of Allowance received for Chinese Patent Application No. 201280047459.6, dated Jan. 31, 2018, 2 pages (1 page of English Translation and 1 page of Official Copy).
Notice of Allowance received for Chinese Patent Application No. 201780002398.4, dated Jun. 17, 2019, 2 pages (1 page of English Translation and 1 page of Official Copy).
Notice of Allowance received for Japanese Patent Application No. 2016-224506, dated Jan. 24, 2020, 4 pages (1 page of English Translation and 3 pages of Official Copy).
Notice of Allowance received for Japanese Patent Application No. 2018-504997, dated Aug. 3, 2018, 4 pages (1 page of English Translation and 3 pages of Official copy).
Notice of Allowance received for Japanese Patent Application No. 2018-560107, dated Dec. 6, 2019, 4 pages (1 page of English Translation and 3 pages of Official Copy).
Notice of Allowance received for Japanese Patent Application No. 2019-096220, dated Nov. 25, 2019, 4 pages (1 page of English Translation and 3 pages of Official Copy).
Notice of Allowance received for Korean Patent Application No. 10-2016-7035555, dated Sep. 23, 2019, 3 pages (1 page of English Translation and 2 pages of Official Copy).
Notice of Allowance received for Korean Patent Application No. 10-2017-7012145, dated Oct. 30, 2019, 3 pages (1 page of English Translation and 2 pages of Official Copy).
Notice of Allowance received for Korean Patent Application No. 10-2018-7033301, dated Feb. 20, 2019, 5 pages (2 Pages of English Translation and 3 Pages of Official Copy).
Notice of Allowance received for Korean Patent Application No. 10-2019-7003374, dated Oct. 4, 2019, 9 pages (2 pages of English Translation and 7 pages of Official Copy).
Notice of Allowance received for Korean Patent Application No. 10-2019-7003836, dated Oct. 4, 2019, 4 pages (1 page of English Translation and 3 pages of Official Copy).
Notice of Allowance received for Korean Patent Application No. 10-2019-7004734, dated Oct. 24, 2019, 6 pages (2 pages of English Translation and 4 pages of Official Copy).
Notice of Allowance received for Korean Patent Application No. 10-2019-7005925, dated Jan. 21, 2020, 6 pages (2 pages of English Translation and 4 pages of Official Copy).

(56) References Cited

OTHER PUBLICATIONS

Notice of Allowance received for Korean Patent Application No. 10-2019-7025322, dated Nov. 20, 2019, 5 pages (2 pages of English Translation and 3 pages of Official Copy).
Notice of Allowance received for Korean Patent Application No. 10-2014-7008348, dated Feb. 21, 2019, 5 pages (2 Pages of English Translation and 3 Pages of Official Copy).
Notice of Allowance received for U.S. Appl. No. 12/286,488, dated Jun. 12, 2019, 17 pages.
Notice of Allowance received for U.S. Appl. No. 13/248,872, dated Dec. 4, 2014, 7 pages.
Notice of Allowance received for U.S. Appl. No. 13/248,882, dated Mar. 13, 2014, 16 pages.
Notice of Allowance received for U.S. Appl. No. 14/285,378, dated May 19, 2016, 10 pages.
Notice of Allowance received for U.S. Appl. No. 14/642,366, dated Jan. 14, 2016, 8 pages.
Notice of Allowance received for U.S. Appl. No. 14/871,635, dated Feb. 3, 2020, 3 pages.
Notice of Allowance received for U.S. Appl. No. 14/871,635, dated Jan. 15, 2020, 3 pages.
Notice of Allowance Received for U.S. Appl. No. 14/871,635, dated Nov. 14, 2019, 14 pages.
Notice of Allowance received for U.S. Appl. No. 15/134,638, dated Apr. 10, 2018, 7 pages.
Notice of Allowance received for U.S. Appl. No. 15/134,638, dated Jul. 27, 2018, 7 pages.
Notice of Allowance received for U.S. Appl. No. 15/145,633, dated Jan. 8, 2019, 14 pages.
Notice of Allowance received for U.S. Appl. No. 15/250,152, dated May 1, 2019, 12 pages.
Notice of Allowance received for U.S. Appl. No. 15/269,801, dated May 3, 2017, 6 pages.
Notice of Allowance received for U.S. Appl. No. 15/269,801, dated Sep. 7, 2017, 5 pages.
Notice of Allowance received for U.S. Appl. No. 15/274,086, dated Jun. 7, 2017, 8 pages.
Notice of Allowance received for U.S. Appl. No. 15/274,086, dated Oct. 19, 2017, 9 pages.
Notice of Allowance received for U.S. Appl. No. 15/782,068, dated Sep. 24, 2019, 7 pages.
Notice of Allowance received for U.S. Appl. No. 15/845,794, dated Feb. 14, 2019, 6 pages.
Notice of Allowance received for U.S. Appl. No. 15/866,341, dated Jul. 26, 2019, 8 pages.
Notice of Allowance received for U.S. Appl. No. 15/894,221, dated Apr. 11, 2019, 5 pages.
Notice of Allowance received for U.S. Appl. No. 15/894,221, dated Aug. 13, 2019, 2 pages.
Notice of Allowance received for U.S. Appl. No. 15/894,221, dated Feb. 1, 2019, 5 pages.
Notice of Allowance received for U.S. Appl. No. 15/894,221, dated Mar. 4, 2019, 2 pages.
Notice of Allowance received for U.S. Appl. No. 15/903,456, dated May 1, 2019, 6 pages.
Notice of Allowance received for U.S. Appl. No. 15/945,610, dated May 20, 2019, 7 pages.
Notice of Allowance received for U.S. Appl. No. 16/131,767, dated Sep. 6, 2019, 7 pages.
Notice of Allowance received for U.S. Appl. No. 16/147,023, dated Feb. 27, 2020, 2 pages.
Notice of Allowance received for U.S. Appl. No. 16/147,023, dated Jan. 31, 2020, 7 pages.
Notice of Allowance received for U.S. Appl. No. 16/147,115, dated Oct. 30, 2019, 10 pages.
Office Action received for Australian Patent Application No. 2016270775, dated Nov. 26, 2019, 3 pages.
Office Action received for Australian Patent Application No. 2017100553, dated Aug. 4, 2017, 5 pages.
Office Action received for Australian Patent Application No. 2017101563, dated Jan. 22, 2018, 2 pages.
Office Action received for Australian Patent Application No. 2017101563, dated Jun. 26, 2018, 3 pages.
Office Action received for Australian Patent Application No. 2017266867, dated Dec. 6, 2018, 3 pages.
Office Action received for Australian Patent Application No. 2017317605, dated Apr. 11, 2019, 4 pages.
Office Action received for Australian Patent Application No. 2017317605, dated Feb. 22, 2019, 4 pages.
Office Action received for Australian Patent Application No. 2017324176, dated Feb. 27, 2020, 3 pages.
Office Action received for Australian Patent Application No. 2018101014, dated Jan. 18, 2019, 5 pages.
Office Action received for Australian Patent Application No. 2018101014, dated Sep. 19, 2018, 4 pages.
Office Action received for Australian Patent Application No. 2018279788, dated Feb. 8, 2019, 4 pages.
Office Action received for Australian Patent Application No. 2018312629, dated Feb. 25, 2019, 4 pages.
Office Action received for Australian Patent Application No. 2019201101, dated Feb. 28, 2019, 3 pages.
Office Action received for Australian Patent Application No. 2019203473, dated Oct. 25, 2019, 2 pages.
Office Action received for Australian Patent Application No. 2020200685, dated Feb. 10, 2020, 4 pages.
Office Action received for Chinese Patent Application No. 201510284715.9, dated Dec. 18, 2019, 24 pages (7 pages of English Translation and 17 pages of Official Copy).
Office Action received for Chinese Patent Application No. 201510284896.5, dated Sep. 3, 2019, 9 pages (2 pages of English Translation and 7 pages of Official Copy).
Office Action received for Chinese Patent Application No. 201610371856.9, dated Dec. 18, 2019, 6 pages (3 pages of English Translation and 3 pages of Official Copy).
Office Action received for Chinese Patent Application No. 201780002398.4, dated Feb. 27, 2019, 6 pages (3 pages of English Translation and 3 pages of Official Copy).
Office Action received for Chinese Patent Application No. 201780002398.4, dated Sep. 12, 2018, 17 pages (5 pages of English Translation and 12 pages of Official Copy).
Office Action received for Chinese Patent Application No. 201780002648.4, dated Dec. 5, 2018, 13 pages (5 pages of English Translation and 8 pages of Official Copy).
Office Action received for Chinese Patent Application No. 201780002648.4, dated Jun. 12, 2019, 11 pages (5 pages of English Translation and 6 pages of Official Copy).
Office Action received for Chinese Patent Application No. 201780002648.4, dated Nov. 26, 2019, 10 pages (4 pages of English Translation and 6 pages of Official Copy).
Office Action received for Chinese Patent Application No. 201810338038.8, dated Jan. 21, 2020, 26 pages (13 pages of English Translation and 13 pages of Official Copy).
Office Action received for Chinese Patent Application No. 201810338038.8, dated May 14, 2019, 26 pages (13 pages of English Translation and 13 pages of Official Copy).
Office Action received for Chinese Patent Application No. 201810338826.7, dated Apr. 3, 2019, 21 pages (13 pages of English Translation and 8 pages of Official Copy).
Office Action received for Chinese Patent Application No. 201810338826.7, dated Jan. 16, 2020, 16 Pages (10 pages of English Translation and 6 pages of Official Copy).
Office Action received for Chinese Patent Application No. 201810338826.7, dated Oct. 21, 2019, 19 pages (12 pages of English Translation and 7 pages of Official Copy).
Office Action received for Chinese Patent Application No. 201811460172.1, dated Jan. 21, 2020, 17 pages (8 pages of English Translation and 9 pages of Official Copy).
Office Action received for Chinese Patent Application No. 201910070375.8, dated Dec. 4, 2019, 23 pages (12 pages of English Translation and 11 pages of Official Copy).

(56) References Cited

OTHER PUBLICATIONS

Office Action received for Chinese Patent Application No. 201910109868.8, dated Sep. 19, 2019, 23 pages (11 pages of English Translation and 12 pages of Official Copy).
Office Action received for Chinese Patent Application No. 201910246439.5, dated Oct. 15, 2019, 17 pages (9 pages of English Translation and 8 pages of Official Copy).
Office Action Received for Danish Patent Application No. PA201670622, dated Aug. 17, 2018, 4 pages.
Office Action Received for Danish Patent Application No. PA201670622, dated May 30, 2017, 4 pages.
Office Action received for Danish Patent Application No. PA201670622, dated Nov. 1, 2017, 5 pages.
Office Action Received for Danish Patent Application No. PA201670622, dated Oct. 31, 2016, 11 pages.
Office Action received for Danish Patent Application No. PA201670628, dated Jun. 6, 2017, 3 pages.
Office Action received for Danish Patent Application No. PA201670628, dated Oct. 26, 2016, 7 pages.
Office Action received for Danish Patent Application No. PA201770502, dated Dec. 14, 2018, 7 pages.
Office Action received for Danish Patent Application No. PA201770502, dated Jan. 20, 2020, 2 pages.
Office Action received for Danish Patent Application No. PA201770502, dated Sep. 9, 2019, 2 pages.
Office Action received for Danish Patent Application No. PA201770503, dated Dec. 19, 2018, 6 pages.
Office Action received for Danish Patent Application No. PA201770503, dated Nov. 24, 2017, 10 pages.
Office Action received for Danish Patent Application No. PA201770503, dated Sep. 20, 2019, 5 pages.
Office Action received for Danish Patent Application No. PA201770505, dated Jan. 17, 2020, 7 pages.
Office Action received for Danish Patent Application No. PA201770505, dated Jul. 27, 2018, 4 pages.
Office Action received for Danish Patent Application No. PA201770505, dated May 20, 2019, 7 pages.
Office Action received for Danish Patent Application No. PA201770505, dated Sep. 19, 2017, 10 pages.
Office Action received for Danish Patent Application No. PA201770712, dated Jul. 20, 2018, 4 pages.
Office Action received for Danish Patent Application No. PA201770712, dated Mar. 1, 2019, 3 pages.
Office Action received for Danish Patent Application No. PA201770713, dated Apr. 18, 2018, 4 pages.
Office Action received for Danish Patent Application No. PA201770713, dated Jun. 7, 2019, 4 pages.
Office Action received for Danish Patent Application No. PA201770713, dated Nov. 13, 2018, 3 pages.
Office Action received for Danish Patent Application No. PA201770714, dated Aug. 17, 2018, 6 pages.
Office Action received for Danish Patent Application No. PA201770714, dated Feb. 21, 2018, 3 pages.
Office Action received for Danish Patent Application No. PA201770714, dated Oct. 13, 2017, 9 pages.
Office Action received for Danish Patent Application No. PA201770715, dated Mar. 8, 2018, 4 pages.
Office Action received for Danish Patent Application No. PA201770715, dated Oct. 29, 2018, 4 pages.
Office Action received for Danish Patent Application No. PA201770782, dated Jan. 26, 2018, 8 pages.
Office Action received for Danish Patent Application No. PA201770782, dated Nov. 22, 2018, 3 pages.
Office Action received for Danish Patent Application No. PA201770804, dated Feb. 1, 2018, 9 pages.
Office Action received for Danish Patent Application No. PA201770804, dated May 31, 2018, 6 pages.
Office Action received for Danish Patent Application No. PA201770804, dated Nov. 6, 2018., 4 pages.
Office Action received for Danish Patent Application No. PA201870370, dated Nov. 9, 2018, 4 pages.
Office Action received for Danish Patent Application No. PA201870371, dated Nov. 20, 2018, 3 pages.
Office Action received for Danish Patent Application No. PA201870855, dated Nov. 7, 2019, 4 pages.
Office Action received for Danish Patent Application No. PA201970127, dated Dec. 20, 2019, 3 pages.
Office Action received for Danish Patent Application No. PA201970127, dated Feb. 24, 2020, 2 pages.
Office Action received for European Patent Application No. 09818165.4, dated Aug. 3, 2016, 7 pages.
Office Action received for European Patent Application No. 12770400.5, dated Mar. 10, 2015, 5 pages.
Office Action received for European Patent Application No. 12773460.6, dated Feb. 19, 2018, 6 pages.
Office Action received for European Patent Application No. 17865509.8, dated Oct. 10, 2019, 6 pages.
Office Action received for European Patent Application No. 18208881.5, dated Jun. 11, 2019, 5 pages.
Office Action received for European Patent Application No. 18713408.5, dated May 20, 2019, 5 pages.
Office Action received for European Patent Application No. 18713408.5, dated Nov. 20, 2019, 4 pages.
Office Action received for European Patent Application No. 18830326.7, dated Aug. 27, 2019, 6 pages.
Office Action received for European Patent Application No. 18830326.7, dated Nov. 22, 2019, 8 pages.
Office Action received for European Patent Application No. 18830326.7, dated Sep. 16, 2019, 6 pages.
Office Action received for German Patent Application No. 202017005507.4, dated Feb. 5, 2018, 2 pages (1 page of English Translation and 1 page of Official Copy).
Office Action received for Indian Patent Application No. 201617039493, dated Oct. 21, 2019, 6 pages.
Office Action received for Japanese Patent Application No. 2017-075031, dated Jul. 30, 2018, 16 pages (8 pages of English Translation and 8 pages of Official Copy).
Office Action received for Japanese Patent Application No. 2017-562050, dated Sep. 30, 2019, 5 pages (2 pages of English Translation and 3 pages of Official Copy).
Office Action received for Japanese Patent Application No. 2018-158482, dated Jan. 10, 2020, 9 pages (5 pages of English Translation and 4 pages of Official Copy).
Office Action received for Japanese Patent Application No. 2018-551159, dated Jan. 27, 2020, 8 pages (4 pages of English Translation and 4 pages of Official Copy).
Office Action received for Japanese Patent Application No. 2018-551159, dated Sep. 30, 2019, 6 pages (3 pages of English Translation and 3 pages of Official Copy).
Office Action received for Japanese Patent Application No. 2018-560107, dated Jun. 14, 2019, 26 pages (13 pages of English Translation and 13 pages of Official Copy).
Office Action received for Japanese Patent Application No. 2019-053379, dated Oct. 18, 2019, 11 pages (6 pages of English Translation and 5 pages of Official Copy).
Office Action received for Japanese Patent Application No. 2019-096220, dated Sep. 9, 2019, 8 pages (4 pages of English Translation and 4 pages of Official Copy).
Office Action received for Japanese Patent Application No. 2019-107235, dated Oct. 18, 2019, 8 pages (4 pages of English Translation and 4 pages of Official Copy).
Office Action received for Japanese Patent Application No. 2019-510416, dated Oct. 18, 2019, 4 pages (2 pages of English translation and 2 pages of Official copy).
Office Action received for Korean Patent Application No. 10-2014-7008348, dated Jan. 22, 2019, 16 pages (1 page of English Translation and 15 pages of Official Copy).
Office Action received for Korean Patent Application No. 10-2016-7035555, dated Dec. 26, 2017, 5 pages (2 pages of English Translation and 3 pages of Official Copy).

(56) References Cited

OTHER PUBLICATIONS

Office Action received for Korean Patent Application No. 10-2016-7035555, dated Jul. 18, 2019, 9 pages (4 pages of English Translation and 5 pages of Official Copy).
Office Action received for Korean Patent Application No. 10-2016-7035555, dated Sep. 18, 2018, 9 pages (4 pages of English Translation and 5 pages of Official Copy).
Office Action received for Korean Patent Application No. 10-2017-7012145, dated Jul. 18, 2019, 5 pages (2 Pages of English Translation and 3 Pages of Official Copy).
Office Action received for Korean Patent Application No. 10-2017-7012145, dated Sep. 13, 2018, 6 pages (3 pages of English Translation and 3 pages of Official Copy).
Office Action received for Korean Patent Application No. 10-2018-7019643, dated Jan. 6, 2020, 7 pages (3 pages of English Translation and 4 pages of Official Copy).
Office Action received for Korean Patent Application No. 10-2018-7033301, dated Dec. 14, 2018, 6 pages (2 pages of English Translation and 4 pages of Official Copy).
Office Action received for Korean Patent Application No. 10-2019-7003374, dated Jun. 10, 2019, 7 pages (2 pages of English Translation and 5 pages of official copy).
Office Action received for Korean Patent Application No. 10-2019-7003836, dated Jun. 14, 2019, 7 pages (2 pages of English Translation and 5 pages of Official Copy).
Office Action received for Korean Patent Application No. 10-2019-7004734, dated Jul. 4, 2019, 7 pages (2 pages of English Translation and 5 pages of Official Copy).
Office Action received for Korean Patent Application No. 10-2019-7005925, dated Jul. 4, 2019, 24 pages (11 pages of English Translation and 13 pages of Official Copy).
Office Action received for Korean Patent Application No. 10-2019-7014494, dated Jun. 14, 2019, 11 pages (5 pages of English Translation and 6 pages of Official Copy).
Okazolab, "Kinect Based 3D Head Tracking in Behavioural Research", Available online at: <https://www.youtube.com/watch?v=nigRvT9beQw>, Aug. 8, 2012, 3 pages.
OnefaceIn, "[How It Works] Securing Your Smartphone with OneFaceIn", Biometric Password Manager, Available at <https://www.youtube.com/watch?v=h-JG5SPxBQ0>, Dec. 2, 2016, 1 page.
Page, Sebastien, "Leaked iOS 11 GM details how you will set up Face ID on your iPhone 8", Online available at: https://www.idownloadblog.com/2017/09/08/leaked-ios-11-gm-details-how-you-will-set-up-face-id-on-your-iphone-8/, Sep. 8, 2017, 9 pages.
Pfaffenberger, Bryan, "Webster's New World Computer Dictionary", 10th Edition, Wiley Publishing, Inc., 2003, 3 pages.
Phonebuff, "How to Use Face Unlock on Android 4.0 ICS", Retrieved from <https://www.youtube.com/watch?v=0ASf6jkpFKE>, Dec. 15, 2011, 1 page.
PSP Security Ltd, "AccuFACE features", Available online at <https://www.youtube.com/watch?v=p3jvGoEbioY>, Oct. 14, 2009, 1 page.
PSP Security Ltd, "PSP Security—AccuFACE Step by Step Enrollment Process", Available online at <https://www.youtube.com/watch?v=0llF5OOdya0>, Oct. 14, 2009, 1 page.
Quicken 2003 for MAC User Guide, 2002, 47 pages.
Result of Consultation received for European Patent Application No. 16803996.4, dated Feb. 17, 2020, 14 pages.
Schofield, Tim, "Face Unlock Demonstration on the HTC EVO 4G LTE", Retrieved from <https://www.youtube.com/watch?v=TNL9Or_9SWg>, May 31, 2012, 1 page.
Search Report and Opinion received for Danish Patent Application No. PA201770502, dated Nov. 10, 2017, 10 pages.
Search Report and Opinion received for Danish Patent Application No. PA201770712, dated Oct. 25, 2017, 10 pages.
Search Report and Opinion received for Danish Patent Application No. PA201770713, dated Oct. 31, 2017, 9 pages.
Search Report and Opinion received for Danish Patent Application No. PA201770715, dated Nov. 9, 2017, 10 pages.
Search Report and Opinion received for Danish Patent Application No. PA201870370, dated Sep. 7, 2018, 11 pages.
Search Report and Opinion received for Danish Patent Application No. PA201870371, dated Sep. 14, 2018, 14 pages.
Search Report and Opinion received for Danish Patent Application No. PA201870855, dated Apr. 3, 2019, 12 pages.
Search Report and Opinion received for Danish Patent Application No. PA201970127, dated Oct. 4, 2019, 9 pages.
Search Report received for Germany Patent Application No. 202017005507.4, dated Jan. 2, 2019, 6 pages (1 page of English Translation and 5 pages of Official Copy).
Sensory TrulySecure, "AppLock Face/Voice Recognition", Available at <https://www.youtube.com/watch?v=odax5O51aT0>, May 27, 2015, 1 page.
Smart Card Alliance, "Security of Proximity Mobile Payments", Online Available at: https://www.securetechalliance.org/resources/pdf/Security_of_Proximity_Mobile_Payments.pdf, May 2009, pp. 1-39.
Summons to Attend Oral Proceedings received for European Patent Application No. 12770400.5, mailed on Mar. 19, 2018, 10 pages.
Summons to Attend Oral Proceedings received for European Patent Application No. 15727291.5, mailed on Jan. 28, 2020, 13 pages.
Summons to Attend Oral Proceedings received for European Patent Application No. 15728352.4, mailed on Nov. 18, 2019, 15 pages.
Summons to Attend Oral Proceedings received for European Patent Application No. 16201205.8, mailed on Jan. 28, 2020, 18 pages.
Tewari, et al., "Multiparty Micropayments for Ad Hoc Networks", IEEE, 2003, pp. 2033-2040.
Thanakulmas, Thanit, "MasterCard Identity Check Facial Recognition Biometrics", Available at<https://www.youtube.com/watch?v=g4sMbrkt1gl>, Oct. 10, 2016, 1 page.
Wikipedia, "QR code", Available online at: https://en.wikipedia.org/w/index.php?title=OR code&oldid=452939488, Sep. 28, 2011, pp. 1-9.
Applicant-Initiated Interview Summary received for U.S. Appl. No. 16/736,704, dated Dec. 11, 2020, 4 pages.
Bank of Queensland, "Logging on to BOQ Internet Banking", Available Online at: https://www.youtube.com/watch?v=afK0EiQq-4Q, May 29, 2013, 3 pages.
Bank of Queensland, "Online Banking Video Tutorials", Available Online at: https://www.boq.com.au/help-and-support/online-banking/ob-video-tutorials, 2020, 1 page.
Bank of Queensland, "Paying a Bill via BPAY with BOQ Internet Banking", Available Online at: https://www.youtube.com/watch?v=f8-5Z00o2to, May 29, 2013, 3 pages.
Bank of Queensland, "Transferring Funds to a 3rd Party (Pay Anyone) with BOQ Internet Banking", Available Online at: https://www.youtube.com/watch?v=-_7FeV8mm-o, May 29, 2013, 3 pages.
Final Office Action received for U.S. Appl. No. 16/125,267, dated Dec. 10, 2020, 20 pages.
Non-Final Office Action received for U.S. Appl. No. 16/670,949, dated Dec. 9, 2020, 11 pages.
Notice of Allowance received for Korean Patent Application No. 10-2020-7002929, dated Nov. 26, 2020, 3 pages (1 page of English Translation and 2 pages of Official Copy).
Notice of Allowance received for U.S. Appl. No. 15/823,269, dated Dec. 10, 2020, 10 pages.
Office Action received for Australian Patent Application No. 2019250143, dated Dec. 3, 2020, 5 pages.
Office Action received for Australian Patent Application No. 2020102130, dated Dec. 7, 2020, 7 pages.
Office Action received for Chinese Patent Application No. 201911199010.1, dated Nov. 4, 2020, 20 pages (10 pages of English Translation and 10 pages of Official Copy).
Office Action received for Japanese Patent Application No. 2020-028315, dated Nov. 9, 2020, 11 pages (6 pages of English Translation and 5 pages of Official Copy).
Techboomers, "Howto Use Skype Course", Available Online at: https://techboomers.com/p/skype, Apr. 25, 2017, 17 pages.
Office Action received for Korean Patent Application No. 10-2019-7006639, dated Dec. 21, 2020, 20 pages (10 pages of English Translation and 10 pages of Official Copy).
Applicant Initiated Interview Summary received for U.S. Appl. No. 15/884,195, dated Dec. 17, 2020, 3 pages.

(56) References Cited

OTHER PUBLICATIONS

Applicant-Initiated Interview Summary received for U.S. Appl. No. 16/786,694, dated Dec. 17, 2020, 6 pages.
International Preliminary Report on Patentability received for PCT Patent Application No. PCT/US2019/035092, dated Dec. 17, 2020, 10 pages.
Office Action received for Chinese Patent Application No. 202010174749.3, dated Nov. 6, 2020, 9 pages (3 pages of English Translation and 6 pages of Official Copy).
Office Action received for European Patent Application No. 18730556.0, dated Dec. 16, 2020, 7 pages.
Extended European Search Report received for European Patent Application No. 20198076.0, dated Jan. 13, 2021, 8 pages.
International Search Report and Written Opinion received for PCT Patent Application No. PCT/US2020/048799, dated Jan. 19, 2021, 19 pages.
Non-Final Office Action received for U.S. Appl. No. 16/413,402, dated Jan. 21, 2021, 14 pages.
Notice of Allowance received for Chinese Patent Application No. 201811460172.1, dated Jan. 11, 2021, 2 pages (1 page of English Translation and 1 page of Official Copy).
Notice of Allowance received for U.S. Appl. No. 16/990,974, dated Jan. 22, 2021, 7 pages.
Office Action received for European Patent Application No. 17835789.3, dated Jan. 20, 2021, 14 pages.
Office Action received for Japanese Patent Application No. 2019-572834, dated Dec. 4, 2020, 7 pages (3 pages of English Translation and 4 pages of Official Copy).
Applicant Initiated Interview Summary received for U.S. Appl. No. 16/581,614, dated May 18, 2021, 2 pages.
Final Office Action received for U.S. Appl. No. 16/413,402, dated May 18, 2021, 17 pages.
Non-Final Office Action received for U.S. Appl. No. 15/884,195, dated May 18, 2021, 26 pages.
Notice of Allowance received for Korean Patent Application No. 10-2020-0097418, dated Apr. 27, 2021, 5 pages (2 pages of English Translation and 3 pages of Official Copy).
Office Action received for European Patent Application No. 19194828.0, dated May 10, 2021, 6 pages.
Non-Final Office Action received for U.S. Appl. No. 16/369,355, dated Apr. 29, 2021, 16 pages.
Non-Final Office Action received for U.S. Appl. No. 16/987,003, dated May 10, 2021, 20 pages.
Notice of Allowance received for U.S. Appl. No. 16/990,974, dated Apr. 28, 2021, 5 pages.
Office Action received for Australian Patent Application No. 2020203899, dated May 5, 2021, 10 pages.
Office Action received for Chinese Patent Application No. 201911199010.1, dated Mar. 29, 2021, 14 pages (8 pages of English Translation and 6 pages of Official Copy).
Office Action received for European Patent Application No. 18208881.5, dated May 7, 2021, 6 pages.
Office Action received for Korean Patent Application No. 10-2021-7011434, dated Apr. 28, 2021, 6 pages (2 pages of English Translation and 4 pages of Official Copy).
Summons to Attend Oral Proceedings received for European Patent Application No. 18713408.5, mailed on Apr. 30, 2021, 5 pages.
Supplemental Notice of Allowance received for U.S. Appl. No. 16/786,694, dated Apr. 28, 2021, 2 pages.
Applicant-Initiated Interview Summary received for U.S. Appl. No. 16/369,355, dated Jul. 28, 2021, 2 pages.
Notice of Allowance received for Korean Patent Application No. 10-2021-7020549, dated Jul. 13, 2021, 3 pages (1 page of English Translation and 2 pages of Official Copy).
Office Action received for European Patent Application No. 20186286.9, dated Jul. 29, 2021, 8 pages.
Board Decision received for Chinese Patent Application No. 201510284896.5, dated Nov. 19, 2021, 14 pages (1 page of English Translation and 13 pages of Official Copy).
Board Decision received for Chinese Patent Application No. 201810094316.X, dated Dec. 3, 2021, 18 pages (1 page of English Translation and 17 pages of Official Copy).
Decision to Refuse received for European Patent Application No. 17865509.8, dated Jan. 4, 2022, 13 pages.
Minutes of the Oral Proceedings received for European Patent Application No. 17865509.8, mailed on Jan. 4, 2022, 8 pages.
Non-Final Office Action received for U.S. Appl. No. 17/027,274, dated Jan. 4, 2022, 23 pages.
Notice of Acceptance received for Australian Patent Application No. 2020289822, dated Dec. 22, 2021, 3 pages.
Notice of Allowance received for Korean Patent Application No. 10-2021-7035417, dated Jan. 3, 2022, 5 pages (1 page of English Translation and 4 pages of Official Copy).
Notice of Allowance received for U.S. Appl. No. 16/814,226, dated Dec. 30, 2021, 24 pages.
Office Action received for Australian Patent Application No. 2019271927, dated Dec. 17, 2021, 4 pages.
Office Action received for Indian Patent Application No. 201917024374, dated Dec. 30, 2021, 10 pages.
Office Action received for Korean Patent Application No. 10-2020-7034405, dated Dec. 4, 2021, 15 pages (7 pages of English Translation and 8 pages of Official Copy).
Summons to Attend Oral Proceedings received for European Patent Application No. 17813737.8, mailed on Jan. 4, 2022, 12 pages.
International Search Report and Written Opinion received for PCT Patent Application No. PCT/US2021/037949, dated Nov. 12, 2021, 19 pages.
Invitation to Pay Additional Fees and Partial International Search Report received for PCT Patent Application No. PCT/US2021/037949, dated Sep. 22, 2021, 13 pages.
Invitation to Pay Search Fees received for European Patent Application No. 19731554.2, mailed on Dec. 16, 2021, 3 pages.
Non-Final Office Action received for U.S. Appl. No. 15/274,910, dated Dec. 24, 2021, 35 pages.
Notice of Allowance received for Korean Patent Application No. 10-2021-7030343, dated Dec. 9, 2021, 6 pages (2 pages of English Translation and 4 pages of Official Copy).
Notice of Allowance received for U.S. Appl. No. 17/015,429, dated Dec. 24, 2021, 2 pages.
Office Action received for Australian Patent Application No. 2019281965, dated Nov. 30, 2021, 3 pages.
Office Action received for Australian Patent Application No. 2020203899, dated Nov. 26, 2021, 4 pages.
Office Action received for Australian Patent Application No. 2020273355, dated Nov. 23, 2021, 6 pages.
Office Action received for Australian Patent Application No. 2021103164, dated Dec. 2, 2021, 3 pages.
Office Action received for Indian Patent Application No. 202018041558, dated Dec. 3, 2021, 7 pages.
Summons to Attend Oral Proceedings received for European Patent Application No. 17799904.2, mailed on Dec. 20, 2021, 8 pages.
Supplemental Notice of Allowance received for U.S. Appl. No. 15/884,195, dated Dec. 16, 2021, 3 pages.
Decision to Grant received for European Patent Application No. 18830326.7, dated Nov. 11, 2021, 3 pages.
Examiner-Initiated Interview Summary received for U.S. Appl. No. 16/814,226, dated Nov. 15, 2021, 2 pages.
Non-Final Office Action received for U.S. Appl. No. 16/125,267, dated Nov. 23, 2021, 21 pages.
Notice of allowance received for Japanese Patent Application No. 2020-159979, dated Nov. 8, 2021, 4 pages (1 page of English Translation and 3 pages of Official Copy).
Notice of Allowance received for Korean Patent Application No. 10-2021-0099243, dated Oct. 30, 2021, 4 pages (1 page of English Translation and 3 pages of Official Copy).
Notice of Allowance received for U.S. Appl. No. 15/884,195, dated Nov. 17, 2021, 19 pages.
Notice of Allowance received for U.S. Appl. No. 17/015,429, dated Nov. 24, 2021, 2 pages.
Office Action received for Chinese Patent Application No. 201810338040.5, dated Oct. 25, 2021, 22 pages (13 pages of English Translation and 9 pages of Official Copy).

(56) References Cited

OTHER PUBLICATIONS

Office Action received for Indian Patent Application No. 201918003782, dated Nov. 18, 2021, 8 pages.
Office Action received for Indian Patent Application No. 202018014786, dated Nov. 9, 2021, 7 pages.
Applicant Initiated Interview Summary received for U.S. Appl. No. 15/884,195, dated Aug. 17, 2021, 4 pages.
Notice of Allowance received for Korean Patent Application No. 10-2021-7011434, dated Jul. 29, 2021, 5 pages (2 pages of English Translation and 3 pages of Official Copy).
Notice of Allowance received for U.S. Appl. No. 16/549,862, dated Aug. 13, 2021, 7 pages.
Notice of Allowance received for U.S. Appl. No. 16/987,003, dated Aug. 18, 2021, 9 pages.
Office Action received for Korean Patent Application No. 10-2020-7022596, dated Jul. 28, 2021, 26 pages (13 pages of English Translation and 13 pages of Official Copy).
Applicant-Initiated Interview Summary received for U.S. Appl. No. 16/125,267, dated Jan. 25, 2022, 5 pages.
Corrected Notice of Allowance received for U.S. Appl. No. 16/814,226, dated Jan. 18, 2022, 21 pages.
Notice of Acceptance received for Australian Patent Application No. 2020273355, dated Jan. 17, 2022, 3 pages.
Office Action received for Chinese Patent Application No. 201710094150.7, dated Jan. 10, 2022, 6 pages (3 pages of English Translation and 3 pages of Official Copy).
Applicant-Initiated Interview Summary received for U.S. Appl. No. 16/125,267, dated Oct. 25, 2021, 4 pages.
Applicant-Initiated Interview Summary received for U.S. Appl. No. 16/667,174, dated Oct. 25, 2021, 2 pages.
Board Opinion received for Chinese Patent Application No. 201810094316.X, dated Sep. 30, 2021, 11 pages (3 pages of English Translation and 8 pages of Official Copy).
Final Office Action received for U.S. Appl. No. 16/814,226, dated Oct. 28, 2021, 19 pages.
Notice of Acceptance received for Australian Patent Application No. 2020202953, dated Oct. 1, 2021, 3 pages.
Notice of Acceptance received for Australian Patent Application No. 2020204256, dated Oct. 9, 2021, 3 pages.
Notice of Allowance received for U.S. Appl. No. 16/549,862, dated Oct. 20, 2021, 7 pages.
Notice of Allowance received for U.S. Appl. No. 17/015,429, dated Oct. 22, 2021, 2 pages.
Office Action received for Chinese Patent Application No. 202011206499.3, dated Sep. 28, 2021, 7 pages (4 pages of English Translation and 3 pages of Official Copy).
Office Action received for European Patent Application No. 19186538.5, dated Oct. 22, 2021, 7 pages.
Supplemental Notice of Allowance received for U.S. Appl. No. 16/786,694, dated Oct. 18, 2021, 2 pages.
Corrected Notice of Allowance received for U.S. Appl. No. 16/549,862, dated Dec. 2, 2021, 2 pages.
Notice of Allowance received for U.S. Appl. No. 17/015,429, dated Dec. 13, 2021, 2 pages.
Corrected Notice of Allowance received for U.S. Appl. No. 16/670,949, dated Sep. 8, 2021, 2 pages.
Notice of Allowance received for U.S. Appl. No. 16/670,949, dated Sep. 14, 2021, 7 pages.
Notice of Allowance received for U.S. Appl. No. 16/786,694, dated Sep. 14, 2021, 10 pages.
Result of Consultation received for European Patent Application No. 18713408.5, dated Aug. 30, 2021, 5 pages.
Applicant-Initiated Interview Summary received for U.S. Appl. No. 17/037,085, dated Sep. 27, 2021, 4 pages.
Decision to Refuse received for European Patent Application No. 16201159.7, dated Sep. 27, 2021, 22 pages.
Intention to Grant received for European Patent Application No. 18830326.7, dated Sep. 15, 2021, 11 pages.
Minutes of the Oral Proceedings received for European Patent Application No. 16201159.7, mailed on Sep. 23, 2021, 6 pages.
Notice of Allowance received for U.S. Appl. No. 17/015,429, dated Sep. 22, 2021, 6 pages.
Office Action received for Australian Patent Application No. 2019271927, dated Sep. 8, 2021, 4 pages.
Office Action received for Australian Patent Application No. 2021103164, dated Sep. 16, 2021, 5 pages.
Office Action received for Chinese Patent Application No. 201780033622.6, dated Sep. 3, 2021, 11 pages (5 pages of English Translation and 6 pages of Official Copy).
Office Action received for European Patent Application No. 20198076.0, dated Sep. 22, 2021, 6 pages.
Supplemental Notice of Allowance received for U.S. Appl. No. 16/786,694, dated Sep. 20, 2021, 3 pages.
Adractas et al., "The road to mobile payments services", McKinsey on Payments, Online available at: https://www.mckinsey.com.br/~/media/mckinsey/dotcom/client_service/financial%20services/latest%20thinking/reports/the_road_to_mobile_payments_services.pdf, Sep. 2011, pp. 45-52.
Applicant-Initiated Interview Summary received for U.S. Appl. No. 16/814,226, dated Aug. 30, 2021, 3 pages.
Corrected Notice of Allowance received for U.S. Appl. No. 16/987,003, dated Sep. 1, 2021, 3 pages.
Final Office Action received for U.S. Appl. No. 16/125,267, dated Aug. 26, 2021, 22 pages.
Final Office Action received for U.S. Appl. No. 16/581,614, dated Aug. 27, 2021, 18 pages.
Notice of Allowance received for Japanese Patent Application No. 2020-126751, dated Aug. 16, 2021, 4 pages (1 page of English Translation and 3 pages of Official Copy).
Notice of Allowance received for U.S. Appl. No. 16/369,355, dated Sep. 1, 2021, 10 pages.
Notice of Allowance received for U.S. Appl. No. 16/549,862, dated Aug. 26, 2021, 2 pages.
Office Action received for Australian Patent Application No. 2020289822, dated Aug. 24, 2021, 7 pages.
Office Action received for Danish Patent Application No. PA201770505, dated Aug. 18, 2021, 2 pages.
Office Action received for Korean Patent Application No. 10-2020-7034180, dated Aug. 17, 2021, 15 pages (6 pages of English Translation and 9 pages of Official Copy).
Supplemental Notice of Allowance received for U.S. Appl. No. 14/869,831, dated Aug. 20, 2021, 2 pages.
"13 questions and answers about using Apple Pay online", Online available at: http://www.it528.com/apple/1356.html, Feb. 18, 2016, 5 pages (Official Copy Only). {See Communication under Rule 37 CFR § 1.98(a) (3)}.
Brief Communication Regarding Oral Proceedings received for European Patent Application No. 18713408.5, dated Sep. 28, 2021, 2 pages.
International Preliminary Report on Patentability received for PCT Patent Application No. PCT/US2020/020414, dated Oct. 7, 2021, 18 pages.
Notice of Allowance received for U.S. Appl. No. 17/015,429, dated Oct. 8, 2021, 5 pages.
Office Action received for Chinese Patent Application No. 201711292804.3, dated Sep. 10, 2021, 19 pages (8 pages of English Translation and 11 pages of Official Copy).
Office Action received for Chinese Patent Application No. 201780033899.9, dated Sep. 3, 2021, 12 pages (6 pages of English Translation and 6 pages of Official Copy).
Office Action received for Chinese Patent Application No. 201911199010.1, dated Sep. 3, 2021, 12 pages (7 pages of English Translation and 5 pages of Official Copy).
Office Action received for European Patent Application No. 19160344.8, dated Oct. 7, 2021, 8 pages.
Office Action received for Korean Patent Application No. 10-2019-7006639, dated Sep. 16, 2021, 20 pages (10 pages of English Translation and 10 pages of Official Copy).
Summons to Attend Oral Proceedings received for European Patent Application No. 20180033.1, mailed on Oct. 4, 2021, 9 pages.
Notice of Allowance received for Chinese Patent Application No. 201910744886.3, dated Jun. 3, 2021, 2 pages (1 page of English Translation and 1 page of Official Copy).

(56) References Cited

OTHER PUBLICATIONS

Notice of Allowance received for U.S. Appl. No. 17/015,429, dated Jun. 17, 2021, 10 pages.
Office Action received for Japanese Patent Application No. 2020-159979, dated May 10, 2021, 9 pages (5 pages of English Translation and 4 pages of Official Copy).
Advisory Action received for U.S. Appl. No. 16/581,614, dated Nov. 4, 2021, 4 pages.
Brief Communication Regarding Oral Proceedings received for European Patent Application No. 17865509.8, dated Nov. 1, 2021, 2 pages.
Intention to Grant received for European Patent Application No. 18713408.5, dated Oct. 28, 2021, 10 pages.
Notice of Allowance received for Chinese Patent Application No. 202010174749.3, dated Oct. 28, 2021, 4 pages (3 pages of English Translation and 1 page of Official Copy).
Notice of Allowance received for Japanese Patent Application No. 2019-572834, dated Nov. 1, 2021, 5 pages (1 page of English Translation and 4 pages of Official Copy).
Notice of Allowance received for Japanese Patent Application No. 2020-103213, dated Oct. 25, 2021, 4 pages (1 page of English Translation and 3 pages of Official Copy).
Notice of Allowance received for U.S. Appl. No. 17/037,085, dated Nov. 10, 2021, 10 pages.
Office Action received for Chinese Patent Application No. 201810339290.0, dated Oct. 18, 2021, 20 pages (11 pages of English Translation and 9 pages of Official Copy).
Office Action received for Indian Patent Application No. 201817036875, dated Oct. 29, 2021, 8 pages.
Result of Consultation received for European Patent Application No. 17865509.8, dated Nov. 2, 2021, 3 pages.
Pu Fang, "Research on Location-aware Service in Pervasive Computing", Issue No. 7, Information Technology Series, China Doctoral Dissertations, Jul. 15, 2008, 140 pages See Communication under 37 CFR § 1.98(a) (3).
Notice of Allowance received for Chinese Patent Application No. 201780033622.6, dated Feb. 16, 2022, 2 pages (1 page of English Translation and 1 page of Official Copy).

* cited by examiner

1000

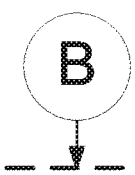

1022
When the payment was authorized by the sender electronic device associated with the first user, the sender electronic device is logged into the service using a first user account different from the second user account, the first user account associated with the first user.

1024
Subsequent to detecting the request to claim the item, transmitting information about the selected one or more attributes to the sender electronic device.

*FIG. 10C*

USER INTERFACE FOR TRANSACTIONS

CROSS-REFERENCE TO RELATED APPLICATIONS

This application is a continuation of U.S. non-provisional patent application Ser. No. 15/351,230, entitled "USER INTERFACE FOR TRANSACTIONS", filed on Nov. 14, 2016 which claims priority to provisional patent application 62/348,893, entitled "USER INTERFACE FOR TRANSACTIONS", filed on Jun. 11, 2016, the content of which are hereby incorporated by reference in their entireties.

FIELD

The present disclosure relates generally to computer user interfaces, and more specifically to techniques for managing transactions.

BACKGROUND

The use of electronic devices for participating in transactions has increased significantly in recent years. Exemplary techniques for participating in transactions including making an online purchase of a good or service on a website using a shopping cart. Participating in transactions using such traditional techniques often requires the user to select for purchase, from among various goods or services, one particular good or service with an identified cost and fixed characteristics.

BRIEF SUMMARY

Some techniques for managing contextual transactions using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

In contrast, providing user interfaces in electronic devices for transactions that appropriately consider the input of multiple participants can provide a more streamlined process for purchasing and claiming items that conform to the preferences of the multiple participants. Similarly, structuring user interfaces for transactions to enable different participants to control or influence different phases of the transaction process can lead to more efficient techniques for purchasing and claiming items using electronic devices. Further, providing mechanisms, based on contextual information, in user interfaces for initiating or participating in such transactions also reduces the complexity of user interactions with the electronic devices, often eliminating extraneous user input, requiring less user time, and conserving device energy.

Accordingly, the present technique provides electronic devices with faster, more efficient methods and interfaces for managing contextual transactions. Such methods and interfaces optionally complement or replace other methods for managing transactions. Such methods and interfaces reduce the cognitive burden on a user and produce a more efficient human-machine interface. For battery-operated computing devices, such methods and interfaces conserve power and increase the time between battery charges.

In accordance with some embodiments, a method is performed at a sender electronic device with a display and one or more input devices. The sender electronic device is associated with a first user. The method comprises: displaying, on the display, graphical representations of one or more items; receiving, via the one or more input devices of the sender electronic device, input corresponding to selection of an item from among the one or more of items; displaying, on the display, a request for authorization of payment for at least a portion of the item for a second user different from the first user; receiving, via the one or more input devices, an input that is responsive to the request for authorization to purchase the item; in response to receiving the input that is responsive to the request for authorization to purchase the item, in accordance with a determination that the input that is responsive to the request for authorization is consistent with input that is enabled to authorize purchase of the item, proceeding with authorizing payment for at least a portion of the item; and wherein one or more attributes of one or more configurable attributes of the item are configured to be selected by the second user prior to the second user submitting a request to claim the item.

In accordance with some embodiments, a non-transitory computer-readable storage medium is described. The non-transitory computer-readable storage medium stores one or more programs configured to be executed by one or more processors of a sender electronic device with a display and one or more input devices, wherein the sender electronic device is associated with a first user, the one or more programs including instructions for: displaying, on the display, graphical representations of one or more items; receiving, via the one or more input devices of the sender electronic device, input corresponding to selection of an item from among the one or more of items; displaying, on the display, a request for authorization of payment for at least a portion of the item for a second user different from the first user; receiving, via the one or more input devices, an input that is responsive to the request for authorization to purchase the item; in response to receiving the input that is responsive to the request for authorization to purchase the item, in accordance with a determination that the input that is responsive to the request for authorization is consistent with input that is enabled to authorize purchase of the item, proceeding with authorizing payment for at least a portion of the item; and wherein one or more attributes of one or more configurable attributes of the item are configured to be selected by the second user prior to the second user submitting a request to claim the item.

In accordance with some embodiments, a sender electronic device is described. The sender electronic device comprises: a display; one or more input devices; one or more processors; and a memory storing one or more programs configured to be executed by the one or more processors, wherein the sender electronic device is associated with a first user, the one or more programs including instructions for: displaying, on the display, graphical representations of one or more items; receiving, via the one or more input devices of the sender electronic device, input corresponding to selection of an item from among the one or more of items; displaying, on the display, a request for authorization of payment for at least a portion of the item for a second user different from the first user; receiving, via the one or more input devices, an input that is responsive to the request for authorization to purchase the item; in response to receiving the input that is responsive to the request for authorization to purchase the item, in accordance with a determination that the input that is responsive to the request for authorization is consistent with input that is enabled to authorize purchase of the item, proceeding with authorizing payment for at least a portion of the item; and wherein one or more attributes of one or more configurable attributes of the item are configured to be selected by the second user prior to the second user submitting a request to claim the item.

In accordance with some embodiments, a sender electronic device is described. The sender electronic device comprises: a display; one or more input devices, wherein the recipient electronic device is associated with a second user; means for displaying, on the display, graphical representations of one or more items; means for receiving, via the one or more input devices of the sender electronic device, input corresponding to selection of an item from among the one or more of items; means for displaying, on the display, a request for authorization of payment for at least a portion of the item for a second user different from the first user; means for receiving, via the one or more input devices, an input that is responsive to the request for authorization to purchase the item; means, responsive to receiving the input that is responsive to the request for authorization to purchase the item, in accordance with a determination that the input that is responsive to the request for authorization is consistent with input that is enabled to authorize purchase of the item, for proceeding with authorizing payment for at least a portion of the item; and wherein one or more attributes of one or more configurable attributes of the item are configured to be selected by the second user prior to the second user submitting a request to claim the item.

In accordance with some embodiments, a transitory computer-readable storage medium is described. The transitory computer-readable storage medium stores one or more programs configured to be executed by one or more processors of a sender electronic device with a display and one or more input devices, wherein the sender electronic device is associated with a first user, the one or more programs including instructions for: displaying, on the display, graphical representations of one or more items; receiving, via the one or more input devices of the sender electronic device, input corresponding to selection of an item from among the one or more of items; displaying, on the display, a request for authorization of payment for at least a portion of the item for a second user different from the first user; receiving, via the one or more input devices, an input that is responsive to the request for authorization to purchase the item; in response to receiving the input that is responsive to the request for authorization to purchase the item, in accordance with a determination that the input that is responsive to the request for authorization is consistent with input that is enabled to authorize purchase of the item, proceeding with authorizing payment for at least a portion of the item; and wherein one or more attributes of one or more configurable attributes of the item are configured to be selected by the second user prior to the second user submitting a request to claim the item.

In accordance with some embodiments, a method is performed at a recipient electronic device with a display and one or more input devices is described. The recipient electronic device is associated with a second user. The method comprises: receiving information identifying an item for which payment has been authorized by a sender electronic device associated with a first user that is different from the second user, the item selected from among one or more items based on input received from the sender electronic device; displaying, on the display, a graphical representation of the item and graphical representations of one or more configurable attributes of the item; detecting, via the one or more input devices of the recipient electronic device, selection of one or more attributes for at least some of the one or more configurable attributes of the item; subsequent to detecting selection of the one or more attributes, detecting, via the one or more input devices of the recipient electronic device, a request to claim the item; and in response to detecting the request to claim the item, initiating a process for obtaining the item with the selected one or more attributes.

In accordance with some embodiments, a non-transitory computer-readable storage medium is described. The non-transitory computer-readable storage medium stores one or more programs configured to be executed by one or more processors of a recipient electronic device with a display and one or more input devices, wherein the recipient electronic device is associated with a second user, the one or more programs including instructions for: receiving information identifying an item for which payment has been authorized by a sender electronic device associated with a first user that is different from the second user, the item selected from among one or more items based on input received from the sender electronic device; displaying, on the display, a graphical representation of the item and graphical representations of one or more configurable attributes of the item; detecting, via the one or more input devices of the recipient electronic device, selection of one or more attributes for at least some of the one or more configurable attributes of the item; subsequent to detecting selection of the one or more attributes, detecting, via the one or more input devices of the recipient electronic device, a request to claim the item; and in response to detecting the request to claim the item, initiating a process for obtaining the item with the selected one or more attributes.

In accordance with some embodiments, a recipient electronic device is described. The recipient electronic device comprises: a display; one or more input devices; one or more processors; and a memory storing one or more programs configured to be executed by the one or more processors, wherein the recipient electronic device is associated with a second user, the one or more programs including instructions for: receiving information identifying an item for which payment has been authorized by a sender electronic device associated with a first user that is different from the second user, the item selected from among one or more items based on input received from the sender electronic device; displaying, on the display, a graphical representation of the item and graphical representations of one or more configurable attributes of the item; detecting, via the one or more input devices of the recipient electronic device, selection of one or more attributes for at least some of the one or more configurable attributes of the item; subsequent to detecting selection of the one or more attributes, detecting, via the one or more input devices of the recipient electronic device, a request to claim the item; and in response to detecting the request to claim the item, initiating a process for obtaining the item with the selected one or more attributes.

In accordance with some embodiments, a recipient electronic device is described. The recipient electronic device comprises: a display; one or more input devices, wherein the recipient electronic device is associated with a second user; means for receiving information identifying an item for which payment has been authorized by a sender electronic device associated with a first user that is different from the second user, the item selected from among one or more items based on input received from the sender electronic device; means for displaying, on the display, a graphical representation of the item and graphical representations of one or more configurable attributes of the item; means for detecting, via the one or more input devices of the recipient electronic device, selection of one or more attributes for at least some of the one or more configurable attributes of the item; means for, subsequent to detecting selection of the one or more attributes, detecting, via the one or more input devices of the recipient electronic device, a request to claim the item; and means, responsive to detecting the request to claim the item, for initiating a process for obtaining the item with the selected one or more attributes.

In accordance with some embodiments, a transitory computer-readable storage medium is described. The transitory computer-readable storage medium stores one or more programs configured to be executed by one or more processors of a recipient electronic device with a display and one or more input devices, wherein the recipient electronic device is associated with a second user, the one or more programs including instructions for: receiving information identifying an item for which payment has been authorized by a sender electronic device associated with a first user that is different from the second user, the item selected from among one or more items based on input received from the sender electronic device; displaying, on the display, a graphical representation of the item and graphical representations of one or more configurable attributes of the item; detecting, via the one or more input devices of the recipient electronic device, selection of one or more attributes for at least some of the one or more configurable attributes of the item; subsequent to detecting selection of the one or more attributes, detecting, via the one or more input devices of the recipient electronic device, a request to claim the item; and in response to detecting the request to claim the item, initiating a process for obtaining the item with the selected one or more attributes.

In accordance with some embodiments, a method performed at an electronic device with a display is described. The method comprises: displaying a first application; while displaying the first application, detecting an event that corresponds to instructions to display a representation of an item on the display; and in response to detecting the event, displaying, on the display, the representation of the item in the first application, wherein displaying the representation of the item includes: in accordance with a determination that the item satisfies a set of one or more purchase conditions, concurrently displaying, on the display, the representation of the item and a purchase affordance for purchasing the item using a payment system that is available on the electronic device independently of the first application.

In accordance with some embodiments, a non-transitory computer-readable storage medium is described. The non-transitory computer-readable storage medium stores one or more programs configured to be executed by one or more processors of an electronic device with a display, the one or more programs including instructions for: displaying a first application; while displaying the first application, detecting an event that corresponds to instructions to display a representation of an item on the display; and in response to detecting the event, displaying, on the display, the representation of the item in the first application, wherein displaying the representation of the item includes: in accordance with a determination that the item satisfies a set of one or more purchase conditions, concurrently displaying, on the display, the representation of the item and a purchase affordance for purchasing the item using a payment system that is available on the electronic device independently of the first application.

In accordance with some embodiments, an electronic device is described. The electronic device comprises: a display; one or more processors; and a memory storing one or more programs configured to be executed by the one or more processors, the one or more programs including instructions for: displaying a first application; while displaying the first application, detecting an event that corresponds to instructions to display a representation of an item on the display; and in response to detecting the event, displaying, on the display, the representation of the item in the first application, wherein displaying the representation of the item includes: in accordance with a determination that the item satisfies a set of one or more purchase conditions, concurrently displaying, on the display, the representation of the item and a purchase affordance for purchasing the item using a payment system that is available on the electronic device independently of the first application.

In accordance with some embodiments, a transitory computer-readable storage medium is described. The transitory computer-readable storage medium stores one or more programs configured to be executed by one or more processors of an electronic device with a display, the one or more programs including instructions for: displaying a first application; while displaying the first application, detecting an event that corresponds to instructions to display a representation of an item on the display; and in response to detecting the event, displaying, on the display, the representation of the item in the first application, wherein displaying the representation of the item includes: in accordance with a determination that the item satisfies a set of one or more purchase conditions, concurrently displaying, on the display, the representation of the item and a purchase affordance for purchasing the item using a payment system that is available on the electronic device independently of the first application.

In accordance with some embodiments, an electronic device is described. The electronic device comprises: a display; means for displaying a first application; means, while displaying the first application, for detecting an event that corresponds to instructions to display a representation of an item on the display; and means, responsive to detecting the event, for displaying, on the display, the representation of the item in the first application, wherein displaying the representation of the item includes: means, in accordance with a determination that the item satisfies a set of one or more purchase conditions, for concurrently displaying, on the display, the representation of the item and a purchase affordance for purchasing the item using a payment system that is available on the electronic device independently of the first application.

In accordance with some embodiments, a sender electronic device is described. The sender electronic device comprises: a display unit; one or more input device units, wherein the sender electronic device is associated with a first user; and a processing unit coupled to the display unit and the one or more input device units, the processing unit configured to: enable display, on the display unit, of graphical representations of one or more items; receive, via the one or more input device units of the sender electronic device, input corresponding to selection of an item from among the one or more of items; enable display, on the display unit, of a request for authorization of payment for at least a portion of the item for a second user different from the first user; receive, via the one or more input device units, an input that is responsive to the request for authorization to purchase the item; in response to receiving the input that is responsive to the request for authorization to purchase the item, in accordance with a determination that the input that is responsive to the request for authorization is consistent with input that is enabled to authorize purchase of the item, proceed with authorizing payment for at least a portion of the item; and wherein one or more attributes of one or more configurable attributes of the item are configured to be selected by the second user prior to the second user submitting a request to claim the item.

In accordance with some embodiments, a recipient electronic device is described. The recipient electronic device comprises: a display unit; one or more input device units, wherein the recipient electronic device is associated with a second user; and a processing unit coupled to the display unit and the one or more input device units, the processing unit configured to: receive information identifying an item for which payment has been authorized by a sender electronic device associated with a first user that is different from the second user, the item selected from among one or more items based on input received from the sender electronic device; enable display, on the display unit, of a graphical representation of the item and graphical representations of one or more configurable attributes of the item; detect, via the one or more input device units of the recipient electronic device, selection of one or more attributes for at least some of the one or more configurable attributes of the item; subsequent to detecting selection of the one or more attributes, detect, via the one or more input device units of the recipient electronic device, a request to claim the item; and in response to detecting the request to claim the item, initiate a process for obtaining the item with the selected one or more attributes.

In accordance with some embodiments, an electronic device is described. The electronic device comprises: a display unit; a processing unit coupled to the display unit, the processing unit configured to: enable display, on the display unit, of a first application; while enabling display of the first application, detect an event that corresponds to instructions to enable display of a representation of an item on the display unit; and in response to detecting the event, enable display, on the display unit, of the representation of the item in the first application, wherein enabling display of the representation of the item includes: in accordance with a determination that the item satisfies a set of one or more purchase conditions, concurrently enable display, on the display unit, of the representation of the item and a purchase affordance for purchasing the item using a payment system that is available on the electronic device independently of the first application.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing contextual transactions, thereby increasing the effectiveness, efficiency, and user satisfaction with such devices. Such methods and interfaces may complement or replace other methods for managing transactions.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 10A-10C is a flow diagram illustrating a method for managing contextual transactions, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing contextual transactions. In accordance with some embodiments, the sender and the recipient of an item, such as a gift, both provide input such that the transaction meets the preferences of both participants. In accordance with some embodiments, contextual information is used to provide, within a computer application, a mechanism to a user of a device for purchasing a recognized item using a payment system that is available on the device. Such techniques can reduce the cognitive burden on a user who participates in transactions, thereby enhancing productivity. Further, such techniques can reduce processor and battery power otherwise wasted on redundant user inputs.

Figure 6:
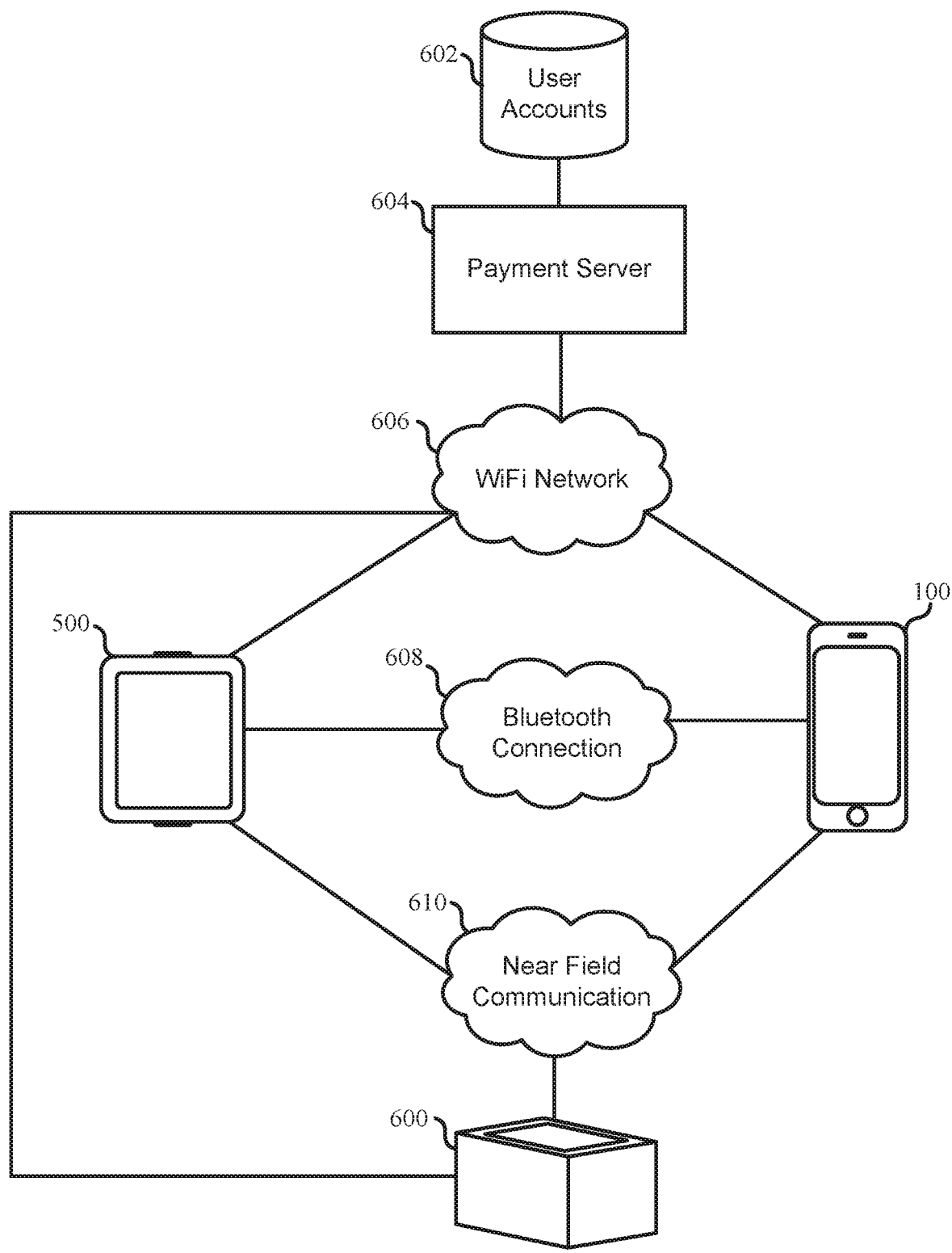
FIG. 6 illustrates exemplary devices connected via one or more communication channels to complete participate in a transaction in accordance with some embodiments.
Figure 7A:
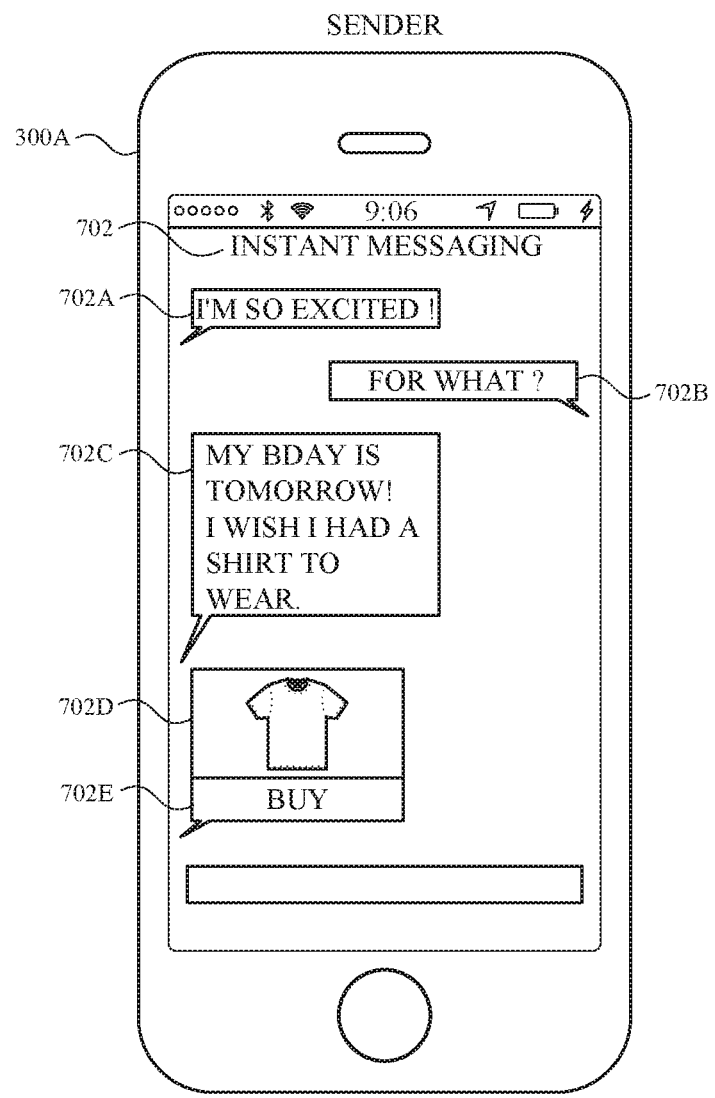
FIGS. 7A-7X illustrate exemplary user interfaces for managing contextual transactions, in accordance with some embodiments.
Figure 8A:
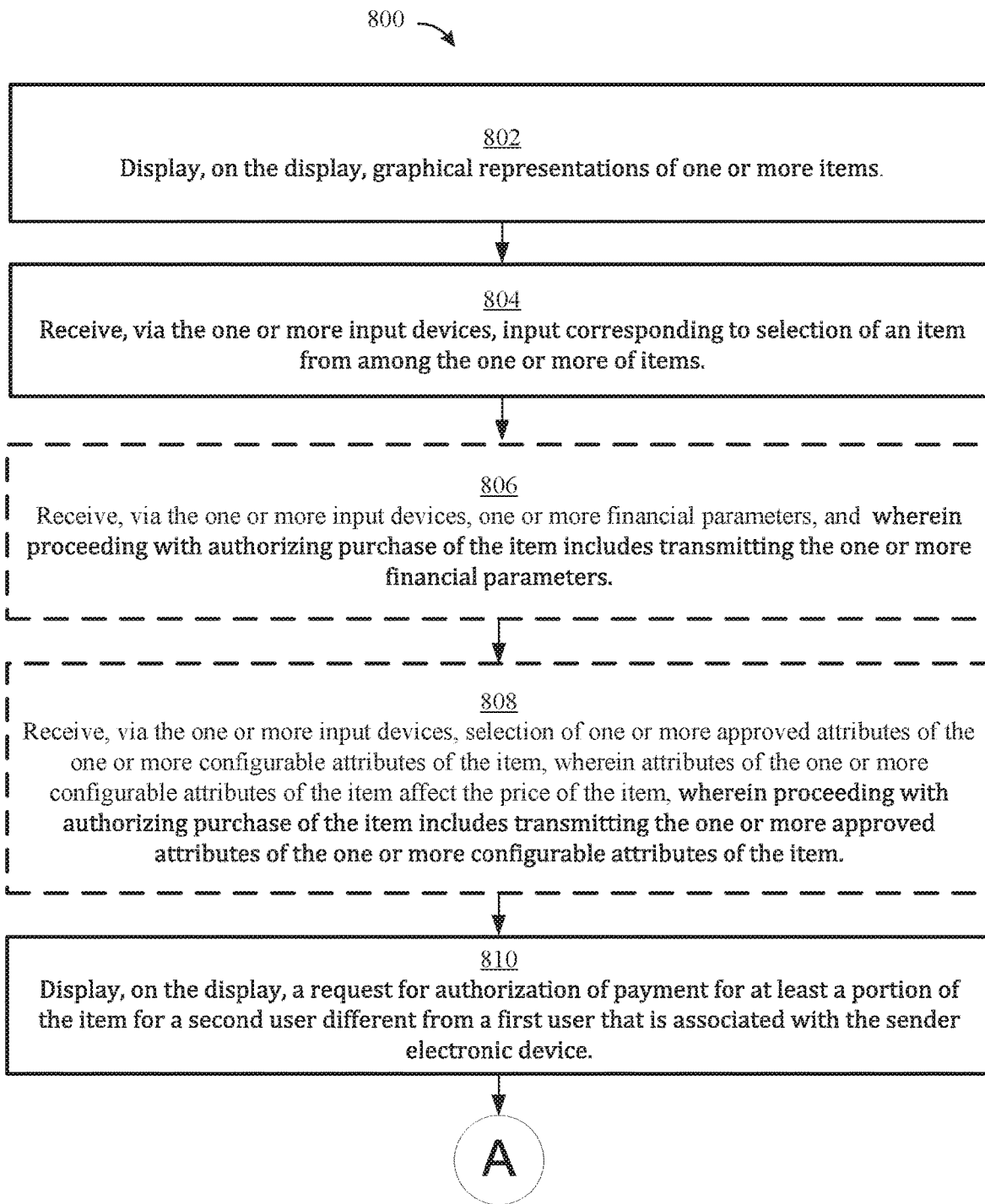
FIGS. 8A-8C is a flow diagram illustrating a method for managing contextual transactions, in accordance with some embodiments.
Figure 8B:
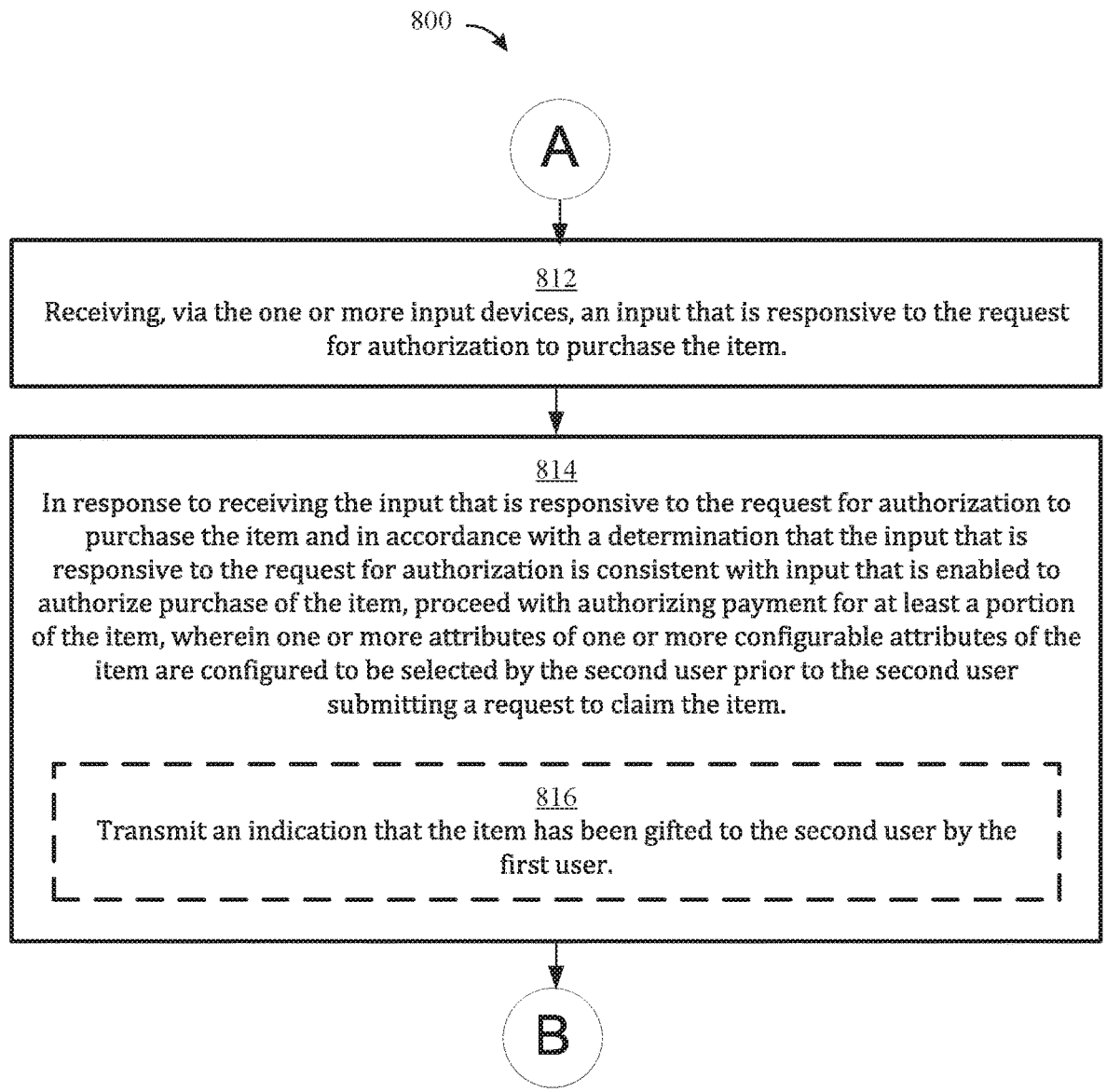
Figure 8C:
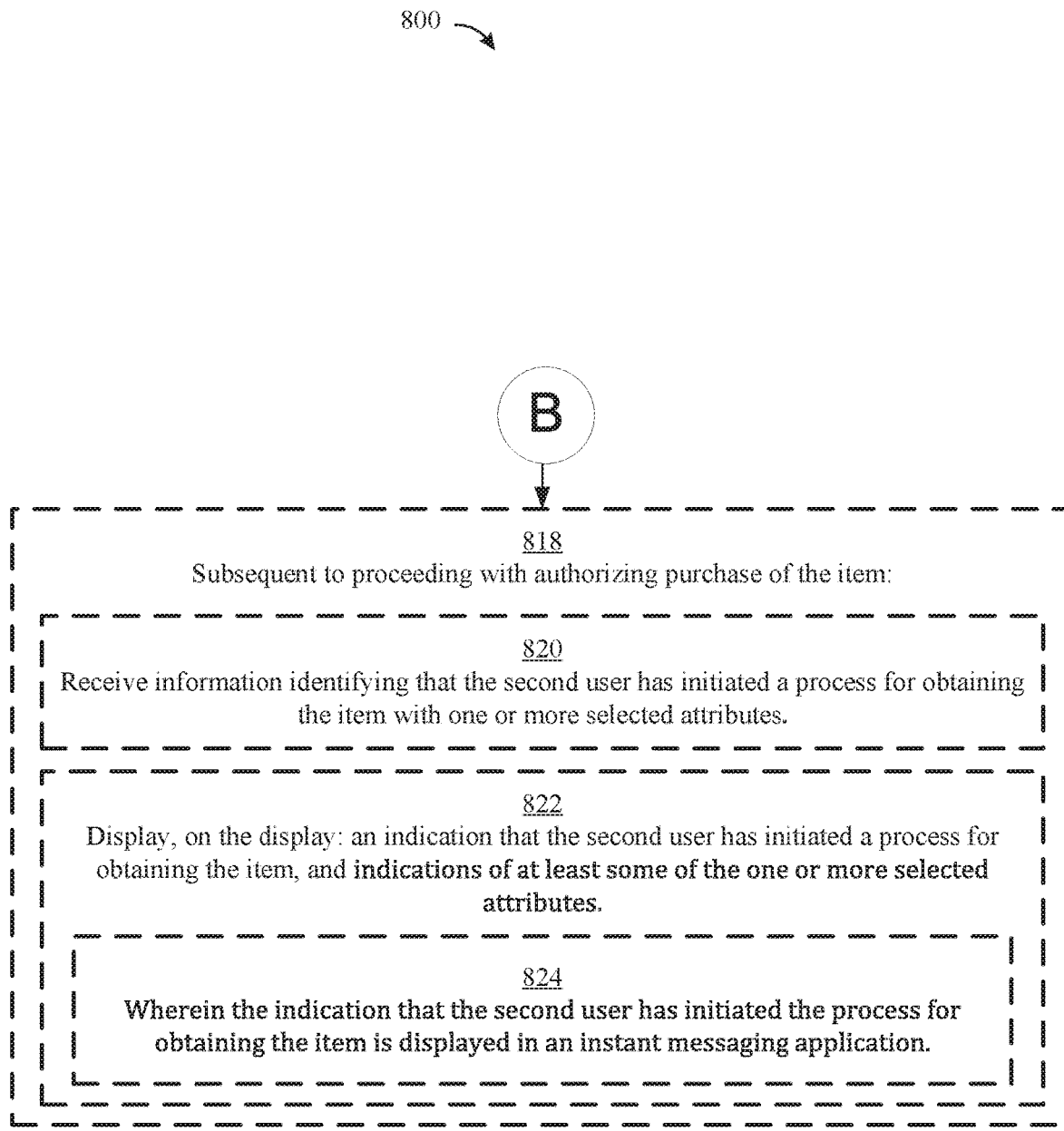
Figure 9A:
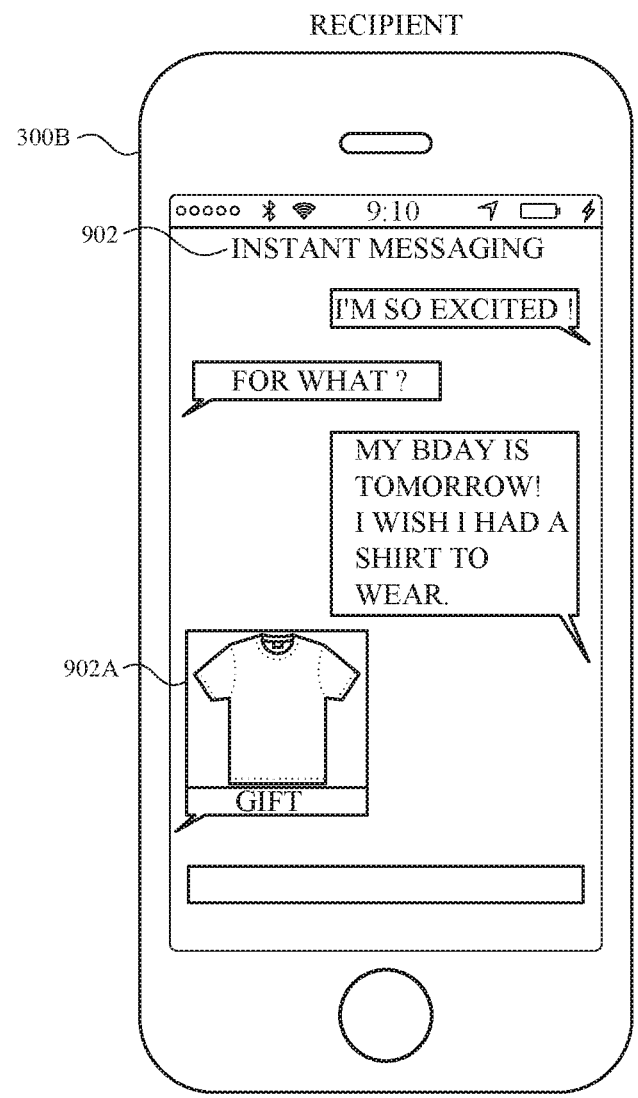
FIGS. 9A-9P illustrate exemplary user interfaces for managing contextual transactions, in accordance with some embodiments.
Figure 10A:
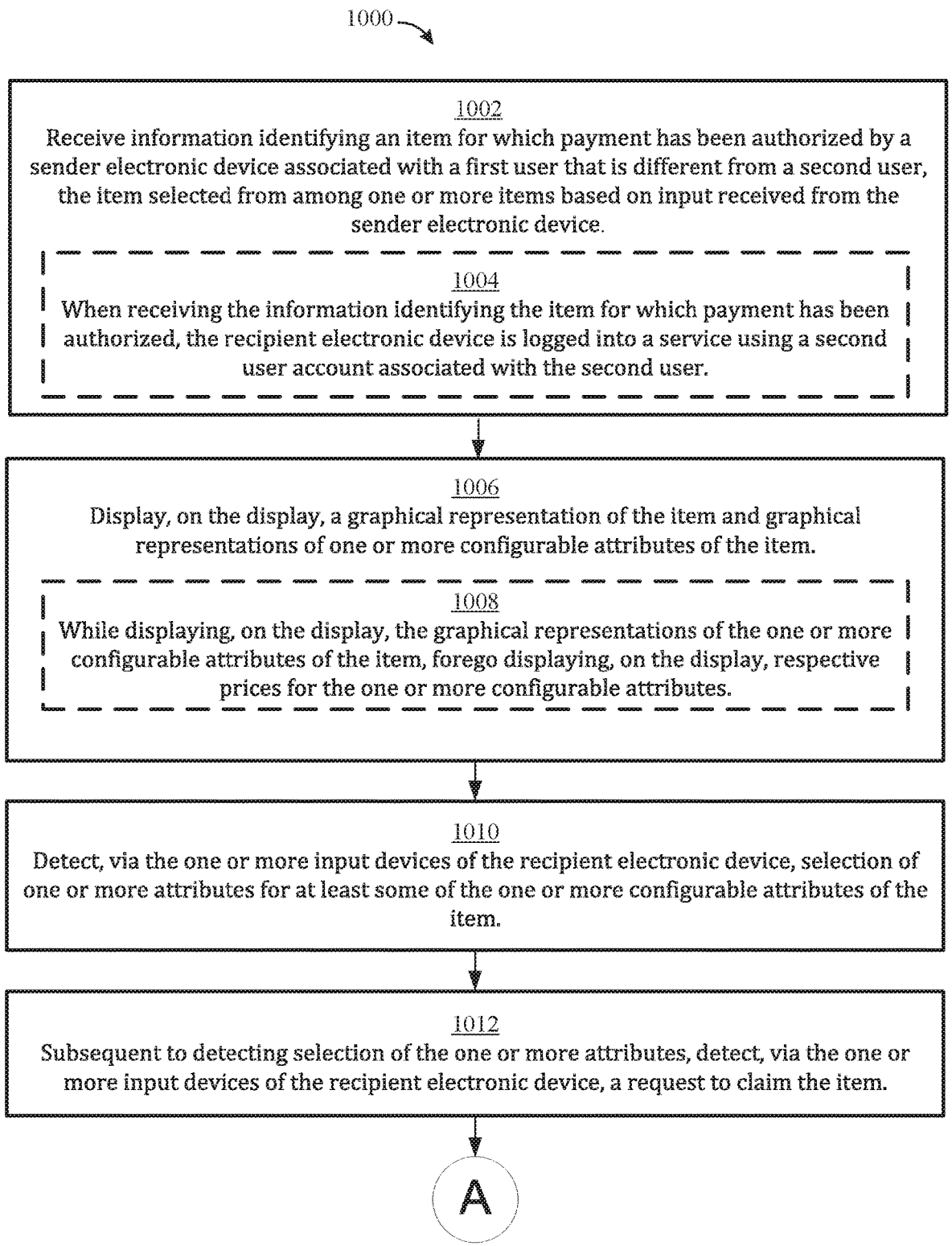
Figure 10B:
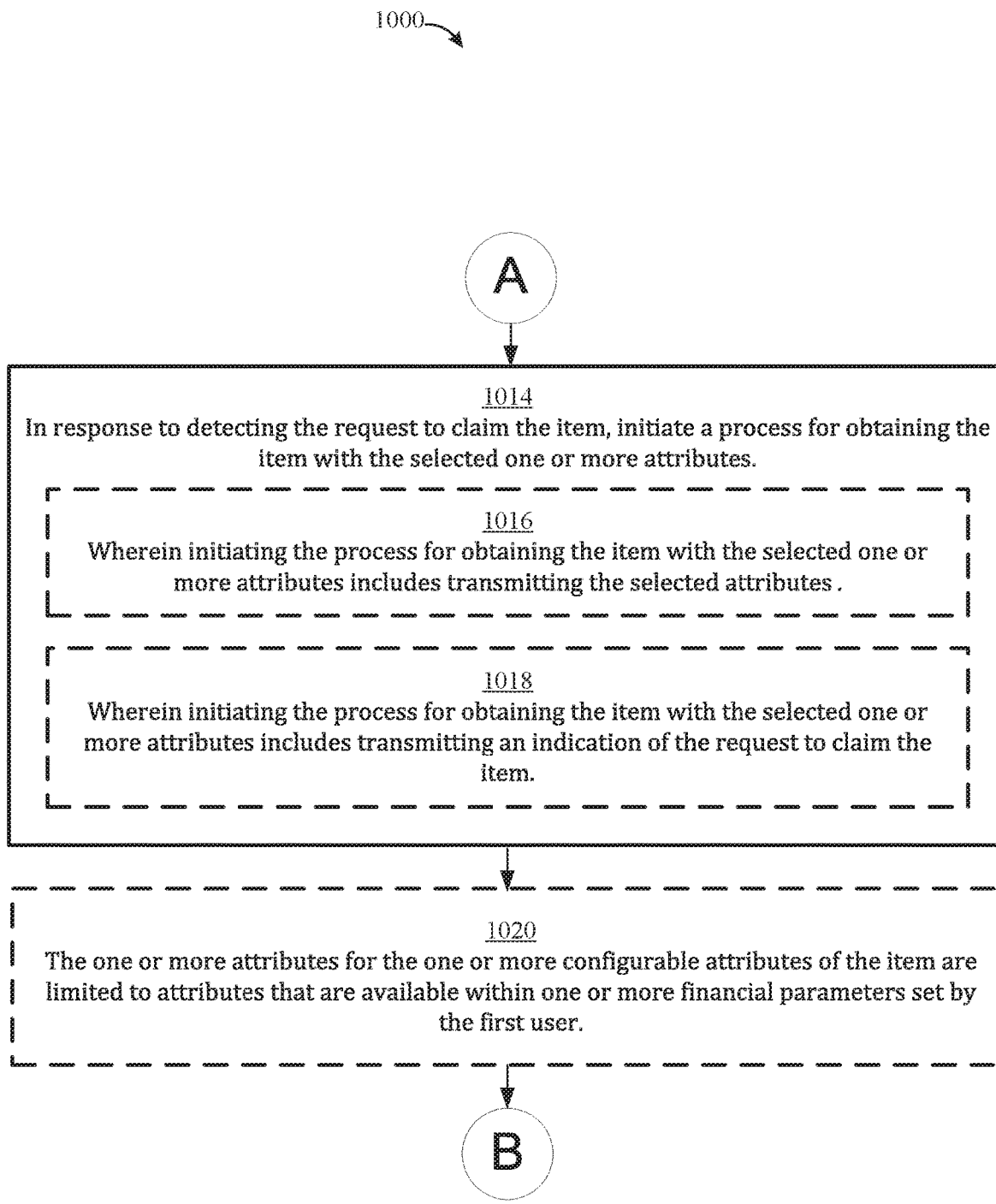
Figure 11:
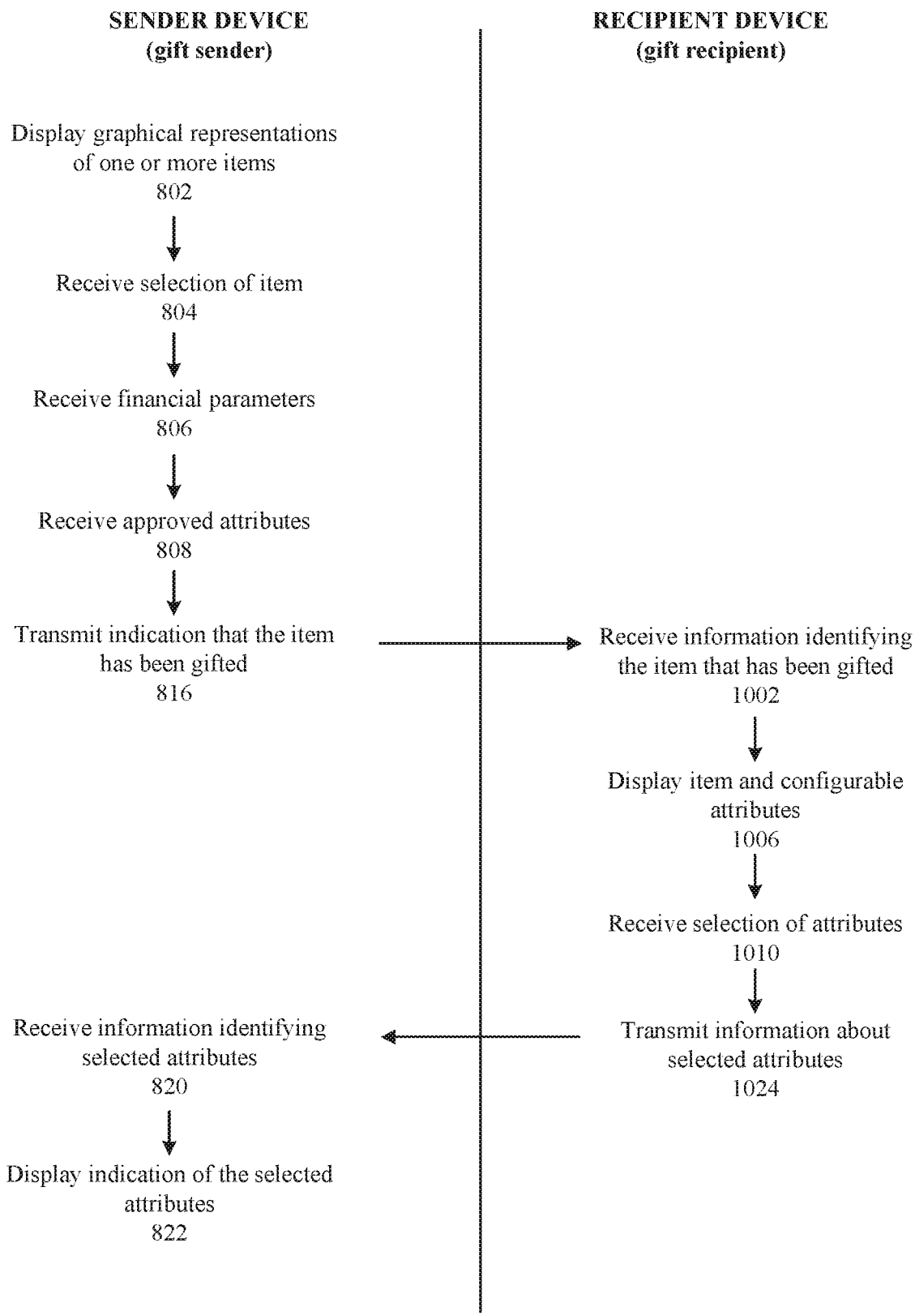
FIG. 11 is a flow diagram illustrating a method for managing contextual transactions, in accordance with some embodiments.

Below, FIGS. 1A-1B, 2, 3, 4A-4B, and 5A-5H provide a description of exemplary devices for performing the techniques for managing event notifications. FIG. 6 illustrates exemplary devices connected via one or more communication channels to participate in a transaction, in accordance with some embodiments. FIGS. 7A-7X illustrate exemplary user interfaces for managing contextual transactions, in accordance with some embodiments. FIGS. 8A-8C is a flow diagram illustrating methods of managing contextual transactions, in accordance with some embodiments. The user interfaces in FIGS. 7A-7X are used to illustrate the processes described below, including the processes in FIGS. 8A-8C and 11. FIGS. 9A-9P illustrate exemplary user interfaces for managing contextual transactions, in accordance with some embodiments. FIGS. 10A-10C is a flow diagram illustrating methods for managing contextual transactions, in accordance with some embodiments. The user interfaces in FIGS. 9A-9P are used to illustrate the processes described below, including the processes in FIGS. 10A-10C and 11. FIG. 11 is a flow diagram illustrating a method for managing contextual transactions, in accordance with some embodiments. FIG. 12A-12I illustrate exemplary user interfaces for managing contextual transactions, in accordance with some embodiments. FIG. 13 is a flow diagram illustrating a method for managing contextual transactions, in accordance with some embodiments. The user interfaces in FIGS. 12A-12I are used to illustrate the processes described below, including the processes in FIG. 13.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
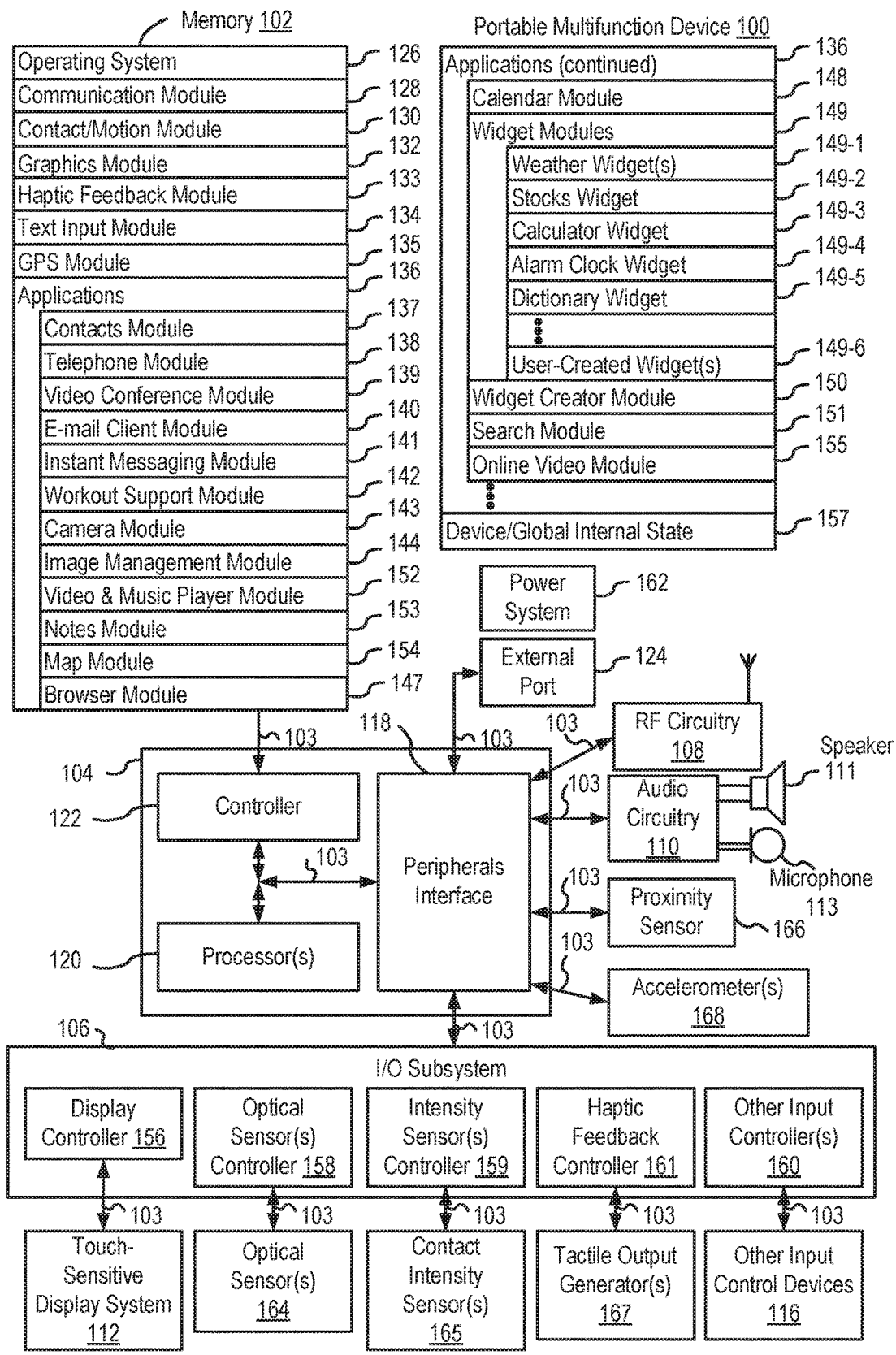
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11 ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S.

patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system)

receiver (not shown) for obtaining information concerning the location and orientation (e.g., portrait or landscape) of device 100.

Figure 3:
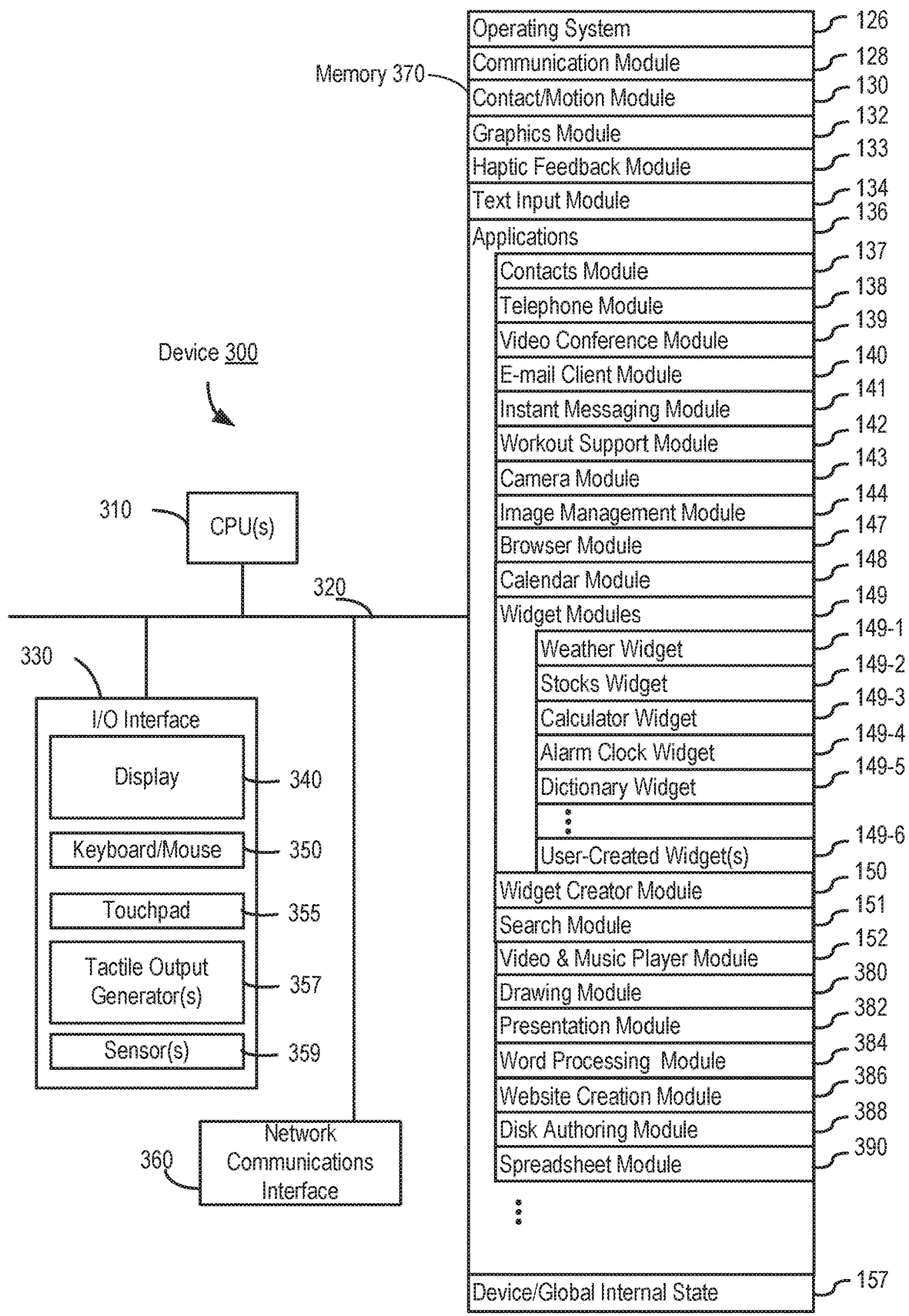
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);

Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
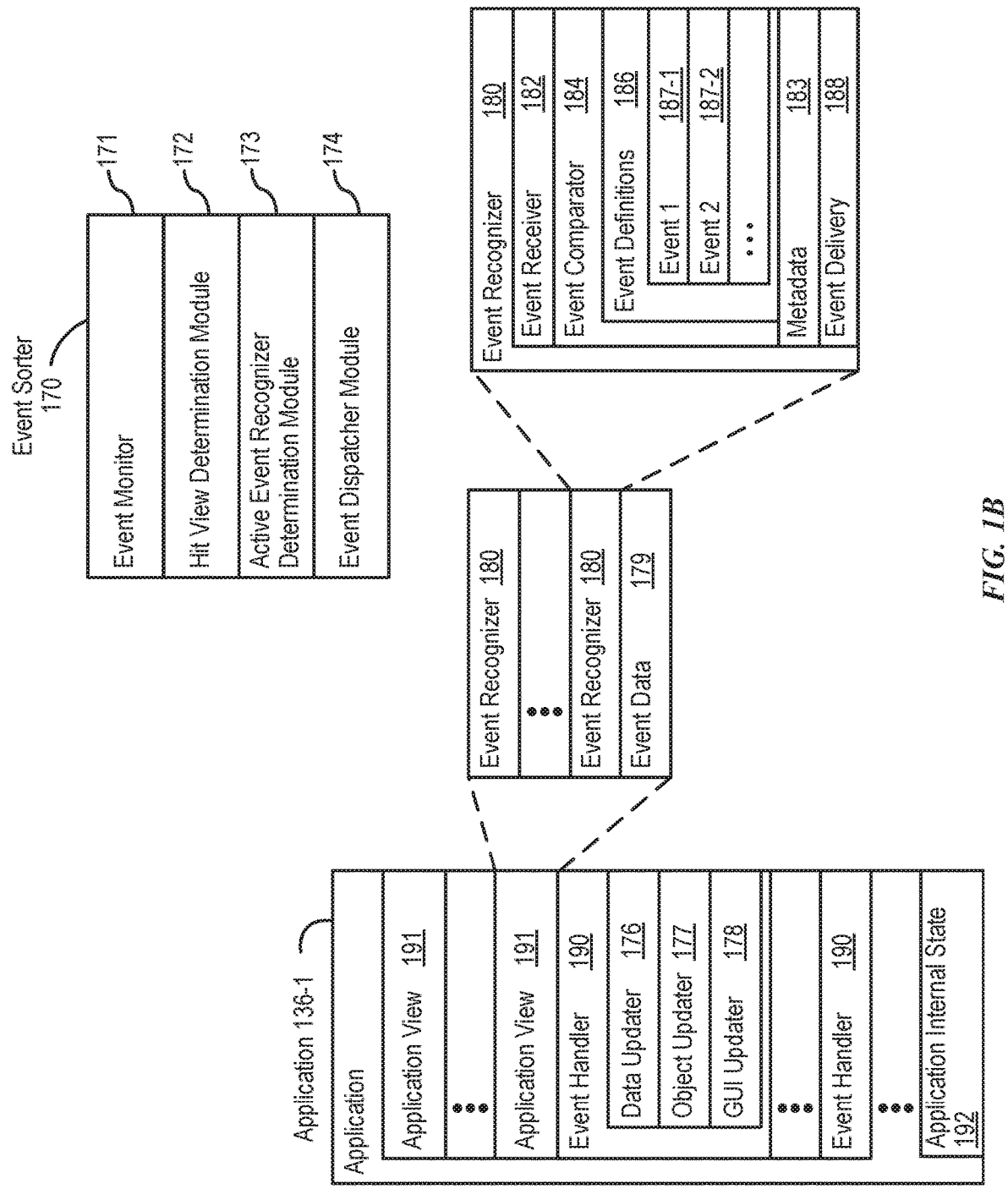
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180).

In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
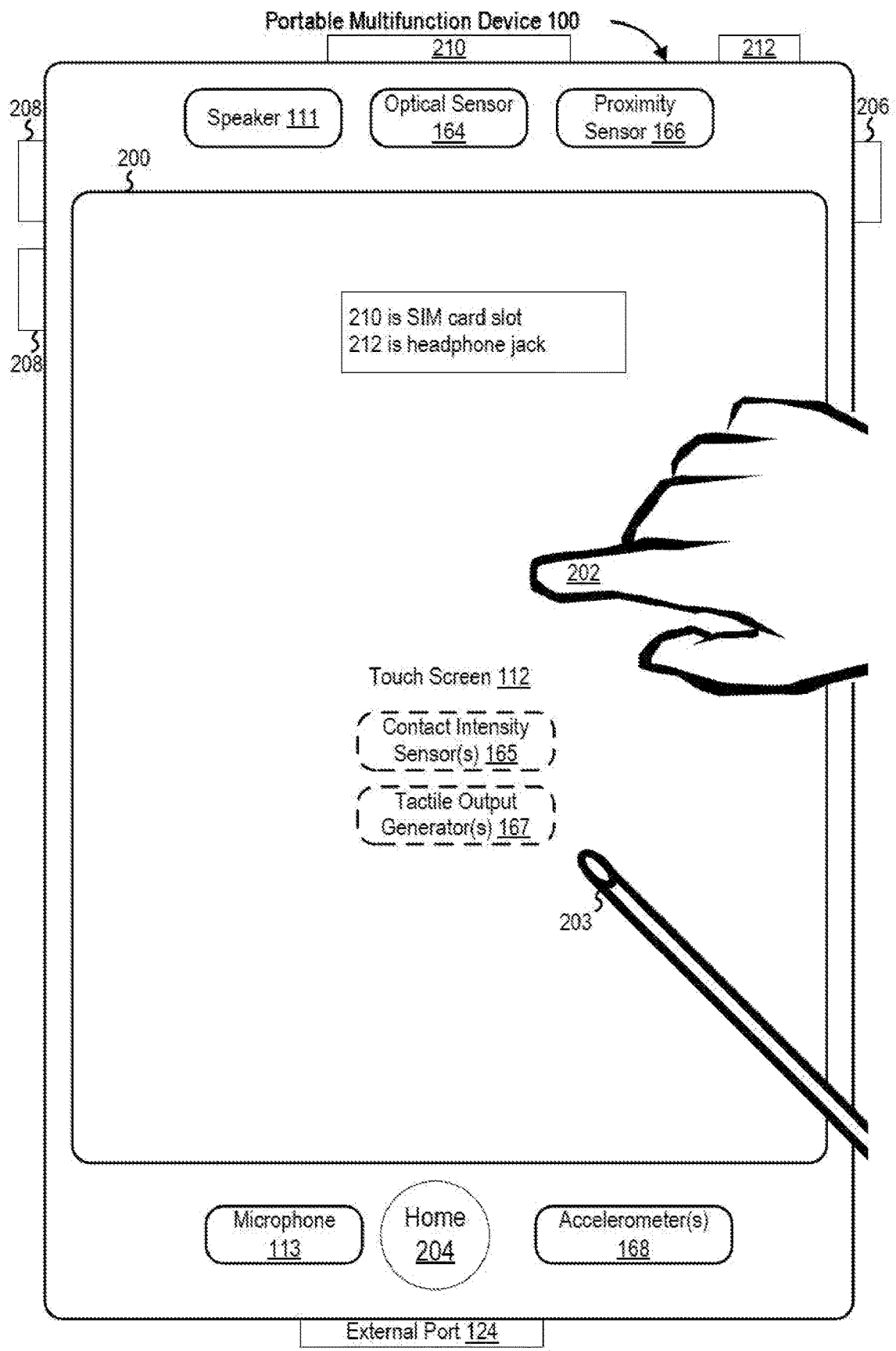
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
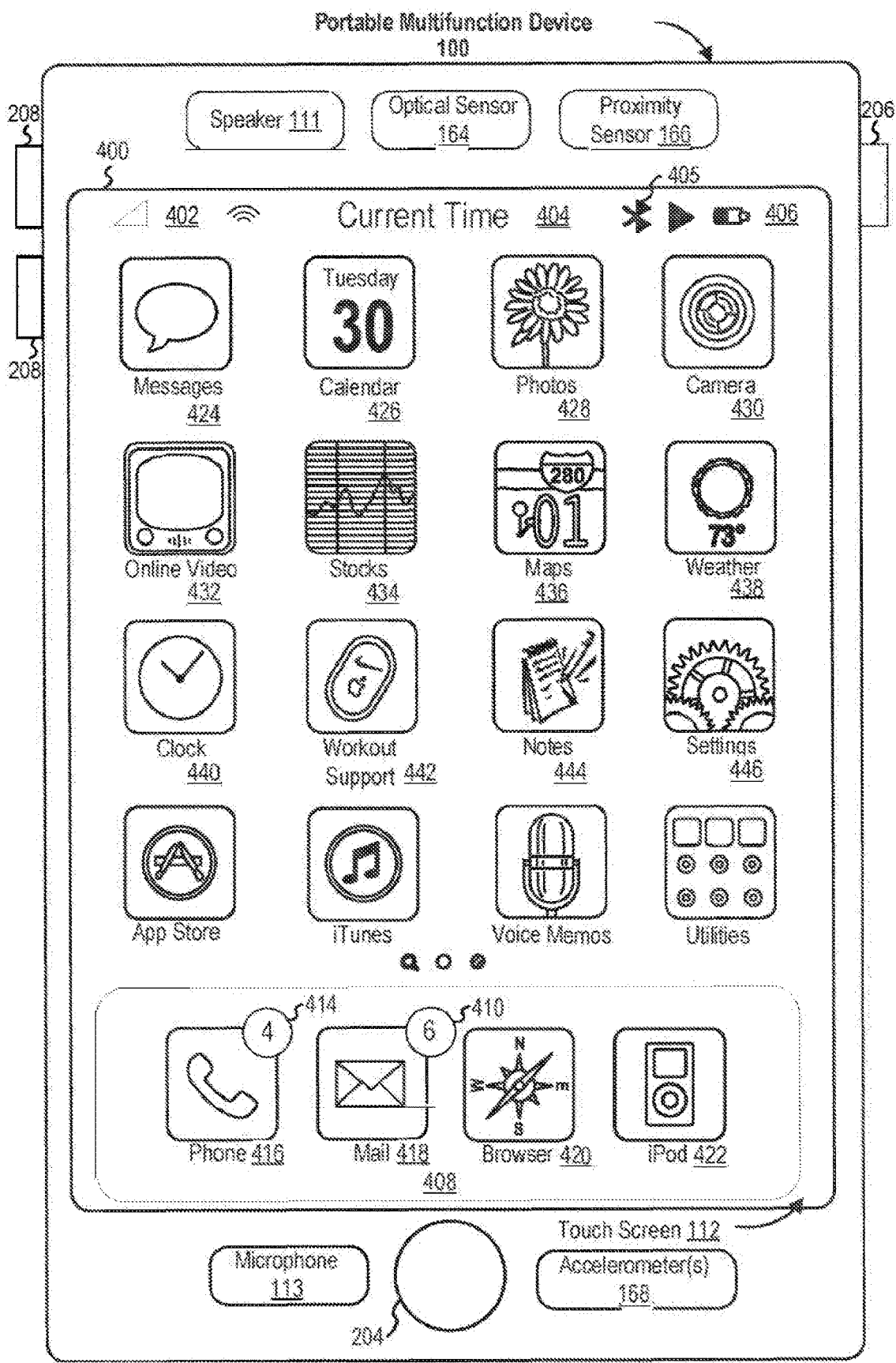
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
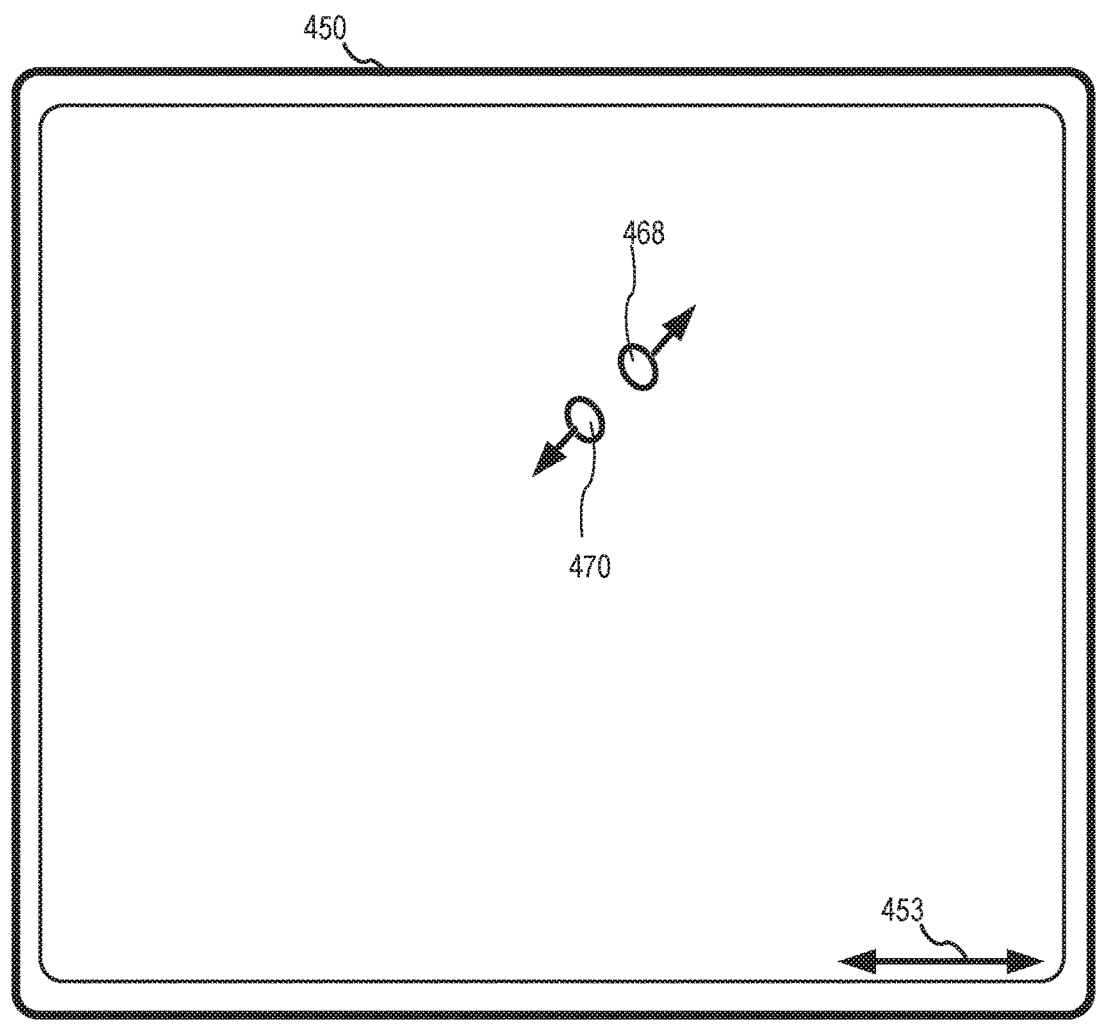
FIG. 4B illustrates an exemplary user interface for a multifunction device with a touch-sensitive surface that is separate from the display in accordance with some embodiments.
Figure 4B:
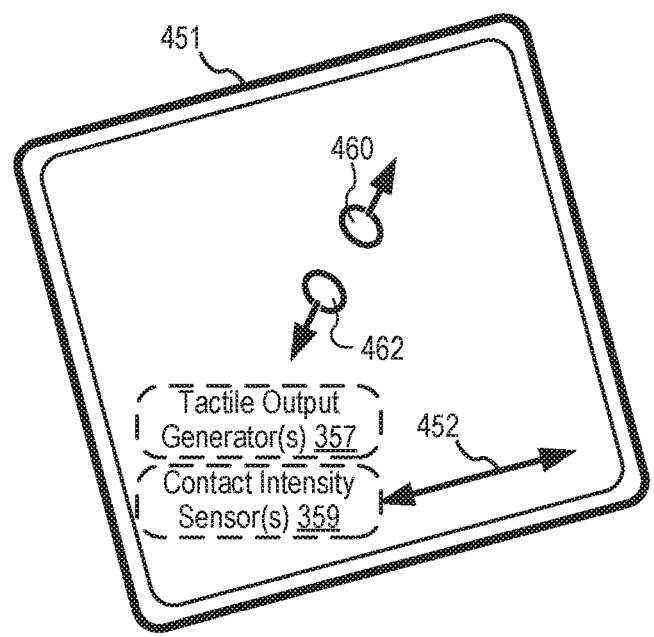

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
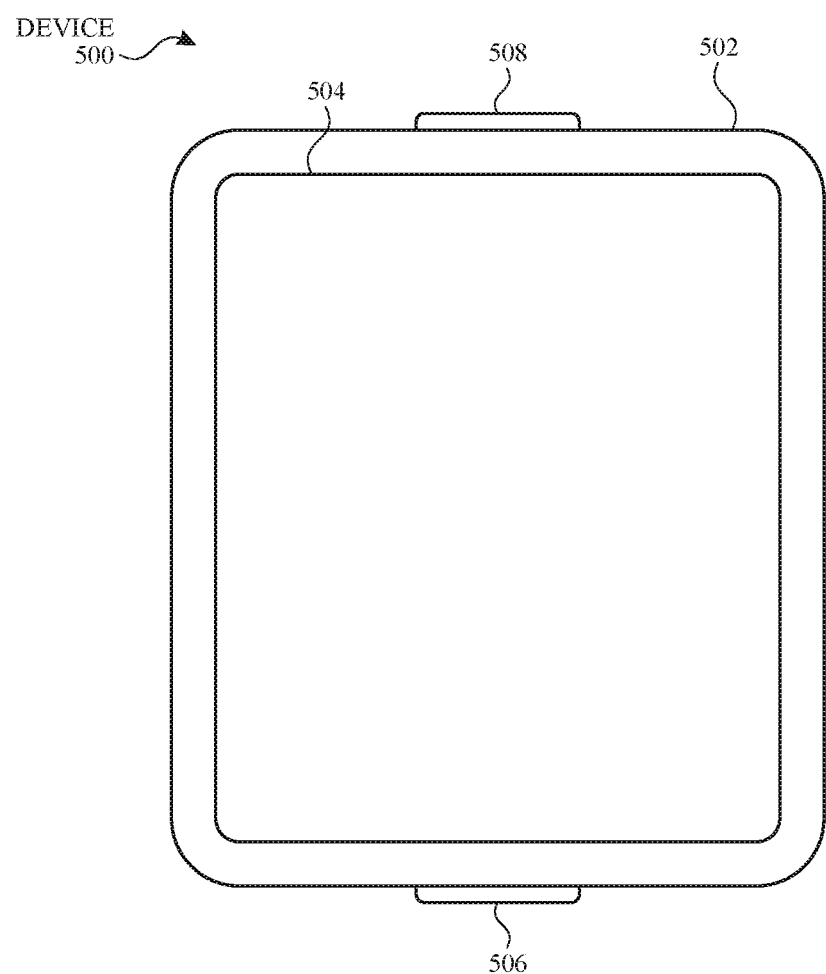
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
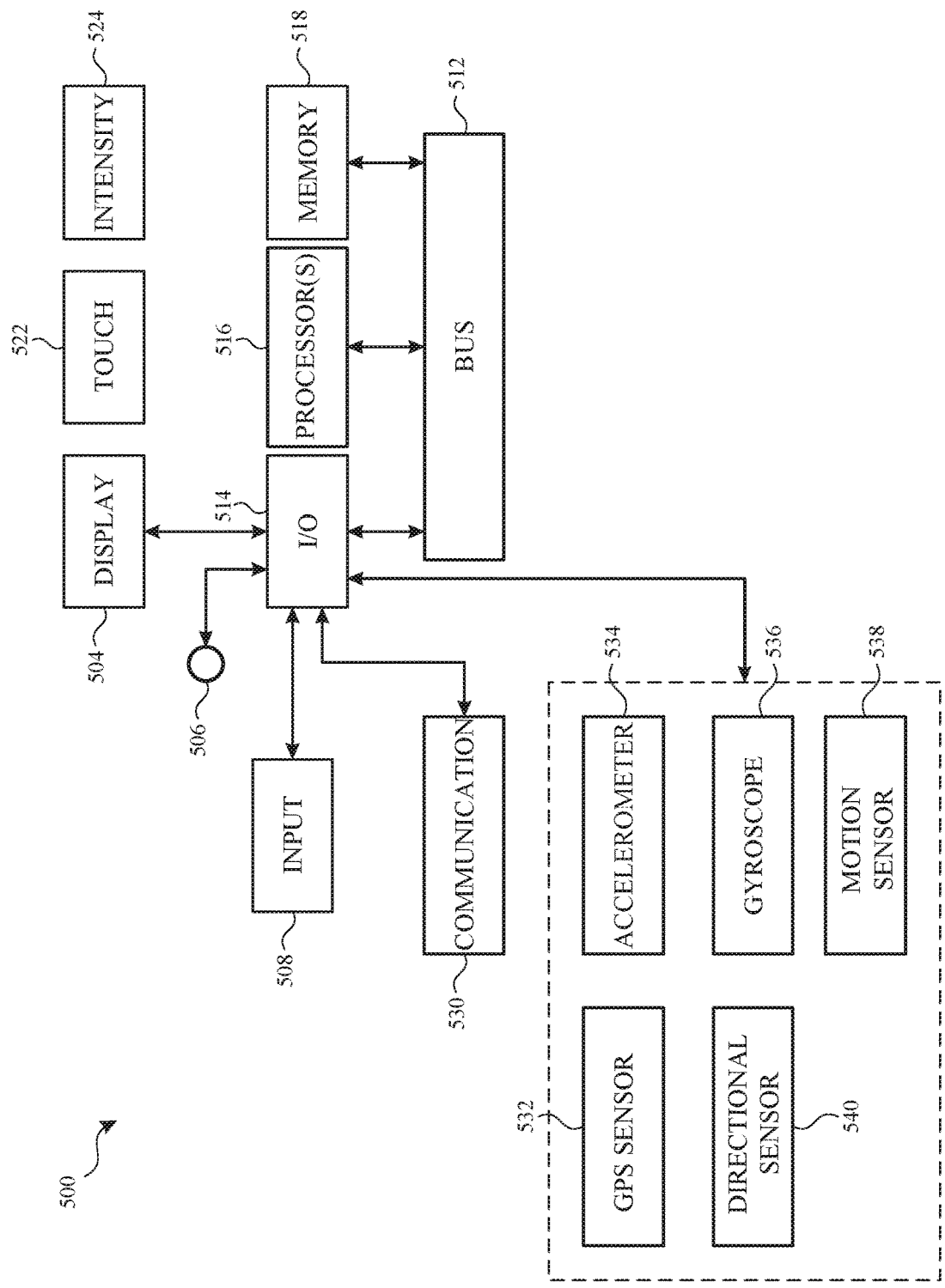
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 800, 1000, and 1300 (FIGS. 8A-8C, 10A-10C, 11, and 13). Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1, 3, and 5). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
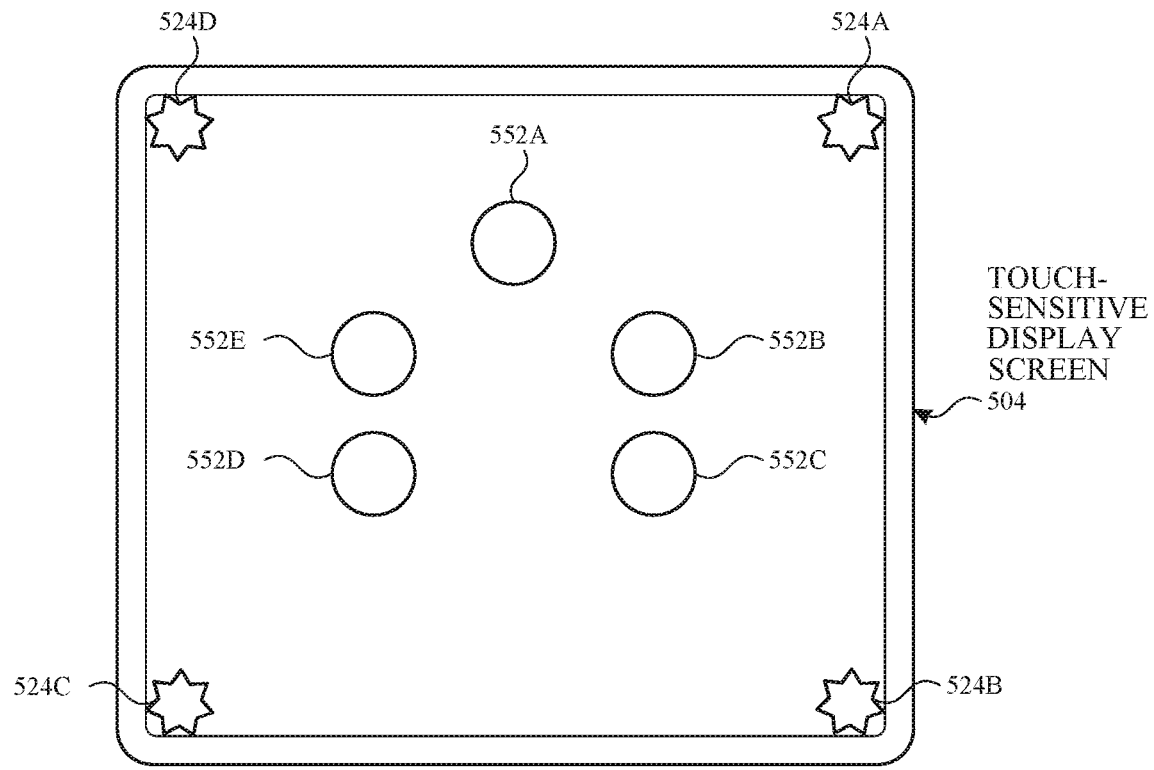
FIGS. 5C-5D illustrate exemplary components of a personal electronic device having a touch-sensitive display and intensity sensors in accordance with some embodiments.
Figure 5C:
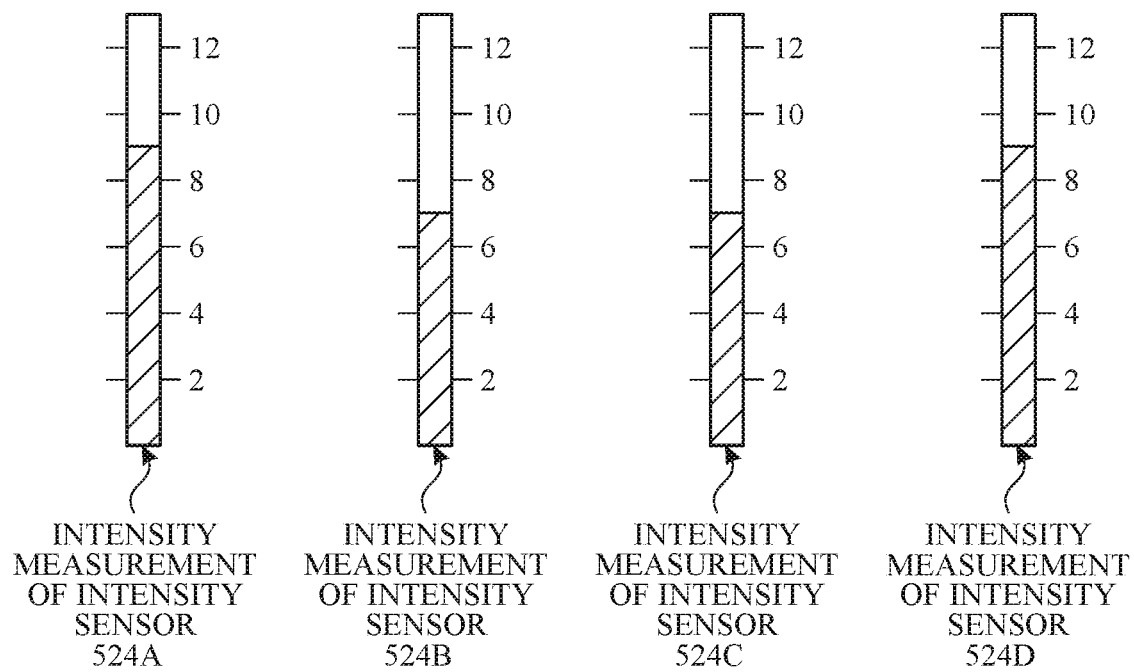
Figure 5D:
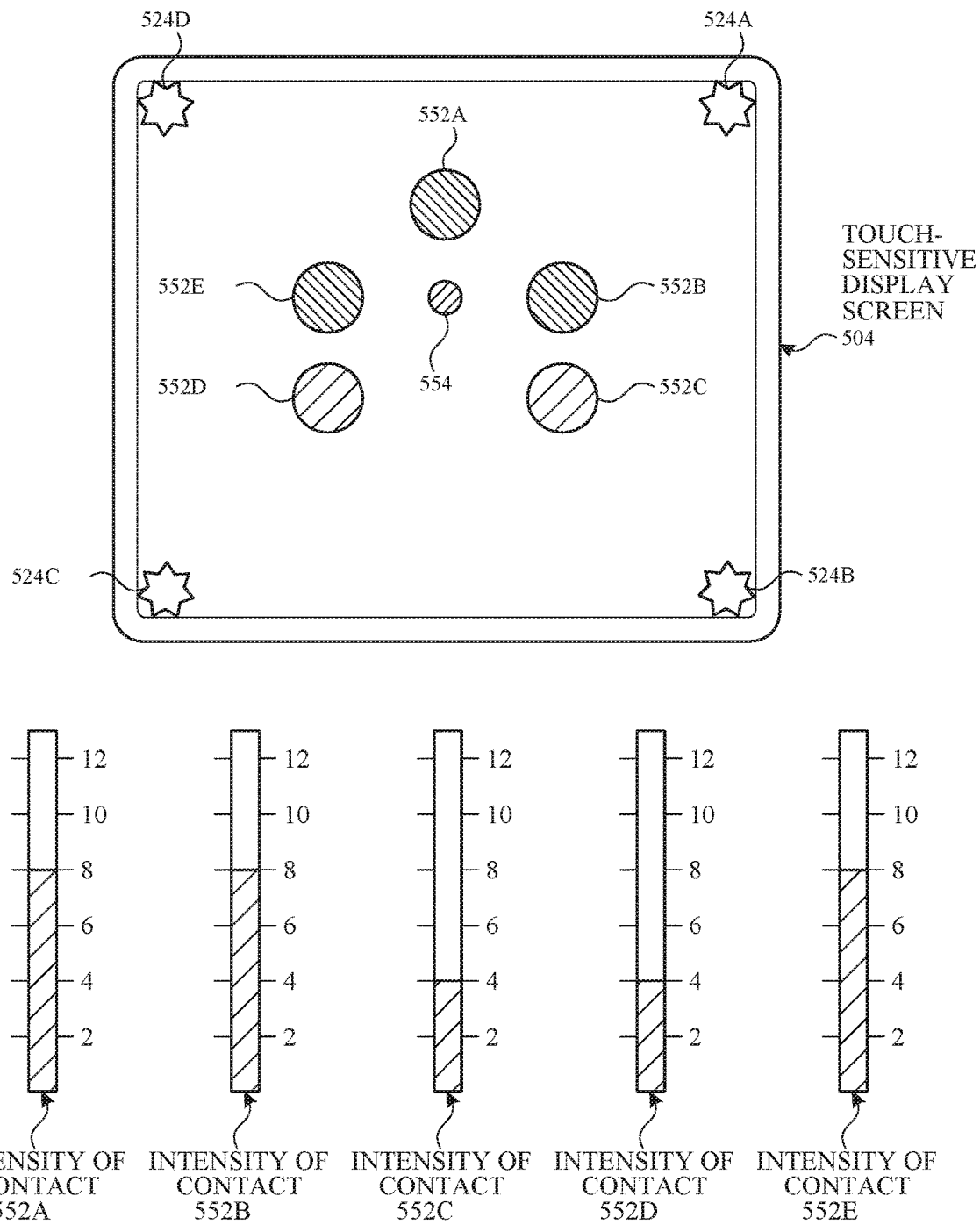

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
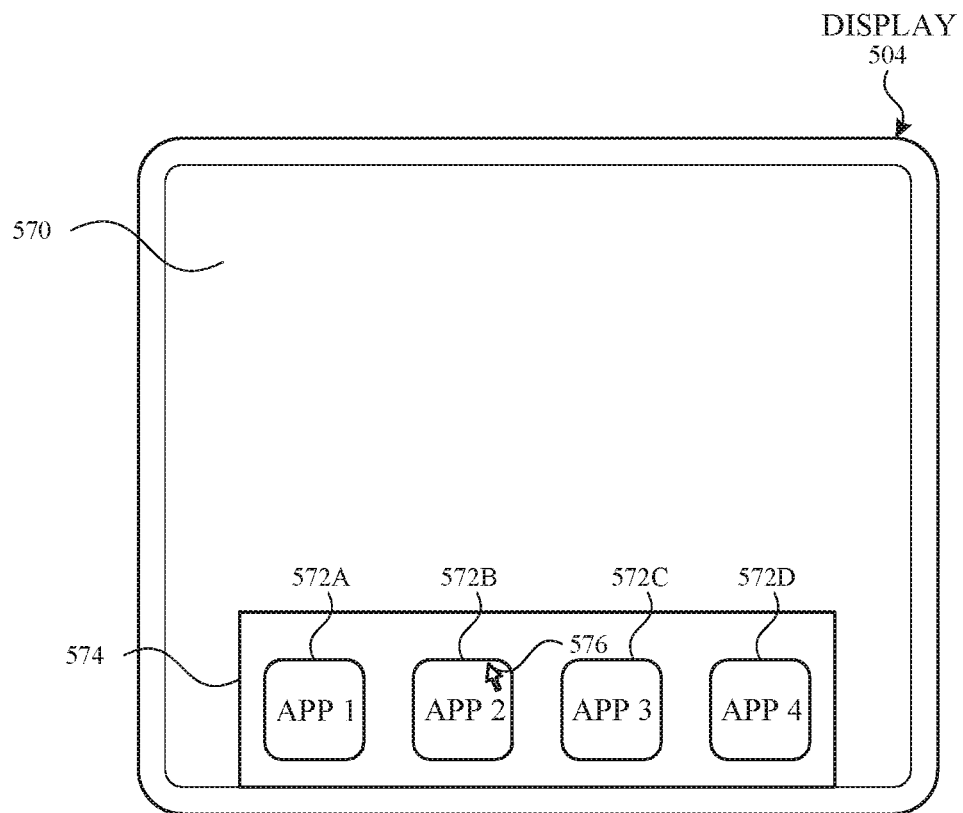
FIGS. 5E-5H illustrate exemplary components and user interfaces of a personal electronic device in accordance with some embodiments.
Figure 5E:
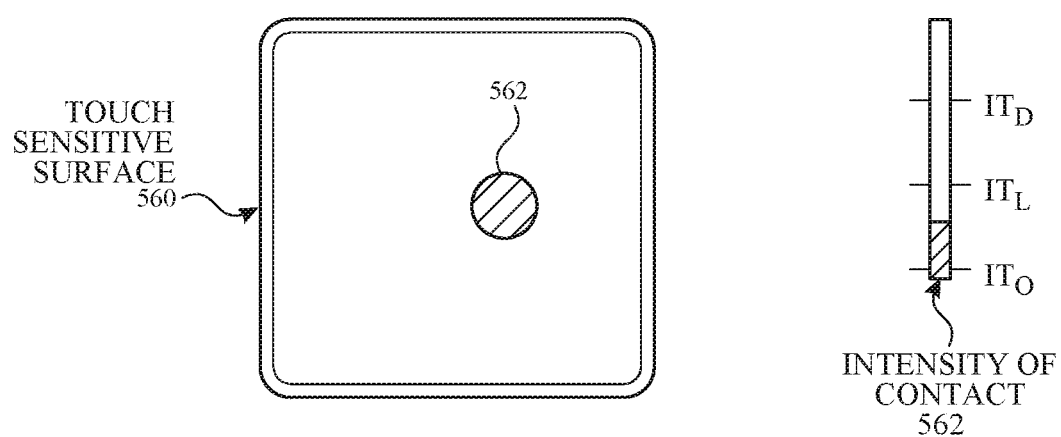
Figure 5F:
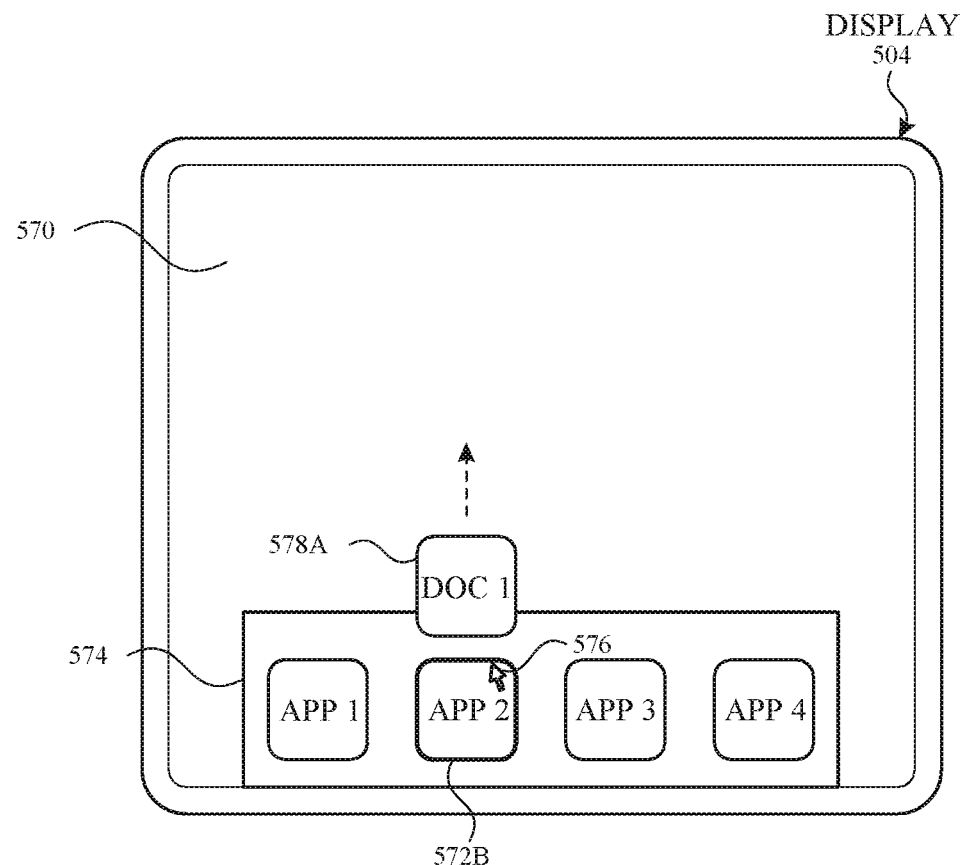
Figure 5F:
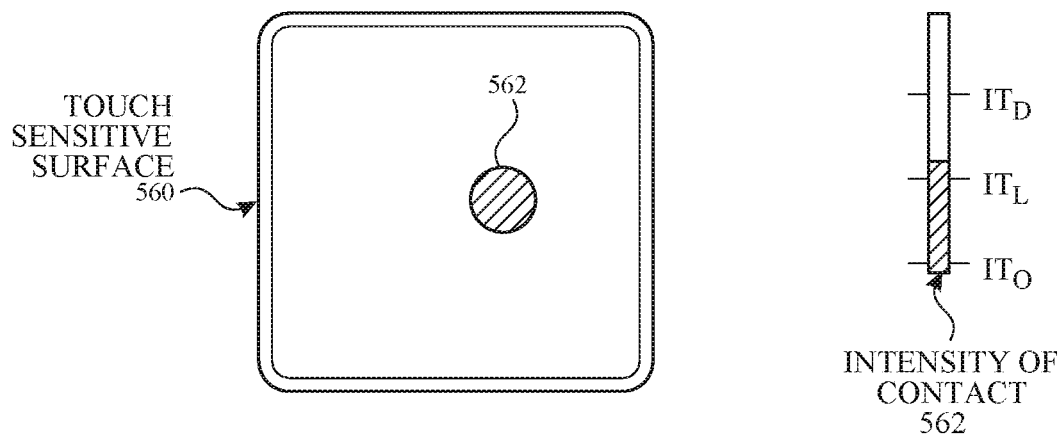
Figure 5G:
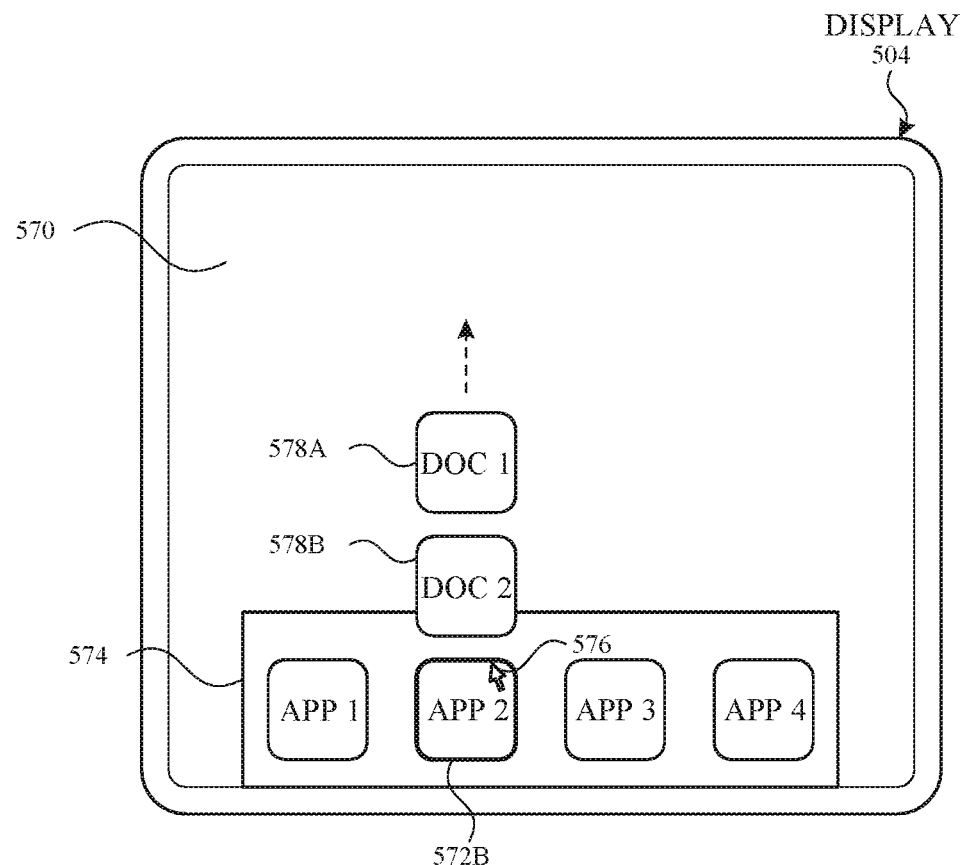
Figure 5G:
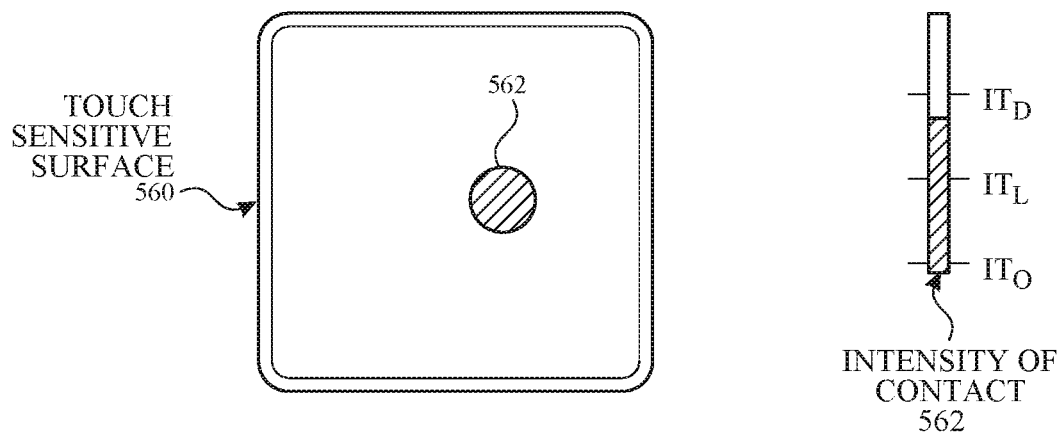
Figure 5H:
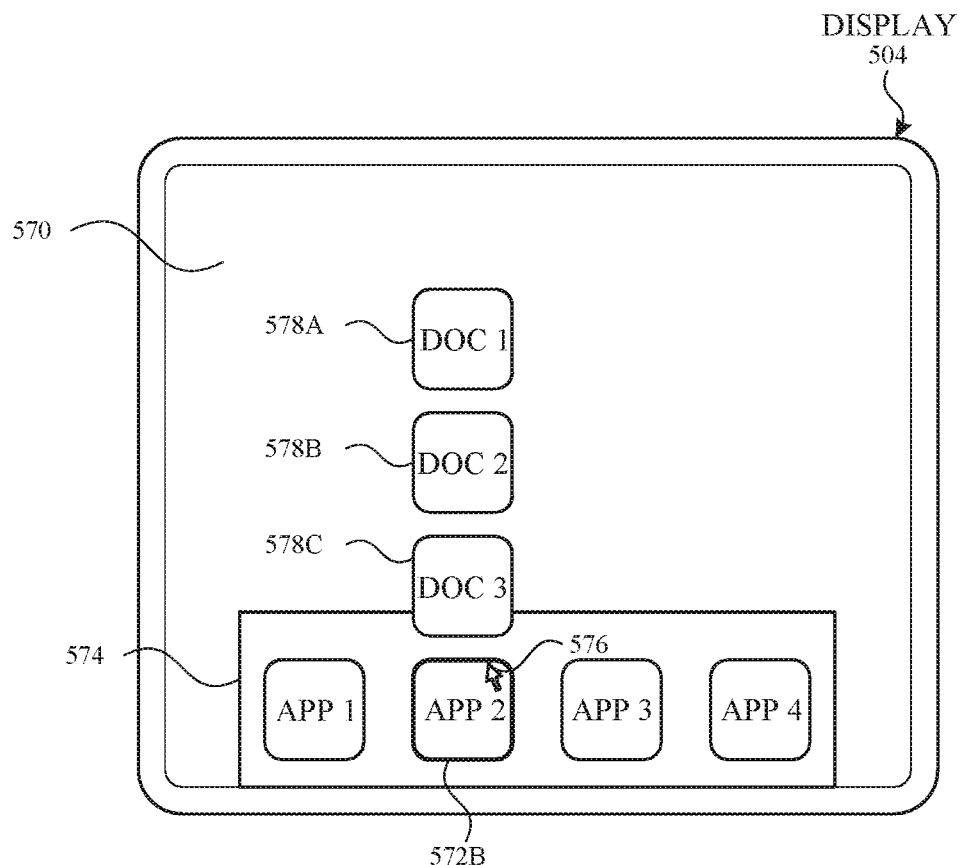
Figure 5H:
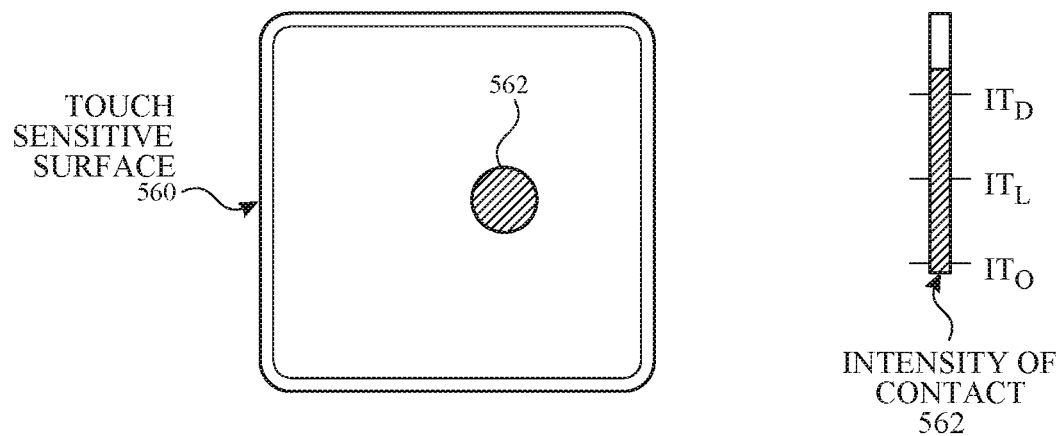

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

FIG. 6 illustrates exemplary devices connected via one or more communication channels to participate in a transaction in accordance with some embodiments. One or more exemplary electronic devices (e.g., devices 100, 300, and 500) are configured to optionally detect input (e.g., a particular user input, an NFC field) and optionally transmit payment information (e.g., using NFC). The one or more electronic devices optionally include NFC hardware and are configured to be NFC-enabled.

The electronic devices (e.g., devices 100, 300, and 500) are optionally configured to store payment account information associated with each of one or more payment accounts. Payment account information includes, for example, one or more of: a person's or company's name, a billing address, a login, a password, an account number, an expiration date, a security code, a telephone number, a bank associated with the payment account (e.g., an issuing bank), and a card network identifier. In some examples, payment account information includes include an image, such as a picture of a payment card (e.g., taken by the device and/or received at the device). In some examples, the electronic devices receive user input including at least some payment account information (e.g., receiving user-entered credit, debit, account, or gift card number and expiration date). In some examples, the electronic devices detect at least some payment account information from an image (e.g., of a payment card captured by a camera sensor of the device). In some examples, the electronic devices receive at least some payment account information from another device (e.g., another user device or a server). In some examples, the electronic device receives payment account information from a server associated with another service for which an account for a user or user device previously made a purchase or identified payment account data (e.g., an app for renting or selling audio and/or video files).

In some embodiments, a payment account is added to an electronic device (e.g., device 100, 300, and 500), such that payment account information is securely stored on the electronic device. In some examples, after a user initiates such process, the electronic device transmits information for the payment account to a transaction-coordination server, which then communicates with a server operated by a payment network for the account (e.g., a payment server) to ensure a validity of the information. The electronic device is optionally configured to receive a script from the server that allows the electronic device to program payment information for the account onto the secure element.

In some embodiments, communication among electronic devices 100, 300, and 500 facilitates transactions (e.g., generally or specific transactions). For example, a first electronic device (e.g., 100) can serve as a provisioning or managing device, and can send notifications of new or updated payment account data (e.g., information for a new account, updated information for an existing account, and/or an alert pertaining to an existing account) to a second electronic device (e.g., 500). In another example, a first electronic device (e.g., 100) can send data to a second election device, wherein the data reflects information about payment transactions facilitated at the first electronic device. The information optionally includes one or more of: a payment amount, an account used, a time of purchase, and whether a default account was changed. The second device (e.g., 500) optionally uses such information to update a default payment account (e.g., based on a learning algorithm or explicit user input).

Electronic devices (e.g., 100, 300, 500) are configured to communicate with each other over any of a variety of networks. For example, the devices communicate using a Bluetooth connection 608 (e.g., which includes a traditional Bluetooth connection or a Bluetooth Low Energy connection) or using a WiFi network 606. Communications among user devices are, optionally, conditioned to reduce the possibility of inappropriately sharing information across devices. For example, communications relating to payment information requires that the communicating devices be paired (e.g., be associated with each other via an explicit user interaction) or be associated with a same user account.

In some embodiments, an electronic device (e.g., 100, 300, 500) is used to communicate with a point-of-sale (POS) payment terminal 600, which is optionally NFC-enabled. The communication optionally occurs using a variety of communication channels and/or technologies. In some examples, electronic device (e.g., 100, 300, 500) communicates with payment terminal 600 using an NFC channel 610. In some examples, payment terminal 600 communicates with an electronic device (e.g., 100, 300, 500) using a peer-to-peer NFC mode. Electronic device (e.g., 100, 300, 500) is optionally configured transmit a signal to payment terminal 600 that includes payment information for a payment account (e.g., a default account or an account selected for the particular transaction).

In some embodiments, generation of and/or transmission of the signal is controlled by a secure element in the electronic device (e.g., 100, 300, 500). The secure element optionally requires a particular user input prior to releasing payment information. For example, the secure element optionally requires detection that the electronic device is being worn, detection of a button press, detection of entry of a passcode, detection of a touch, detection of one or more option selections (e.g., received while interacting with an application), detection of a fingerprint signature, detection of a voice or voice command, and or detection of a gesture or movement (e.g., rotation or acceleration). In some examples, if a communication channel (e.g., an NFC communication channel) with another device (e.g., payment terminal 600) is established within a defined time period from detection of the input, the secure element releases payment information to be transmitted to the other device (e.g., payment terminal 600). In some examples, the secure element is a hardware component that controls release of secure information. In some examples, the secure element is a software component that controls release of secure information.

In some embodiments, protocols related to transaction participation depend on, for example, device types. For example, a condition for generating and/or transmitting payment information can be different for a wearable device (e.g., device 500) and a phone (e.g., device 100). For example, a generation and/or transmission condition for a wearable device includes detecting that a button has been pressed (e.g., after a security verification), while a corresponding condition for a phone does not require button-depression and instead requires detection of particular interaction with an application. In some examples, a condition for transmitting and/or releasing payment information includes receiving particular input on each of multiple devices. For example, release of payment information optionally requires detection of a fingerprint and/or passcode at the device (e.g., device 100) and detection of a mechanical input (e.g., button press) on another device (e.g., device 500).

Payment terminal 600 optionally uses the payment information to generate a signal to transmit to a payment server 604 to determine whether the payment is authorized. Payment server 604 optionally includes any device or system configured to receive payment information associated with a payment account and to determine whether a proposed purchase is authorized. In some examples, payment server 604 includes a server of an issuing bank. Payment terminal 600 communicates with payment server 604 directly or indirectly via one or more other devices or systems (e.g., a server of an acquiring bank and/or a server of a card network).

Payment server 604 optionally uses at least some of the payment information to identify a user account from among a database of user accounts (e.g., 602). For example, each user account includes payment information. An account is, optionally, located by locating an account with particular payment information matching that from the POS communication. In some examples, a payment is denied when provided payment information is not consistent (e.g., an expiration date does not correspond to a credit, debit or gift card number) or when no account includes payment information matching that from the POS communication.

In some embodiments, data for the user account further identifies one or more restrictions (e.g., credit limits); current or previous balances; previous transaction dates, locations and/or amounts; account status (e.g., active or frozen), and/or authorization instructions. In some examples, the payment server (e.g., 604) uses such data to determine whether to authorize a payment. For example, a payment server denies a payment when a purchase amount added to a current balance would result in exceeding an account limit, when an account is frozen, when a previous transaction amount exceeds a threshold, or when a previous transaction count or frequency exceeds a threshold.

In some embodiments, payment server 604 responds to POS payment terminal 600 with an indication as to whether a proposed purchase is authorized or denied. In some examples, POS payment terminal 600 transmits a signal to the electronic device (e.g., 100, 300, 500) to identify the result. For example, POS payment terminal 600 sends a receipt to the electronic device (e.g., 100, 300, 500) when a purchase is authorized (e.g., via a transaction-coordination server that manages a transaction app on the user device). In some instances, POS payment terminal 600 presents an output (e.g., a visual or audio output) indicative of the result. Payment can be sent to a merchant as part of the authorization process or can be subsequently sent.

In some embodiments, the electronic device (e.g., 100, 300, 500) participates in a transaction that is completed without involvement of POS payment terminal 600. For example, upon detecting that a mechanical input has been received, a secure element in the electronic device (e.g., 100, 300, 500) releases payment information to allow an application on the electronic device to access the information (e.g., and to transmit the information to a server associated with the application).

In some embodiments, the electronic device (e.g., 100, 300, 500) is in a locked state or an unlocked state. In the locked state, the electronic device is powered on and operational but is prevented from performing a predefined set of operations in response to the user input. The predefined set of operations may include navigation between user interfaces, activation or deactivation of a predefined set of functions, and activation or deactivation of certain applications. The locked state may be used to prevent unintentional or unauthorized use of some functionality of the electronic device or activation or deactivation of some functions on the electronic device. In the unlocked state, the electronic device 100 is power on and operational and is not prevented from performing at least a portion of the predefined set of operations that cannot be performed while in the locked state.

When the device is in the locked state, the device is said to be locked. In some embodiments, the device in the locked state may respond to a limited set of user inputs, including input that corresponds to an attempt to transition the device to the unlocked state or input that corresponds to powering the device off.

In some examples, a secure element is a hardware component (e.g., a secure microcontroller chip) configured to securely store data or an algorithm. In some examples, the secure element provides (or releases) payment information (e.g., an account number and/or a transaction-specific dynamic security code). In some examples, the secure element provides (or releases) the payment information in response to the device receiving authorization, such as a user authentication (e.g., fingerprint authentication; passcode authentication; detecting double-press of a hardware button when the device is in an unlocked state, and optionally, while the device has been continuously on a user's wrist since the device was unlocked by providing authentication credentials to the device, where the continuous presence of the device on the user's wrist is determined by periodically checking that the device is in contact with the user's skin). For example, the device detects a fingerprint at a fingerprint sensor (e.g., a fingerprint sensor integrated into a button) of the device. The device determines whether the fingerprint is consistent with a registered fingerprint. In accordance with a determination that the fingerprint is consistent with the registered fingerprint, the secure element provides (or releases) payment information. In accordance with a determination that the fingerprint is not consistent with the registered fingerprint, the secure element forgoes providing (or releasing) payment information.

Attention is now directed towards embodiments of user interfaces ("UI") and associated processes that are implemented on an electronic device, such as portable multifunction device 100, device 300, or device 500.

FIGS. 7A-7X illustrate exemplary user interfaces for managing contextual transactions, in accordance with some embodiments. The user interfaces in these figures are used to illustrate the processes described below, including the processes in FIGS. 8A-8C.

FIGS. 7A-7X illustrate an exemplary sender electronic device (e.g., 300A, 100, 300, 500) associated with a first user (e.g., a sender). The sender electronic device 300A includes a display and one or more input devices. The one or more input devices of the sender electronic device 300A optionally include a touch-sensitive surface, such as incorporated into the display.

The sender electronic device 300A displays, on the display, graphical representations (e.g., name, description, image) of one or more items, and receives, via the one or more input devices of the sender electronic device, input corresponding to selection of an item (e.g., a tangible good, an intangible good, or a service) from among the one or more items. Thus, the first user uses the sender electronic device 300A to pick the item to be gifted to a second user.

Figure 7B:
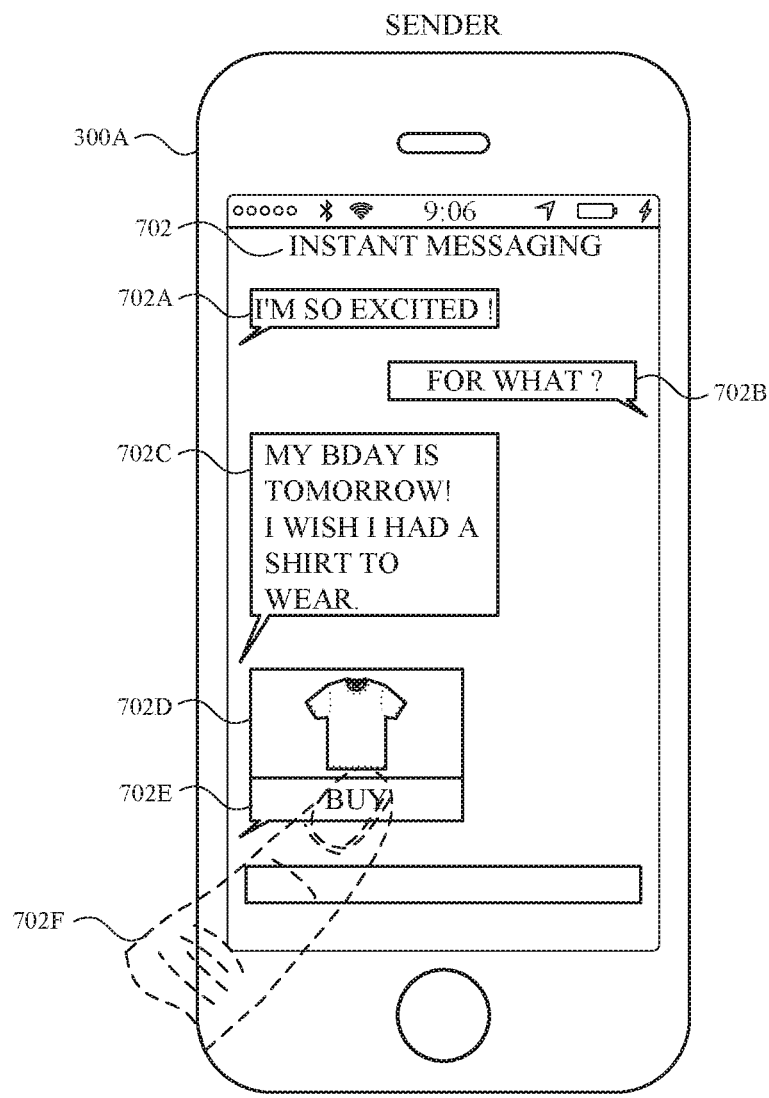

In accordance with some embodiments, as illustrated in FIGS. 7A-7B, the displayed graphical representation 702D is displayed in a first application, such as instant messaging application 702, and includes a purchase affordance 702E for purchasing the item using a payment system, wherein the payment system is available on the electronic device, such as described in greater detail with reference to FIGS. 12A-12I and 13. Instant messaging application 702 includes messages from multiple participants—the first user and a second user. For example, message balloons 702A and 702C correspond to messages sent by the second user using a recipient electronic device (e.g., 300B) and received by the first user at the sender electronic device 300A. Message balloon 702B corresponds to a message sent by the first user using the sender electronic device 300A to the second user. At FIG. 7B, the sender electronic device 300A receives, via the one or more input devices of the sender electronic device, input corresponding to selection of an item (e.g., the shirt depicted in 702D) from among the one or more items. For example, the sender electronic device 300A receives a finger tap 702F on purchase affordance 702E.

In accordance with some embodiments, in response to detecting the input corresponding to selection of the item, the sender electronic device 300A displays a user interface for a second application that is different from the first application. In some examples, the user interfaces of FIGS. 7C-7R correspond to the second application, such as an electronic wallet application of the sender electronic device 300A. Thus, different applications with different (e.g., specialized) capabilities handle different aspects of the technique, resulting in a more efficient technique.

In accordance with some embodiments, the sender electronic device 300A is configured using an account of the first user. In some examples, the sender electronic device 300A is logged into a remote service using an account of the first user. Thus, the electronic device has information about the first user.

Figure 7C:
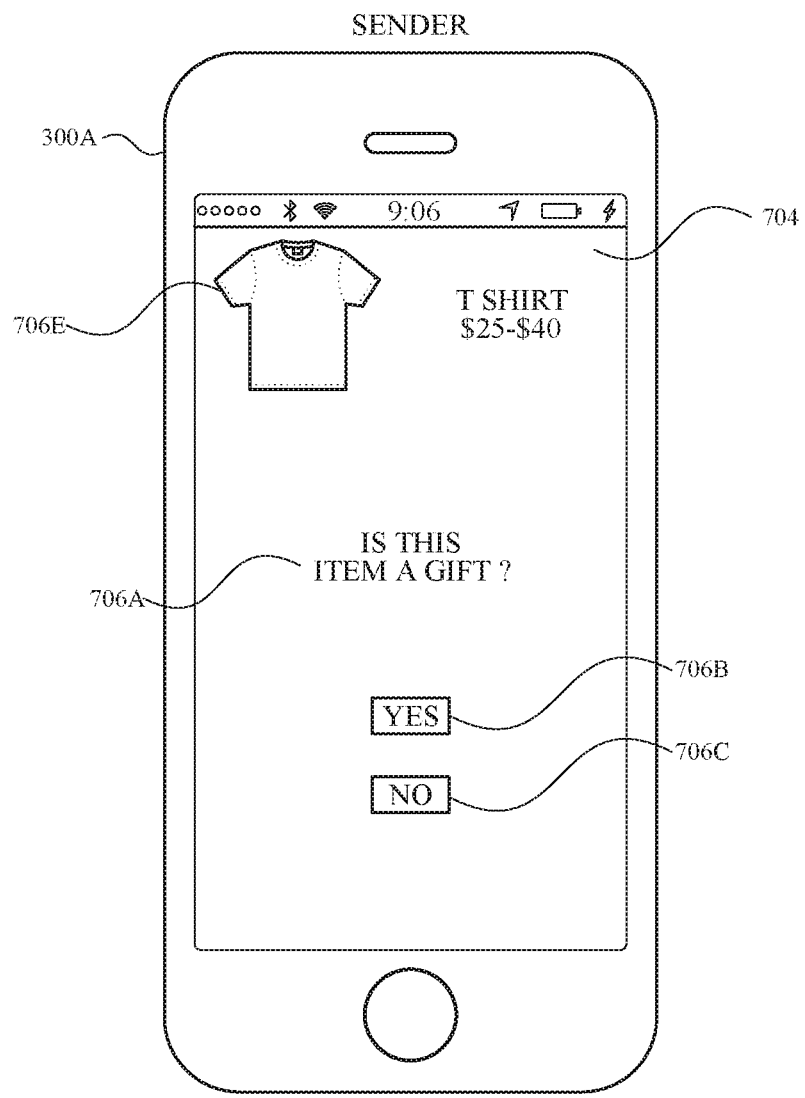
Figure 7D:
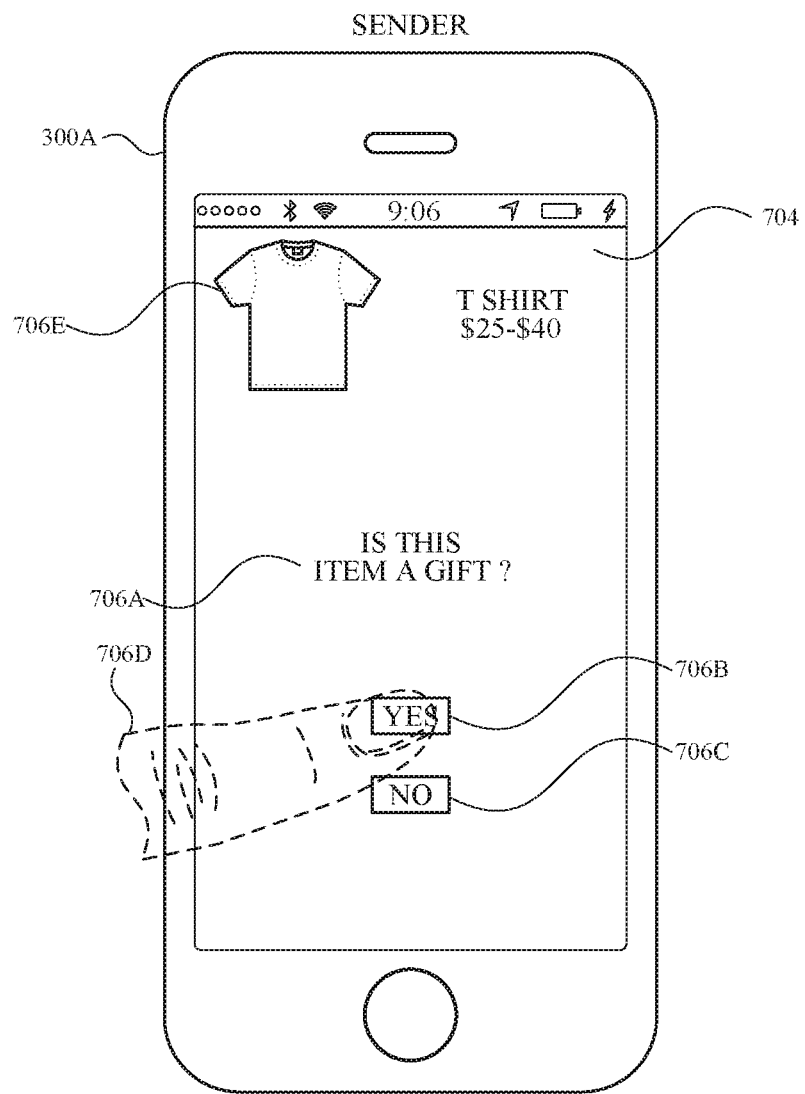

At FIGS. 7C-7D, the sender electronic device 300A determines whether the item is intended as a gift. At FIG. 7C, the sender electronic device 300A requests user input indicating whether the item is intended as a gift. The sender electronic device 300A displays, on the display, a request 706A and affordances 706B and 706C. The sender electronic device 300A also displays, on the display, an image 706E of the item. At FIG. 7D, the sender electronic device 300A receives, via the one or more input devices of the sender electronic device, input (e.g., a tap input with finger 706D) corresponding to affordance 706B, indicating that the item is intended as a gift.

Figure 7E:
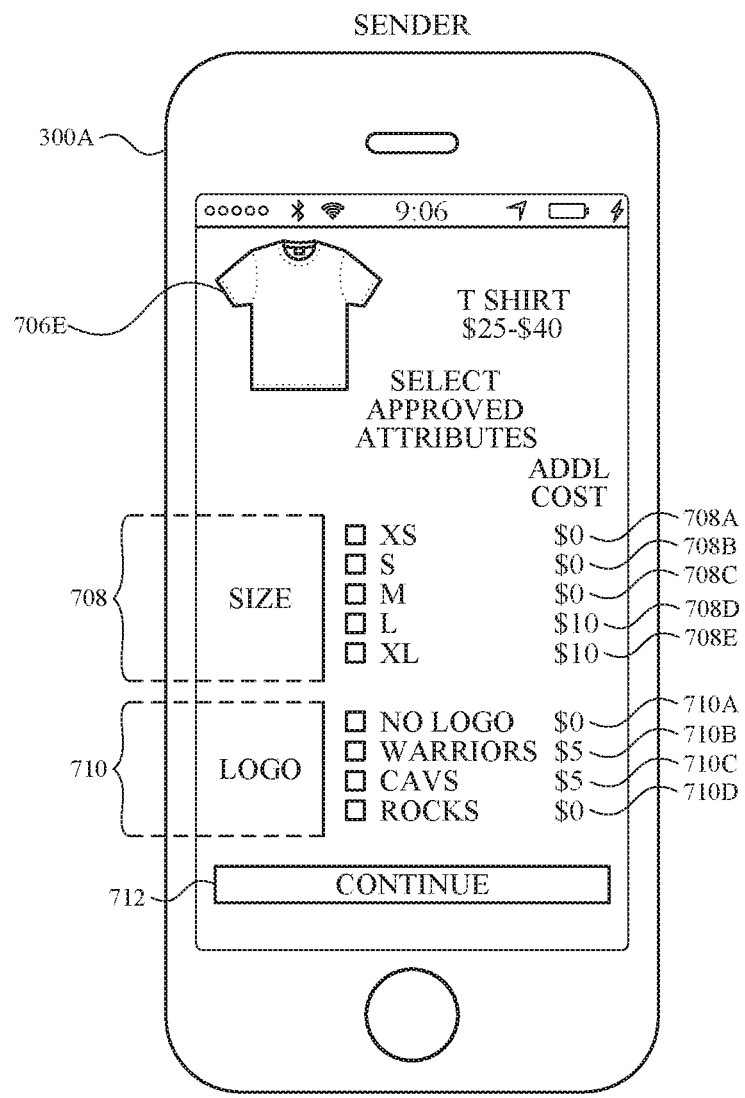
Figure 7F:
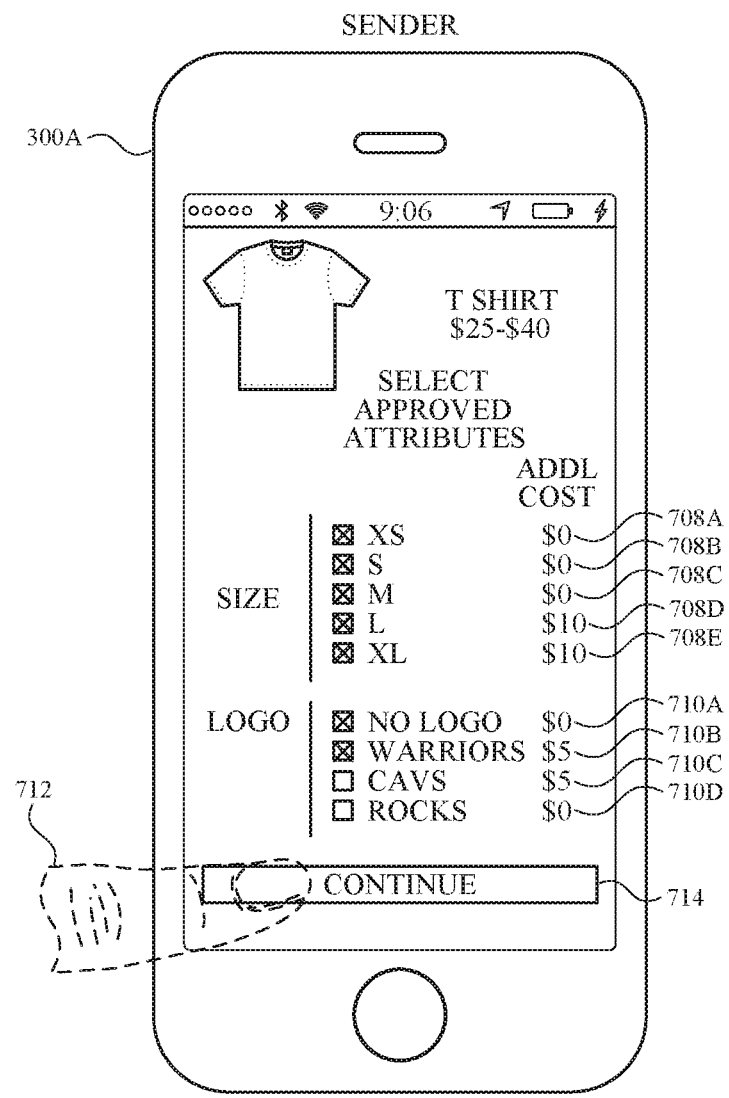

In accordance with some embodiments, at FIG. 7E, the sender electronic device 300A displays one or more configurable attributes 708 and 710 of the item. At FIG. 7F, the sender electronic device 300A receives (e.g., prior to receiving an input that is responsive to the request for authorization, and before the second user is notified of the opportunity to claim the item), via the one or more input devices of the sender electronic device, selection of one or more approved attributes 708A-708E and 710A-710B of the one or more configurable attributes 708 and 710 of the item, wherein the attributes of the one or more configurable attributes of the item affect the price (or range of price) of the item. For example, the sender electronic device 300A receives inputs corresponding to attributes and receives an input 712 at affordance 714 indicating that the user has completed selecting attributes. In this example, the sender electronic device 300A does not receive selection of attributes 710C-710D. Thus, the first user uses the sender electronic device 300A to select which attributes of the item the second user (e.g., recipient of the gift) should have the ability to configure. In accordance with some embodiments, sender electronic device 300A transmits the one or more approved attributes (or indications of the approved one or more attributes) of the one or more configurable attributes of the item (e.g., to a service, to a product fulfillment server) as part of proceeding with authorizing purchase of the item, as described in more detail below.

For this example, (e.g., prior to receiving input that is responsive to a request for authorization) the sender electronic device 300A receives selection of all sizes for the size configurable attribute and selection of only some of the logo options for the logo configurable attribute. Thus, the first user approves the item to be claimed with no logo 710A or with a Warriors logo 710B, but the item is not approved to be claim with other sports logos 710C and 710D. Accordingly, in some examples, only approved attributes of the one or more configurable attributes of the item are selectable by the second user (e.g., recipient) for claiming the item.

Figure 7G:
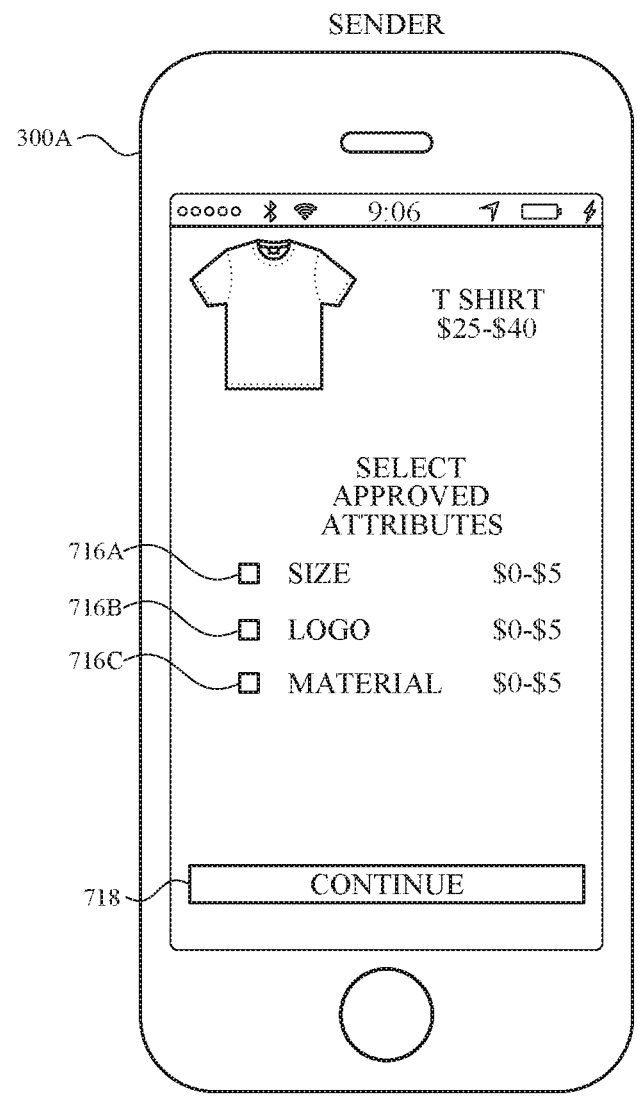
Figure 7H:
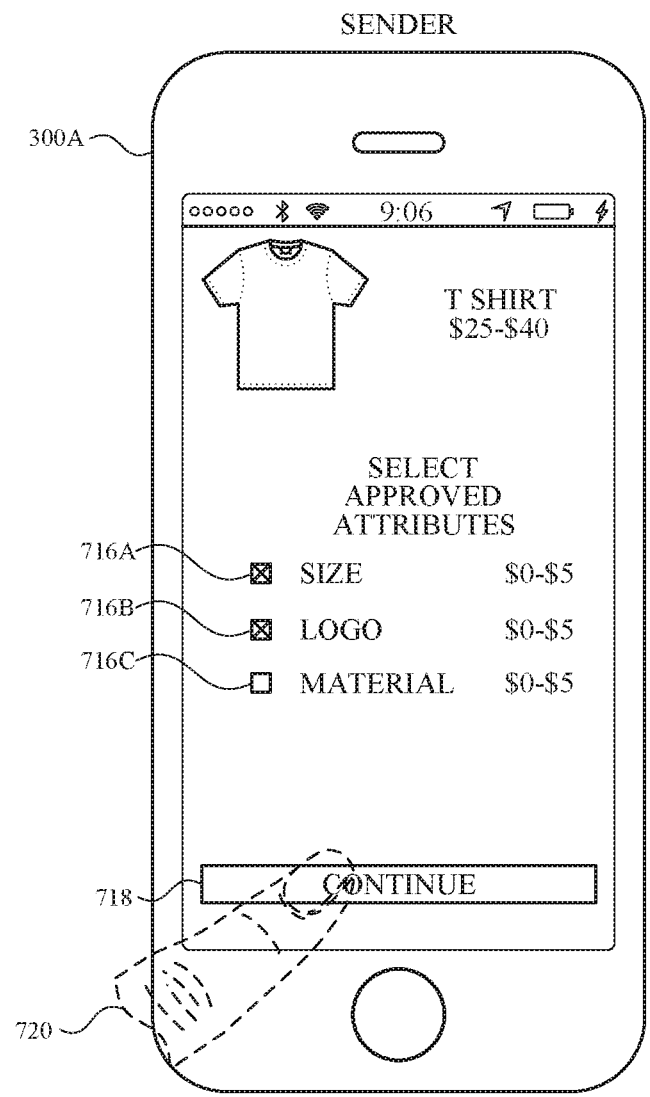

In accordance with some embodiments, at FIG. 7G, the sender electronic device 300A displays one or more configurable attributes 716A-716C of the item. At FIG. 7H, the sender electronic device 300A receives (e.g., prior to receiving an input that is responsive to the request for authorization, and before the second user is notified of the opportunity to claim the item), via the one or more input devices of the sender electronic device, selection of one or more approved attributes 716A-716B of the one or more configurable attributes 716A-716C of the item, wherein the attributes of the one or more configurable attributes of the item affect the price (or range of price) of the item. As illustrated in FIG. 7H, in this example, the sender electronic device 300A does receive selection of attributes 716A-716B. Thus, the first user uses the sender electronic device 300A to select which attributes of the item the second user (e.g., recipient of the gift) should have the ability to configure. The sender electronic device 300A receives inputs an input 720 at affordance 718 indicating that the user has completed selecting attributes. In some examples, sender electronic device 300A transmits the one or more approved attributes (or indications of the approved one or more attributes) of the one or more configurable attributes of the item (e.g., to a service, to a product fulfillment server) as part of proceeding with authorizing purchase of the item, as described in more detail below.

In accordance with some embodiments, the item has one or more configurable attributes 708-710 and selection of one or more attributes of the one or more configurable attributes of the item (e.g., selection by the second user (the recipient) affects the price of the item. Thus, in some examples, the price of the item varies based on different attributes that a second user (e.g., recipient of the gift) picks for the item.

Figure 7I:
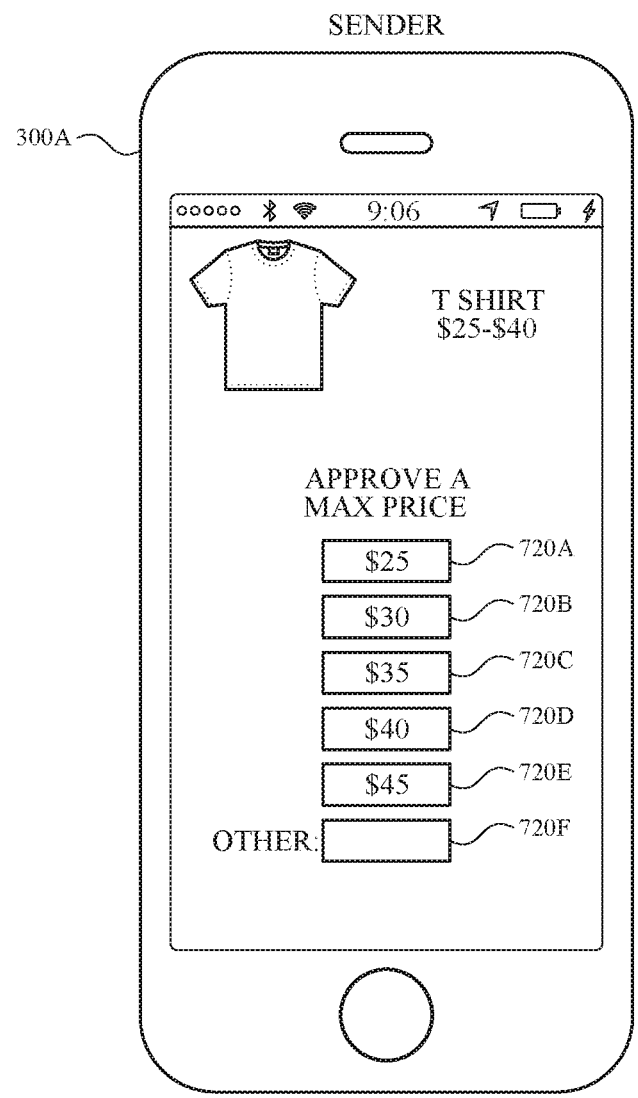
Figure 7J:
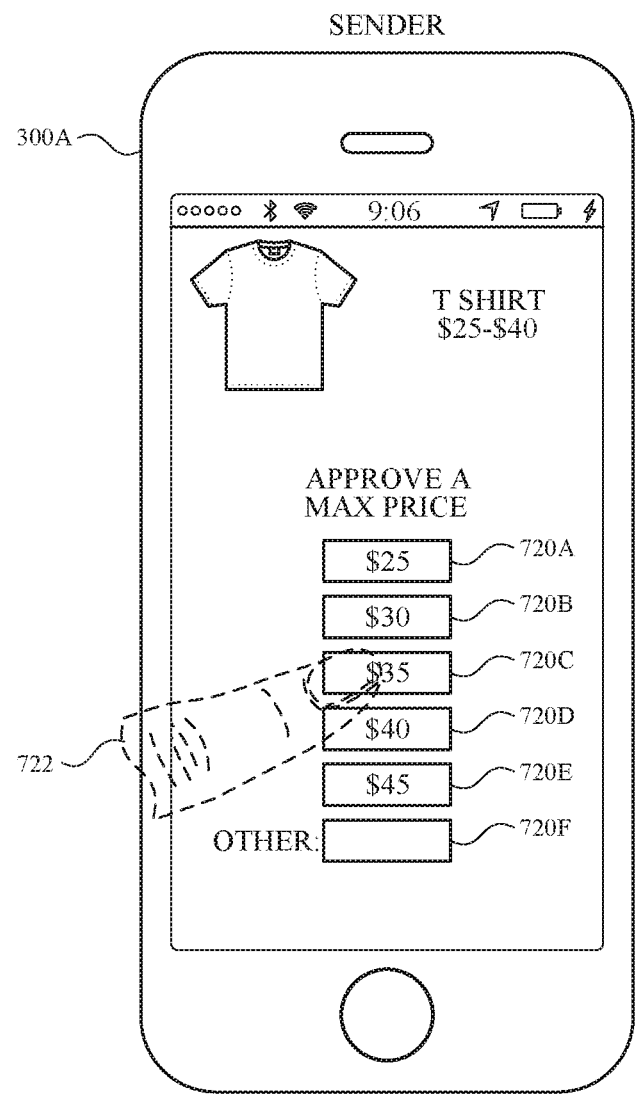

FIGS. 7I-7J illustrate receiving selection of financial parameters for the gift. At FIG. 7I, the sender electronic device 300A displays a user interface for the first user (e.g., the sender) to specify one or more financial parameters, such as a maximum price for the gift. For example, the sender electronic device 300A affordance 720A-720F for selection by the first user (e.g., the sender). At FIG. 7J, the sender electronic device 300A receives (e.g., prior to receiving input that is responsive to the request for authorization), via the one or more input devices of the sender electronic device, one or more financial parameters (e.g., an approved price point, a maximum price). For example, (e.g., prior to receiving the input that is responsive to the request for authorization) the sender electronic device 300A receives an approved price point of $35 corresponding to affordance 720C (e.g., an upper limit cost for the total price of the purchase). Thus, only attributes of the one or more configurable attributes of the item that would not cause the purchase price to exceed the upper cost limit are selectable by the second user (e.g., the recipient). In some examples, sender electronic device 300A transmits the one or more financial parameters (e.g., the approved price point, a maximum price) (e.g., to a service, to a product fulfillment server) as part of proceeding with authorizing purchase of the item. For example, the first user (e.g., the sender) specifies a maximum price for the gift is $35, and then only options that can be selected without exceeding the maximum price of $35 for the gift are displayed to the second user (e.g., the recipient). Thus, the first user allows the second user to select attributes of the item, while the first user maintains a certain level of control (e.g., control of price) over the purchase.

Figure 7K:
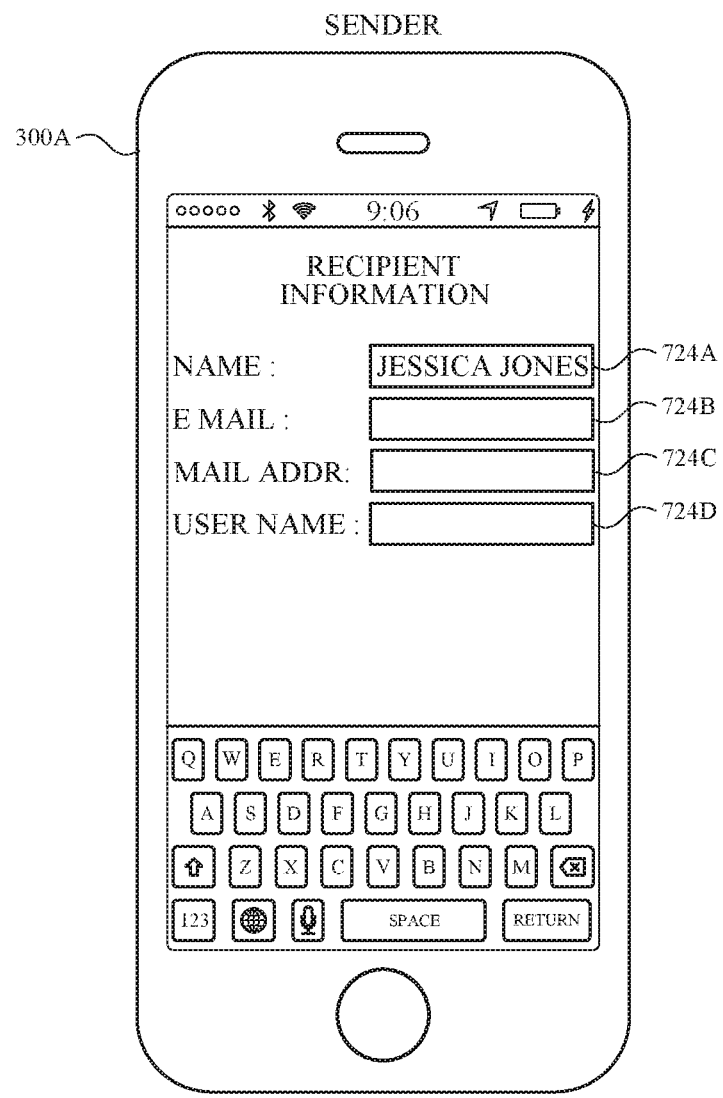

FIG. 7K illustrates an exemplary user interface for receiving recipient information for the gift. The sender electronic device 300A displays options 724A-724D for specifying a recipient of the item. For example, the sender electronic device 300A displays options for the user to specify one or more of a name (e.g., 724A), an email (e.g., 724B), a mailing address, (e.g., 724C), and a username (e.g., 724D). The sender electronic device 300A detects (e.g., prior to receiving the input that is responsive to the request for authorization), via the one or more input devices of the sender electronic device, input (e.g., name of the second user, email address of the second user, mailing address of the second user, username of the second user) specifying the second user as the recipient of the item. In some examples, the sender electronic device 300A determines (e.g., based on contextual data) whether the item is intended for a recipient other than the user of the sender electronic device. In accordance with a determination that the item is intended for a recipient other than the user of the sender electronic device 300A, the user interface (e.g., the user interface of the electronic wallet application in FIG. 7K) includes the option for specifying a recipient of the item. In accordance with a determination that the item is not intended for a recipient other than the user of the sender electronic device, the user interface does not include the option for specifying a recipient of the item. Thus, the first user (e.g., the sender) specifies details about the second user (e.g., the recipient).

Figure 7L:
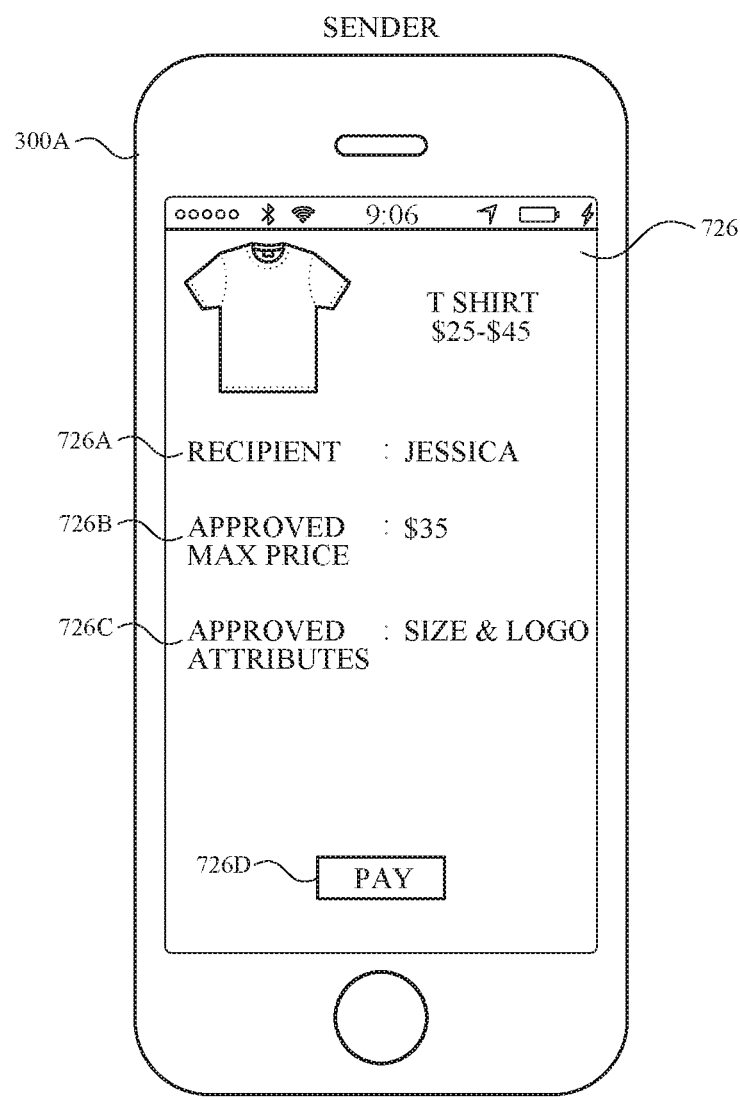
Figure 7M:
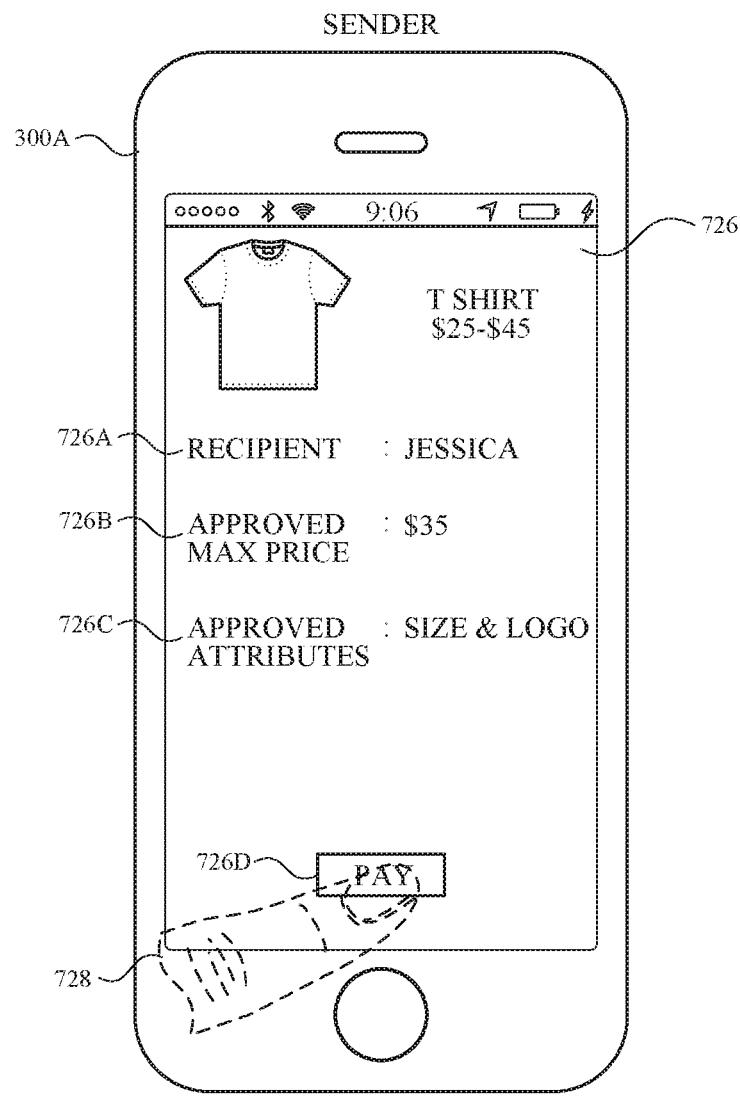

FIG. 7L illustrates an exemplary user interface for reviewing a summary 726 of the transaction. For example, the sender electronic device 300A displays the summary 726 in the second application, such as the electronic wallet application of the sender electronic device 300A, that is different from the first application (e.g., the instant messaging application 702). In some examples, the summary 726 includes one or more of: an indication 726A of the recipient's name (the second user), an indication 726B of the one or more financial parameters, such as a maximum price for the gift, an indication 726C of the approved attributes of the one or more configurable attributes of the item to be selected by the second user (e.g., recipient) for claiming the item, and an option 726D for confirming the summary 726 of the transaction. At FIG. 7K, the sender electronic device 300A receives input 728 (e.g., at a location on a touch-sensitive surface corresponding to the option 726*d*) confirming the summary 726.

Figure 7N:
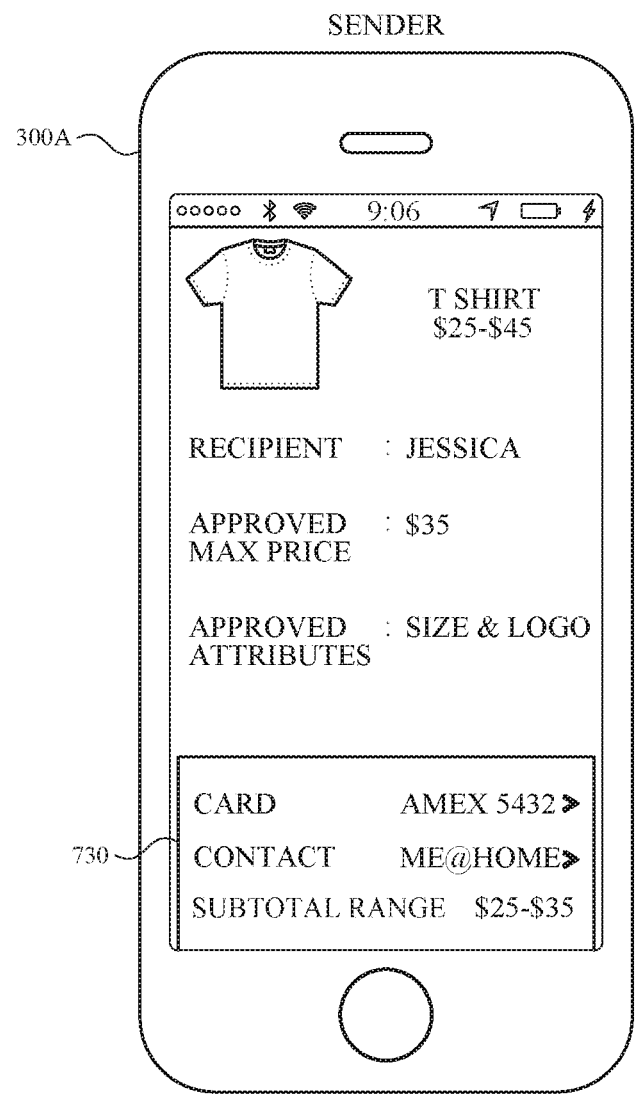
Figure 7O:
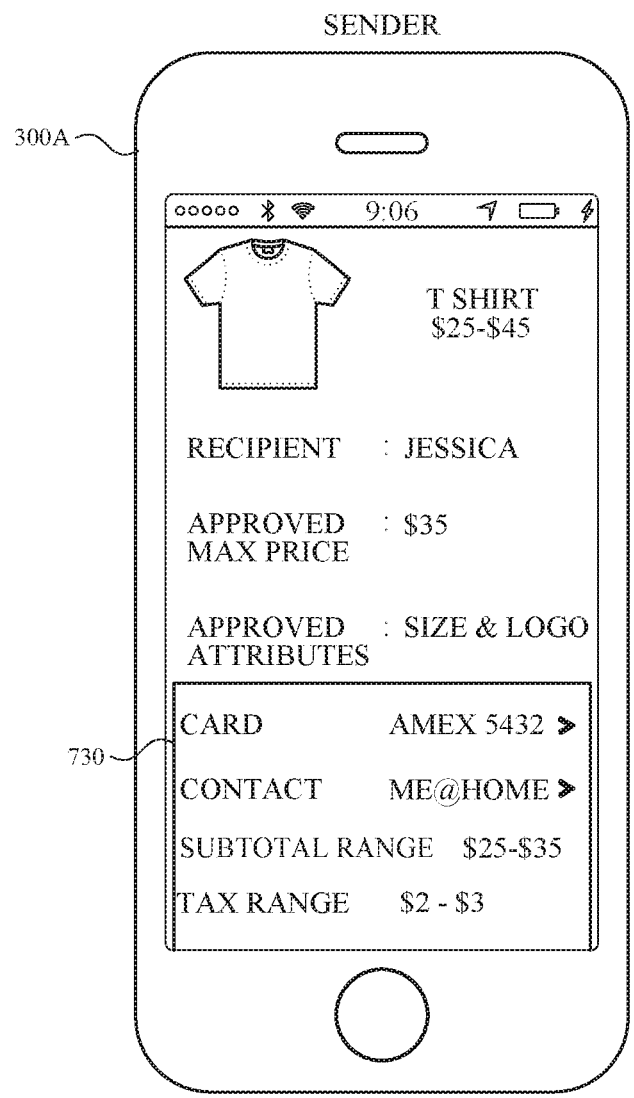
Figure 7P:
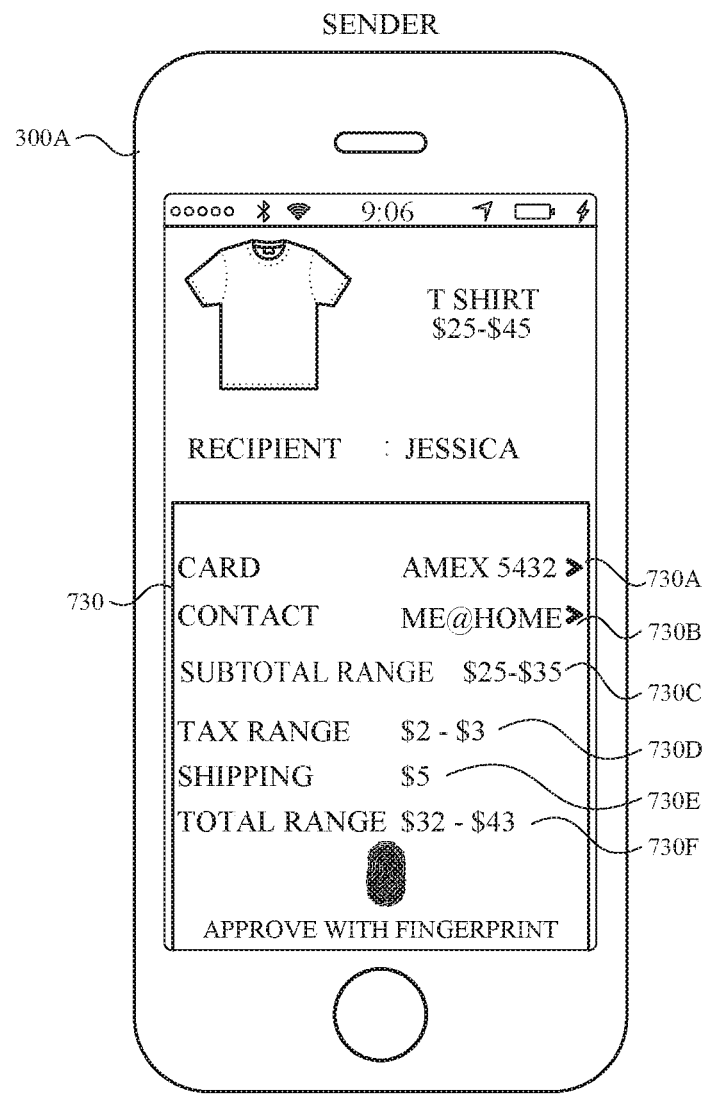

At FIGS. 7N-7Q, the sender electronic device 300A displays a user interface for requesting authorization for payment (e.g., in response to receiving input 728 confirming the summary 726). The sender electronic device 300A displays request 730 for authorization of payment for at least a portion of (e.g., or purchase by paying the total price of) the item for the second user (e.g., a recipient) that is different from the first user (e.g., the sender). For example, sender electronic device 300A displays the request 730 in the second application, such as the electronic wallet application of the sender electronic device 300A, that is different from the first application (e.g., the instant messaging application 702). In some examples, the request 730 slides into view on the display, such as from the bottom of the display as illustrated in FIGS. 7N-7P. In some examples, the request 730 includes one or more of: an indication 730A of a payment account of the electronic wallet application of the sender electronic device 300A, contact information 730B for the first user (e.g., the sender), a subtotal range 730C for the item, a tax range 730D for the item, a shipping cost (e.g., estimated shipping cost) 730E, and a total price or total price range 730F. In some examples, the contact information 730B is automatically populated using information received from a phonebook application of the sender election device 300A. In some examples, the first user can activate indication 730A to select a different payment account of the electronic wallet application for use in making the payment for the gift.

Figure 7Q:
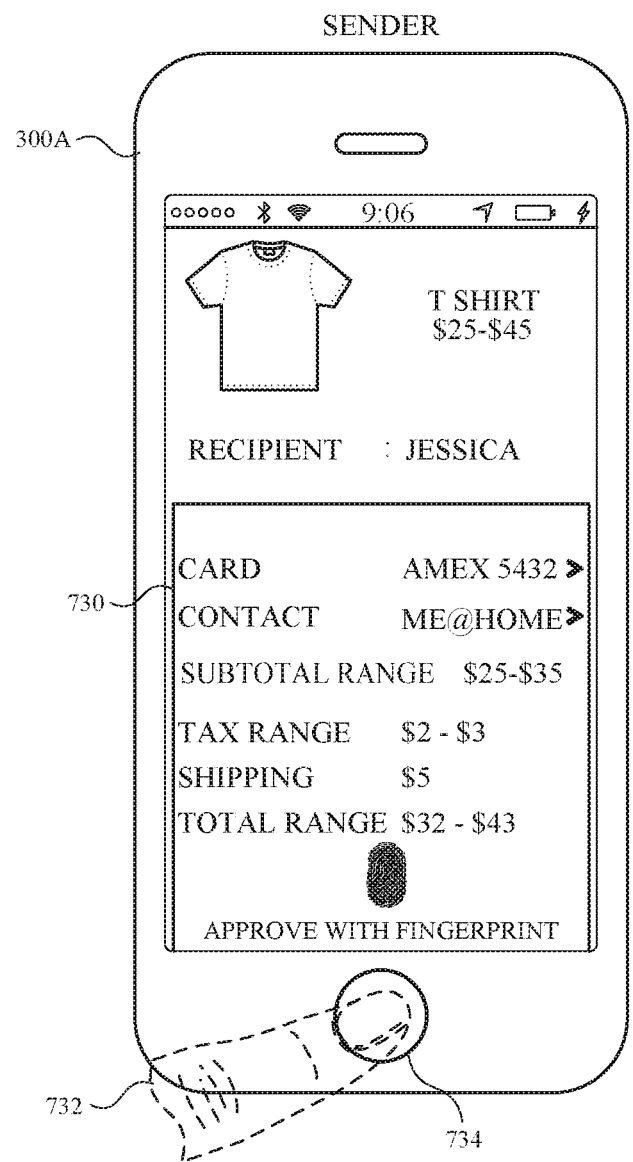

At FIG. 7Q, the sender electronic device 300A receives an input that is responsive to the request for authorization to purchase the item. In the example of FIG. 7Q, authorization to purchase the item includes the sender electronic device 300A detecting, using fingerprint sensor 734, a fingerprint of finger 732, the fingerprint being determined to be consistent with an enrolled fingerprint that is enabled to authorize purchasing the item. For example, the sender electronic device 300A stores information about one or more fingerprints of the first user to use for determining whether a respective fingerprint is enabled to authorize purchasing the item. In some examples, receiving authorization to purchase the item includes receiving a passcode via a touch-sensitive surface of the sender electronic device, the passcode being determined to be consistent with an enrolled passcode that is enabled to authorize the payment transaction. In some examples, authorization to purchase the item includes receiving a double-press of a mechanical button while the device is in an unlocked state (and optionally, while the device has been continuously on a user's wrist since the device was unlocked by providing authentication credentials to the device, where the continuous presence of the device on the user's wrist is determined by periodically checking that the device is in contact with the user's skin).

In response to receiving the input that is responsive to the request for authorization to purchase the item, in accordance with a determination that the input that is responsive to the request for authorization is consistent with input that is enabled to authorize purchase of the item, the sender electronic device 300A proceeds with authorizing payment for at least a portion of the item. In some examples, the sender electronic device transmits payment information (e.g., to the merchant, to a payment processor) as part of authorizing payment. For example, the payment information includes a payment account number or a credit card number. In accordance with a determination that the input that is responsive to the request for authorization is not consistent with an enrolled passcode or fingerprint (respectively) that is enabled to authorize purchasing the item, the sender electronic device does not proceed with authorizing purchase of the item.

Figure 7R:

At FIG. 7R, in accordance the determination that the input that is responsive to the request for authorization is consistent with input that is enabled to authorize purchase of the item, the sender electronic device 300A displays, on the display, indication 736 that the payment was successful.

Figure 7S:
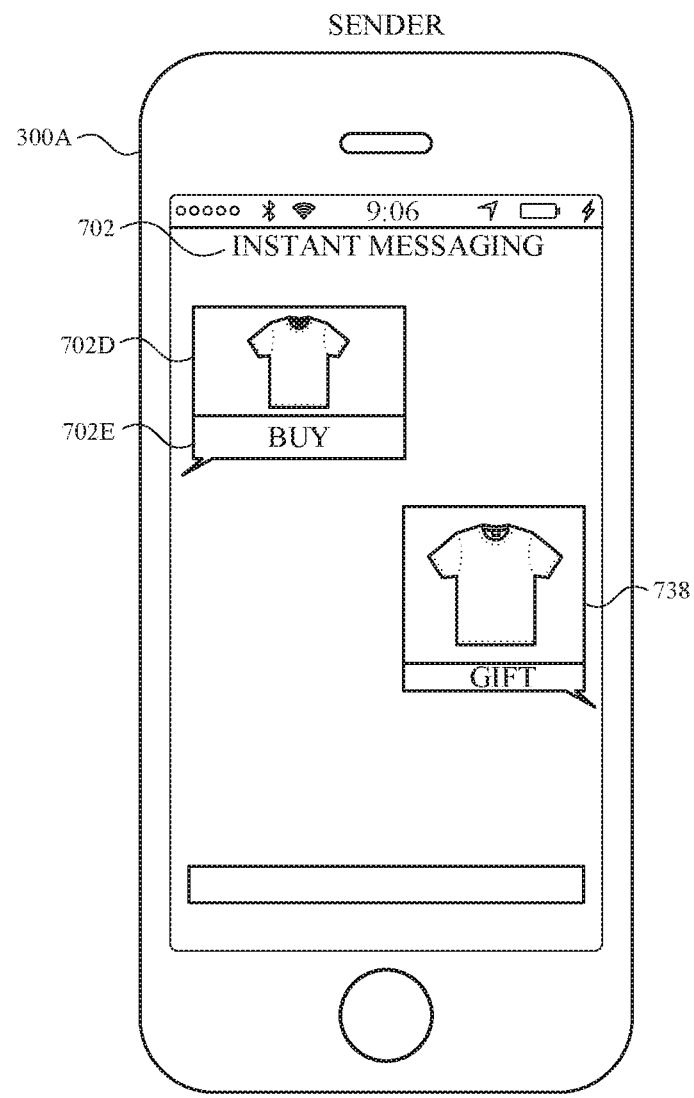

At FIG. 7S, in accordance the determination that the input that is responsive to the request for authorization is consistent with input that is enabled to authorize purchase of the item (or in response to proceeding with authorizing payment for at least a portion of the item), the sender electronic device 300A transmits (e.g., to the recipient device) an indication that the item has been gifted to the second user by the first user (e.g., by transmitting information identifying the item for which payment has been authorized). In some examples, the electronic device 300A transmits a message 738 using the first application (e.g., the instant messaging application 702) to the recipient electronic device indicating that the item has been gifted to the second user by the first user. For the example, the conversation of FIG. 7S is between the first user and the second user and the location and/or orientation of the messages indicate the source of the message. As described with reference to 9A-9P and 10A-10C, the second user (e.g., the recipient) can initiate a process to claim the item.

Figure 7T:
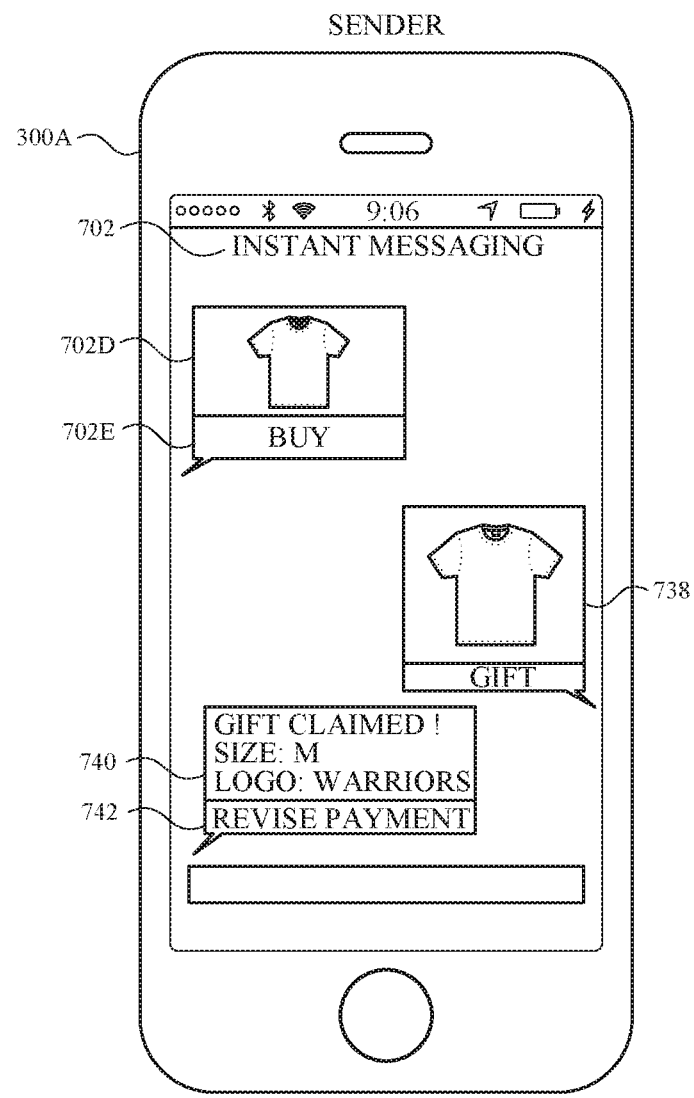

At FIG. 7T, the sender electronic device 300A notifies the first user (e.g., sender) that the second user (e.g., recipient) has accepted the item. Subsequent to proceeding with authorizing purchase of the item, sender electronic device 300A receives information identifying that the second user has initiated a process for obtaining the item with one or more selected attributes. The sender electronic device 300A displays (e.g., in response to receiving the information identifying that the second user has initiated the process for obtaining the item), on the display, (e.g., based on the information identifying that the second user has initiated the process for obtaining the item): an indication 740 that the second user has initiated a process for obtaining the item, and indications 740 of at least some (or all) of the one or more attributes selected by the second user (e.g., the recipient). In some examples, the indications 740 are displayed in the first application (e.g., the instant messaging application 702). In some examples, the indications are displayed in the second application (e.g., the electronic wallet application). In some examples, the indication 740 that the second user has initiated the process for obtaining the item is displayed in an instant messaging application 702. In some examples, the indications of the at least some (or all) of the one or more selected attributes are displayed in the instant messaging application 702. In some examples, the sender electronic device 300A concurrently displays the indication that the second user has initiated the process for obtaining the item and indications of at least some (or all) of the one or more selected attributes in the instant messaging application.

Figure 7U:
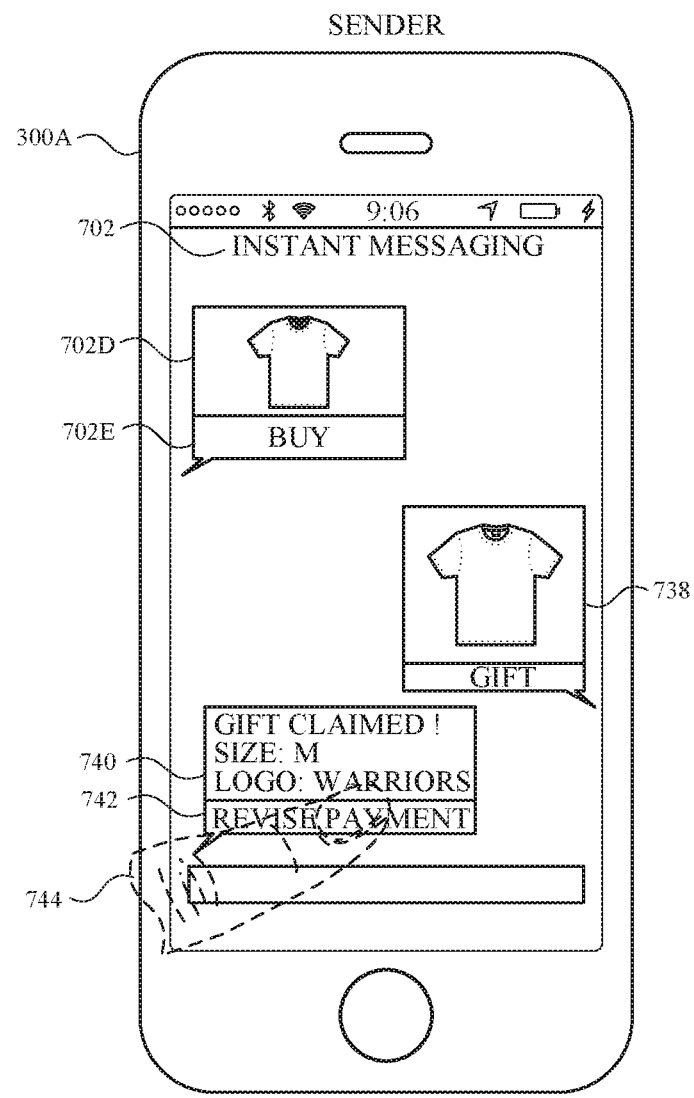

At FIG. 7T, the sender electronic device 300A optionally also displays an indication (or affordance) 742 that the item claimed by the second user does not conform to the one or more financial parameters (e.g., in accordance with a determination that the information identifying that the second user has initiated the process for obtaining the item indicates that the item claimed by the second user does not conform to the one or more financial parameters). At FIG. 7U, the sender electronic device 300A detects a user input (e.g., via finger 744 activating the indication (or affordance) 742) to authorize payment for the item claimed by the second user. Thus, if the second user selects attributes that cause the price of the item to exceed the maximum price specified by the first user (e.g., via the one or more financial parameters), the first user is notified and can take actions to update the payment to cover the cost of the item claimed that does not conform to the one or more financial parameters.

Figure 7V:
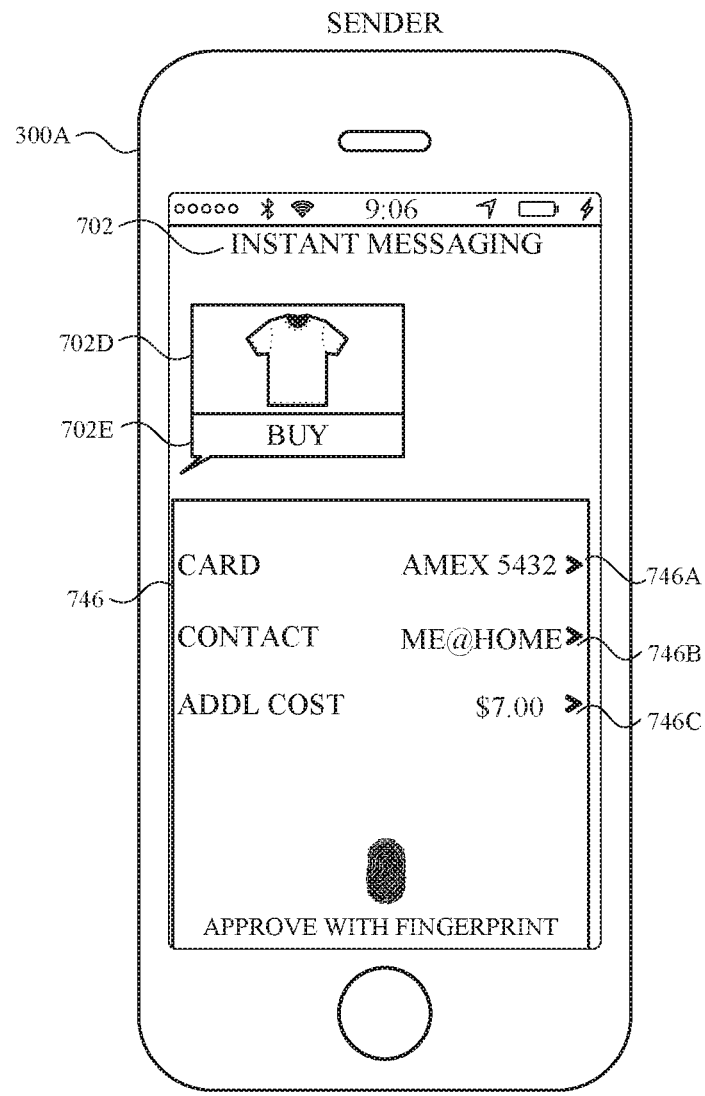
Figure 7W:
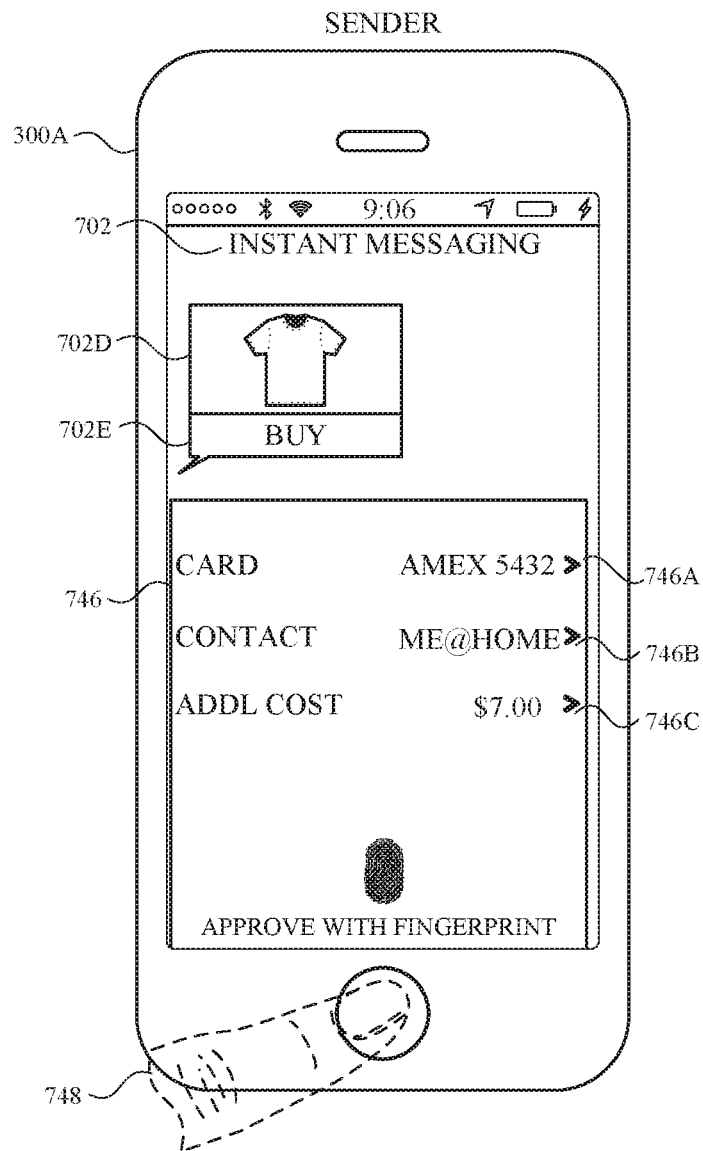
Figure 7X:
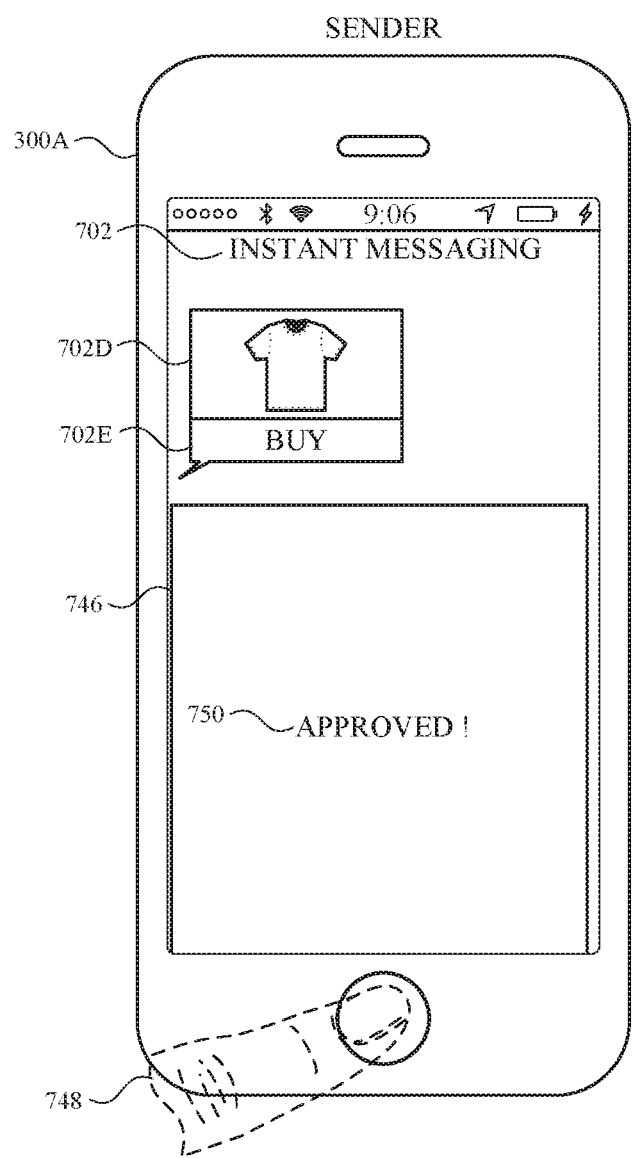

At FIGS. 7V-7X, the sender electronic device 300A provides the first user (e.g., the sender) an opportunity to take actions to update the payment to cover the cost of the item claimed that does not conform to the one or more financial parameters. At FIGS. 7V-7W, subsequent to receiving information identifying that the second user has initiated the process for obtaining the item and in accordance with a determination that the item does not conform to the one or more financial parameters, (and/or in response to detecting activation of the indication 742) the sender electronic device 300A displays a second request for authorization (e.g., from the first user) of payment for at least a second portion of the item for a second user (e.g., a recipient) in, for example, a user interface 746 of the second application (e.g., the electronic wallet application). In some examples, the second request for authorization of payment identifies a payment account 746A for making the additional payment, contact information 746B for the first user (e.g., sender), and the additional cost 746C of the item claimed.

At FIG. 7W, the sender electronic device 300A receives a second input (e.g., fingerprint of finger 748 of the first user, user authentication information, a passcode) that is responsive to the second request for authorization to purchase the item. In some examples, receiving authorization to purchase (or pay for the second portion of) the already claimed item includes receiving a passcode via a touch-sensitive surface of the sender electronic device, the passcode being determined to be consistent with an enrolled passcode that is enabled to authorize the payment transaction. In some examples, authorization to purchase the already claimed item includes detecting a fingerprint, the fingerprint being determined to be consistent with an enrolled fingerprint that is enabled to authorize purchasing the item. For example, the sender electronic device stores information about one or more fingerprints of the user to use for determining whether a respective fingerprint is enabled to authorize purchasing the item. In some examples, authorization to purchase the already claimed item includes receiving a double-press of a mechanical button while the sender electronic device is in an unlocked state (and optionally, while the device has been continuously on a user's wrist (such as when the sender electronic device is a watch) since the device was unlocked by providing authentication credentials to the device, where the continuous presence of the device on the user's wrist is determined by periodically checking that the device is in contact with the user's skin).

At FIG. 7X, in response to receiving the second input that is responsive to the second request and in accordance with a determination that the second input that is responsive to the second request is consistent with input that is enabled to authorize purchase of the item, the sender electronic device 300A proceeds with authorizing payment for at least the second portion of the item and, optionally, the sender electronic device 300A displays an indication 750 (e.g., tin the second application, such as the electronic wallet application) that the authorization was successful. In some examples, the sender electronic device transmits payment information (e.g., to the merchant, to a payment processor) as part of authorizing payment for at least the second portion of the item (or again for the item). For example, the payment information includes a payment account number or a credit card number. In accordance with a determination that the second input that is responsive to the second request for authorization is not consistent with an enrolled passcode or fingerprint (respectively) that is enabled to authorize purchasing the item, the sender electronic device 300A does not proceed with authorizing purchase of the item.

In accordance with some embodiments, the payment is processed when the notification is sent. For example, the payment for at least the portion of the item is processed (e.g., by a merchant, using the payment account) in accordance with (or in response to, subsequent to) the sender electronic device 300A authorizing payment for at least the portion of the item.

In accordance with some embodiments, the payment is processed when the notification is sent, but the payment is refunded if the second user does not claim the item. For example, the processed payment for at least the portion of the item is refunded (e.g., by the merchant, to the payment account) in accordance with (or in response to, subsequent to) the second user not claiming the item within a predetermined time (e.g., one week, one month) after the sender electronic device authorizes payment for at least the portion of the item.

FIGS. 8A-8C is a flow diagram illustrating a method for managing contextual transactions using an electronic device in accordance with some embodiments. Method 800 is performed at a sender electronic device (e.g., 100, 300, 500) with a display and one or more input devices, wherein the sender electronic device is associated with a first user (e.g., a sender of a gift). Some operations in method 800 are, optionally, combined, the order of some operations are, optionally, changed, and some operations are, optionally, omitted.

As described below, method 800 provides an intuitive way for managing contextual transactions. The method reduces the cognitive burden on a user for both managing a contextual payment and participating in a transaction for a gift, thereby creating a more efficient human-machine interface. For battery-operated computing devices, enabling a user to manage a contextual transaction faster and more efficiently conserves power and increases the time between battery charges.

At block 802, the sender electronic device displays, on the display, graphical representations (e.g., 702D, 702E, a name, a description, an image) of one or more items.

At block 804, the sender electronic device receives, via the one or more input devices of the sender electronic device, input (e.g., 702F) corresponding to selection of an item (e.g., the shirt depicted in 702D, a tangible good, an intangible good, or a service) from among the one or more of items. In some examples, a graphical representation of the item and graphical representations of one or more configurable attributes of the item are concurrently displayed, on the display. In some examples, an item (e.g., the shirt depicted in 702D) is displayed in an instant message conversation (e.g., the conversation in instant messaging application 702) between the first user and a second user, with a displayed purchase affordance (e.g., 702E, as described in greater detail below with reference to FIGS. 12A-12I and 13.

At block 806, in accordance with some embodiments, the sender electronic device receives (e.g., prior to receiving the input that is responsive to the request for authorization), via the one or more input devices of the sender electronic device, one or more financial parameters (e.g., an approved price point, a maximum price). For example, (e.g., prior to receiving the input that is responsive to the request for authorization) the sender electronic device receives an approved price point (e.g., 720C, an upper limit cost for the total price of the purchase). Thus, only attributes of the one or more configurable attributes of the item that would not cause the purchase price to exceed the upper cost limit (e.g., $35) are selectable by the recipient. In some examples, attributes that would cause the purchase price to exceed the approved price point are displayed for the recipient, but are not selectable. In some examples, attributes that would cause the purchase price to exceed the approved price point (e.g., $35) are not displayed for the recipient (e.g., the device foregoes displaying) and are not selectable. In some embodiments, proceeding with authorizing purchase of the item includes transmitting the one or more financial parameters (e.g., the approved price point, a maximum price) (e.g., to a service, to a product fulfillment server). For example, the first user can specify (e.g., by activing affordance 720C) that a maximum price for the gift is $35, and then only options that can be selected without exceeding the maximum price for the gift are displayed to the second user on the recipient electronic device.

At block 808, in accordance with some embodiments, the sender electronic device receives (e.g., prior to receiving the input that is responsive to the request for authorization, and before the second user is notified of the opportunity to claim the item), via the one or more input devices of the sender electronic device, selection of one or more approved attributes (e.g., 708A-708E, 710A-710B) of the one or more configurable attributes of the item, wherein attributes of the one or more configurable attributes of the item affect the price of the item. In accordance with some embodiments, proceeding with authorizing purchase of the item includes transmitting the one or more approved attributes of the one or more configurable attributes of the item (e.g., to a service, to a product fulfillment server). In some examples, (e.g., prior to receiving the input that is responsive to the request for authorization) the sender electronic device receives selection of one or more approved attributes (e.g., 708A-708E, 710A-710B, 716A, 716B) of the one or more configurable attributes of the item (e.g., small/medium is approved for size, but large is not approved; item with a particular sports logo is approved for design, but the item with other sports logos is not approved). Thus, only approved attributes (e.g., 708A-708E, 710A-710B, 716A, 716B) of the one or more configurable attributes of the item are selectable by the second user (e.g., the recipient) at the recipient electronic device. As a result, the first user can provide user input limiting the scope of the gift, while still enabling the second user to provide user input customizing the gift. In some examples, approved attributes are displayed for the recipient at the recipient electronic device, but are not selectable. In some examples, unapproved attributes are not displayed for the recipient (e.g., the recipient electronic device foregoes displaying) and are not selectable.

At block 810, the sender electronic device displays, on the display, a request (e.g., 730) for authorization of payment for at least a portion of (e.g., or purchase by paying the total price of) the item for a second user (e.g., a recipient) different from the first user. For example, the item is being purchased by the first user as a gift for the second user.

At block 812, the sender electronic device receives, via the one or more input devices of the sender electronic device (e.g., a fingerprint sensor 734 of the sender electronic device 300A), an input (e.g., fingerprint of finger 732, user authentication information, a fingerprint, a passcode) that is responsive to the request (e.g., 730) for authorization to purchase the item. In accordance with some embodiments, receiving authorization to purchase the item includes receiving a passcode via a touch-sensitive surface of the sender electronic device, the passcode being determined to be consistent with an enrolled passcode that is enabled to authorize the payment transaction. In accordance with some embodiments, authorization to purchase the item includes detecting a fingerprint, the fingerprint being determined to be consistent with an enrolled fingerprint that is enabled to authorize purchasing the item. For example, the sender electronic device 300A stores information about one or more fingerprints of the first user to use for determining whether a respective fingerprint is enabled to authorize purchasing the item. In accordance with some embodiments, authorization to purchase the item includes receiving a double-press of a mechanical button while the device is in an unlocked state (and optionally, while the device has been continuously on a user's wrist since the device was unlocked by providing authentication credentials to the device, where the continuous presence of the device on the user's wrist is determined by periodically checking that the device is in contact with the user's skin).

At block 814, in response to receiving the input (e.g., fingerprint of finger 732) that is responsive to the request (e.g., 730) for authorization to purchase the item and in accordance with a determination that the input (e.g., fingerprint of finger 732) that is responsive to the request (e.g., 730) for authorization is consistent with input that is enabled to authorize purchase of the item, proceeding with authorizing payment for at least a portion of the item. In accordance with some embodiments, the sender electronic device transmits payment information (e.g., to the merchant, to a payment processor) as part of authorizing payment for at least a portion of the item. For example, the payment information includes a payment account number or a credit card number. In some examples, in accordance with a determination that the input that is responsive to the request for authorization is not consistent with an enrolled passcode or fingerprint (respectively) that is enabled to authorize purchasing the item, the sender electronic device does not proceed with authorizing purchase of the item. The one or more attributes (e.g., large for size, blue for color, long-sleeve for style) of one or more configurable attributes of the item are configured to be selected by the second user prior to the second user submitting a request to claim the item.

At block 816, in accordance with some embodiments, in accordance the determination that the input (e.g., fingerprint of finger 732) that is responsive to the request for authorization is consistent with input that is enabled to authorize purchase of the item (or in response to proceeding with authorizing payment for at least a portion of the item), the sender electronic device transmits (e.g., to the recipient device) an indication that the item has been gifted to the second user by the first user. In accordance with the determination that the input that is response to the request for authorization is not consistent with input that is enabled to authorize purchase of the item, the sender electronic device forgoes transmitting (e.g., to the recipient device) the indication that the item has been gifted to the second user by the first user.

In accordance with some embodiments, the sender electronic device displays an option (e.g., 724A-724D) for specifying a recipient of the item (e.g., by username 724D, phone number, email address 724B, mailing address 724C, name 724A). The sender electronic device detects (e.g., prior to receiving the input that is responsive to the request for authorization), via the one or more input devices of the sender electronic device, input (e.g., username of the second user, phone number of the second user, email address of the second user) specifying the second user as the recipient of the item. In some examples, the sender electronic device determines (e.g., based on contextual data) whether the item is intended for a recipient other than the user of the sender electronic device. In accordance with a determination that the item is intended for a recipient other than the user of the sender electronic device (e.g., other than the first user), the user interface (e.g., as illustrated in FIG. 7K) of the electronic wallet application includes the option for specifying a recipient of the item. In accordance with a determination that the item is not intended for a recipient other than the user of the sender electronic device, the user interface of the electronic wallet application does not include the option for specifying a recipient of the item.

In accordance with some embodiments, the item has one or more configurable attributes and selection of one or more attributes of the one or more configurable attributes of the item affect the price of the item. Thus, the price of the item varies as the second user (e.g., recipient) selects attributes for the item at the recipient electronic device.

At block 818, in accordance with some embodiments, subsequent to proceeding with authorizing purchase of the item, the sender electronic device receives, at block 820, information identifying that the second user has initiated a process for obtaining the item with one or more selected attributes, and displays, at block 822, (e.g., in response to receiving the information identifying that the second user has initiated the process for obtaining the item) (e.g., concurrently), on the display (e.g., based on the information identifying that the second user has initiated the process for obtaining the item): an indication (e.g., 740) that the second user has initiated a process for obtaining the item, and indications (e.g., 740) of at least some (or all) of the one or more selected attributes.

In accordance with some embodiments, subsequent to receiving information identifying that the second user has initiated the process for obtaining the item, and in accordance with a determination that the item does not conform to the one or more financial parameters: the sender electronic device displays a second request (e.g., 746) for authorization of payment for at least a second portion of the item for a second user (e.g., a recipient), the sender electronic device receives a second input (e.g., fingerprint of finger 748, user authentication information, a fingerprint, a passcode) that is responsive to the second request for authorization to purchase the item. As a result, the sender electronic device informs the first user that the second user attempted to claim an item outside the scope of the originally intended gift, and enables the first user to provide user input to pay for the claimed item that is outside the scope of the originally intended gift. In some examples, receiving authorization to purchase the item includes receiving a passcode via a touch-sensitive surface of the sender electronic device, the passcode being determined to be consistent with an enrolled passcode that is enabled to authorize the payment transaction. In some examples, authorization to purchase the item includes detecting a fingerprint, the fingerprint being determined to be consistent with an enrolled fingerprint that is enabled to authorize purchasing the item. For example, the device stores information about one or more fingerprints of the user to use for determining whether a respective fingerprint is enabled to authorize purchasing the item. In some examples, authorization to purchase the item includes receiving a double-press of a mechanical button while the device is in an unlocked state (and optionally, while the device has been continuously on a user's wrist since the device was unlocked by providing authentication credentials to the device, where the continuous presence of the device on the user's wrist is determined by periodically checking that the device is in contact with the user's skin). In response to receiving the second input (e.g., fingerprint of finger 748, user authentication information, a fingerprint, a passcode), in accordance with a determination that the second input that is responsive to the second request for authorization is consistent with input that is enabled to authorize purchase of the item, the sender electronic device proceeds with authorizing payment for at least the second portion of the item. In accordance with a determination that the second input that is responsive to the second request for authorization is not consistent with an enrolled passcode or fingerprint (respectively) that is enabled to authorize purchasing the item, the sender electronic device 300A does not proceed with authorizing purchase of the item.

At block 824, in accordance with some embodiments, the indication (e.g., 740) that the second user has initiated the process for obtaining the item is displayed in an instant messaging application (e.g., instant messaging application 702). In some examples, the indications (e.g., 740) of the at least some (or all) of the one or more selected attributes are displayed in the instant messaging application (e.g., instant messaging application 702). In some examples, the sender electronic device concurrently displays the indication (e.g., 740) that the second user has initiated the process for obtaining the item and indications (e.g., 740) of at least some (or all) of the one or more selected attributes in the instant messaging application (e.g., instant messaging application 702). As a result, the sender electronic device informs the first user about the details of the item that the second user (e.g., the recipient) has claimed. Therefore, the first user knows the details of the gift given to the second user. By displaying the indication (e.g., 740) in the messaging application, the sender electronic device provides the first user with additional context for the gift, such as who the recipient of the gift is, when they claimed the gift, etc.

In accordance with some embodiments, the payment for the item is processed after second user (e.g., the recipient) claims the gifted item. In accordance with some embodiments, the payment for at least the portion of the item is processed (e.g., by a merchant, using the payment account) in response to (or subsequent to) the second user submitting the request to claim the item.

In accordance with some embodiments, the payment for the item is processed when the notification (e.g., 738) is sent. In some embodiments, the payment for at least the portion of the item is processed (e.g., by a merchant, using the payment account) in accordance with (or in response to, subsequent to) the sender electronic device authorizing payment for at least the portion of the item. In some examples, the sender electronic device transmits payment information (e.g., to the merchant, to a payment processor) as part of authorizing payment for at least the portion of the item.

In accordance with some embodiments, the payment is processed when the notification is sent, but is refunded if the second user does not claim the item. For example, the processed payment for at least the portion of the item is refunded (e.g., by the merchant) in accordance with (or in response to, subsequent to) the second user not claiming the item within a predetermined time (e.g., one week, one month) after the sender electronic device authorizes payment for at least the portion of the item.

Note that details of the processes described above with respect to method 800 (e.g., FIGS. 7A-7X and FIG. 8A-8C) are also applicable in an analogous manner to the methods described below. For example, methods 1000 and 1300 optionally include one or more of the characteristics of the various methods described above with reference to method 800. For example, the first user uses the sender electronic device to purchase a gift for the second user. The second user uses the recipient electronic device to claim the gift. For brevity, these details are not repeated below.

FIGS. 9A-9P illustrate exemplary user interfaces for managing contextual transactions, in accordance with some embodiments. The user interfaces in these figures are used to illustrate the processes described below, including the processes in FIGS. 10A-10C.

FIGS. 9A-9P illustrate an exemplary recipient electronic device (e.g., 300B, 100, 300, 500) associated with a second user (e.g., a recipient). The recipient electronic device 300B includes a display and one or more input devices. The one or more input devices of the recipient electronic device 300B optionally include a touch-sensitive surface, such as incorporated into the display.

At FIG. 9A, the recipient electronic device 300B displays a user interface for an instant messaging application 902, including a conversation between two participants. For example, the conversation is between the first user and the second user and the location and/or orientation of the messages indicate the source of the message (e.g., originating from the first user or the second user).

The recipient electronic device 300B receives (e.g., from the sender electronic device 300A) information identifying an item (e.g., a gifted item, such as a tangible good, an intangible good, or a service) for which payment has been authorized by the sender electronic device (e.g., 300A) associated with a first user (e.g., a sender) that is different from the second user, the item selected from among one or more (or a plurality of) items based on input received from the sender electronic device (e.g., 300A).

In accordance with some embodiments, in response to receiving the information identifying the item, the recipient electronic device 300B displays, on the display, an indication 902A of the information identifying the item. In some examples, the recipient electronic device 300B displays a graphical indication 902A of the information identifying the item for which payment has been authorized in an instant messaging application 902 of the recipient electronic device 300B. For example, the indication 902A of the information identifying the item for which payment has been authorized is displayed in response to receiving the information identifying the item. Thus, the recipient electronic device informs the second user about the item that has been gifted by the first user.

Figure 9B:
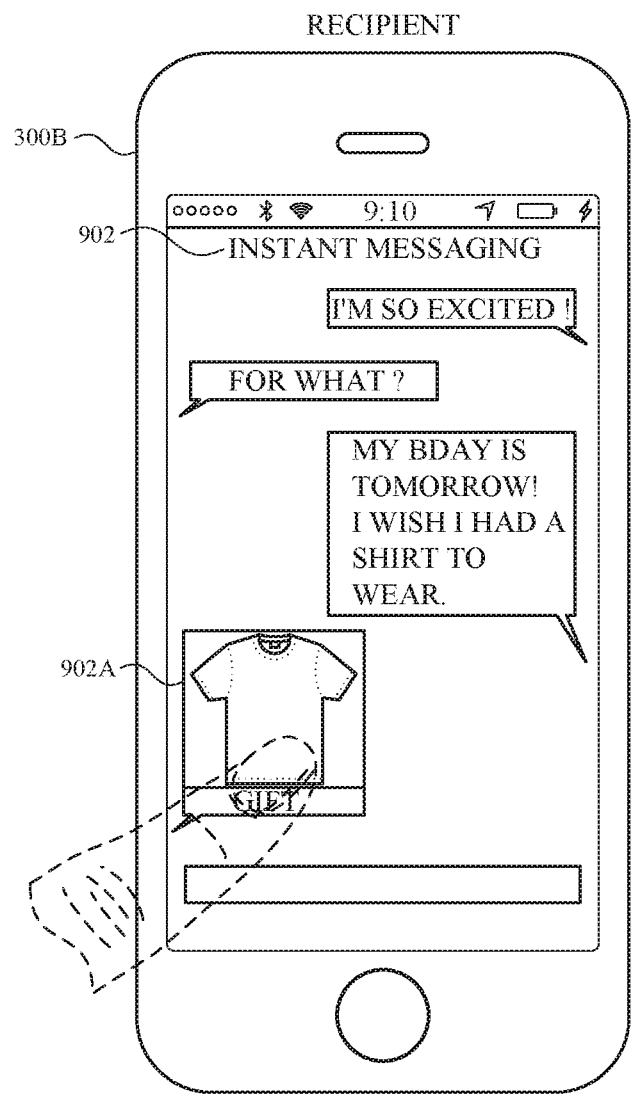

In accordance with some embodiments, at FIG. 9B, the recipient electronic device 300B detects, via the one or more input devices of the recipient electronic device, activation of the indication 902A of the information identifying the item, such as a tap input at a location on a touch-sensitive surface that corresponds to the purchase affordance of the indication 902A. In response to detecting activation of the indication 902A, the recipient electronic device 300B displays a user interface (e.g., of an electronic wallet application of the electronic device) for claiming the item, such as those of FIGS. 9C-9P.

Figure 9C:
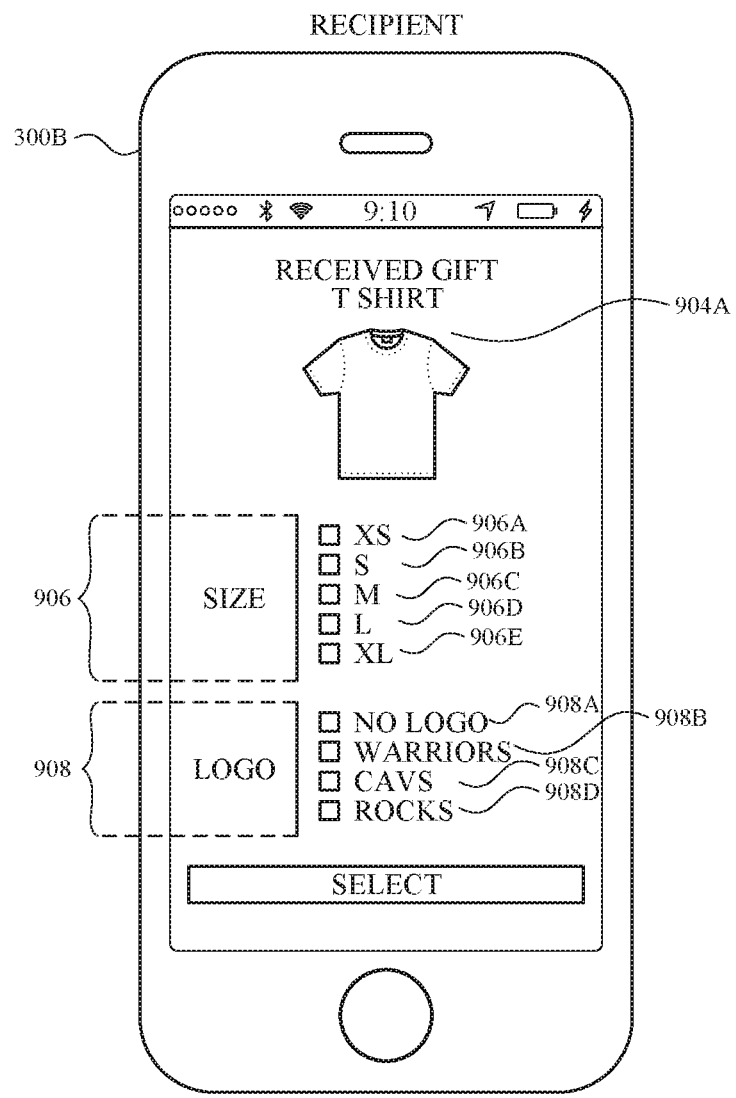

FIG. 9C illustrates an exemplary technique for displaying a graphical representation of the item (e.g., 904A) and graphical representations (e.g., 906A-906E, 908A-908D) of one or more configurable attributes of the item. In some examples, the graphical representation of the item and the graphical representations of the one or more configurable attributes of the item are concurrently displayed, on the display. In some examples, the recipient electronic device 300B displays, on the display, a graphical representation (e.g., 904A, a name, a description, an image) of the item and graphical representations 906 and 908 of one or more configurable attributes (e.g., size, color, style) of the item. The second user can use this interface to select the attributes that the second user desires for obtaining the item. Thus, although payment has been authorized by the sender electronic device (e.g., 300A) associated with a first user (e.g., a sender), the second user can use the recipient electronic device 300B to configure the item before claiming the item.

In accordance with some embodiments, the one or more attributes for the one or more configurable attributes (e.g., size 906, logo 908) of the item are limited to attributes that are available within one or more financial parameters set by the first user. For example, the first user specifies that a maximum price for the gift is $35, and then only attributes can be selected without exceeding the maximum price for the gift are displayed to the second user. In some examples, the recipient electronic device 300B foregoes providing (e.g., displaying) attributes for selection that do not confirm to the one or more financial parameters (e.g., exceed the approved price point). For example, input received at the sender electronic device specifies an approved price point (e.g., an upper limit cost for the total price of the purchase). Thus, only attributes of the one or more configurable attributes of the item that would not cause the purchase price to exceed the upper cost limit are selectable. In some examples, attributes that would cause the purchase price to exceed the approved price point are displayed, but are not selectable. In some examples, attributes that would cause the purchase price to exceed the approved price point are not displayed (e.g., the device foregoes displaying) and are not selectable. As a result, the first user can select a known amount for the gift while still enabling the second user to customize the gift.

In accordance with some embodiments, the one or more configurable attributes (e.g., size 906, logo 908) are limited to configurable attributes of (e.g., below, that do not exceed) an approved price point (or price range). In some examples, the recipient electronic device foregoes displaying configurable attributes of the item that exceed the approved price point. For example, input received at the sender electronic device specifies an approved price point (e.g., an upper limit cost for the total price of the purchase). Thus, only the configurable attributes of the item that would not cause the purchase price to exceed the approved price point are displayed at the recipient electronic device. In other examples, attributes that would cause the purchase price to exceed the approved price point are displayed at the recipient electronic device, but are not configurable. In some examples, attributes that would cause the purchase price to exceed the approved price point are not displayed (e.g., the recipient electronic device foregoes displaying) and are not configurable.

In the exemplary user interface of FIG. 9C, the configurable attributes of the item from which the second user can select are available independent of whether the configurable attribute was previously approved by the first user at the sender electronic device 300A, as described, for example, with reference to FIG. 7F. Alternatively, or in addition, in the exemplary user interface of FIG. 9C, the configurable attributes of the item from which the second user can select are available independent of whether the respective configurable attribute is consistent with the one or more financial parameters (e.g., an approved price point, a maximum price) provided by the first user at the sender electronic device 300A, as described, for example, with reference to FIG. 7J.

Figure 9D:
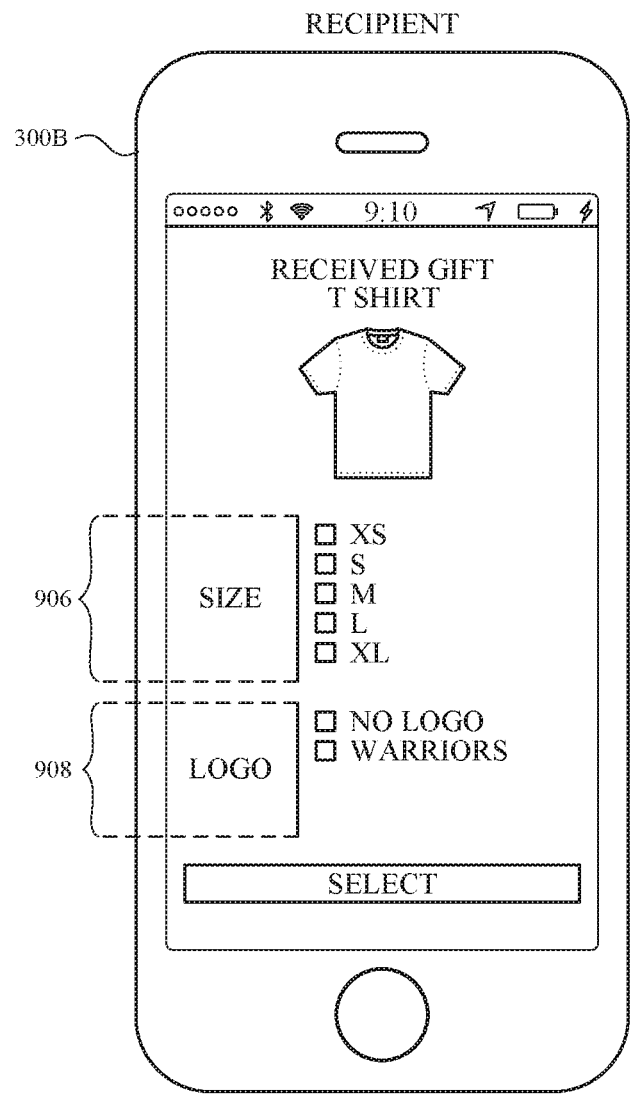

In the exemplary user interface of FIG. 9D, the configurable attributes of the item are available from which the second user can select if the configurable attribute was approved by the first user at the sender electronic device 300A, as described, for example, with reference to FIG. 7F. Alternatively, or in addition, in the exemplary user interface of FIG. 9D, the configurable attributes of the item from which the second user can select are available if the respective configurable attribute is consistent with the one or more financial parameters (e.g., an approved price point, a maximum price) provided by the first user at the sender electronic device 300A, as described, for example, with reference to FIG. 7J.

Figure 9E:
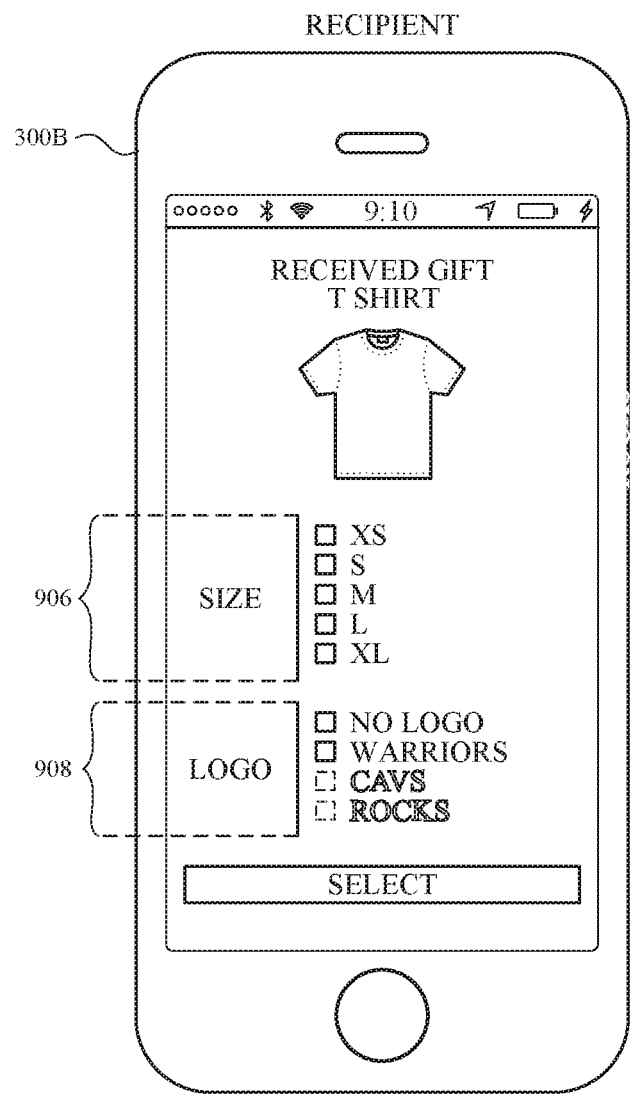

In the exemplary user interface of FIG. 9E, the configurable attributes of the item are available from which the second user can select if the configurable attribute was approved by the first user at the sender electronic device 300A, as described, for example, with reference to FIG. 7F. Configurable attributes that were not approved are grayed out. Alternatively, or in addition, in the exemplary user interface of FIG. 9D, the configurable attributes of the item from which the second user can select are available if the respective configurable attribute is consistent with the one or more financial parameters (e.g., an approved price point, a maximum price) provided by the first user at the sender electronic device 300A, as described, for example, with reference to FIG. 7J. Configurable attributes that are not consistent with the one or more financial parameters are grayed out.

In accordance with some embodiments, as illustrated in FIGS. 9C-9E, while displaying, on the display, the graphical representations 906, 908 of the one or more configurable attributes (e.g., size, color, style) of the item, the recipient electronic device 300B foregoes displaying, on the display, respective prices for the one or more configurable attributes. This enables the first user to preserve the illusion of giving a gift to the second user without the gift appearing to be a monetary gift or a gift that is limited to a certain monetary value. In other examples, the recipient electronic device 300B concurrently displays, with the graphical representations of the one or more configurable attributes (e.g., size, color, style), on the display, respective prices for the one or more configurable attributes. This enables the second user to configure the gift while appreciating or understanding the financial costs associated with the gift.

Figure 9F:
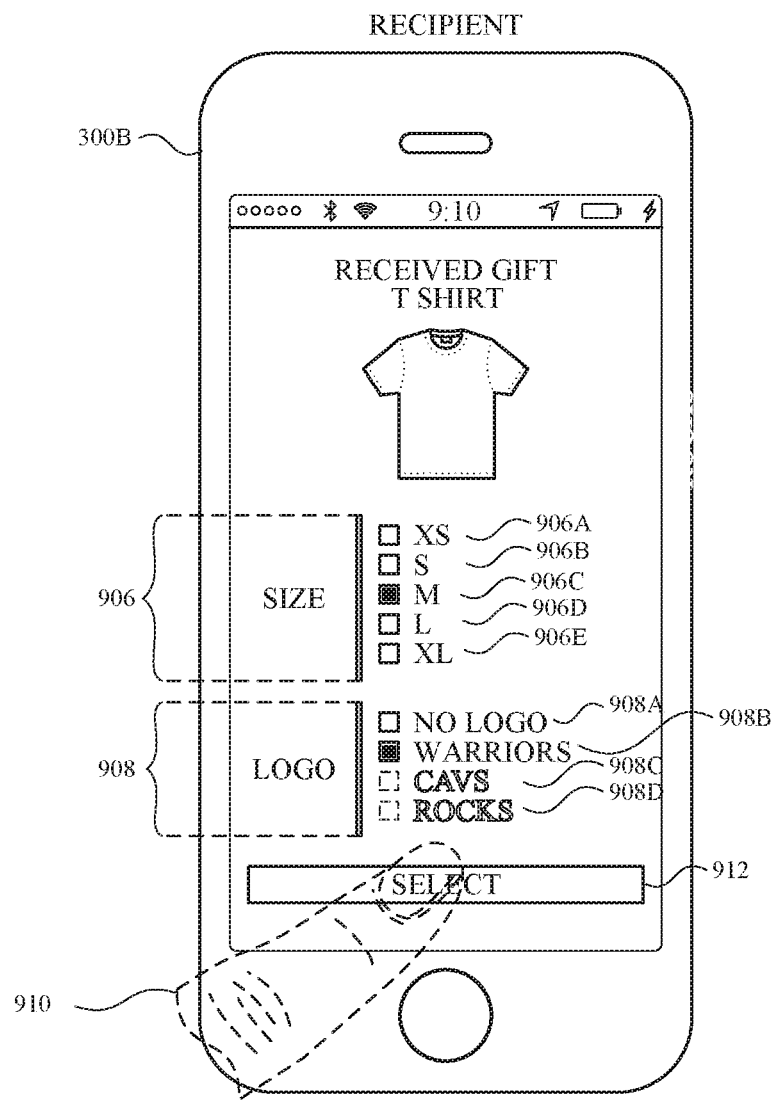

At FIG. 9F, the recipient electronic device 300B detects, via the one or more input devices of the recipient electronic device, selection of one or more attributes (e.g., 906C medium for size, 908B Warriors for logo) for at least some of the one or more configurable attributes of the item. In the example of FIG. 9F, the second user activates affordances 906C and 908B, then activates the select affordance 912 using a tap input with finger 910.

Figure 9G:
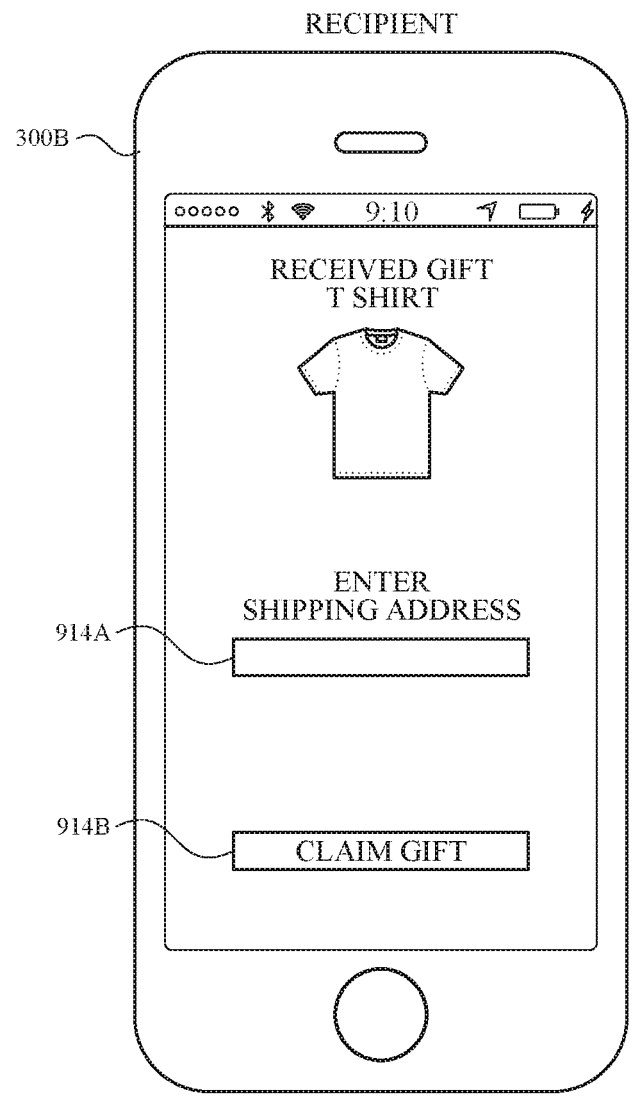
Figure 9H:
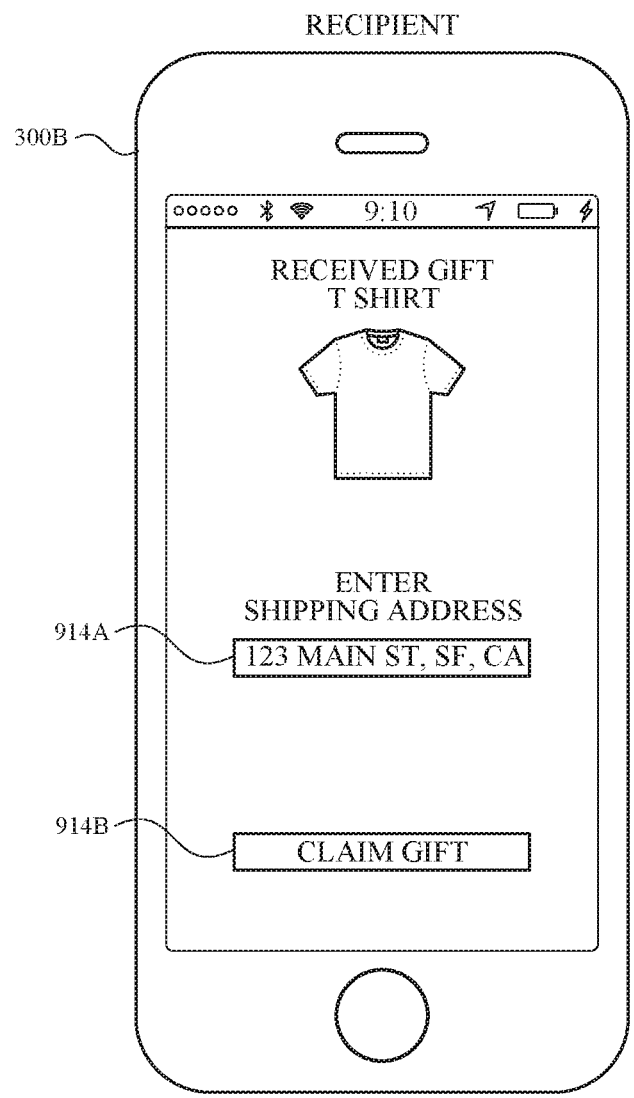

At FIG. 9G, the recipient electronic device 300B displays (e.g., subsequent to or in response to detecting selection of the one or more attributes), on the display, an option 914A to receive personal information about the second user, such as shipping information. At FIG. 9H, the recipient electronic device 300B receives, via the one or more input devices of the recipient electronic device, personal information about the second user, such as the second user's shipping information. By collecting such information at the recipient electronic device 300B from the second user (e.g., the recipient), the first user is enabled to provide the second user with a gift without having all the second user's (e.g., recipient's) personal information, such as their shipping or mailing address.

In accordance with some embodiments, recipient electronic device 300B detects, via the one or more input devices of the recipient electronic device that is associated with the second user, input of shipping information that specifies a physical address at which the item can be delivered to the second user. For example, the recipient electronic device detects user input identifying a mailing address for delivery of the item. In some examples, the recipient electronic device transmits the mailing address information to a service, such as at a fulfillment server. In some examples, the recipient electronic device 300B detects input of the delivery information subsequent to receiving the information identifying the item for which payment has been authorized.

Figure 9I:
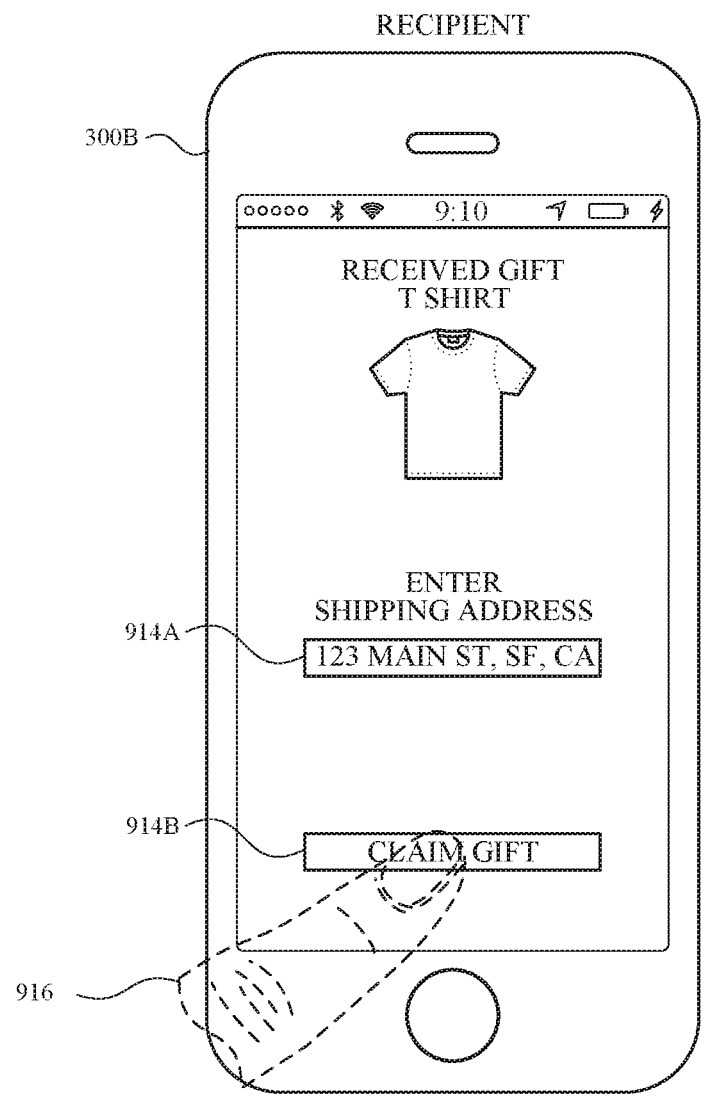

At FIG. 9I, subsequent to detecting selection of the one or more attributes, the recipient electronic device 300B detects, via the one or more input devices of the recipient electronic device, a request to claim the item (e.g., activation of the "claim gift" affordance 914B by a tap input at a location corresponding to affordance 914B with finger 916). In response (or subsequent) to detecting the request to claim the item, the recipient electronic device 300B initiates a process for obtaining the item (e.g., for the second user) with the selected one or more attributes. For example, the sender uses the sender electronic device to purchase a shirt for the recipient, while giving the recipient the option to pick the attributes (e.g., size, logo) of the shirt.

In accordance with some embodiments, the sender electronic device is logged into a first account corresponding to the first user (e.g., the sender) and the recipient electronic device is logged into a second account corresponding to the second user (e.g., the recipient). In some examples, when the recipient electronic device 300B receives the information identifying the item for which payment has been authorized, the recipient electronic device is 300B logged into a service using the second user account associated with the second user. In some examples, when the payment is authorized by the sender electronic device 300A associated with the first user, the sender electronic device 300A is logged into the service using a first user account that is different from the second user account, the first user account associated with the first user. In other examples, the recipient electronic device and the sender electronic device are both logged into the service using the same account. Thus, in some examples, the server helps coordinate the relationship between the sender electronic device and the recipient electronic device.

In accordance with some embodiments, initiating the process for obtaining the item with the selected one or more attributes comprises transmitting the selected attributes (e.g., to a service, to a product fulfillment server, or to a device associated with the first user so that the first user can authorize or finalize the order for the item, such as described with respect to FIGS. 7T-7X). Thus, in some examples, the first user (e.g., sender) is notified that the send user has initiated the process for obtaining the item so that the first user can take any required or helpful steps. In some examples, the first user is notified of the selected attributes so that the first user knows how the gift was configured.

In accordance with some embodiments, initiating the process for obtaining the item with the selected one or more attributes comprises transmitting an indication of the request to claim the item (e.g., to a service, to a product fulfillment server, or to a device associated with the first user so that the first user can authorize and place an order for the item).

In accordance with some embodiments, subsequent to detecting the request to claim the item (e.g., in response to detecting the request to claim the item), the recipient electronic device 300B transmits information about the selected one or more attributes to the sender electronic device 300A. In some examples, transmitting the information about the selected one or more attributes to the sender electronic device occurs subsequent to initiating the process for obtaining the item. For example, the recipient electronic device sends information about the selected one or more attributes to the sender electronic device so that the sender electronic device displays the information to the first user, informing the first user as to how the gift was configured.

Figure 9J:
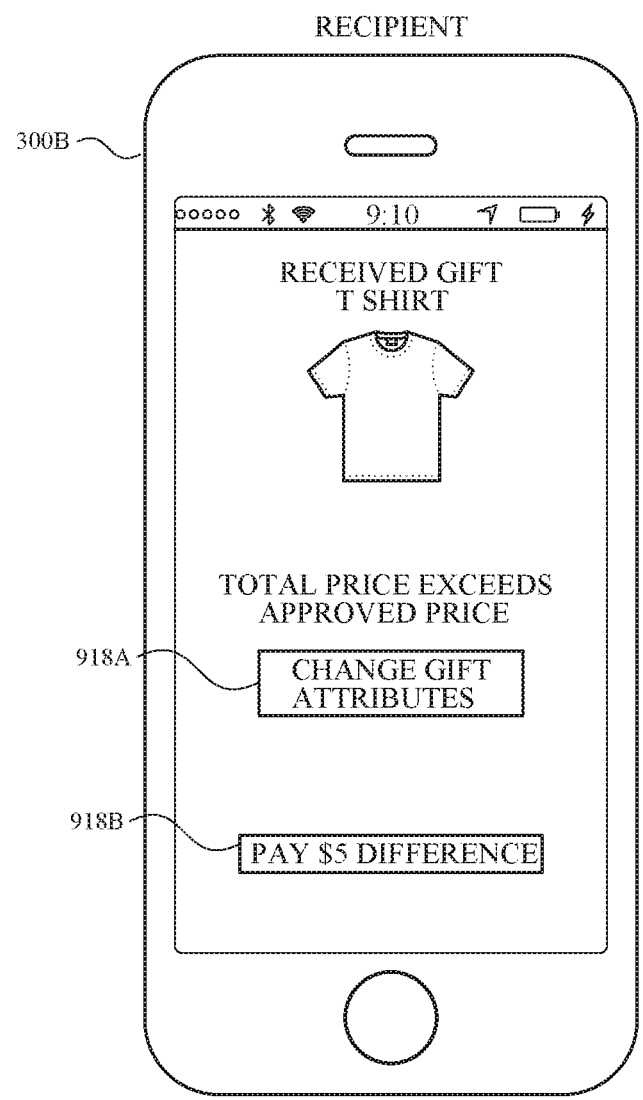
Figure 9K:
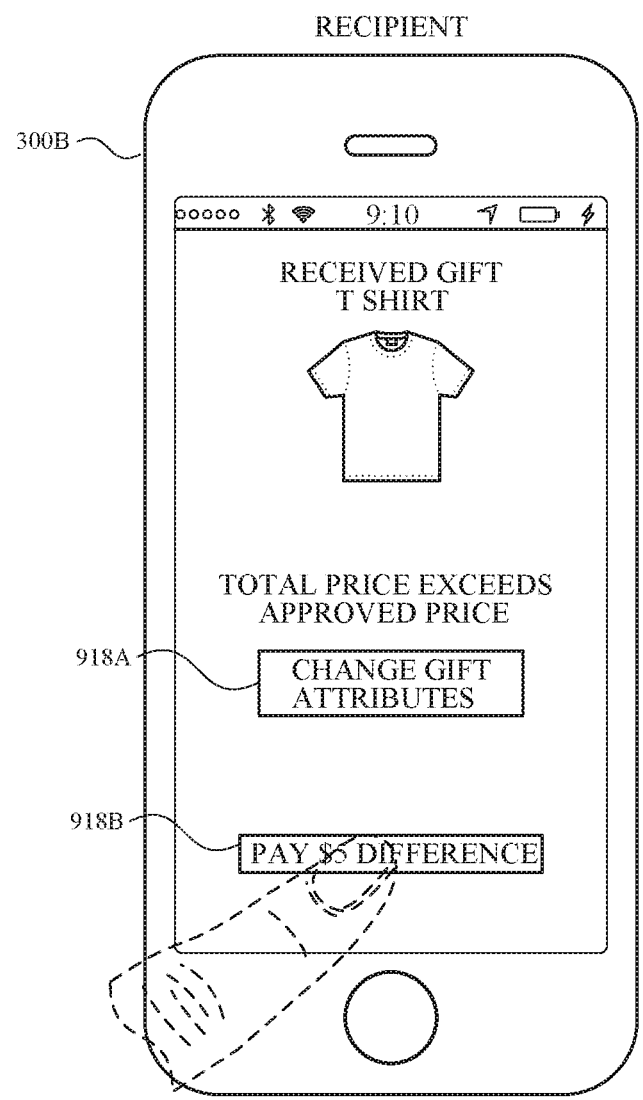
Figure 9L:
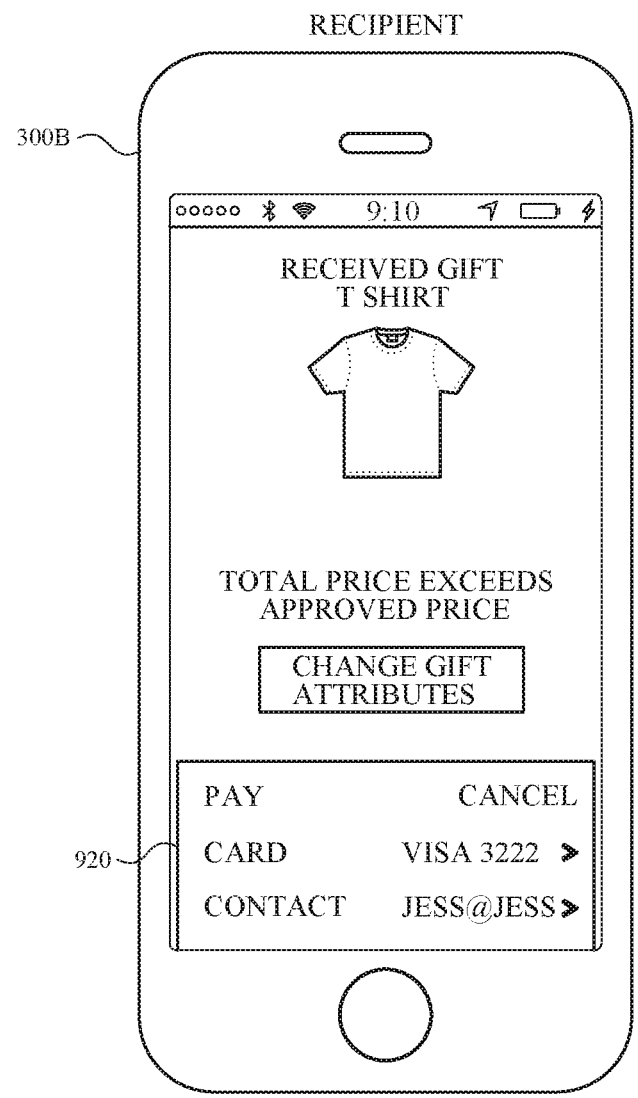
Figure 9M:
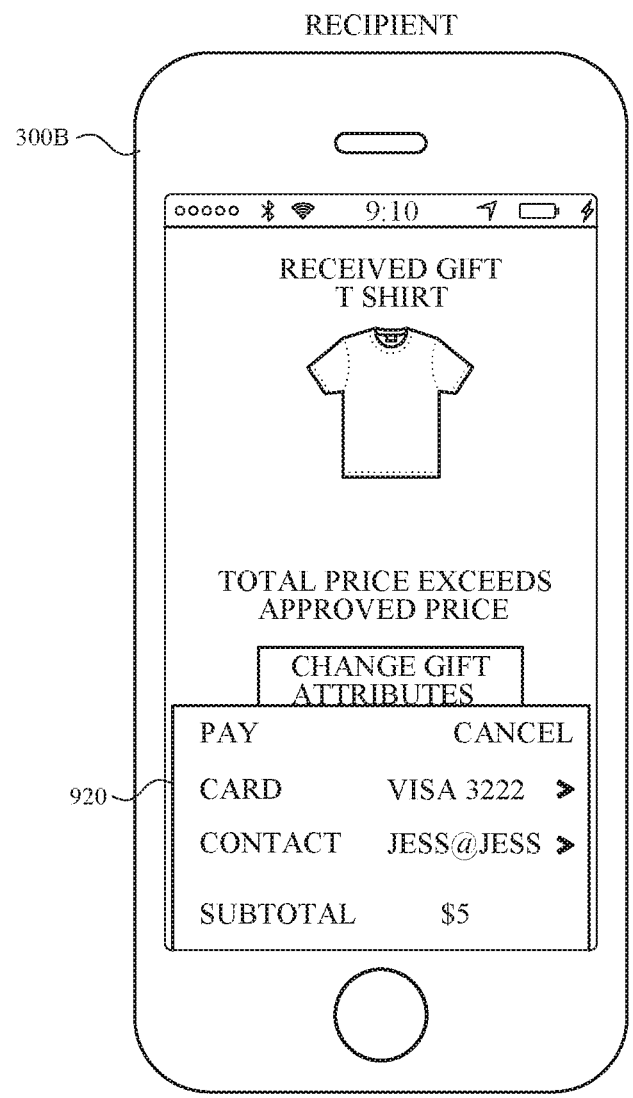

In accordance with some embodiments, subsequent to (or in response to) detecting the request to claim the item: in accordance with a determination that the request to claim the item included the selection of attributes that exceed one or more financial parameters set by the first user, requesting payment at the recipient electronic device 300B, from the second user, for an amount (e.g., an excess amount) that is determined based on how much a total price of the item exceeds the one or more financial parameters prior to initiating the process for obtaining the item (e.g., requesting payment from the second user as a precondition of obtaining the item), and in accordance with a determination that the request to claim the item did not include the selection of attributes that exceed the one or more financial parameters set by the first user, initiating the process for obtaining the item without requesting payment from the second user. For example, as illustrated in FIG. 9J, the recipient electronic device 300B determines that the selected attributes result in the total price exceeding the approved price point and requests that the second user (e.g., the recipient) either change the items attributes (e.g., using affordance 918A) or make a payment (e.g., using affordance 918B). As illustrated in FIG. 9K, in some examples, the recipient electronic device 300B detects activation of affordance 918B.

Figure 9N:
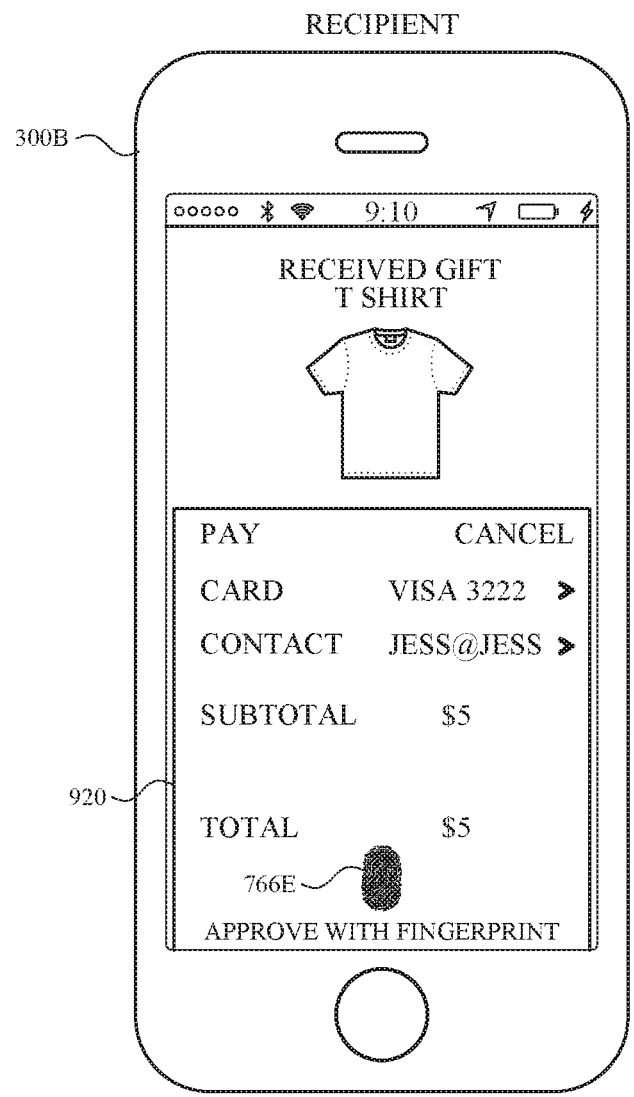
Figure 9O:
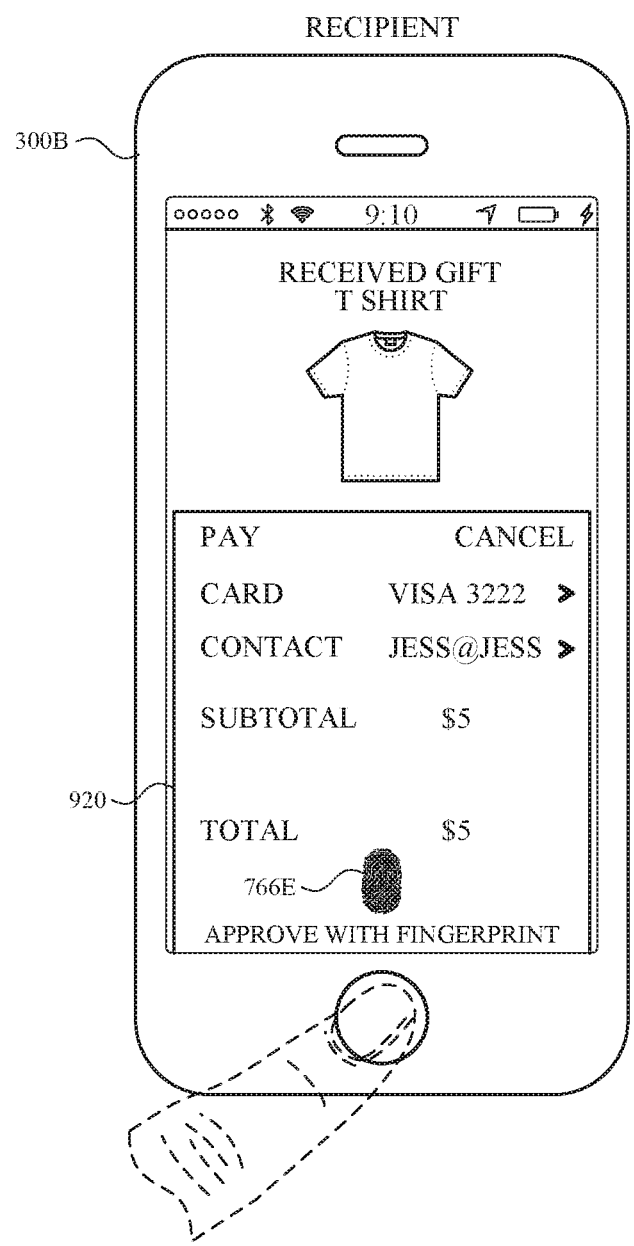
Figure 9P:
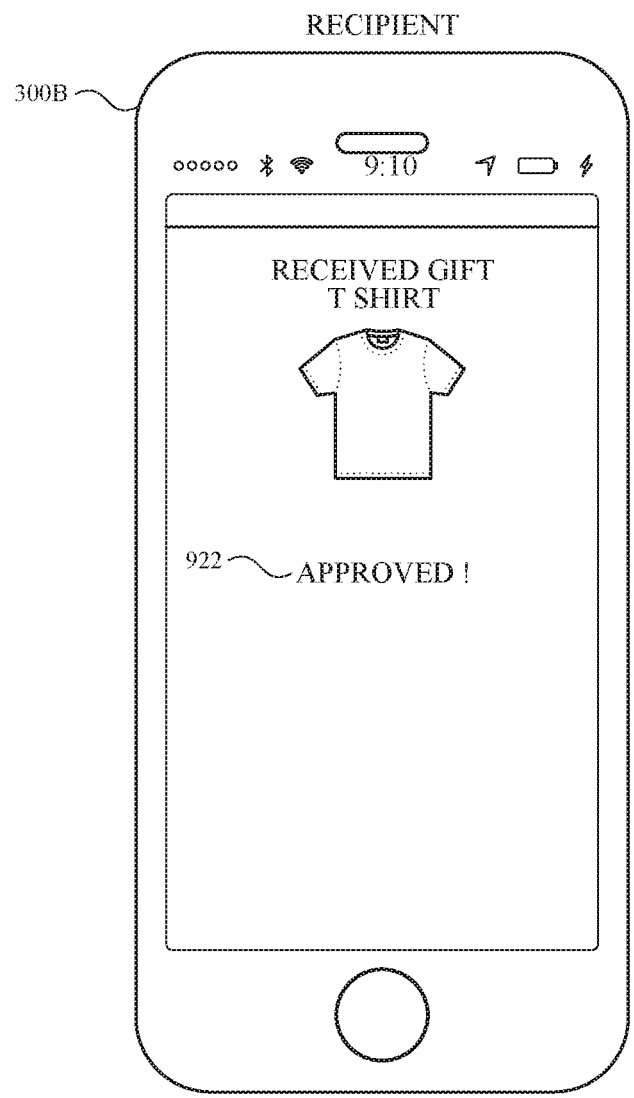

In accordance with some embodiments, as illustrated in FIGS. 9L-9P, the recipient electronic device 300B requests payment (e.g., as illustrated in FIGS. 9N-9O at 920), receives authentication (e.g., using password authentication or fingerprint authentication) and, in response to receiving authentication, proceeds with payment of the amount (e.g., the excess amount) using an account of an electronic wallet of the device and displays an indication 922 that the recipient electronic device 300B proceeded with payment of the amount.

In accordance with some embodiments, as illustrated in FIGS. 9L-9P, subsequent to detecting the request to claim the item (e.g., in response to detecting the request to claim the item), the recipient electronic device 300B requests payment, from the second user, for an amount less than a total price of the item (e.g., but more than 0). In some examples, the recipient electronic device 300B receives authentication (e.g., using password authentication or fingerprint authentication) and, in response to receiving authentication, proceeds with payment of the amount (e.g., the excess amount) using an account of an electronic wallet of the recipient electronic device 300B. Thus, payment for the item can be split between the sender and the recipient. Thus, the device detects that the sender has paid for a first portion of the total price of the item and the device requests payment for a second portion of the total price of the item from the recipient. In some examples, the first portion and second portion are different. In some examples, the first portion and the second portion are each less than the total price.

In accordance with some embodiments, displaying, on the display, the graphical representation (e.g., a name, a description, an image) of the item and graphical representations of one or more configurable attributes (e.g., size, logo, color, style) of the item includes displaying the graphical representation of the item and the graphical representations of one or more configurable attributes in an instant messaging application 902 of the recipient electronic device 300B. In some examples, the graphical representation (e.g., a name, a description, an image) of the item is displayed in an instant messaging application 902 of the electronic device. In some examples, graphical representations of one or more configurable attributes (e.g., size, color, style) of the item are displayed in an instant messaging application 902 of the recipient electronic device.

In accordance with some embodiments, displaying, on the display, the graphical representation (e.g., a name, a description, an image) of the item and graphical representations of one or more configurable attributes (e.g., size, logo, color, style) of the item includes displaying the graphical representation of the item and the graphical representations of one or more configurable attributes in a second application different from the instant messaging application 902. In some examples, the graphical representation (e.g., a name, a description, an image) of the item is displayed in the second application different from the instant messaging application 902 of the electronic device. In some examples, graphical representations of one or more configurable attributes (e.g., size, color, style) of the item are displayed in the second application different from the instant messaging application 902 of the recipient electronic device. In some examples, the second application is an electronic wallet application of the recipient electronic device 300B.

In accordance with some embodiments, the recipient electronic device 300B accesses personal information (e.g., delivery information, such as a mailing address) about the second user stored at the recipient electronic device 300B that is associated with the second user. In some embodiments, this personal information is not accessible to the sender electronic device 300A (and/or to the first user), so that the first user can order an item for the second user and pay for shipping that item to the second user without knowing a current shipping address of the second user. In accordance with some embodiments, initiating the process for obtaining the item with the selected one or more attributes includes transmitting the personal information (e.g., to a service, to a product fulfillment server, or to an electronic device of the first user). For example, the electronic device associated with the second user stores the name, mailing address, and other information about the second user. The electronic device associated with the second user accesses and transmits this information for use in obtaining the item for the second user. In some examples, the sender electronic device 300A (and/or the first user) does not have access to the personal information.

In accordance with some embodiments, the recipient electronic device 300B detects, via the one or more input devices of the recipient electronic device 300B associated with the second user, selection of an option to expedite delivery of the item. For example, the recipient electronic device 300B detects user input requesting that the item be delivered in an expedited manner, such as through two-day air shipping. The recipient electronic device 300B displays, on the display, a request for authorization (e.g., from the second user) to proceed with a payment for expedited delivery of the item. The recipient electronic device 300B receives, via the one or more input devices of the recipient electronic device 300B associated with the second user, an input that is responsive to the request for authorization to proceed with the payment (e.g., user authentication information, a fingerprint of finger, a passcode). In response to receiving the input, in accordance with a determination that the input that is responsive to the request for authorization to proceed with the payment is consistent with an input enabled to authorize to proceed with the payment, the recipient electronic device 300B proceeds with the payment for expedited delivery of the item using an account of an electronic wallet of the recipient electronic device. For example, the recipient electronic device 300B receives as input a fingerprint of a finger at a fingerprint sensor of the recipient electronic device 300B and determines that the fingerprint is consistent with a enrolled fingerprint that is enabled to authorize to proceed with payments. Thus, the second user can opt to pay for expedited delivery to receive the gift item more quickly (e.g., without the first user paying for the expedited delivery and/or without the first user's approval).

In accordance with some embodiments, in response to receiving the input, in accordance with a determination that the input that is responsive to the request for authorization to proceed with the payment is not consistent with an input enabled to authorize to proceed with the payment, the recipient electronic device 300B forgoes proceeding with the payment for expedited delivery of the item using an account of an electronic wallet of the recipient electronic device 300B. For example, the recipient electronic device 300B receives as input a fingerprint of a finger and determines that the fingerprint is not consistent with an enrolled fingerprint that is enabled to authorize to proceed with payments. Accordingly, the recipient electronic device 300B does not proceed with the payment for expedited delivery.

In accordance with some embodiments, the recipient electronic device 300B displays, on the display, an indication (e.g., 902A, "GIFT" in 904A, 914B) that the item is a gift item. In some examples, the item is a gifted item. For example, the item is fully paid for by the first user using the sender electronic device 300A. In some examples, the recipient electronic device 300B displays an indication that the item is fully paid for (e.g., by the first user).

In accordance with some embodiments, the recipient electronic device 300B includes a location sensor (e.g., a GPS location sensor). The recipient electronic device 300B detects, using the location sensor, a current location of the recipient electronic device 300B. In accordance with a determination that the item is available (e.g., available for purchase, available for pickup) at a merchant associated with (e.g., within a certain distance of) the current location, the recipient electronic device 300B displays (e.g., prior to detecting selection of the one or more attributes), on the display, a second indication of the information identifying the item for which payment has been authorized. For example, a sender gifts an item to a recipient, and subsequently, after receiving a notification of the gift, the recipient electronic device 300B monitors the physical location of the recipient electronic device 300B so that when the recipient electronic device 300B detects (via the monitoring of location of the device using, for example, GPA) that the recipient is at a physical store of the merchant through which the item was gifted, the recipient electronic device 300B informs the recipient that the gift can be redeemed at the physical store. The recipient electronic device 300B displays (or otherwise provides) an indication that the user can obtain the item (e.g., at the physical store of the merchant).

In accordance with some embodiments, the second user associated with the recipient electronic device 300B is responsible for a portion of the cost of the item. In some examples, the recipient pays for expedited shipping, an updated of the item, or the link. Thus, the recipient electronic device 300B displays, on the display, a request for authorization (e.g., from the second user) to proceed with a payment transaction for the item. The recipient electronic device 300B receives an input (e.g., user authentication information, a fingerprint, a passcode) that is responsive to the request for authorization to proceed with the payment transaction. In some examples, receiving authorization to proceed with the payment transaction includes receiving a passcode via a touch-sensitive surface of the electronic device, the passcode being determined to be consistent with an enrolled passcode that is enabled to authorize the payment transaction. In some examples, receiving authorization to proceed includes detecting a fingerprint, the fingerprint being determined to be consistent with an enrolled fingerprint that is enabled to authorize the payment transaction. For example, the device stores information about one or more fingerprints of the user to use for determining whether a respective fingerprint is enabled to authorize the payment transaction. In some examples, receiving authorization to proceed includes receiving a double-press of a mechanical button while the device is in an unlocked state (and optionally, while the device has been continuously on a user's wrist since the device was unlocked by providing authentication credentials to the device, where the continuous presence of the device on the user's wrist is determined by periodically checking that the device is in contact with the user's skin). In response to receiving the input, in accordance with a determination that the input that is responsive to the request for authorization is consistent with input that is enabled to authorize the payment transaction, the recipient electronic device 300B proceeds with the payment transaction for the item. If the input that is responsive to the request for authorization is not consistent with an enrolled passcode or fingerprint (respectively) that is enabled to authorize the payment transaction, the electronic device does not proceed with the payment transaction for the item.

In some embodiments, proceeding with the payment transaction includes transmitting payment information to a payment transaction server to engage in a payment transaction for the item. In some examples, engaging in the payment transaction includes routing information to one or more financial institutions to verify payment credentials and/or receive authorization to complete the transaction. For example, payment information is transmitted from the recipient electronic device 300B to a payment server for engaging in the payment transaction.

In some embodiments, proceeding with the payment transaction includes using the payment information (e.g., payment information of a payment account linked to the electronic device and stored in an electronic wallet of the device) to complete the payment transaction. In some embodiments, proceeding with the payment transaction includes using the payment information (e.g., a primary account number) for use in the payment transaction (e.g., using a credit account to make the purchase) to complete the payment transaction, where the payment information is stored at the recipient electronic device 300B.

In some embodiments, in response to receiving the input, in accordance with a determination that the input that is responsive to the request for authorization is not consistent with input that is enabled to authorize the payment transaction, the recipient electronic device 300B forgoes proceeding with the payment transaction for the item. Thus, the recipient electronic device 300B does not enable the payment transaction to be completed because the user has not provided valid authorization.

FIGS. 10A-10C is a flow diagram illustrating a method for managing contextual transactions using an electronic device in accordance with some embodiments. Method 1000 is performed at a recipient electronic device (e.g., 100, 300, 500) with a display and one or more input devices, wherein the recipient electronic device is associated with a second user (e.g., a recipient). Some operations in method 1000 are, optionally, combined, the order of some operations are, optionally, changed, and some operations are, optionally, omitted.

As described below, method 1000 provides an intuitive way for managing contextual transactions. The method reduces the cognitive burden on a user for managing a contextual payment and participating in a transaction for a gift, thereby creating a more efficient human-machine interface. For battery-operated computing devices, enabling a user to manage a contextual transaction faster and more efficiently conserves power and increases the time between battery charges.

At block 1002, the recipient electronic device receives information identifying an item (e.g., a gifted item, such as a tangible good, an intangible good, or a service) for which payment has been authorized by a sender electronic device associated with a first user (e.g., a sender) that is different from the second user, the item selected from among one or more (or a plurality of) items based on input received (e.g., by a merchant, by the service, by the electronic device) from the sender electronic device.

In accordance with some embodiments, at block 1004, when receiving the information identifying the item for which payment has been authorized, the recipient electronic device is logged into a service using a second user account associated with the second user. When the payment was authorized by the sender electronic device associated with the first user, the sender electronic device is logged into the service using a first user account different from the second user account, the first user account associated with the first user. In other examples, the recipient electronic device and the sender electronic device are both logged into the service using the same account.

At block 1006, the recipient electronic device displays, on the display, a graphical representation (e.g., 904A, a name, a description, an image) of the item and graphical representations (e.g., 906, 908) of one or more configurable attributes (e.g., size, color, style) of the item. In some examples, the graphical representation (e.g., 904A) of the item and the graphical representations (e.g., 906, 908) of the one or more configurable attributes of the item are concurrently displayed, on the display of the recipient electronic device.

In accordance with some embodiments, at block 1008, while recipient electronic device displays, on the display, the graphical representations (e.g., 906, 908) of the one or more configurable attributes (e.g., size, color, style) of the item, the recipient electronic device foregoes displaying, on the display, respective prices for the one or more configurable attributes. This enables the first user to preserve the illusion of giving a gift to the second user without the gift appearing to be a monetary gift or a gift that is limited to a certain monetary value. In other examples, the recipient electronic device concurrently displays, with the graphical representations (e.g., 906, 908) of the one or more configurable attributes (e.g., size, color, style), on the display, respective prices for the one or more configurable attributes. This enables the second user to configure the gift while appreciating or understanding the financial costs associated with the gift.

At block 1010, the recipient electronic device detects, via the one or more input devices of the recipient electronic device, selection of one or more attributes (e.g., 906C, 908B) for at least some of the one or more configurable attributes of the item.

At block 1012, subsequent to detecting selection of the one or more attributes (e.g., 906C, 908B), the recipient electronic device detects, via the one or more input devices of the recipient electronic device, a request (e.g., from the second user) to claim the item.

At block 1014, in response to detecting the request to claim the item, the recipient electronic device initiates a process for obtaining the item with the selected one or more attributes.

In accordance with some embodiments, at block 1016, initiating the process for obtaining the item with the selected one or more attributes includes transmitting an indication of the request to claim the item (e.g., to a service, to a product fulfillment server, or to a device associated with the first user so that the first user can authorize and place an order for the item). In accordance with some embodiments, at block 1018, initiating the process for obtaining the item with the selected one or more attributes includes transmitting the selected attributes (e.g., to a service, to a product fulfillment server, or to a device associated with the first user so that the first user can authorize and place an order for the item).

At block 1020, the one or more attributes (e.g., 906C, 908B) for the one or more configurable attributes of the item are limited to attributes that are available within one or more financial parameters set by the first user. As a result, the first user can provide input limiting the scope of the gift (e.g., limiting the total cost of the item to be gifted), while still enabling the second user to provide user input to customize the gift.

At block 1022, when the payment was authorized by the sender electronic device associated with the first user, the sender electronic device was logged into the service using a first user account different from the second user account, the first user account associated with the first user. In other examples, the recipient electronic device and the sender electronic device are both logged into the service using the same account.

At block 1024, subsequent to detecting the request (e.g., from the second user) to claim the item (e.g., in response to detecting the request to claim the item), the recipient electronic device transmits information about the selected one or more attributes to the sender electronic device. In some examples, transmitting the information about the selected one or more attributes to the sender electronic device occurs subsequent to initiating the process for obtaining the item. For example, the recipient electronic device sends information about the selected one or more attributes to the sender electronic device (e.g., which are displayed by the sender electronic device, as illustrated in by indication 740 of FIG. 7T), informing the first user as to how the gift was configured.

In accordance with some embodiments, subsequent to (or in response to) detecting the request to claim the item: in accordance with a determination that the request to claim the item included the selection of attributes (e.g., by the second user) that exceed one or more financial parameters set by the first user, the recipient electronic device requests payment (e.g., using user interface 920, as illustrated at FIGS. 9N-9O), from the second user, for an amount (e.g., an excess amount, such as $5, as illustrated in FIGS. 9N-9O) that is determined based on how much a total price of the item exceeds the financial parameters prior to initiating the process for obtaining the item (e.g., requesting payment from the second user as a precondition of obtaining the item). For example, the recipient electronic device determines that the selected attributes result in the total price exceeding the approved price point and requests payment (e.g., using user interface 920, as illustrated at FIGS. 9N-9O). In accordance with a determination that the request to claim the item did not include the selection of attributes that exceed the financial parameter set by the first user, the recipient electronic device initiates the process for obtaining the item without requesting payment from the second user (e.g., without displaying the user interfaces of FIGS. 9J-9O, and instead transitioning from the user interface of FIG. 9I to the user interface of FIG. 9N). In some examples, the device requests and receives authentication (e.g., using password authentication or fingerprint authentication, such as illustrated in FIGS. 9L-9O) and, in response to receiving authentication, proceeds with payment of the amount (e.g., the excess amount) using an account of an electronic wallet of the recipient electronic device.

In accordance with some embodiments, subsequent to detecting the request to claim the item (e.g., in response to detecting the request to claim the item), the recipient electronic device requests payment (e.g., using user interface 920), from the second user, for an amount less than a total price of the item (e.g., but more than 0). In some examples, the device receives authentication (e.g., using password authentication or fingerprint authentication) and, in response to receiving authentication, proceeds with payment of the amount (e.g., the excess amount) using an account of an electronic wallet of the recipient electronic device. As a result, by providing user input to authorize payment for the excess amount (e.g., the difference), the second user can claim an item that falls outside the intended scope of the gift from the first user. Thus, payment for the item can be split between the sender and the recipient. In some examples, the device detects that the sender has paid for a first portion of the total price of the item (e.g., as described with reference to FIGS. 7M-7R) and the device requests payment for a second portion of the total price of the item (e.g., as described with reference to FIGS. 9J-9O). In some examples, the first portion and second portion are different. In some examples, the first portion and the second portion are each less than the total price.

In accordance with some embodiments, the recipient electronic device displays, on the display, a graphical indication (e.g., 902A) of the information identifying the item for which payment has been authorized in an instant messaging application (e.g., 902) of the recipient electronic device. For example, the indication (e.g., 902A) of the information identifying the item for which payment has been authorized is displayed in response to receiving the information identifying the item.

In accordance with some embodiments, displaying, on the display, the graphical representation (e.g., 904A, a name, a description, an image) of the item and graphical representations (e.g., 906, 908) of one or more configurable attributes (e.g., size, color, style) of the item includes displaying the graphical representation of the item and the graphical representations of one or more configurable attributes in an instant messaging application (e.g., 902) of the recipient electronic device. In some examples, the graphical representation (e.g., a name, a description, an image) of the item is displayed in an instant messaging application (e.g., 902) of the electronic device. In some examples, graphical representations of one or more configurable attributes (e.g., size, color, style) of the item are displayed in an instant messaging application (e.g., 902) of the electronic device.

In accordance with some embodiments, the recipient electronic device detects, via the one or more input devices of the recipient electronic device that is associated with the second user, input of shipping information (e.g., 914A) that specifies a physical address at which the item can be delivered to the second user. For example, the recipient electronic device detects user input identifying a mailing address (e.g., 914A) for delivery of the item. In some examples, the recipient electronic device transmits the delivery information to a service, such as at a fulfillment server. In some examples, the recipient electronic device detects input (e.g., from the second user) of the delivery information subsequent to receiving the information identifying the item for which payment has been authorized.

In accordance with some embodiments, the recipient electronic device accesses personal information (e.g., delivery information, such as a mailing address) about the second user stored at the recipient electronic device that is associated with the second user. In some embodiments, this personal information is not accessible to the first user, so that the first user can order an item for the second user and pay for shipping that item to the second user without knowing a current shipping address of the second user. Thus, the sender electronic device requires less user input from the first user (e.g., no need to provide personal information of the gift recipient). In some embodiments, initiating the process for obtaining the item with the selected one or more attributes includes transmitting the personal information (e.g., to a service, to a product fulfillment server, or to an electronic device of the first user). For example, the recipient electronic device associated with the second user stores the name, mailing address, and other information about the second user, such as in a phone contacts application or database. The recipient electronic device associated with the second user accesses and transmits this information for use in obtaining the item for the second user. In some examples, the sender electronic device (and/or the first user) does not have access to the personal information.

In accordance with some embodiments, the recipient electronic device detects, via the one or more input devices of the recipient electronic device associated with the second user, selection of an option to expedite delivery of the item. For example, the recipient electronic device detects user input (e.g., from the second user) requesting that the item be delivered in an expedited manner, such as through 2-day air shipping. The recipient electronic device displays, on the display, a request for authorization (e.g., from the second user) to proceed with a payment for expedited delivery of the item. The recipient electronic device receives, via the one or more input devices of the recipient electronic device associated with the second user, an input (e.g., user authentication information, a fingerprint of finger, a passcode) that is responsive to the request for authorization to proceed with the payment. In response to receiving the input, in accordance with a determination that the input that is responsive to the request for authorization to proceed with the payment is consistent with an input enabled to authorize to proceed with the payment, the recipient electronic device proceeds with the payment for expedited delivery of the item using an account of an electronic wallet of the recipient electronic device. For example, the recipient electronic device receives as input a fingerprint of a finger and determines that the fingerprint is consistent with an enrolled fingerprint that is enabled to authorize to proceed with payments.

In accordance with some embodiments, in response to receiving the input, in accordance with a determination that the input that is responsive to the request for authorization to proceed with the payment is not consistent with an input enabled to authorize to proceed with the payment, the recipient electronic device forgoes proceeding with the payment for expedited delivery of the item using an account of an electronic wallet of the recipient electronic device. For example, the recipient electronic device receives as input a fingerprint of a finger and determines that the fingerprint is not consistent with an enrolled fingerprint that is enabled to authorize to proceed with payments.

In accordance with some embodiments, the recipient electronic device displays, on the display, an indication (e.g., 902A, "GIFT" in 904A, 914B) that the item is a gift item. In some examples, the item is a gifted item. For example, the item is fully paid for by the first user using the sender electronic device. In some examples, the recipient electronic device displays an indication that the item is fully paid for (e.g., by the first user).

In accordance with some embodiments, the recipient electronic device includes a location sensor (e.g., a GPS location sensor). The recipient electronic device detects, using the location sensor, a current location of the recipient electronic device. In accordance with a determination that the item is available (e.g., available for purchase, available for pickup) at a merchant associated with the current location (and, for example, prior to detecting selection of the one or more attributes), the recipient electronic device displays, on the display, a second indication of the information identifying the item for which payment has been authorized. For example, a sender gifts an item to a recipient, and subsequently, after receiving a notification of the gift, the recipient electronic device monitors the physical location of the device so that when the device detects (via the monitoring of location of the device) that the recipient is at a physical store of the merchant through which the item was gifted, the recipient electronic device informs the recipient that the gift can be redeemed at the physical store. The recipient electronic device 300B displays (or otherwise provides) an indication that the user can obtain the item (e.g., at the physical store of the merchant).

In accordance with some embodiments, the recipient electronic device displays, on the display, a request for authorization (e.g., from the second user) to proceed with a payment transaction for the item. The recipient electronic device receives (e.g., from the second user), via the one or more input devices of the recipient electronic device, an input (e.g., user authentication information, a fingerprint, a passcode) that is responsive to the request for authorization to proceed with the payment transaction. In some examples, receiving authorization to proceed with the payment transaction includes receiving a passcode via a touch-sensitive surface of the electronic device, the passcode being determined to be consistent with an enrolled passcode that is enabled to authorize the payment transaction. In some examples, authorization to proceed includes detecting a fingerprint, the fingerprint being determined to be consistent with an enrolled fingerprint that is enabled to authorize the payment transaction. For example, the recipient electronic device stores information about one or more fingerprints of the user to use for determining whether a respective fingerprint is enabled to authorize the payment transaction. In some examples, authorization to proceed includes receiving a double-press of a mechanical button while the recipient electronic device is in an unlocked state (and optionally, while the device has been continuously on a user's wrist (e.g., when the recipient electronic device is a watch) since the device was unlocked by providing authentication credentials to the device, where the continuous presence of the device on the user's wrist is determined by periodically checking that the device is in contact with the user's skin). In response to receiving the input, in accordance with a determination that the input that is responsive to the request for authorization is consistent with input that is enabled to authorize the payment transaction, the recipient electronic device proceeds with the payment transaction for the item. If the input that is responsive to the request for authorization is not consistent with an enrolled passcode or fingerprint (respectively) that is enabled to authorize the payment transaction, the recipient electronic device does not proceed with the payment transaction for the item.

In some examples, proceeding with the payment transaction includes transmitting payment information to a payment transaction server to engage in a payment transaction for the item. In some examples, engaging in the payment transaction includes routing information to one or more financial institutions to verify payment credentials and/or receive authorization to complete the transaction. For example, payment information is transmitted from the recipient electronic device 300B to a payment server for engaging in the payment transaction.

In some examples, proceeding with the payment transaction includes using the payment information (e.g., payment information of a payment account linked to the electronic device and stored in an electronic wallet of the device) to complete the payment transaction. In some examples, proceeding with the payment transaction includes using the payment information (e.g., a primary account number) for use in the payment transaction (e.g., using a credit account to make the purchase) to complete the payment transaction, where the payment information is stored at the recipient electronic device.

In accordance with some embodiments, in response to receiving the input, in accordance with a determination that the input that is responsive to the request for authorization is not consistent with input that is enabled to authorize the payment transaction, the recipient electronic device forgoes proceeding with the payment transaction for the item.

Note that details of the processes described above with respect to method 1000 (e.g., FIGS. 10A-10C) are also applicable in an analogous manner to the methods described below and above. For example, methods 800 and 1300 optionally include one or more of the characteristics of the various methods described above with reference to method 1000. For example, the first user uses the sender electronic device to purchase a gift for the second user. The second user uses the recipient electronic device to claim the gift. For brevity, these details are not repeated below.

FIG. 11 is a flow diagram illustrating a method for managing contextual transactions using the sender electronic device 300A and the recipient electronic device 300B, in accordance with some embodiments. FIG. 11 illustrates some, though not all, of the interconnections between method 800 of FIGS. 8A-8C and method 1000 of FIGS. 10A-10C. For example, the sender electronic device is associated with a first user (e.g., a sender) and the recipient electronic device is associated with a second user (e.g., a recipient). Some operations in the technique of FIG. 11 are, optionally, combined, the order of some operations are, optionally, changed, and some operations are, optionally, omitted.

As described below, the method of FIG. 11 provides an intuitive way for managing contextual transactions. The method reduces the cognitive burden on a user for managing a contextual payment and participating in a transaction for a gift, thereby creating more efficient human-machine interfaces. For battery-operated computing devices, enabling users to manage a contextual transaction faster and more efficiently conserves power and increases the time between battery charges.

At block 802 of FIG. 11, the sender electronic device displays, on the display, graphical representations (e.g., 702D, 702E, a name, a description, an image) of one or more items.

At block 804 of FIG. 11, the sender electronic device receives, via the one or more input devices of the sender electronic device, input (e.g., 702F) corresponding to selection of an item (e.g., the shirt depicted in 702D, a tangible good, an intangible good, or a service) from among the one or more of items.

At block 806 of FIG. 11, in accordance with some embodiments, the sender electronic device receives, via the one or more input devices of the sender electronic device, one or more financial parameters.

At block 808 of FIG. 11, in accordance with some embodiments, the sender electronic device receives, via the one or more input devices of the sender electronic device, selection of one or more approved attributes (e.g., 708A-708E, 710A-710B) of the one or more configurable attributes of the item, wherein attributes of the one or more configurable attributes of the item affect the price of the item.

At block 816 of FIG. 11, in accordance with some embodiments, the sender electronic device transmits (e.g., to the recipient device) an indication that the item has been gifted to the second user by the first user.

At block 1002 of FIG. 11, the recipient electronic device receives information (e.g., the indication from the sender electronic device that the item has been gifted to the second user by the first user) identifying the item (e.g., a gifted item, such as a tangible good, an intangible good, or a service) for which payment has been authorized by a sender electronic device associated with a first user (e.g., a sender) that is different from the second user, the item selected from among one or more (or a plurality of) items based on input received (e.g., by a merchant, by the service, by the electronic device) from the sender electronic device.

At block 1006 of FIG. 11, the recipient electronic device displays, on the display, a graphical representation (e.g., 904A, a name, a description, an image) of the item and graphical representations (e.g., 906, 908) of one or more configurable attributes (e.g., size, color, style) of the item. In some examples, the graphical representation (e.g., 904A) of the item and the graphical representations (e.g., 906, 908) of the one or more configurable attributes of the item are concurrently displayed, on the display of the recipient electronic device.

At block 1010 of FIG. 11, the recipient electronic device detects, via the one or more input devices of the recipient electronic device, selection of one or more attributes (e.g., 906C, 908B) for at least some of the one or more configurable attributes of the item.

At block 1024 of FIG. 11, the recipient electronic device transmits information about the selected one or more attributes to the sender electronic device. In some examples, transmitting the information about the selected one or more attributes to the sender electronic device occurs subsequent to initiating a process for obtaining the item. For example, the recipient electronic device sends information about the selected one or more attributes to the sender electronic device, informing the first user as to how the gift was configured.

At block 820 of FIG. 11, in accordance with some embodiments, the sender electronic device receives (e.g., from the recipient electronic device) information (e.g., the information about the selected one or more attributes) identifying that the second user has initiated a process for obtaining the item with one or more selected attributes.

At block 822 of FIG. 11, in accordance with some embodiments, the sender electronic device displays (e.g., in response to receiving the information identifying that the second user has initiated the process for obtaining the item) (e.g., concurrently), on the display (e.g., based on the information identifying that the second user has initiated the process for obtaining the item): an indication (e.g., 740) that the second user has initiated a process for obtaining the item, and indications (e.g., 740) of at least some (or all) of the one or more selected attributes.

Note that details of the processes described above with respect to FIG. 11 are also applicable in an analogous manner to the methods described below and above. For example, methods 800, 1000, and 1300 optionally include one or more of the characteristics of the various methods described above with reference to the method of FIG. 11. For example, the corresponding blocks of methods 800 and 1000 are referenced with like numerals in FIG. 11. For example, block 802 of FIG. 11 corresponds to block 802 of FIG. 8A and block 1002 of FIG. 11 corresponds to block 1002 of FIG. 10A. For example, the first user uses the sender electronic device to purchase a gift for the second user. The second user uses the recipient electronic device to claim the gift. For brevity, these details are not repeated below.

FIGS. 12A-12I illustrate exemplary user interfaces for managing contextual transactions, in accordance with some embodiments. The user interfaces in these figures are used to illustrate the processes described below, including the processes in FIG. 13.

FIGS. 12A-12I illustrate an exemplary electronic device (e.g., 300A, 300B, 100, 300, 500). The electronic device 300C includes a display and, optionally, one or more input devices. The one or more input devices of the electronic device optionally include a touch-sensitive surface, such as incorporated into the display.

Figure 12A:
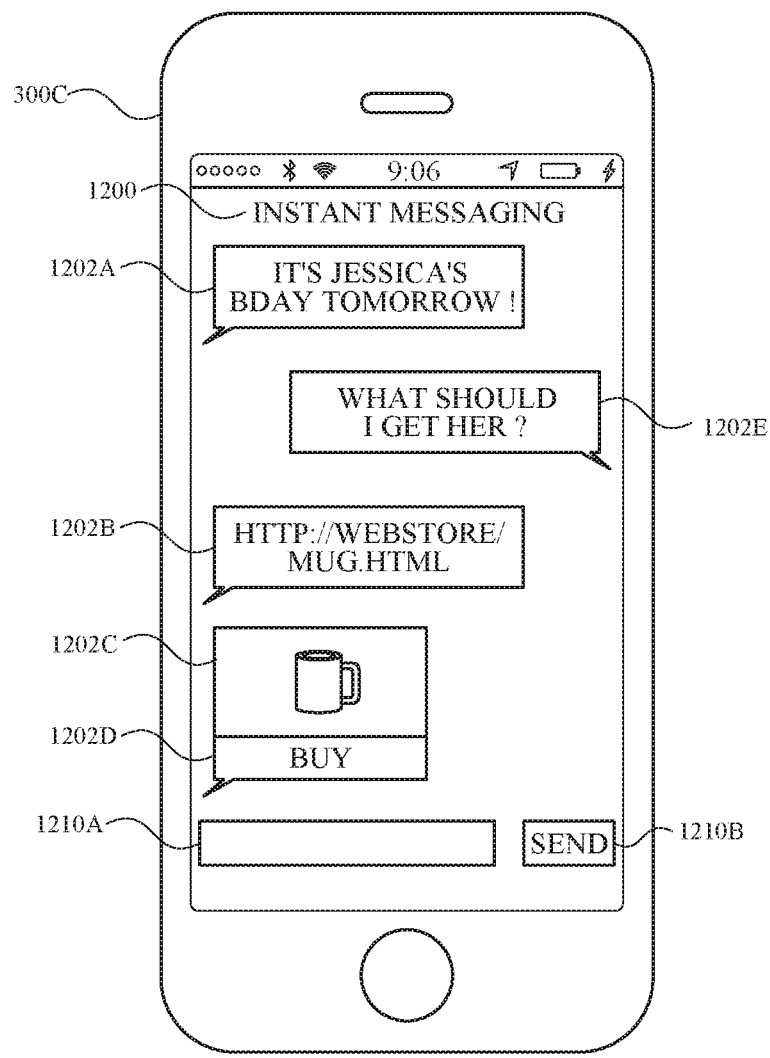
FIG. 12A-12I illustrate exemplary user interfaces for managing contextual transactions, in accordance with some embodiments.
Figure 13:
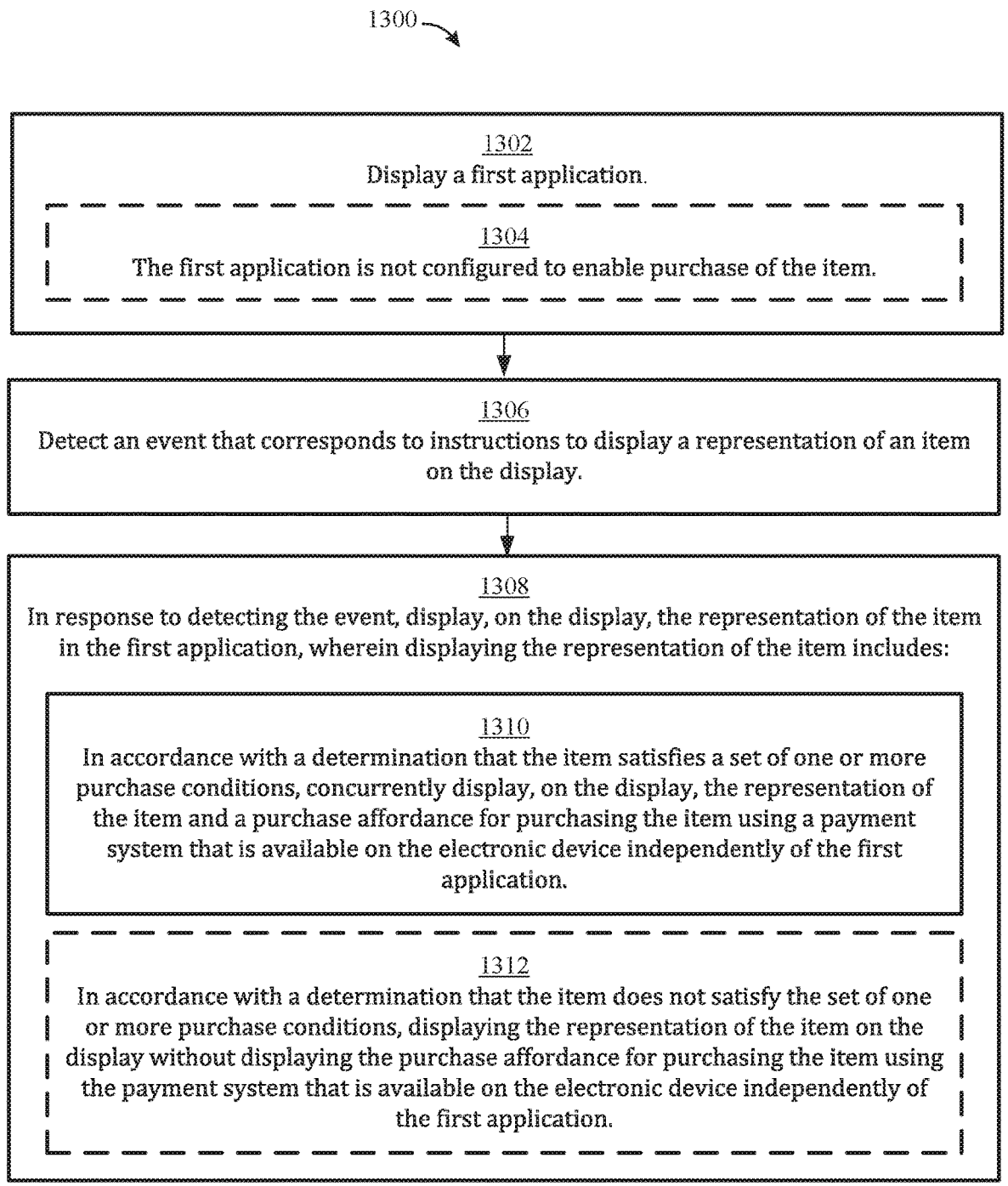
FIG. 13 is a flow diagram illustrating a method for managing contextual transactions, in accordance with some embodiments.

At FIG. 12A, the electronic device 300C displays a first application 1200 (e.g., an instant messaging application, an email application). The electronic device 300C detects (e.g., while displaying the first application 1200) an event that corresponds to instructions to display a representation 1202C of an item (e.g., a tangible good, an intangible good, a service) on the display. In some examples, detecting the event includes receiving a request from the user to display the representation, receiving a message (e.g., in an instant messaging application) that includes the representation of the item, downloading content such as a webpage, transmitting a URL of a webpage including the item. In response to detecting the event, the electronic device 300C displays, on the display, the representation 1202C of the item (e.g., a name of the item, an image of item, a description of item) in the first application 1200 (e.g., an instant messaging application, an email application).

As illustrated in FIG. 12A, displaying the representation of the item includes: in accordance with a determination that the item satisfies a set of one or more purchase conditions, the electronic device 300C concurrently displays, on the display, the representation 1202C of the item and a purchase affordance 1202D for purchasing the item using a payment system that is available on the electronic device 300C independently of the first application 1200. Thus, the purchase affordance 1202D, when activated, initiates a process for purchasing the item using the payment system. In the example of FIG. 12A, the event includes receiving a URL to a webpage that includes the item (e.g., a mug, a shirt), the URL receives from a remote user via the instant messaging application 1200. Accordingly, in the examples of FIG. 12A, the electronic device has determined that the set of one or more conditions is satisfied, and therefore both the representation 1202C of the item and a purchase affordance 1202D for purchasing the item are displayed.

In some examples, instant messaging application 1200 includes messages from multiple participants—a first user and a second user. For example, message balloons 1202A and 1202B correspond to messages received at the electronic device 300C from a remote user. Message balloon 1202E corresponds to a message sent by a user using the electronic device 300C to the remote user.

At. FIG. 12A, the representation 1202C of the item and the purchase affordance 1202D for purchasing the item are displayed as a single message balloon with a tail, the tail indicating that the single message balloon was received from the remote user. In some examples, the single message balloon is displayed on the left side of the display, indicating that the single message balloon was received from the remote user. In some examples, the instant messaging application 1200 also includes an input area 1210A and a send affordance 1210B, which when activated causes the electronic device 300C to transmit a message entered into the input area 1210A to the remote user. The representation 1202C of the item is displayed above the purchase affordance 1202D for purchasing the item.

In some examples, the electronic device 300C detecting the event that corresponds to instructions to display the representation 1202C of the item on the display includes receiving a reference (e.g., a name of the item, an image of the item, a barcode corresponding to the item, a URL to the item, wherein the URL points to an online merchant's webpage with a picture, price, or description of the item) to the item (e.g., a tangible good, an intangible good, a service). In some examples, the electronic device 300C displays, on the display, the reference 1202B (e.g., in response to detecting the event). In some examples, the reference 1202B is displayed as a message balloon in the instant messaging application 1200. In some examples, the electronic device captures an image of an object using a camera sensor of the electronic device 300C. In response to capturing the image, the electronic device performs object recognition to determine that the object in the captured image is the item. In some examples, the electronic device 300A captures an image of a visual identifier (e.g., a barcode, a QR code) of the item using a camera sensor of the electronic device. In response to capturing the image of the visual identifier, the electronic device performs a lookup in a database to determine that the visual identifier corresponds to the item.

Figure 12B:
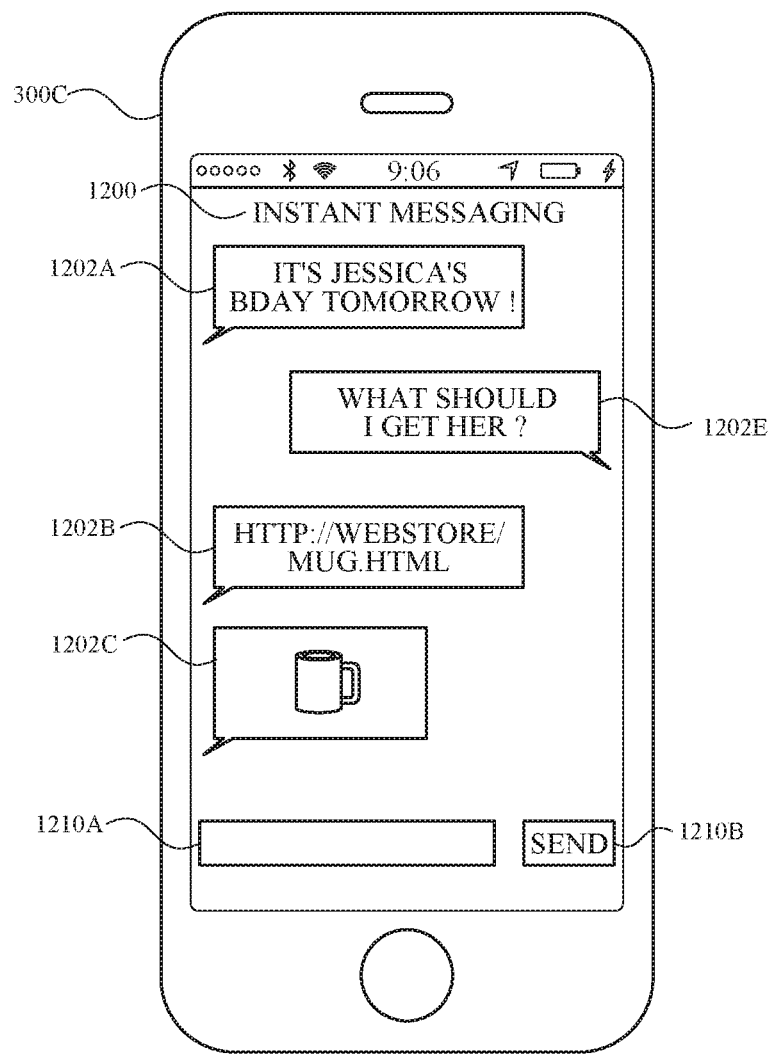

As illustrated in FIG. 12B, in accordance with some embodiments, the electronic device 300C displaying the representation of the item includes: in accordance with a determination that the item does not satisfy the set of one or more purchase conditions, the electronic device 300C displaying the representation 1202C of the item on the display without displaying the purchase affordance 1202D for purchasing the item using the payment system that is available on the electronic device independently of the first application. In the example of FIG. 12B, the electronic device has determined that the set of one or more purchase conditions is not satisfied, and therefore, the representation 1202C of the item is displayed without displaying the purchase affordance 1202D. Accordingly, the electronic device does not present the user with a purchase affordance 1202D if the item cannot be purchased using the payment system that is available on the electronic device 300C independently of the first application. Thus, the user is not confused as to why a displayed purchase affordance does not function properly.

In some examples, the first application (e.g., the instant messaging application 1200) is not configured to enable purchase of the item. In some examples, the first application is not useable by a user to purchase the item. In some examples, the first application is not configured to complete a purchase of the item. In some examples, the first application does not have access to payment information (such as an identifier of a payment account, an account number, etc.) for use in purchase of the item.

In accordance with some embodiments, the electronic device 300C detecting the event that corresponds to instructions to display the representation 1202C of the item on the display includes detecting an identifier (e.g., a URL to a webpage of the item, wherein the URL points to an online merchant's webpage with a picture, price, or description of the item) of a source of purchase of the item (e.g., a tangible good, an intangible good, a service). In some examples, detecting the event includes sending (or detecting transmission of) the identifier to a participant of a conversation using the first application (e.g., instant messaging application 1200). In some examples, detecting the event includes receiving (or detecting receipt of) the identifier from a participant of a conversation using the first application (e.g., instant messaging application 1200). In some examples, the identifier of the source of purchase of the item is a URL at which the item is available for purchase.

In some examples, as illustrated in FIG. 12A, the electronic device 300C concurrently displaying, on the display, the representation 1202C of the item and the purchase affordance 1202D includes: the electronic device 300C displaying, on the display, the purchase affordance 1202D adjacent to (e.g., directly below) the representation 1202C of the item. In some examples, the purchase affordance 1202D is displayed directly above, directly to the left, or directly to the right of the representation 1202C of the item.

In some examples, the set of one or more purchase conditions includes a condition that is satisfied when the item is purchasable using the payment system (e.g., that authenticates the user at the electronic device, such as through fingerprint authentication using a fingerprint sensor of the electronic device) of the electronic device (e.g., purchasable using a particular payment system, rather than generally purchasable).

In some examples, the set of one or more purchase conditions includes a condition that is satisfied when the item is identified as purchasable based on the item being included in a catalog (e.g., a catalog stored and/or maintained by the manufacturer of the electronic device, catalog stored locally in memory, catalog stored at a remote server). In some examples, the electronic device 300C transmits information about the item to a remote server (e.g., that stores or has access to the catalog). In response, the electronic device 300C receives confirmation as to whether the item is purchasable based on the item being included in the catalog. In some examples, the electronic device 300C stores the catalog in memory of the electronic device 300C and identifies whether the item is purchasable based on the item being included in the catalog.

In some examples, the set of one or more purchase conditions includes a condition that is satisfied when the item is identified as purchasable based on metadata available at a source (e.g., a webpage) where the item is available for purchase. For example, the electronic device 300C receives (or transmits) a URL to the item. The electronic device 300C accesses the URL and determines, based on metadata available at the URL, that the item is purchasable using the payment system that is available on the electronic device.

In some examples, the electronic device 300C receives a voice instruction corresponding to the item (e.g., a voice instruction asking where to purchase the item, a voice instruction asking to purchase the item, a voice instruction asking for one or more details about the item). The electronic device purchases (or initiates a process to purchase) the item using an electronic assistant of the electronic device and an electronic wallet of the electronic device (e.g., in response to receiving the voice instruction corresponding to the item). For example, the electronic assistant is a voice-controlled assistant that can access (e.g., via a network) a catalog of purchasable items. In some examples, the catalog of purchasable items is stored and/or maintained by the manufacturer of the electronic device (e.g., on a server at a remote location). In accordance with a determination that the item is in the catalog of purchasable items, the electronic assistant performs a first function (e.g., request authorization, such as fingerprint authorization, to proceed with the purchase of the item). In accordance with a determination that the item is not in the catalog of purchasable items, the electronic assistant does not perform the first function and/or performs a second function (e.g., provides a recommendation (e.g., via display on a display, via audio through a speaker) on where to purchase the item, such as through a website).

In some examples, prior to displaying the representation of the item, the electronic device 300C retrieves the representation 1202C of the item (e.g., a name of the item, an image of item, a description of item) from a remote server based on a received reference to the item. In some examples, the electronic device 300C displays the representation 1202C of the item in response to retrieving the representation 1202C of the item.

Figure 12C:
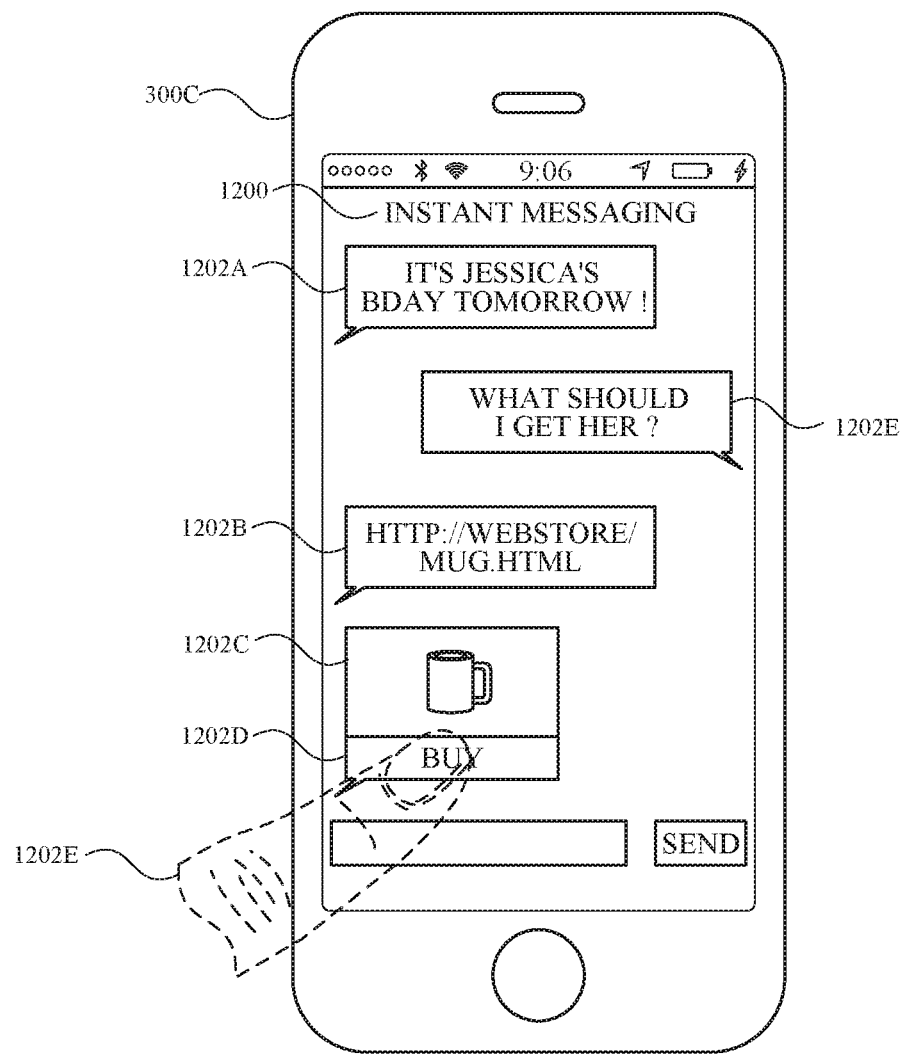

As illustrated in FIG. 12C, in some examples, the electronic device 300C detects, via one or more input devices, activation of the purchase affordance 1202D. For example, the electronic device detects a tap input (e.g., of the finger 1202E) on a touch-sensitive surface of the electronic device 300C at a location that corresponds to the purchase affordance 1202D. In response to detecting activation of the purchase affordance 1202D, the electronic device 300C displays a user interface 1204 of an electronic wallet application of the electronic device for proceeding with the purchase of the item. In some examples, the electronic wallet application is different from the first application. In some examples, the electronic wallet application is part of the payment system that is available on the electronic device independently of the first application.

Figure 12D:
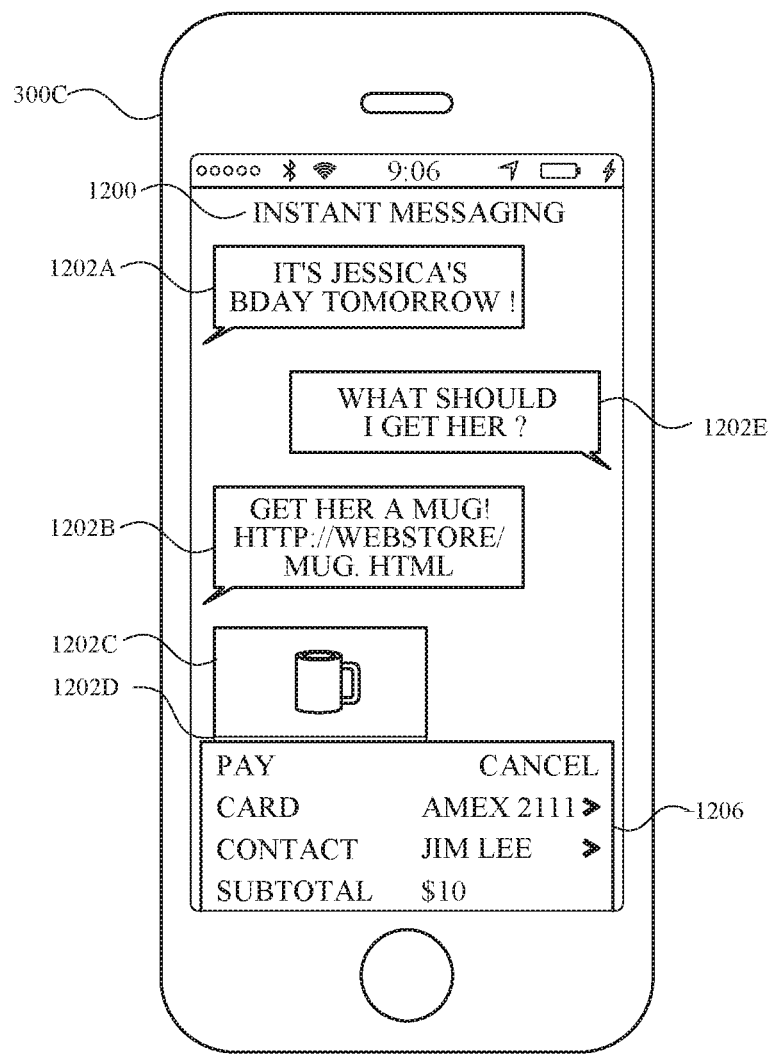
Figure 12E:
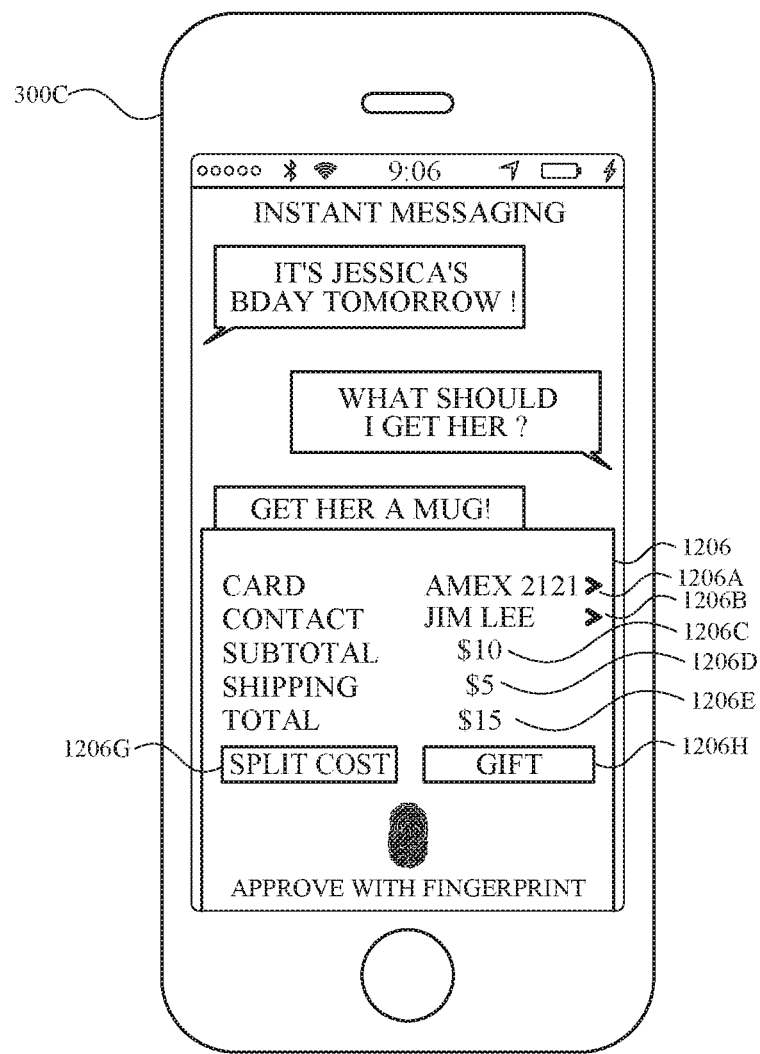

For example, the electronic device 300C displays an electronic wallet application of the electronic device 300C, that is different from the first application (e.g., the instant messaging application 1200). In some examples, the user interface 1206 of the electronic wallet application slides into view on the display, such as from the bottom of the display as illustrated in FIGS. 12D-12E. In some examples, the user interface 1206 includes one or more of: an indication 1206A of a payment account of the electronic wallet application of the electronic device 300C, contact information 1206B for the user (e.g., associated with the electronic device 300C or logged into the electronic device 300C), a subtotal 1206C for the item, a shipping cost (e.g., estimated shipping cost) 1206D, and a total price 1206E. In some examples, the contact information 1206B is automatically populated using information received from a phonebook application of the election device 300C.

In accordance with some embodiments, the user interface 1206 of the electronic wallet application includes an option 1206G to split the cost of the purchase of the item with one or more additional purchasers. For example, the electronic wallet includes an option to identify one or more additional purchasers who will each contribute to the purchase of the item. In accordance with some embodiments, the user interface 1206 of the electronic wallet application includes an option 1206H to specify that the item is a gift. As described above with reference to FIGS. 7C-7L, this allows a user to specify details about the gift so that a recipient of the gift can claim the gift.

Figure 12F:
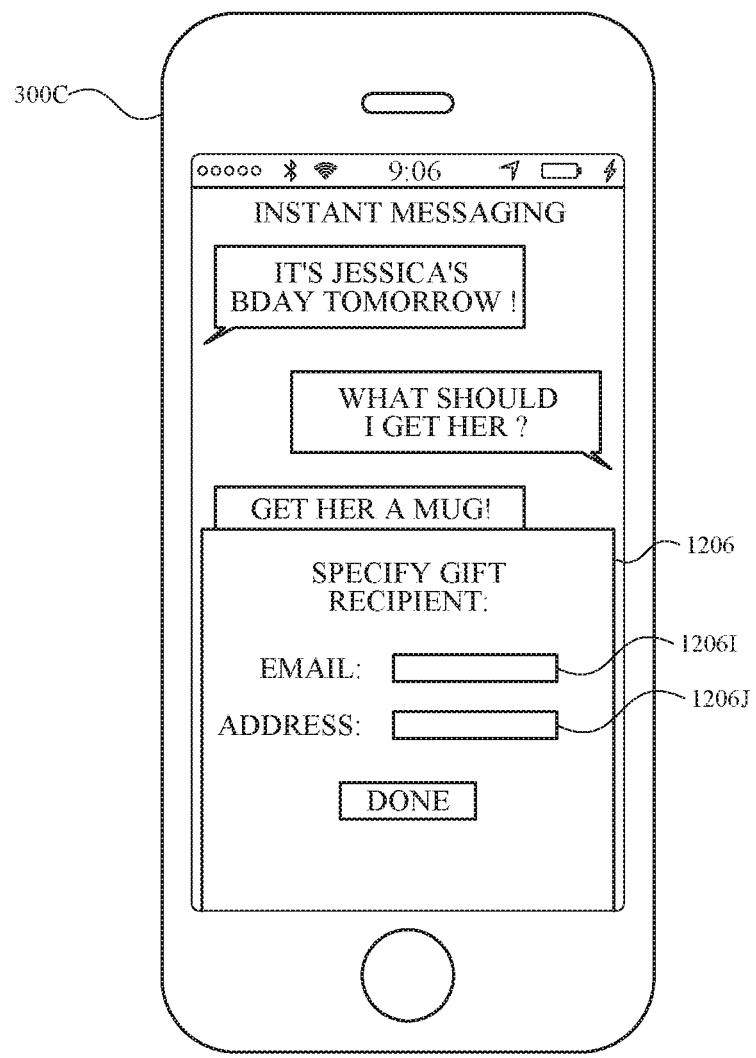
Figure 12G:
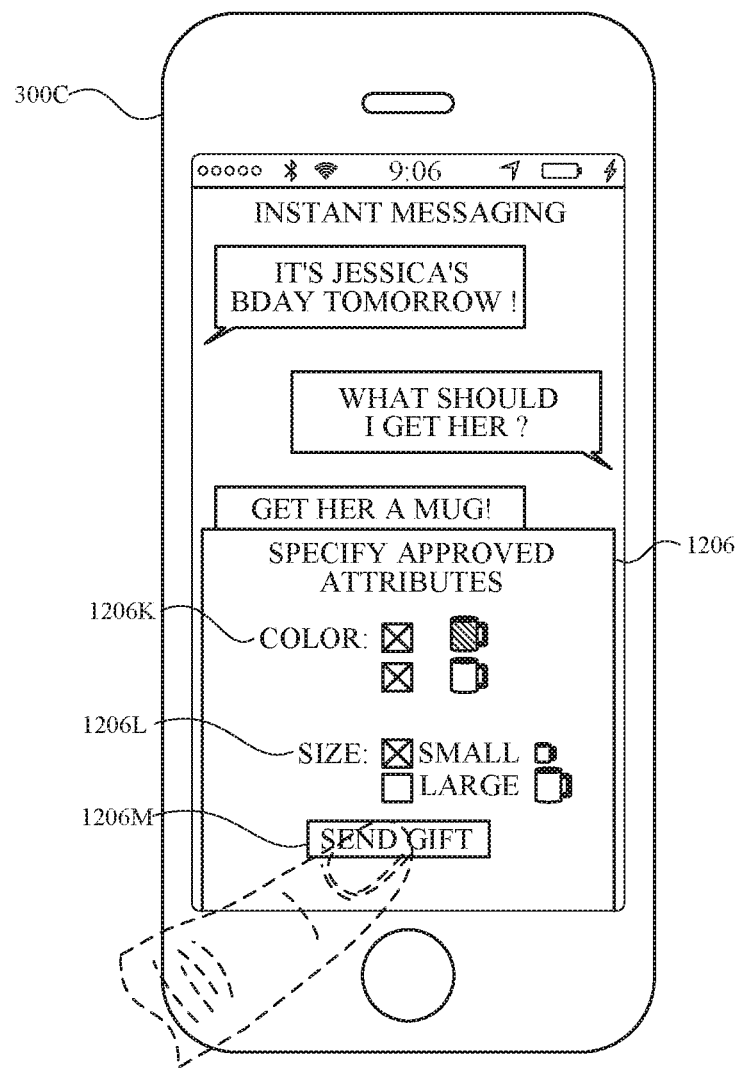
Figure 12H:
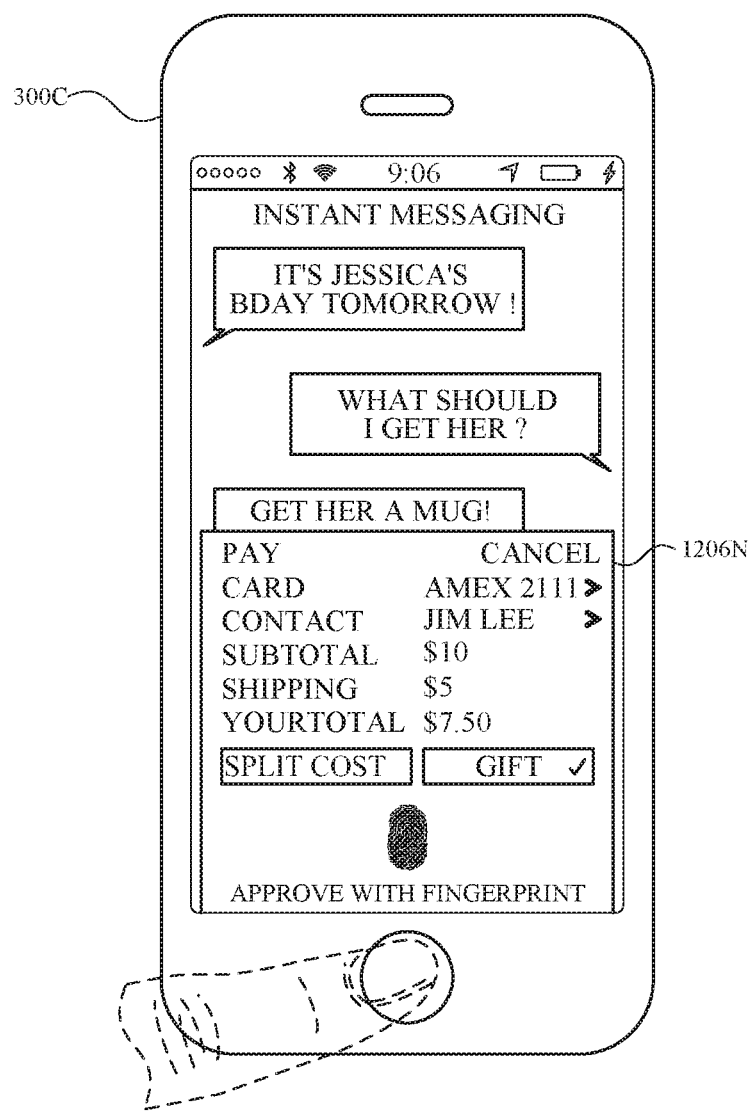

As illustrated in FIG. 12F, in some examples, the user interface 1206 of the electronic wallet application includes an option 1206H for specifying a recipient of the item (e.g., by username, phone number, email address) In some examples, the electronic device 300C detects, via the one or more input devices, input specifying the recipient 12061-1206J of the item. In some examples, the electronic device determines (e.g., based on contextual data) whether the item is intended for a recipient other than the user of the electronic device. In accordance with a determination that the item is intended for a recipient other than the user of the electronic device 300C, the user interface 1206 of the electronic wallet application includes the option for specifying a recipient of the item. In accordance with a determination that the item is not intended for a recipient other than the user of the electronic device, the user interface of the electronic wallet application does not include the option for specifying a recipient of the item.

In some examples, the user interface of the electronic wallet application 1206 includes graphical representations 1206K and 1206L of one or more configurable attributes (e.g., size, color, style) of the item. In some examples, the electronic device 300C concurrently displays, on the display, a graphical representation of the item and the graphical representations of the one or more configurable attributes of the item. In some examples, the electronic device 300C detects, via the one or more input devices, selection of one or more attributes 1206K 1206L (e.g., large for size, blue for color, long-sleeve for style) for at least some of the one or more configurable attributes of the item. Subsequent to detecting selection of the one or more attributes, the electronic device detects, via the one or more input devices, a request (e.g., activation of a "send gift" affordance 1206M) to proceed with payment for the item.

In accordance with some embodiments, subsequent to detecting activation of the payment affordance: the electronic device 300C displays (e.g., as part of the electronic wallet application) a request 1206N for authorization to proceed with a payment transaction for the item. The electronic device 300C receives an input (e.g., detects a fingerprint using a fingerprint sensor of the electronic device 300C) that is responsive to the request for authorization to proceed with the payment transaction for the item (e.g., user authentication information, a fingerprint, a passcode). In some examples, receiving authorization to proceed with the payment transaction includes receiving a passcode via a touch-sensitive surface of the electronic device, the passcode being determined to be consistent with an enrolled passcode that is enabled to authorize the payment transaction. In some examples, receiving authorization to proceed includes detecting a fingerprint, the fingerprint being determined to be consistent with an enrolled fingerprint that is enabled to authorize the payment transaction. For example, the device stores information about one or more fingerprints of the user to use for determining whether a respective fingerprint is enabled to authorize the payment transaction. In some examples, receiving authorization to proceed includes receiving a double-press of a mechanical button while the device is in an unlock state (and optionally, while the device has been continuously on a user's wrist since the device was unlocked by providing authentication credentials to the device, where the continuous presence of the device on the user's wrist is determined by periodically checking that the device is in contact with the user's skin).

Figure 12I:
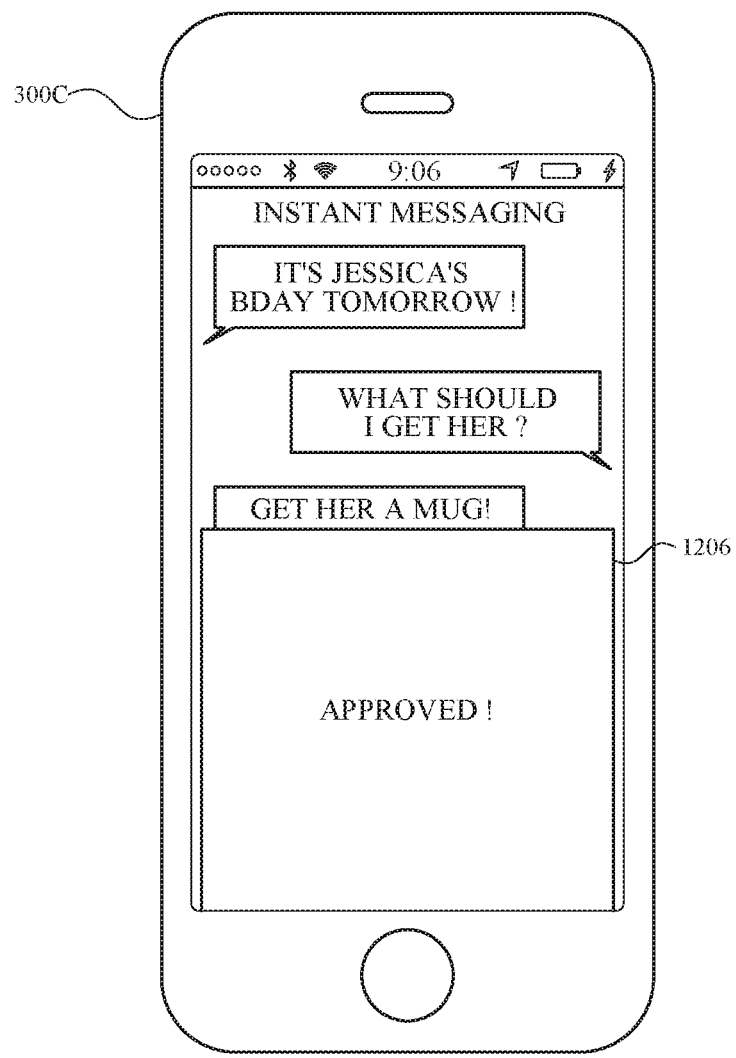

As illustrated in FIG. 12I, in accordance with some embodiments, in accordance with a determination that the input that is responsive to the request for authorization is consistent with input that is enabled to authorize the payment transaction for the item, the electronic device 300C proceeds with the payment transaction for the item. In some examples, the electronic device 300C displays, on the display, an indication that the electronic device 300C is proceeding with the payment transaction for the item. If the input that is responsive to the request for authorization is not consistent with an enrolled passcode or fingerprint (respectively) that is enabled to authorize the payment transaction, the electronic device 300C does not proceed with the payment transaction for the item.

In some examples, proceeding with the payment transaction includes transmitting payment information to a payment transaction server to engage in a payment transaction for the item. In some examples, engaging in the payment transaction includes routing information to one or more financial institutions to verify payment credentials and/or receive authorization to complete the transaction. For example, payment information is transmitted from the device to a payment server for engaging in the payment transaction.

In some examples, proceeding with the payment transaction includes using the payment information (e.g., payment information of a payment account linked to the electronic device and stored in an electronic wallet of the device) to complete the payment transaction. In some examples, proceeding with the payment transaction includes using the payment information (e.g., a primary account number) for use in the payment transaction (e.g., using a credit account to make the purchase) to complete the payment transaction, where the payment information is stored at the electronic device. In some examples, the electronic wallet application is part of the payment system that is available on the electronic device independently of the first application.

FIG. 13 is a flow diagram illustrating a method for 1300 using an electronic device in accordance with some embodiments. Method 1300 is performed at a device (e.g., 100, 300, 300A, 300B, 300C, 500) with a display. Some operations in method 1300 are, optionally, combined, the order of some operations are, optionally, changed, and some operations are, optionally, omitted.

As described below, method 1300 provides an intuitive way for managing contextual transactions. The method reduces the cognitive burden on a user for both managing a contextual payment and participating in a transaction for a gift, thereby creating a more efficient human-machine interface. For battery-operated computing devices, enabling a user to manage a contextual transaction faster and more efficiently conserves power and increases the time between battery charges.

At block 1302, the electronic device displays a first application (e.g., an instant messaging application 1200, an email application). In accordance with some embodiments, at block 1304, the first application is not configured to enable purchase of an item.

At block 1306, the electronic device detects an event that corresponds to instructions to display a representation of an item (e.g., a tangible good, an intangible good, a service) on the display (e.g., receiving a request from the user to display the representation, receiving a message that includes the representation of the item, downloading content such as a webpage, transmitting a URL of a webpage including the item). In some examples, the electronic device detects the event while displaying the first application.

At block 1308, in response to detecting the event, the electronic device displays, on the display, the representation 1202C of the item (e.g., a name of the item, an image of item, a description of item) in the first application (e.g., an instant messaging application 1200, an email application).

At block 1310, displaying the representation of the item includes: in accordance with a determination that the item satisfies a set of one or more purchase conditions, the electronic device concurrently displays, on the display, the representation (1202C) of the item and a purchase affordance (e.g., 1202D) for purchasing the item using a payment system that is available on the electronic device independently of the first application. For example, the electronic device informs the user of the item, while maintaining display of the user interface for the first application (e.g., 1200), and simultaneously provides the user (without requiring additional user inputs from the user) with a mechanism (e.g., purchase affordance 1202D) for purchasing the item. Thus, the purchase affordance, when activated, initiates a process for purchasing the item using the payment system.

At block 1312, in accordance with some embodiments, displaying the representation of the item includes: in accordance with a determination that the item does not satisfy the set of one or more purchase conditions, the electronic device displays the representation (e.g., 1202C) of the item on the display without displaying the purchase affordance for purchasing the item using the payment system that is available on the electronic device independently of the first application. Accordingly, the electronic device does not present the user with a purchase affordance (e.g., 1202D) if the item cannot be purchased using the payment system that is available on the electronic device 300C independently of the first application. Thus, the user does not provide extraneous user inputs in an attempt to activate the purchase affordance and the user is not confused as to why a displayed purchase affordance does not function properly.

In accordance with some embodiments, the first application (e.g., 1200) is not configured to enable purchase of the item. In some examples, the first application (e.g., 1200) is not useable by a user to purchase the item. In some examples, the first application (e.g., 1200) is not configured to complete a purchase of the item. In some examples, the first application (e.g., 1200) does not have access to payment information (such as an identifier of a payment account, an account number, etc.).

In accordance with some embodiments, detecting the event that corresponds to instructions to display the representation (e.g., 1202C) of the item on the display includes receiving a reference (e.g., a name of the item, an image of the item, a barcode corresponding to the item, a URL to the item (e.g., as illustrated as part of 1202B), wherein the URL points to an online merchant's webpage with a picture, price, or description of the item) to the item (e.g., a tangible good, an intangible good, a service). In some examples, the electronic device captures an image of an object using a camera sensor of the electronic device. In some examples, the electronic device performs object recognition to determine that the object is the item (and thus can display the representation of the item). In some examples, the electronic device captures an image of a visual identifier (e.g., a barcode, a QR code) using a camera sensor of the electronic device. In some examples, the electronic device performs a lookup in a database to determine that the visual identifier corresponds to the item.

In accordance with some examples, detecting the event that corresponds to instructions to display the representation (e.g., 1202C) of the item on the display includes detecting an identifier (e.g., a URL to a webpage of the item, wherein the URL points to an online merchant's webpage with a picture, price, or description of the item) of a source of purchase of the item (e.g., a tangible good, an intangible good, a service). In some examples, detecting the event includes sending (or detecting sending of) the identifier to a participant of a conversation using the first application (e.g., an instant messaging application 1200). Thus, in some examples, the event is transmitting the identifier via the first application (e.g., 1200). In some examples, detecting the identifier includes receiving (or detecting receipt of) the identifier from a participant of a conversation using the first application (e.g., an instant messaging application). In some examples, the identifier of the source of purchase of the item is a URL where the item is available for purchase.

In accordance with some embodiments, the electronic device concurrently displaying, on the display, the representation (e.g., 1202C) of the item and the purchase affordance includes: the electronic device displaying, on the display, the purchase affordance (e.g., 1202D) adjacent to (e.g., directly below) the representation (e.g., 1202C) of the item. Thus, the user can appreciate that the purchase affordance (e.g., 1202D) corresponds to a process for purchasing the item in the representation (e.g., 1202C), without requiring multiple user inputs to navigate a complex user interface. In some examples, the electronic device displays the purchase affordance (e.g., 1202D) directly above, to the left, or to the right of the representation (e.g., 1202C) of the item.

In accordance with some embodiments, the set of one or more purchase conditions includes a condition that is satisfied when the item is purchasable using the payment system (e.g., that authenticates the user at the electronic device) of the electronic device (e.g., purchasable using a particular payment system, rather than generally purchasable).

In accordance with some embodiments, the set of one or more purchase conditions includes a condition that is satisfied when the item is identified as purchasable based on the item being included in a catalog (e.g., a catalog stored and/or maintained by the manufacturer of the electronic device).

In accordance with some embodiments, the set of one or more purchase conditions includes a condition that is satisfied when the item is identified as purchasable based on metadata available at a source (e.g., a webpage) where the item is available for purchase. For example, the electronic device receives (or transmits) a URL to the item. The device accesses the URL and determines, based on metadata available at the URL, that the item is purchasable using the payment system that is available on the electronic device.

In accordance with some embodiments, the electronic device receives a voice instruction corresponding to the item (e.g., a voice instruction asking where to purchase the item, a voice instruction asking to purchase the item, a voice instruction asking for one or more details about the item). As a result, the electronic device uses contextual information to minimize the number of user inputs required to proceed with purchasing the item. The electronic device purchases (or proceeds with purchasing) the item using an electronic assistant of the electronic device and an electronic wallet of the electronic device (e.g., in response to receiving the voice instruction asking to purchase the item). For example, the electronic assistant is a voice-controlled assistant that can access (e.g., via a network) a catalog of purchasable items. In some examples, the catalog of purchasable items is stored and/or maintained by the manufacturer of the electronic device (e.g., on a server at a remote location). In some examples, in accordance with a determination that the item is in the catalog of purchasable items, the electronic assistant performs a first function (e.g., request authorization to proceed with the purchase of the item). In some examples, in accordance with a determination that the item is not in the catalog of purchasable items, the electronic assistant does not perform the first function and/or performs a second function (e.g., provides a recommendation on where to purchase the item, such as through a website).

In accordance with some embodiments, prior to the electronic device displaying the representation (e.g., 1202C) of the item, the electronic device retrieves the representation (e.g., 1202C) of the item (e.g., a name of the item, an image of item, a description of item) from a remote server based on a received reference to the item.

In accordance with some embodiments, the electronic device detects, via one or more input devices, activation of the purchase affordance (e.g., 1202D). In response to detecting activation of the purchase affordance, the electronic device displays a user interface (e.g. of an electronic wallet application of the electronic device for proceeding with the purchase of the item.

In accordance with some embodiments, the user interface of the electronic wallet application includes an option to split the cost of the purchase of the item with one or more additional purchasers. For example, the electronic wallet includes an option to identify one or more additional purchasers who will each contribute to the purchase of the item.

In accordance with some embodiments, the user interface of the electronic wallet application includes an option for specifying a recipient of the item (e.g., by username, phone number, email address). The electronic device detects, via the one or more input devices, input specifying the recipient of the item. In some examples, the electronic device determines (e.g., based on contextual data) whether the item is intended for a recipient other than the user of the electronic device. In accordance with a determination that the item is intended for a recipient other than the user of the electronic device, the user interface of the electronic wallet application includes the option for specifying a recipient of the item. In accordance with a determination that the item is not intended for a recipient other than the user of the electronic device, the user interface of the electronic wallet application does not include the option for specifying a recipient of the item.

In accordance with some embodiments, the user interface of the electronic wallet application includes graphical representations of one or more configurable attributes (e.g., size, color, style) of the item. In some examples, a graphical representation of the item and the graphical representations of the one or more configurable attributes of the item are concurrently displayed, on the display. In some examples, the electronic device detects, via the one or more input devices, selection of one or more attributes (e.g., large for size, blue for color, long-sleeve for style) for at least some of the one or more configurable attributes of the item. Subsequent to detecting selection of the one or more attributes, the electronic device detects, via the one or more input devices, a request (e.g., activation of a "send gift" affordance) to proceed with payment for the item.

In accordance with some embodiments, subsequent to detecting activation of the payment affordance: the electronic device displays a request for authorization to proceed with a payment transaction for the item, and the electronic device receives an input that is responsive to the request for authorization to proceed with the payment transaction for the item (e.g., user authentication information, a fingerprint, a passcode). In some examples, receiving authorization to proceed with the payment transaction includes receiving a passcode via a touch-sensitive surface of the electronic device, the passcode being determined to be consistent with an enrolled passcode that is enabled to authorize the payment transaction. In some examples, authorization to proceed includes detecting a fingerprint, the fingerprint being determined to be consistent with an enrolled fingerprint that is enabled to authorize the payment transaction. For example, the device stores information about one or more fingerprints of the user to use for determining whether a respective fingerprint is enabled to authorize the payment transaction. In some examples, authorization to proceed includes receiving a double-press of a mechanical button while the device is in an unlock state (and optionally, while the device has been continuously on a user's wrist since the device was unlocked by providing authentication credentials to the device, where the continuous presence of the device on the user's wrist is determined by periodically checking that the device is in contact with the user's skin). In accordance with a determination that the input that is responsive to the request for authorization is consistent with input that is enabled to authorize the payment transaction for the item, the electronic device proceeds with the payment transaction for the item. If the input that is responsive to the request for authorization is not consistent with an enrolled passcode or fingerprint (respectively) that is enabled to authorize the payment transaction, the electronic device does not proceed with the payment transaction for the item.

In some examples, proceeding with the payment transaction includes transmitting payment information to a payment transaction server to engage in a payment transaction for the item. In some examples, engaging in the payment transaction includes routing information to one or more financial institutions to verify payment credentials and/or receive authorization to complete the transaction. For example, payment information is transmitted from the device to a payment server for engaging in the payment transaction.

In some examples, proceeding with the payment transaction includes using the payment information (e.g., payment information of a payment account linked to the electronic device and stored in an electronic wallet of the device) to complete the payment transaction. In some examples, proceeding with the payment transaction includes using the payment information (e.g., a primary account number) for use in the payment transaction (e.g., using a credit account to make the purchase) to complete the payment transaction, where the payment information is stored at the electronic device.

Note that details of the processes described above with respect to method 1300 (e.g., FIG. 13) are also applicable in an analogous manner to the methods described below/above. For example, method 800 and 1000 optionally includes one or more of the characteristics of the various methods described above with reference to method 1300. In some examples, the technique is performed at the sender electronic device to provide a purchase affordance, which the first user can activate to initiate the process for gifting the item. For brevity, these details are not repeated below.

Figure 14:
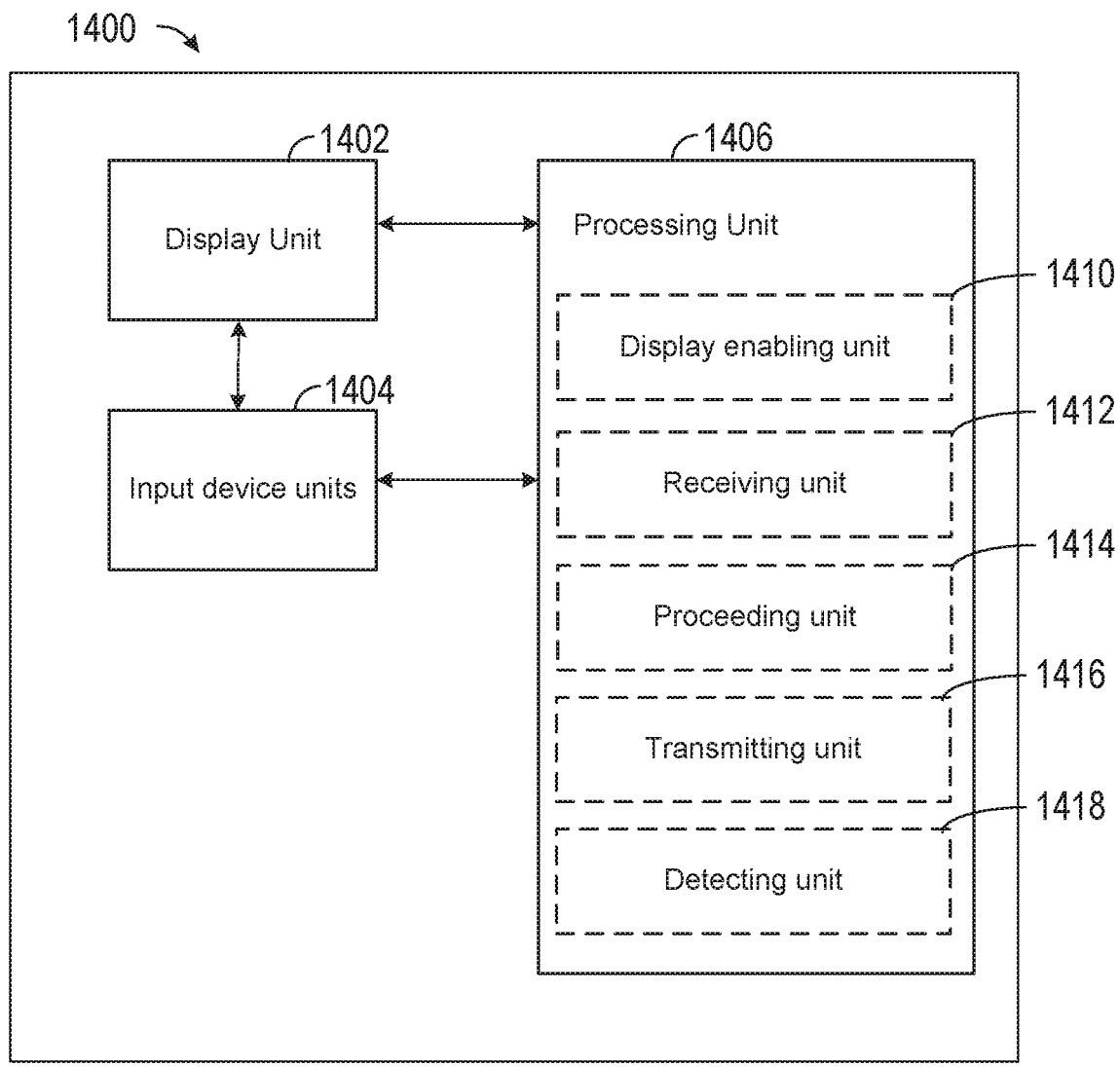
FIGS. 14-16 are functional block diagrams, in accordance with some embodiments.

In accordance with some embodiments, FIG. 14 shows an exemplary functional block diagram of a sender electronic device 1400 configured in accordance with the principles of the various described embodiments. In accordance with some embodiments, the functional blocks of the sender electronic device 1400 are configured to perform the techniques described above. The functional blocks of the device 1400 are, optionally, implemented by hardware, software, or a combination of hardware and software to carry out the principles of the various described examples. It is understood by persons of skill in the art that the functional blocks described in FIG. 14 are, optionally, combined or separated into sub-blocks to implement the principles of the various described examples. Therefore, the description herein optionally supports any possible combination or separation or further definition of the functional blocks described herein.

As shown in FIG. 14, a sender electronic device 1400 includes a display unit 1402 configured to display a graphic user interface, one or more input device units 1404, and a processing unit 1406 coupled to the display unit 1402 and the one or more input device units 1404. In some embodiments, the processing unit 1406 includes a display enabling unit 1410, a receiving unit 1412, a proceeding unit 1414, a transmitting unit 1416, and a detecting unit 1418.

The processing unit 1406 is configured to: enable display (e.g., using the display enabling unit 1410), on the display unit 1402, of graphical representations of one or more items; receive (e.g., using receiving unit 1412), via the one or more input device units 1404 of the sender electronic device 1400, input corresponding to selection of an item from among the one or more of items; enable display (e.g., using the display enabling unit 1410), on the display unit 1402, of a request for authorization of payment for at least a portion of the item for a second user different from the first user; receive (e.g., using receiving unit 1412), via the one or more input device units 1404, an input that is responsive to the request for authorization to purchase the item; in response to receiving the input that is responsive to the request for authorization to purchase the item, in accordance with a determination that the input that is responsive to the request for authorization is consistent with input that is enabled to authorize purchase of the item, proceed (e.g., using proceeding unit 1414) with authorizing payment for at least a portion of the item; and wherein one or more attributes of one or more configurable attributes of the item are configured to be selected by the second user prior to the second user submitting a request to claim the item.

In accordance with some embodiments, the processing unit 1406 is further configured to: in accordance with the determination that the input that is responsive to the request for authorization is consistent with input that is enabled to authorize purchase of the item, transmit (e.g., using the transmitting unit 1416) an indication that the item has been gifted to the second user by the first user.

In accordance with some embodiments, the processing unit 1406 is further configured to: receive (e.g., using the receiving unit 1412), via the one or more input device units 1404, one or more financial parameters; and wherein proceeding with authorizing purchase of the item includes transmitting the one or more financial parameters.

In accordance with some embodiments, the processing unit 1406 is further configured to: receive (e.g., using the receiving unit 1412), via the one or more input device units 1404, selection of one or more approved attributes of the one or more configurable attributes of the item, wherein attributes of the one or more configurable attributes of the item affect the price of the item; and wherein proceeding with authorizing purchase of the item includes transmitting the one or more approved attributes of the one or more configurable attributes of the item.

In accordance with some embodiments, the processing unit 1406 is further configured to: enable display (e.g., using the display enabling unit 1410), on the display unit 1402, of an option for specifying a recipient of the item; and detect (e.g., using the detecting unit 1418), via the one or more input device units 1404, input specifying the second user as the recipient of the item.

In accordance with some embodiments, the item has one or more configurable attributes and selection of one or more attributes of the one or more configurable attributes of the item affect the price of the item.

In accordance with some embodiments, the processing unit 1406 is further configured to: subsequent to proceeding with authorizing purchase of the item, receive (e.g., using the receiving unit 1412) information identifying that the second user has initiated a process for obtaining the item with one or more selected attributes; and enable display (e.g., using the display enabling unit 1410), on the display unit 1402, of: an indication that the second user has initiated a process for obtaining the item; and indications of at least some of the one or more selected attributes.

In accordance with some embodiments, the processing unit 1406 is further configured to: subsequent to receiving information identifying that the second user has initiated the process for obtaining the item: in accordance with a determination that the item does not conform to the one or more financial parameters: enable display (e.g., using the display enabling unit 1410), on the display unit 1402, of a second request for authorization of payment for at least a second portion of the item for a second user; receive (e.g., using the receiving unit 1412), via the one or more input devices 1404, a second input that is responsive to the second request for authorization to purchase the item; in response to receiving the second input, in accordance with a determination that the second input that is responsive to the second request for authorization is consistent with input that is enabled to authorize purchase of the item, proceed (e.g., using proceeding unit 1414) with authorizing payment for at least the second portion of the item.

In accordance with some embodiments, the indication that the second user has initiated the process for obtaining the item is displayed in an instant messaging application.

In accordance with some embodiments, the payment for at least the portion of the item is processed in response to the second user submitting the request to claim the item.

In accordance with some embodiments, the payment for at least the portion of the item is processed in accordance with the sender electronic device authorizing payment for at least the portion of the item.

In accordance with some embodiments, the processed payment for at least the portion of the item is refunded in accordance with the second user not claiming the item within a predetermined time after the sender electronic device authorizes payment for at least the portion of the item.

The operations described above with reference to FIG. 8A-8C are, optionally, implemented by components depicted in FIGS. 1A-1B or FIG. 14. For example, receiving operation 804 and displaying operation 822 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 15:
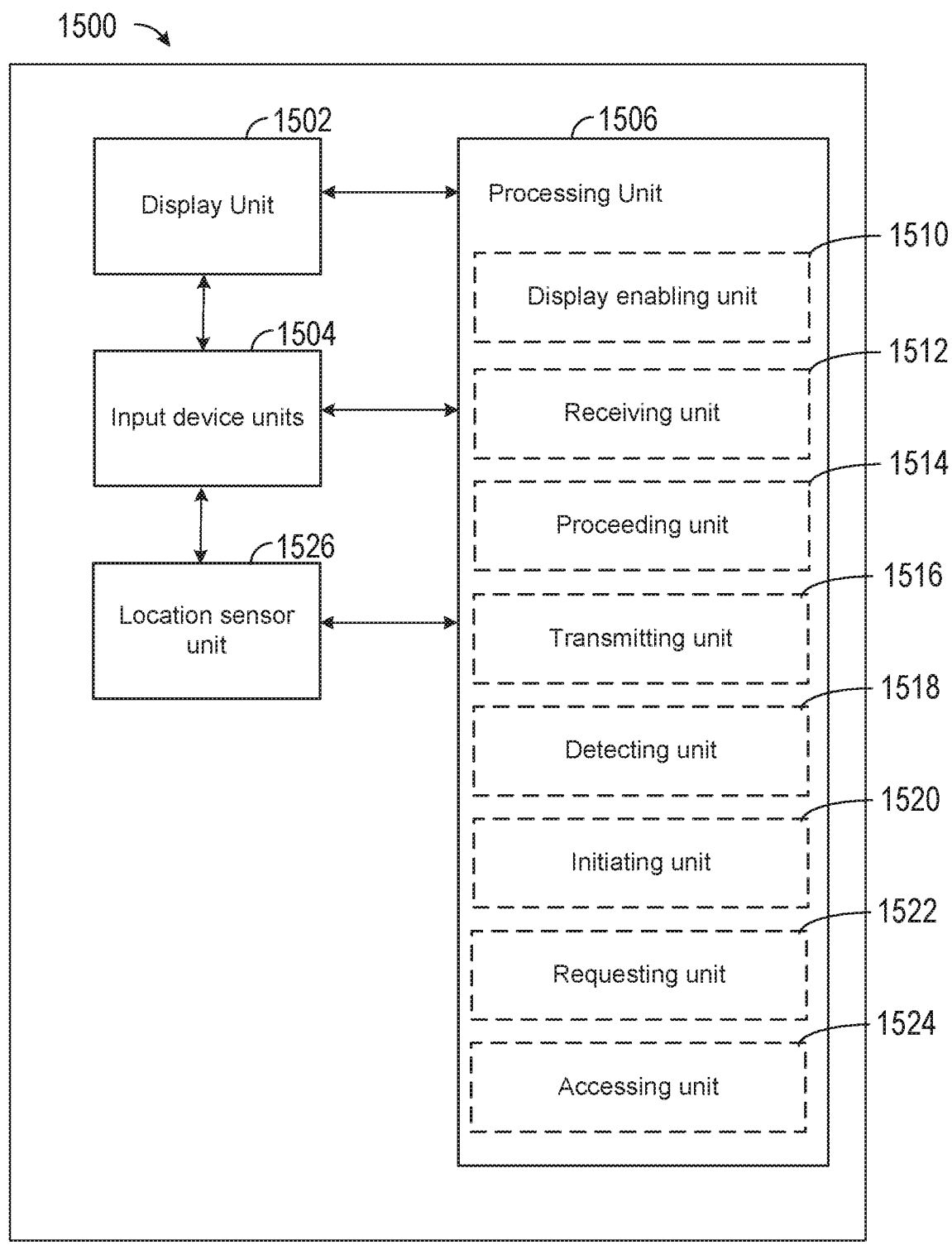

In accordance with some embodiments, FIG. 15 shows an exemplary functional block diagram of a recipient electronic device 1500 configured in accordance with the principles of the various described embodiments. In accordance with some embodiments, the functional blocks of the recipient electronic device 1500 are configured to perform the techniques described above. The functional blocks of the device 1500 are, optionally, implemented by hardware, software, or a combination of hardware and software to carry out the principles of the various described examples. It is understood by persons of skill in the art that the functional blocks described in FIG. 15 are, optionally, combined or separated into sub-blocks to implement the principles of the various described examples. Therefore, the description herein optionally supports any possible combination or separation or further definition of the functional blocks described herein.

As shown in FIG. 15, a recipient electronic device 1500 includes a display unit 1502 configured to display a graphic user interface, one or more input device units 1504, optionally, a location sensor unit 1526, and a processing unit 1506 coupled to the display unit 1502, the one or more input device units 1504, and, optionally, location sensor unit 1526. In some embodiments, the processing unit 1506 includes a display enabling unit 1510, a receiving unit 1512, a proceeding unit 1514, a transmitting unit 1516, a detecting unit 1518, an initiating unit 1520, a requesting unit 1522, and an accessing unit 1524.

The processing unit 1506 is configured to: receive (e.g., using the receiving unit 1512) information identifying an item for which payment has been authorized by a sender electronic device associated with a first user that is different from the second user, the item selected from among one or more items based on input received from the sender electronic device; enable display (e.g., using the display enabling unit 1510), on the display unit 1502, of a graphical representation of the item and graphical representations of one or more configurable attributes of the item; detect (e.g., using the detecting unit 1518), via the one or more input device units 1504 of the recipient electronic device, selection of one or more attributes for at least some of the one or more configurable attributes of the item; subsequent to detecting selection of the one or more attributes, detect (e.g., using the detecting unit 1518), via the one or more input device units 1504 of the recipient electronic device, a request to claim the item; and in response to detecting the request to claim the item, initiate (e.g., using the initiating unit 1520) a process for obtaining the item with the selected one or more attributes.

In accordance with some embodiments, the one or more attributes for the one or more configurable attributes of the item are limited to attributes that are available within one or more financial parameters set by the first user.

In accordance with some embodiments, the processing unit 1506 is further configured to: while displaying, on the display unit 1502, the graphical representations of the one or more configurable attributes of the item, forego display (e.g., using the display enabling unit 1510), on the display unit 1502, of respective prices for the one or more configurable attributes.

In accordance with some embodiments, when receiving the information identifying the item for which payment has been authorized, the recipient electronic device is logged into a service using a second user account associated with the second user; and when the payment was authorized by the sender electronic device associated with the first user, the sender electronic device is logged into the service using a first user account different from the second user account, the first user account associated with the first user.

In accordance with some embodiments, initiating the process for obtaining the item with the selected one or more attributes includes transmitting the selected attributes.

In accordance with some embodiments, initiating the process for obtaining the item with the selected one or more attributes includes transmitting an indication of the request to claim the item.

In accordance with some embodiments, the processing unit 1506 is further configured to: subsequent to detecting the request to claim the item, transmit (e.g., using the transmitting unit 1516) information about the selected one or more attributes to the sender electronic device.

In accordance with some embodiments, the processing unit 1506 is further configured to: subsequent to detecting the request to claim the item: in accordance with a determination that the request to claim the item included the selection of attributes that exceed one or more financial parameters set by the first user, request payment (e.g., using the requesting unit 1522), from the second user, for an amount that is determined based on how much a total price of the item exceeds the financial parameters prior to initiating the process for obtaining the item; and in accordance with a determination that the request to claim the item did not include the selection of attributes that exceed the financial parameter set by the first user, initiate (e.g., using the initiating unit 1520) the process for obtaining the item without requesting payment from the second user.

In accordance with some embodiments, the processing unit 1506 is further configured to: subsequent to detecting the request to claim the item, request payment (e.g., using the requesting unit 1522), from the second user, for an amount less than a total price of the item.

In accordance with some embodiments, the processing unit 1506 is further configured to: enable display (e.g., using the display enabling unit 1510), on the display unit 1502, of a graphical indication of the information identifying the item for which payment has been authorized in an instant messaging application of the recipient electronic device.

In accordance with some embodiments, enabling display of the graphical representation of the item and graphical representations of one or more configurable attributes of the item includes enabling display, on the display unit 1502, of the graphical representation of the item and the graphical representations of one or more configurable attributes in an instant messaging application of the recipient electronic device.

In accordance with some embodiments, the processing unit 1506 is further configured to: detect (e.g., using the detecting unit 1518), via the one or more input device units 1504 of the recipient electronic device that is associated with the second user, input of shipping information that specifies a physical address at which the item can be delivered to the second user.

In accordance with some embodiments, the processing unit 1506 is further configured to: access (e.g., using the accessing unit 1524) personal information about the second user stored at the recipient electronic device that is associated with the second user; and wherein initiating the process for obtaining the item with the selected one or more attributes includes transmitting the personal information.

In accordance with some embodiments, the processing unit 1506 is further configured to: detect (e.g., using the detecting unit 1518), via the one or more input device units 1504 of the recipient electronic device associated with the second user, selection of an option to expedite delivery of the item; enable display (e.g., using the display enabling unit), on the display unit 1502, of a request for authorization to proceed with a payment for expedited delivery of the item; receive (e.g., using the receiving unit 1512), via the one or more input device units 1504 of the recipient electronic device associated with the second user, an input that is responsive to the request for authorization to proceed with the payment; and in response to receiving the input, in accordance with a determination that the input that is responsive to the request for authorization to proceed with the payment is consistent with an input enabled to authorize to proceed with the payment, proceed (e.g., using the proceeding unit 1514) with the payment for expedited delivery of the item using an account of an electronic wallet of the recipient electronic device.

In accordance with some embodiments, the processing unit 1506 is further configured to: in response to receiving the input, in accordance with a determination that the input that is responsive to the request for authorization to proceed with the payment is not consistent with an input enabled to authorize to proceed with the payment, forego proceeding (e.g., using the proceeding unit 1514) with the payment for expedited delivery of the item using an account of an electronic wallet of the recipient electronic device.

In accordance with some embodiments, the processing unit 1506 is further configured to: enable display (e.g., using the display enabling unit 1510), on the display unit 1502, of an indication that the item is a gift item.

In accordance with some embodiments, the recipient electronic device 1500 includes a location sensor unit 1526, wherein the processing unit 1506 is further configured to: detect (e.g., using the detecting unit 1518), using the location sensor unit 1526, a current location of the recipient electronic device; and in accordance with a determination that the item is available at a merchant associated with the current location, enable display (e.g., using the display enabling unit 1510), on the display unit 1502, of a second indication of the information identifying the item for which payment has been authorized.

In accordance with some embodiments, the processing unit 1506 is further configured to: enable display (e.g., using the display enabling unit 1510), on the display unit 1502, of a request for authorization to proceed with a payment transaction for the item; receive (e.g., using the receiving unit 1512), via the one or more input device units 1504 of the recipient electronic device, an input that is responsive to the request for authorization to proceed with the payment transaction; and in response to receiving the input, in accordance with a determination that the input that is responsive to the request for authorization is consistent with input that is enabled to authorize the payment transaction, proceed (e.g., using the proceeding unit 1514) with the payment transaction for the item.

In accordance with some embodiments, the processing unit 1506 is further configured to: in response to receiving the input, in accordance with a determination that the input that is responsive to the request for authorization is not consistent with input that is enabled to authorize the payment transaction, forego proceeding (e.g., using the proceeding unit 1514) with the payment transaction for the item.

The operations described above with reference to FIGS. 10A-10C are, optionally, implemented by components depicted in FIGS. 1A-1B or FIG. 15. For example, displaying operation 1006 and detecting operation 1010 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 16:
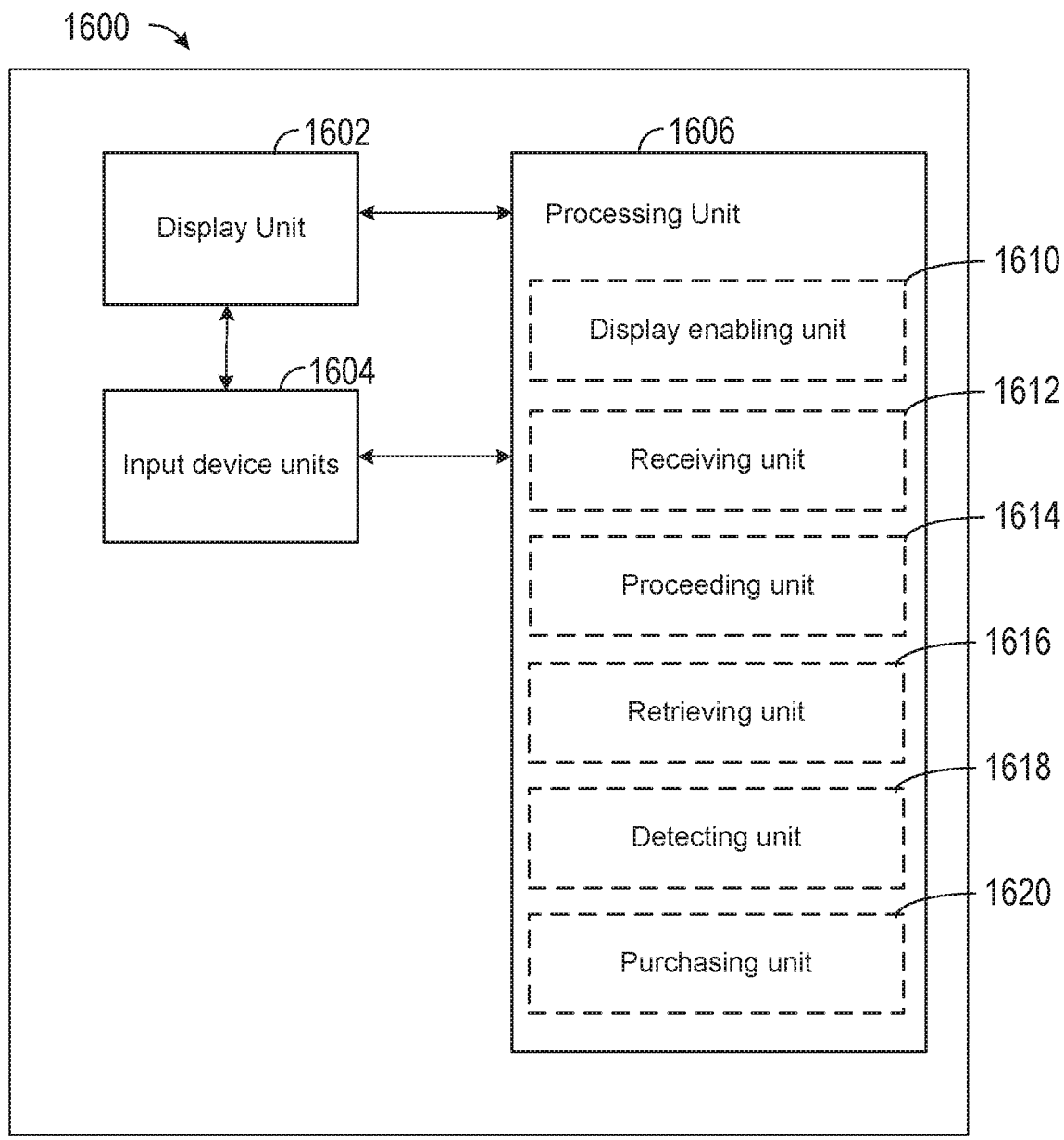

In accordance with some embodiments, FIG. 16 shows an exemplary functional block diagram of an electronic device 1600 configured in accordance with the principles of the various described embodiments. In accordance with some embodiments, the functional blocks of the electronic device 1600 are configured to perform the techniques described above. The functional blocks of the device 1600 are, optionally, implemented by hardware, software, or a combination of hardware and software to carry out the principles of the various described examples. It is understood by persons of skill in the art that the functional blocks described in FIG. 16 are, optionally, combined or separated into sub-blocks to implement the principles of the various described examples. Therefore, the description herein optionally supports any possible combination or separation or further definition of the functional blocks described herein.

As shown in FIG. 16, an electronic device 1600 includes a display unit 1602 configured to display a graphic user interface, one or more input device units 1604, and a processing unit 1606 coupled to the display unit 1602 and the one or more input device units 1604. In some embodiments, the processing unit 1606 includes a display enabling unit 1610, a receiving unit 1612, a proceeding unit 1614, a retrieving unit 1616, a detecting unit 1618, and a purchasing unit.

The processing unit 1606 is configured to: enable display (e.g., using the display enabling unit 1610), on the display unit 1602, of a first application; while enabling display of the first application, detect (e.g., using the detecting unit 1618) an event that corresponds to instructions to enable display of a representation of an item on the display unit 1602; and in response to detecting the event, enable display (e.g., using the display enabling unit 1610), on the display unit 1602, of the representation of the item in the first application, wherein enabling display of the representation of the item includes: in accordance with a determination that the item satisfies a set of one or more purchase conditions, concurrently enable display (e.g., using the display enabling unit 1610), on the display unit 1602, of the representation of the item and a purchase affordance for purchasing the item using a payment system that is available on the electronic device independently of the first application.

In accordance with some embodiments, enabling display of the representation of the item includes: in accordance with a determination that the item does not satisfy the set of one or more purchase conditions, enabling display of the representation of the item on the display unit 1602 without enabling display of the purchase affordance for purchasing the item using the payment system that is available on the electronic device independently of the first application.

In accordance with some embodiments, the first application is not configured to enable purchase (e.g., using the purchasing unit 1620) of the item.

In accordance with some embodiments, detecting the event that corresponds to instructions to enable display (e.g., using the display enabling unit 1610) of the representation of the item on the display unit 1602 includes receiving a reference to the item.

In accordance with some embodiments, detecting the event that corresponds to instructions to enable display (e.g., using the display enabling unit 1610) of the representation of the item on the display unit 1602 includes detecting an identifier of a source of purchase of the item.

In accordance with some embodiments, concurrently enabling display, on the display unit 1602, of the representation of the item and the purchase affordance includes: enabling display, on the display unit 1602, of the purchase affordance adjacent to the representation of the item.

In accordance with some embodiments, the set of one or more purchase conditions includes a condition that is satisfied when the item is purchasable using the payment system of the electronic device.

In accordance with some embodiments, the set of one or more purchase conditions includes a condition that is satisfied when the item is identified as purchasable based on the item being included in a catalog.

In accordance with some embodiments, the set of one or more purchase conditions includes a condition that is satisfied when the item is identified as purchasable based on metadata available at a source where the item is available for purchase.

In accordance with some embodiments, the processing unit 1606 is further configured to: receive (e.g., using the receiving unit 1612) a voice instruction corresponding to the item; and purchase (e.g., using the purchasing unit 1620) the item using an electronic assistant of the electronic device and an electronic wallet of the electronic device.

In accordance with some embodiments, the processing unit 1606 is further configured to: prior to enabling display of the representation of the item, retrieve (e.g., using the retrieving unit 1616) the representation of the item from a remote server based on a received reference to the item.

In accordance with some embodiments, the processing unit 1606 is further configured to: detect (e.g., using the detecting unit 1618), via one or more input device units 1604, activation of the purchase affordance; and in response to detecting activation of the purchase affordance, enable display (e.g., using the display enabling unit 1610), on the display unit 1602, of a user interface of an electronic wallet application of the electronic device 1600 for proceeding with the purchase of the item.

In accordance with some embodiments, the user interface of the electronic wallet application includes an option to split the cost of the purchase of the item with one or more additional purchasers.

In accordance with some embodiments, the user interface of the electronic wallet application includes an option for specifying a recipient of the item, wherein the processing unit 1606 is further configured to: detect (e.g., using the detecting unit 1618), via the one or more input device units 1604, input specifying the recipient of the item.

In accordance with some embodiments, the user interface of the electronic wallet application includes graphical representations of one or more configurable attributes of the item.

In accordance with some embodiments, the processing unit 1606 is further configured to: subsequent to detecting activation of the payment affordance: enable display (e.g., using the display enabling unit 1610), on the display unit 1602, of a request for authorization to proceed with a payment transaction for the item; receive (e.g., using the receiving unit 1612), via the one or more input device units 1604, an input that is responsive to the request for authorization to proceed with the payment transaction for the item; and in accordance with a determination that the input that is responsive to the request for authorization is consistent with input that is enabled to authorize the payment transaction for the item, proceed (e.g., using the proceeding unit 1614) with the payment transaction for the item.

The operations described above with reference to FIG. 13 are, optionally, implemented by components depicted in FIGS. 1A-1B or FIG. 16. For example, detecting operation 1306 and displaying operation 1308 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A recipient electronic device, comprising:
a display;
one or more input devices;
one or more processors; and
memory storing one or more programs configured to be executed by the one or more processors, wherein the recipient electronic device is associated with a second user, the one or more programs including instructions for:
  receiving information identifying an item for which payment has been authorized by a sender electronic device associated with a first user that is different from the second user, the item selected from among one or more items based on input received from the sender electronic device;
  displaying, on the display:
    a graphical representation of the item;
    one or more selectable graphical user interface objects corresponding to one or more configurable attributes of the item; and
    a selectable claim item graphical user interface object that enables the second user to claim the item:
  detecting, via the one or more input devices of the recipient electronic device, selection of one or more attributes of the one or more configurable attributes of the item via activation of the one or more selectable graphical user interface objects corresponding to the one or more attributes of the one or more configurable attributes of the item;
  subsequent to detecting selection of the one or more attributes via activation of the one or more selectable graphical user interface objects corresponding to the one or more attributes of the one or more configurable attributes of the item, detecting, via the one or more input devices of the recipient electronic device, a request to claim the item, wherein the request to claim the item includes activation of the claim item graphical user interface object; and
  in response to detecting the request to claim the item, including activation of the claim item graphical user interface object, initiating a process at the recipient device for obtaining the item with the selected one or more attributes, wherein initiating the process for obtaining the item with the selected one or more attributes includes transmitting an indication of the request to claim the item.

2. The recipient electronic device of claim 1, wherein the one or more attributes for the one or more configurable attributes of the item are limited to attributes that are available within one or more financial parameters set by the first user.

3. The recipient electronic device of claim 1, the one or more programs further including instructions for:
while displaying, on the display, the one or more selectable graphical user interface Objects corresponding to the one or more configurable attributes of the item, foregoing displaying, on the display, respective prices for the one or more configurable attributes.

4. The recipient electronic device of claim 1, wherein:
when receiving the information identifying the item for which payment has been authorized, the recipient electronic device is logged into a service using a second user account associated with the second user; and
when the payment was authorized by the sender electronic device associated with the first user, the sender electronic device is logged into the service using a first user account different from the second user account, the first user account associated with the first user.

5. The recipient electronic device of claim 1, wherein initiating the process for obtaining the item with the selected one or more attributes includes transmitting the selected attributes.

6. The recipient electronic device of claim 1, the one or more programs further including instructions for:
subsequent to detecting the request to claim the item, transmitting information about the selected one or more attributes to the sender electronic device.

7. The recipient electronic device of claim 1, the one or more programs further including instructions for:
subsequent to detecting the request to claim the item:
in accordance with a determination that the request to claim the item included the selection of attributes that exceed one or more financial parameters set by the first user, requesting payment, from the second user, for an amount that is determined based on how much a total price of the item exceeds the financial parameters prior to initiating the process for obtaining the item; and
in accordance with a determination that the request to claim the item did not include the selection of attributes that exceed the financial parameter set by the first user, initiating the process for obtaining the item without requesting payment from the second user.

8. The recipient electronic device of claim 1, the one or more programs further including instructions for:
subsequent to detecting the request to claim the item, requesting payment, from the second user, for an amount less than a total price of the item.

9. The recipient electronic device of claim 1, the one or more programs further including instructions for:
displaying, on the display, a graphical indication of the information identifying the item for which payment has been authorized in an instant messaging application of the recipient electronic device.

10. The recipient electronic device of claim 1, wherein displaying, on the display, the graphical representation of the item and the one or more selectable graphical user interface objects corresponding to the one or more configurable attributes of the item includes displaying the graphical representation of the item and the one or more selectable graphical user interface objects corresponding to the one or more configurable attributes in an instant messaging application of the recipient electronic device.

11. The recipient electronic device of claim 1, the one or more programs further including instructions for:
detecting, via the one or more input devices of the recipient electronic device that is associated with the second user, input of shipping information that specifies a physical address at which the item can be delivered to the second user.

12. The recipient electronic device of claim 1, the one or more programs further including instructions for:
accessing personal information about the second user stored at the recipient electronic device that is associated with the second user; and
wherein initiating the process for obtaining the item with the selected one or more attributes includes transmitting the personal information.

13. The recipient electronic device of claim 1, the one or more programs further including instructions for:
detecting, via the one or more input devices of the recipient electronic device associated with the second user, selection of an option to expedite delivery of the item;
displaying, on the display, a request for authorization to proceed with a payment for expedited deliver of the item;
receiving, via the one or more input devices of the recipient electronic device associated with the second user, an input that is responsive to the request for authorization to proceed with the payment; and
in response to receiving the input, in accordance with a determination that the input that is responsive to the request for authorization to proceed with the payment is consistent with an input enabled to authorize to proceed with the payment, proceeding with the payment for expedited delivery of the item using an account of an electronic wallet of the recipient electronic device.

14. The recipient electronic device of claim 13, the one or more programs further including instructions for:
in response to receiving the input, in accordance with a determination that the input that is responsive to the request for authorization to proceed with the payment is not consistent with an input enabled to authorize to proceed with the payment, forgoing proceeding with the payment for expedited delivery of the item using the account of the electronic wallet of the recipient electronic device.

15. The recipient electronic device of claim 1, the one or more programs further including instructions for:
displaying, on the display, an indication that the item is a gift item.

16. The recipient electronic device of claim 1, wherein the recipient electronic device includes a location sensor, the one or more programs further including instructions for:
detecting, using the location sensor, a current location of the recipient electronic device; and
in accordance with a determination that the item is available at a merchant associated with the current location, displaying, on the display, a second indication of the information identifying the item for which payment has been authorized.

17. The recipient electronic device of claim 1, the one or more programs further including instructions for:
  displaying, on the display, a request for authorization to proceed with a payment transaction for the item;
  receiving, via the one or more input devices of the recipient electronic device, an input that is responsive to the request for authorization to proceed with the payment transaction; and
  in response to receiving the input, in accordance with a determination that the input that is responsive to the request for authorization is consistent with input that is enabled to authorize the payment transaction, proceeding with the payment transaction for the item.

18. The recipient electronic device of claim 17, the one or more programs further including instructions for:
  in response to receiving the input, in accordance with a determination that the input that is responsive to the request for authorization is not consistent with input that is enabled to authorize the payment transaction, forgoing proceeding with the payment transaction for the item.

19. A non-transitory computer-readable storage medium storing one or more programs configured to be executed by one or more processors of a recipient electronic device with a display and one or more input devices, wherein the recipient electronic device is associated with a second user, the one or more programs including instructions for:
  receiving information identifying an item for which payment has been authorized by a sender electronic device associated with a first user that is different from the second user, the item selected from among one or more items based on input received from the sender electronic device;
  displaying, on the display:
    a graphical representation of the items;
    one or more selectable graphical user interface objects corresponding to one or more configurable attributes of the item; and
    a selectable claim item graphical user interface object that enables the second user to claim the item;
  detecting, via the one or more input devices of the recipient electronic device, selection of one or more attributes of the one or more configurable attributes of the item via activation of the one or more selectable graphical user interface objects corresponding to the one or more attributes of the one or more configurable attributes of the item;
  subsequent to detecting selection of the one or more attributes via activation of the one or more selectable graphical user interface objects corresponding to the one or more attributes of the one or more configurable attributes of the item, detecting, via the one or more input devices of the recipient electronic device, a request to claim the item, wherein the request to claim the item includes activation of the claim item graphical user interface object; and
  in response to detecting the request to claim the item, including activation of the claim item graphical user interface object, initiating a process at the recipient device for obtaining the item with the selected one or more attributes, wherein initiating the process for obtaining the item with the selected one or more attributes includes transmitting an indication of the request to claim the item.

20. A method, comprising:
  at a recipient electronic device with a display and one or more input devices, wherein the recipient electronic device is associated with a second user:
    receiving information identifying an item for which payment has been authorized by a sender electronic device associated with a first user that is different from the second user, the item selected from among one or more items based on input received from the sender electronic device;
    displaying, on the display:
      a graphical representation of the item;
      one or more selectable graphical user interface objects corresponding to one or more configurable attributes of the item; and
      a selectable claim item graphical user interface object that enables the second user to claim the item;
    detecting, via the one or more input devices of the recipient electronic device, selection of one or more attributes of the one or more configurable attributes of the item via activation of the one or more selectable graphical user interface objects corresponding to the one or more attributes of the one or more configurable attributes of the item;
    subsequent to detecting selection of the one or more attributes via activation of the one or more selectable graphical user interface objects corresponding to the one or more attributes of the one or more configurable attributes of the item, detecting, via the one or more input devices of the recipient electronic device, a request to claim the item, wherein the request to claim the item includes activation of the claim item graphical user interface object; and
    in response to detecting e request to claim the item, including activation of the claim item graphical user interface object, initiating a process at the recipient device for obtaining the item with the selected one or more attributes, wherein initiating the process for obtaining the item with the selected one or more attributes includes transmitting an indication of the request to claim the item.

21. The non-transitory computer-readable storage medium of claim 19, wherein the one or more attributes for the one or more configurable attributes of the item are limited to attributes that are available within one or more financial parameters set by the first user.

22. The non-transitory computer-readable storage medium of claim 19, the one or more programs further including instructions for:
  while displaying, on the display, the one or more selectable graphical user interface Objects corresponding to the one or more configurable attributes of the item, foregoing displaying, on the display, respective prices for the one or more configurable attributes.

23. The non-transitory computer-readable storage medium of claim 19, wherein:
  when receiving the information identifying the item for which payment has been authorized, the recipient electronic device is logged into a service using a second user account associated with the second user; and
  when the payment was authorized by the sender electronic device associated with the first user, the sender electronic device is logged into the service using a first user account different from the second user account, the first user account associated with the first user.

24. The non-transitory computer-readable storage medium of claim 19, wherein initiating the process for obtaining the item with the selected one or more attributes includes transmitting the selected attributes.

25. The non-transitory computer-readable storage medium of claim 19, the one or more programs further including instructions for:
subsequent to detecting the request to claim the item, transmitting information about the selected one or more attributes to the sender electronic device.

26. The non-transitory computer-readable storage medium of claim 19, the one or more programs further including instructions for:
subsequent to detecting the request to claim the item:
in accordance with a determination that the request to claim the item included the selection of attributes that exceed one or more financial parameters set by the first user, requesting payment, from the second user, for an amount that is determined based on how much a total price of the item exceeds the financial parameters prior to initiating the process for obtaining the item; and
in accordance with a determination that the request to claim the item did not include the selection of attributes that exceed the financial parameter set by the first user, initiating the process for obtaining the item without requesting payment from the second user.

27. The non-transitory computer-readable storage medium of claim 19, the one or more programs further including instructions for:
subsequent to detecting the request to claim the item, requesting payment, from the second user, for an amount less than a total price of the item.

28. The non-transitory computer-readable storage medium of claim 19, the one or more programs further including instructions for:
displaying, on the display, a graphical indication of the information identifying the item for which payment has been authorized in an instant messaging application of the recipient electronic device.

29. The non-transitory computer-readable storage medium of claim 19, wherein displaying, on the display, the graphical representation of the item and the one or more selectable graphical user interface objects corresponding to the one or more configurable attributes of the item includes displaying the graphical representation of the item and the one or more selectable graphical user interface objects corresponding to the one or more configurable attributes in an instant messaging application of the recipient electronic device.

30. The non-transitory computer-readable storage medium of claim 19, the one or more programs further including instructions for:
detecting, via the one or more input devices of the recipient electronic device that is associated with the second user, input of shipping information that specifies a physical address at which the item can be delivered to the second user.

31. The non-transitory computer-readable storage medium of claim 19, the one or more programs further including instructions for:
accessing personal information about the second user stored at the recipient electronic device that is associated with the second user; and
wherein initiating the process for obtaining the item with the selected one or more attributes includes transmitting the personal information.

32. The non-transitory computer-readable storage medium of claim 19, the one or more programs further including instructions for:
detecting, via the one or more input devices of the recipient electronic device associated with the second user, selection of an option to expedite delivery of the item;
displaying, on the display, a request for authorization to proceed with a payment for expedited delivery of the item;
receiving, via the one or more input devices of the recipient electronic device associated with the second user, an input that is responsive to the request for authorization to proceed with the payment; and
in response to receiving the input, in accordance with a determination that the input that is responsive to the request for authorization to proceed with the payment is consistent with an input enabled to authorize to proceed with the payment, proceeding with the payment for expedited delivery of the item using an account of an electronic wallet of the recipient electronic device.

33. The non-transitory computer-readable storage medium of claim 19, the one or more programs further including instructions for:
displaying, on the display, an indication that the item is a gift item.

34. The non-transitory computer-readable storage medium of claim 19, wherein the recipient electronic device includes a location sensor, the one or more programs further including instructions for:
detecting, using the location sensor, a current location of the recipient electronic device; and
in accordance with a determination that the item is available at a merchant associated with the current location, displaying, on the display, a second indication of the information identifying the item for which payment has been authorized.

35. The method of claim 20, wherein the one or more attributes for the one or more configurable attributes of the item are limited to attributes that are available within one or more financial parameters set by the first user.

36. The method of claim 20, further comprising:
while displaying, on the display, the one or more selectable graphical user interface objects corresponding to the one or more configurable attributes of the item, foregoing displaying, on the display, respective prices for the one or more configurable attributes.

37. The method of claim 20, wherein:
when receiving the information identifying the item for which payment has been authorized, the recipient electronic device is logged into a service using a second user account associated with the second user; and
when the payment was authorized by the sender electronic device associated with the first user, the sender electronic device is logged into the service using a first user account different from the second user account, the first user account associated with the first user.

38. The method of claim 20, wherein initiating the process for obtaining the item with the selected one or more attributes includes transmitting the selected attributes.

39. The method of claim 20, further comprising:
subsequent to detecting the request to claim the item, transmitting information about the selected one or more attributes to the sender electronic device.

40. The method of claim 20, further comprising:
subsequent to detecting the request to claim the item:
- in accordance with a determination that the request to claim the item included the selection of attributes that exceed one or more financial parameters set by the first user, requesting payment, from the second user, for an amount that is determined based on how much a total price of the item exceeds the financial parameters prior to initiating the process for obtaining the item; and
- in accordance with a determination that the request to claim the item did not include the selection of attributes that exceed the financial parameter set by the first user, initiating the process for obtaining the item without requesting payment from the second user.

41. The method of claim 20, further comprising:
subsequent to detecting the request to claim the item, requesting payment, from the second user, for an amount less than a total price of the item.

42. The method of claim 20, further comprising:
displaying, on the display, a graphical indication of the information identifying the item for which payment has been authorized in an instant messaging application of the recipient electronic device.

43. The method of claim 20, wherein displaying, on the display, the graphical representation of the item and the one or more selectable graphical user interface objects corresponding to the one or more configurable attributes of the item includes displaying the graphical representation of the item and the one or more selectable graphical user interface objects corresponding to the one or more configurable attributes in an instant messaging application of the recipient electronic device.

44. The method of claim 20, further comprising:
detecting, via the one or more input devices of the recipient electronic device that is associated with the second user, input of shipping information that specifies a physical address at which the item can be delivered to the second user.

45. The method of claim 20, further comprising:
accessing personal information about the second user stored at the recipient electronic device that is associated with the second user; and
wherein initiating the process for obtaining the item with the selected one or more attributes includes transmitting the personal information.

46. The method of claim 20, further comprising:
detecting, via the one or more input devices of the recipient electronic device associated with the second user, selection of an option to expedite delivery of the item;
displaying, on the display, a request for authorization to proceed with a payment for expedited delivery of the item;
receiving, via the one or more input devices of the recipient electronic device associated with the second user, an input that is responsive to the request for authorization to proceed with the payment; and
in response to receiving the input, in accordance with a determination that the input that is responsive to the request for authorization to proceed with the payment is consistent with an input enabled to authorize to proceed with the payment, proceeding with the payment for expedited delivery of the item using an account of an electronic wallet of the recipient electronic device.

47. The method of claim 20, further comprising:
displaying, on the display, an indication that the item is a gift item.

48. The method of claim 20, wherein the recipient electronic device includes a location sensor, the method further comprising:
detecting, using the location sensor, a current location of the recipient electronic device; and
in accordance with a determination that the item is available at a merchant associated with the current location, displaying, on the display, a second indication of the information identifying the item for which payment has been authorized.

* * * * *

UNITED STATES PATENT AND TRADEMARK OFFICE
CERTIFICATE OF CORRECTION

| | | |
|---|---|---|
| PATENT NO. | : 11,481,769 B2 | Page 1 of 1 |
| APPLICATION NO. | : 16/789132 | |
| DATED | : October 25, 2022 | |
| INVENTOR(S) | : Marcel Van Os et al. | |

It is certified that error appears in the above-identified patent and that said Letters Patent is hereby corrected as shown below:

In the Claims

In Column 84, Line 49, Claim 1, delete "item:" and insert -- item; --, therefor.

In Column 85, Line 15, Claim 3, delete "Objects" and insert -- objects --, therefor.

In Column 86, Line 30, Claim 13, delete "deliver" and insert -- delivery --, therefor.

In Column 87, Line 37, Claim 19, delete "items;" and insert -- item; --, therefor.

In Column 88, Line 36, Claim 20, delete "e" and insert -- the --, therefor.

In Column 88, Line 53, Claim 22, delete "Objects" and insert -- objects --, therefor.

Signed and Sealed this
Eighteenth Day of April, 2023

Katherine Kelly Vidal
*Director of the United States Patent and Trademark Office*